(12) United States Patent
Yamano et al.

(10) Patent No.: US 7,737,933 B2
(45) Date of Patent: Jun. 15, 2010

(54) DISPLAY UNIT AND DRIVE SYSTEM THEREOF AND AN INFORMATION DISPLAY UNIT

(75) Inventors: Atsuhiro Yamano, Hyogo (JP); Hiroshi Takahara, Osaka (JP); Hitoshi Tsuge, Osaka (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 854 days.

(21) Appl. No.: 10/381,047

(22) PCT Filed: Sep. 26, 2001

(86) PCT No.: PCT/JP01/08331

§ 371 (c)(1),
(2), (4) Date: Sep. 10, 2003

(87) PCT Pub. No.: WO02/26905

PCT Pub. Date: Apr. 4, 2002

(65) Prior Publication Data

US 2004/0066363 A1    Apr. 8, 2004

(30) Foreign Application Priority Data

Sep. 26, 2000 (JP) ............................. 2000-292037
Dec. 27, 2000 (JP) ............................. 2000-39710
Dec. 27, 2000 (JP) ............................. 2000-397710
Mar. 12, 2001 (JP) ............................. 2001-068947

(51) Int. Cl.
*G09G 3/36* (2006.01)
(52) U.S. Cl. ............................. 345/94; 345/98; 345/95

(58) Field of Classification Search .................... 345/63, 345/94–96, 98, 101, 206, 208, 210
See application file for complete search history.

(56) References Cited

U.S. PATENT DOCUMENTS 4,915,477 A * 4/1990 Ohta et al. ..................... 345/94

(Continued)

FOREIGN PATENT DOCUMENTS

EP    0654777    5/1995

(Continued)

OTHER PUBLICATIONS

English Language Abstract of JP 10-161615.

(Continued)

*Primary Examiner*—Sumati Lefkowitz
*Assistant Examiner*—William L Boddie
(74) *Attorney, Agent, or Firm*—Greenblum & Bernstein PLC

(57) ABSTRACT

In a display panel, a dummy pulse of a predetermined voltage signal is superimposed on a data signal and the dummy pulse has an amplitude much larger than the amplitude of the data signal, and thus a signal waveform applied to a light modulation layer such as LC layer is changed to a high frequency wave. The applying position of the dummy pulse is varied according to each color of R, G and B, or varied according to frame or field. By performing a MLS drive with the dummy pulse superimposed on the data signal, the amplitude difference between the selection signal and the data signal can be reduced. Thus, a common driver IC and a segment driver IC can be formed as one semiconductor chip to be placed on one side, constructing a three side free type.

10 Claims, 156 Drawing Sheets

U.S. PATENT DOCUMENTS

| | | | | |
|---|---|---|---|---|
| 5,107,353 A | * | 4/1992 | Okumura | 345/96 |
| 5,841,416 A | | 11/1998 | Mano et al. | |
| 6,061,044 A | | 5/2000 | Ohno et al. | |
| 6,219,113 B1 | | 4/2001 | Takahara | |
| 6,232,944 B1 | | 5/2001 | Kumagawa et al. | |
| 6,426,594 B1 | * | 7/2002 | Ito | 345/210 |
| 6,522,356 B1 | * | 2/2003 | Watanabe | 348/272 |
| 6,535,191 B1 | * | 3/2003 | Miyachi | 345/89 |

FOREIGN PATENT DOCUMENTS

| | | | |
|---|---|---|---|
| EP | 0990940 | | 4/2000 |
| JP | 09243997 A | * | 9/1997 |
| JP | 10-161615 | | 6/1998 |
| JP | 11024102 A | * | 1/1999 |
| JP | 2000-147576 | | 5/2000 |

OTHER PUBLICATIONS

Patent Abstracts of Japan, vol. 2000, No. 8 (Oct. 6, 2000).

* cited by examiner

Fig.1
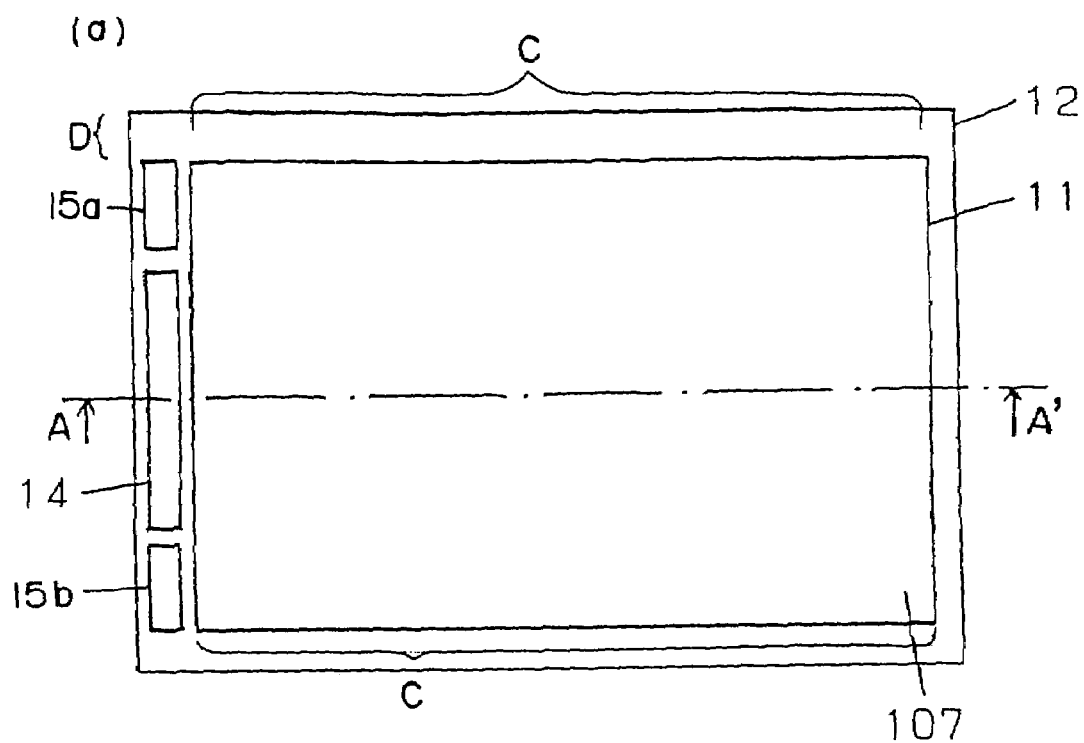
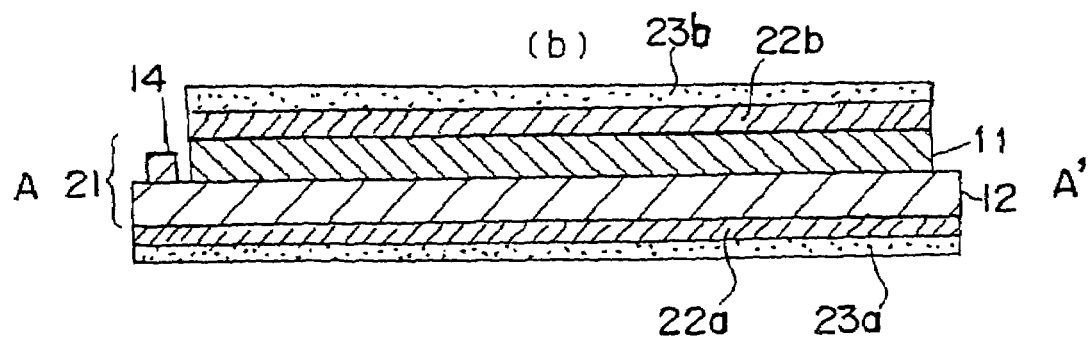

Fig.5
(a)
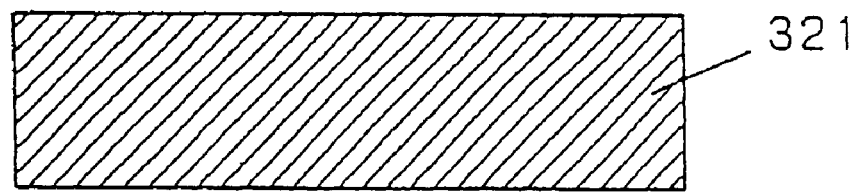
(b)
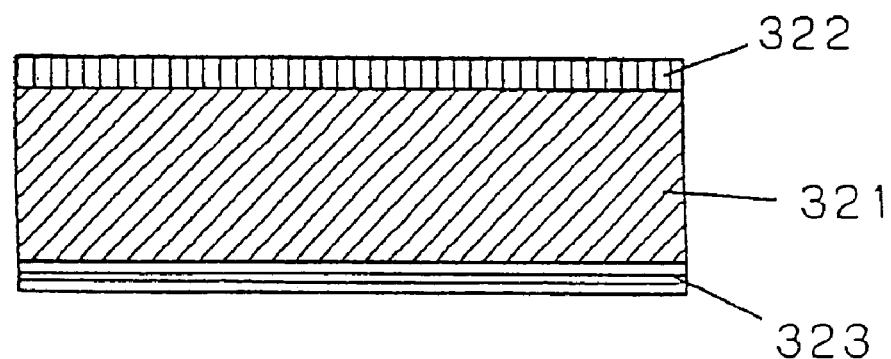
(c)
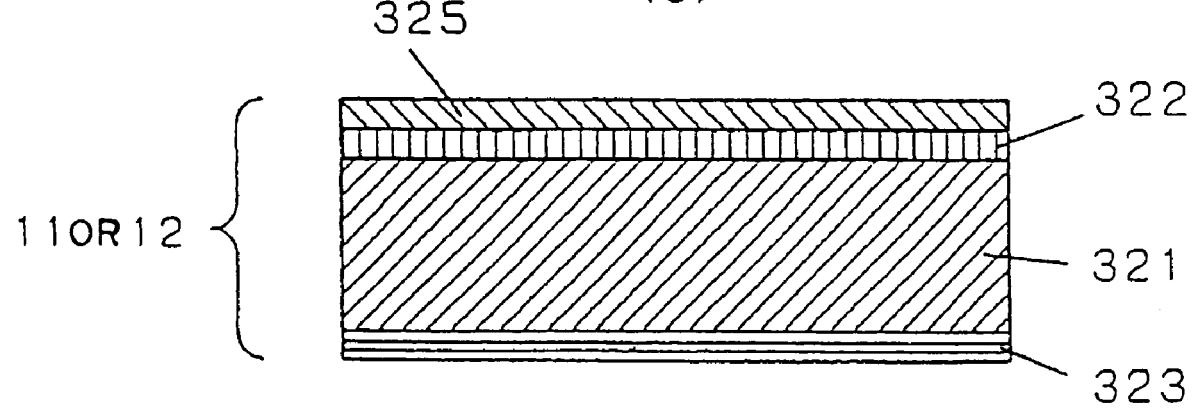

Fig.11

$$\sqrt{\frac{(a+2)^2 V^2 + V^2 + (aV)^2 + V^2 + (aV)^2 + V^2 + (aV)^2 + V^2}{8}} = V\sqrt{\frac{a^2+a+2}{2}}$$

Fig.12

1, 5, 7 SCAN LINE : $V\sqrt{\dfrac{a^2+a+2}{2}}$ 2, 3, 4.6, 8 SCAN LINE : $V\sqrt{\dfrac{a^2-a+2}{2}}$

Fig.13

$V\sqrt{\dfrac{a^2+a+2}{2}} \Rightarrow$ ON $V\sqrt{\dfrac{a^2-a+2}{2}} \Rightarrow$ OFF

Fig.14

$$\text{TIME} \downarrow \begin{bmatrix} -1 & 1 & 1 & 1 & 0 & 0 & 0 & 0 \\ 0 & 0 & 0 & 0 & -1 & 1 & 1 & 1 \\ 1 & 1 & -1 & 1 & 0 & 0 & 0 & 0 \\ 0 & 0 & 0 & 0 & 1 & 1 & -1 & 1 \\ 1 & -1 & 1 & 1 & 0 & 0 & 0 & 0 \\ 0 & 0 & 0 & 0 & 1 & -1 & 1 & 1 \\ 1 & 1 & 1 & -1 & 0 & 0 & 0 & 0 \\ 0 & 0 & 0 & 0 & 1 & 1 & 1 & -1 \end{bmatrix} \xrightarrow{\text{SCAN LINE}} \times \text{SCAN LINE} \downarrow \begin{bmatrix} -1 \\ -1 \\ -1 \\ -1 \\ -1 \\ -1 \\ -1 \\ -1 \end{bmatrix} = \text{TIME} \downarrow \begin{bmatrix} -2 \\ -2 \\ -2 \\ -2 \\ -2 \\ -2 \\ -2 \\ -2 \end{bmatrix}$$

Fig.15

$$\text{TIME} \downarrow \begin{bmatrix} -1 & 1 & 1 & 1 & 0 & 0 & 0 & 0 \\ 0 & 0 & 0 & 0 & -1 & 1 & 1 & 1 \\ 1 & 1 & -1 & 1 & 0 & 0 & 0 & 0 \\ 0 & 0 & 0 & 0 & 1 & 1 & -1 & 1 \\ 1 & -1 & 1 & 1 & 0 & 0 & 0 & 0 \\ 0 & 0 & 0 & 0 & 1 & -1 & 1 & 1 \\ 1 & 1 & 1 & -1 & 0 & 0 & 0 & 0 \\ 0 & 0 & 0 & 0 & 1 & 1 & 1 & -1 \end{bmatrix} \times \text{SCAN LINE} \downarrow \begin{bmatrix} 1 \\ 1 \\ 1 \\ 1 \\ 1 \\ 1 \\ 1 \\ 1 \end{bmatrix} = \text{TIME} \downarrow \begin{bmatrix} 2 \\ 2 \\ 2 \\ 2 \\ 2 \\ 2 \\ 2 \\ 2 \end{bmatrix}$$

Fig.17

$$V_{ON} = \sqrt{\frac{3(a+1)^2V^2 + (a-1)^2V^2 + (N-4)V^2}{N}} = V\sqrt{\frac{4a^2+4a+N}{N}}$$

$$V_{OFF} = \sqrt{\frac{(a+1)^2V^2 + 3(a-1)^2V^2 + (N-4)V^2}{N}} = V\sqrt{\frac{4a^2-4a+N}{N}}$$

Fig.18

$$V_{ON} = V\sqrt{\frac{4a^2+4a+N}{N}}\frac{L}{4}$$

$$V_{OFF} = V\sqrt{\frac{4a^2-4a+N}{N}}\frac{L}{4}$$

Fig.19

$$V_{ON} / V_{OFF} \sqrt{\frac{4a^2+4a+N}{4a^2-4a+N}}$$

Fig.20

$$\frac{d}{da}\left(\frac{4a^2+4a+N}{4a^2-4a+N}\right) = \frac{(8a+4)(4a^2-4a+N)-(8a-4)(4a^2+4a+N)}{(4a^2-4a+N)^2}$$

$$= \frac{8(N-4a)^2}{(4a^2-4a+N)^2}$$

Fig.21

$$\left(V_{ON}/V_{OFF}\right)_{max} = \sqrt{\frac{4\cdot\frac{N}{4}+4\cdot\frac{\sqrt{N}}{2}+N}{4\cdot\frac{N}{4}-4\cdot\frac{\sqrt{N}}{2}+N}} = \sqrt{\frac{\sqrt{N}+1}{\sqrt{N}-1}}$$

Fig.22

$$V_{OFF} = V\sqrt{\frac{4a^2-4a+N}{N}\frac{L}{4}} = V_{th}$$

$$\therefore V = V_{th}\sqrt{\frac{N}{4a^2-4a+N}\frac{4}{L}}$$

Fig.23

$$V = V_{th} \sqrt{\frac{N}{4 \cdot \frac{N}{4} - 4 \cdot \sqrt{\frac{N}{2}} + N} \cdot \frac{4}{L}} = \frac{V_{th}}{\sqrt{L}} \sqrt{\frac{2}{1 - 1/\sqrt{N}}}$$

Fig.24

$$L \cdot V = \sqrt{L} V_{th} \sqrt{\frac{2}{1 - 1/\sqrt{N}}}$$

Fig.25

$$2aV = \frac{2\sqrt{N}}{2} V = \frac{V_{th}}{\sqrt{L}} \sqrt{\frac{2N}{1 - 1/\sqrt{N}}}$$

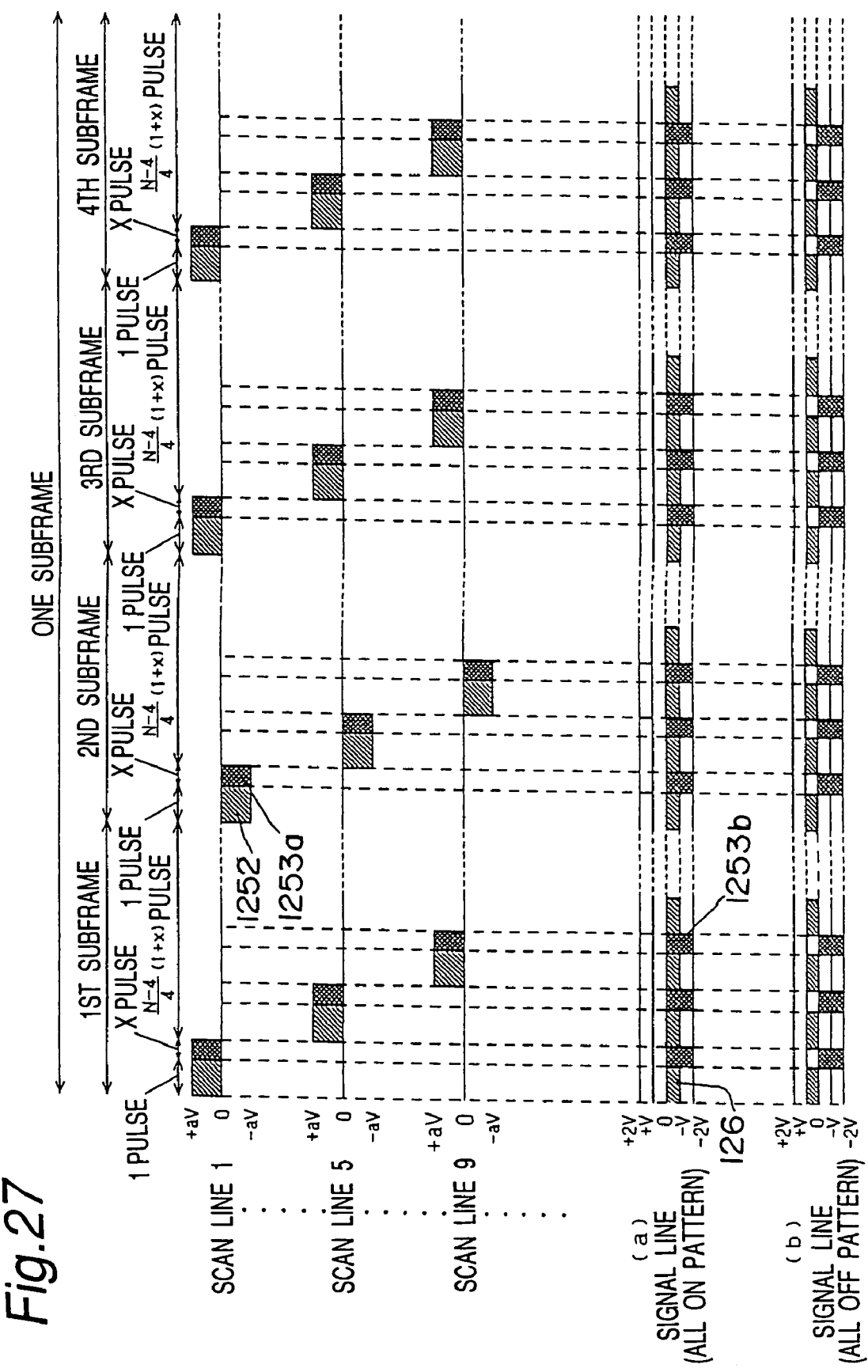

Fig.28

$$V_{ON} = V\sqrt{\frac{3(a+1)^2V^2+(a-1)^2V^2+(N-4)V^2+3x(a+2)^2V^2+x(a-2)^2V^2+x(N-4)(2V)^2}{(1+x)N}}$$

$$= V\sqrt{\frac{4a^2+4a+N+4x(a^2+2a+N)}{(1+x)N}}$$

$$V_{OFF} = V\sqrt{\frac{(a+1)^2V^2+3(a-1)^2V^2+(N-4)V^2+3x(a+2)^2V^2+x(a-2)^2V^2+x(N-4)(2V)^2}{(1+x)N}}$$

$$= V\sqrt{\frac{4a^2-4a+N+4x(a^2+2a+N)}{(1+x)N}}$$

Fig.29

$$\text{STANDARD VOLTAGE} = V_{th}\sqrt{\frac{(1+x)N}{4a^2-4a+N+4x(a^2+2a+N)}}$$

$$V_{ON}/V_{OFF} = \sqrt{\frac{4a^2+4a+N+4x(a^2+2a+N)}{4a^2-4a+N+4x(a^2+2a+N)}}$$

Fig.30

| DUMMY PULSE WIDTH X | STANDARD VOLTAGE V | SIGNAL SIDE TOLERANCE VOLTAGE 4V | SCAN SIDE TOLERANCE VOLTAGE 2aV | ON/OFF RATIO $V_{ON}/V_{OFF}$ |
|---|---|---|---|---|
| 0.00 | 1.44 | 5.75 | 17.24 | 1.082 |
| 0.05 | 1.37 | 5.49 | 16.48 | 1.072 |
| 0.10 | 1.32 | 5.29 | 15.87 | 1.064 |
| 0.15 | 1.28 | 5.12 | 15.37 | 1.058 |
| 0.20 | 1.25 | 4.98 | 14.95 | 1.052 |

Fig.32

$$V_{ON} = V\sqrt{\frac{3(a+1)^2V^2+(a-1)^2V^2+(N-4)V^2+3x(a+2)^2V^2+x(a-2)^2V^2+x(N-4)(3V)^2}{(1+x)N}}$$

$$= V\sqrt{\frac{4a^2+4a+N+x(4a^2+8a+9N-20)}{(1+x)N}}$$

$$V_{OFF} = V\sqrt{\frac{(a+1)^2V^2+3(a-1)^2V^2+(N-4)V^2+3x(a+2)^2V^2+x(a-2)^2V^2+x(N-4)(3V)^2}{(1+x)N}}$$

$$= V\sqrt{\frac{4a^2-4a+N+x(4a^2+8a+9N-20)}{(1+x)N}}$$

Fig.33

$$V = V_{th}\sqrt{\frac{(1+x)N}{4a^2-4a+N+x(4a^2+8a+9N-20)}}$$

$$V_{ON}/V_{OFF} = \sqrt{\frac{4a^2+4a+N+x(4a^2+8a+9N-20)}{4a^2-4a+N+x(4a^2+8a+9N-20)}}$$

Fig.34

| DUMMY PULSE WIDTH X | STANDARD VOLTAGE V | SIGNAL SIDE TOLERANCE VOLTAGE 4V | SCAN SIDE TOLERANCE VOLTAGE 2aV | ON/OFF RATIO $V_{ON}/V_{OFF}$ |
|---|---|---|---|---|
| 0.00 | 1.44 | 5.75 | 17.24 | 1.082 |
| 0.025 | 1.36 | 5.44 | 16.31 | 1.072 |
| 0.05 | 1.30 | 5.19 | 15.56 | 1.064 |
| 0.075 | 1.24 | 4.98 | 14.93 | 1.058 |

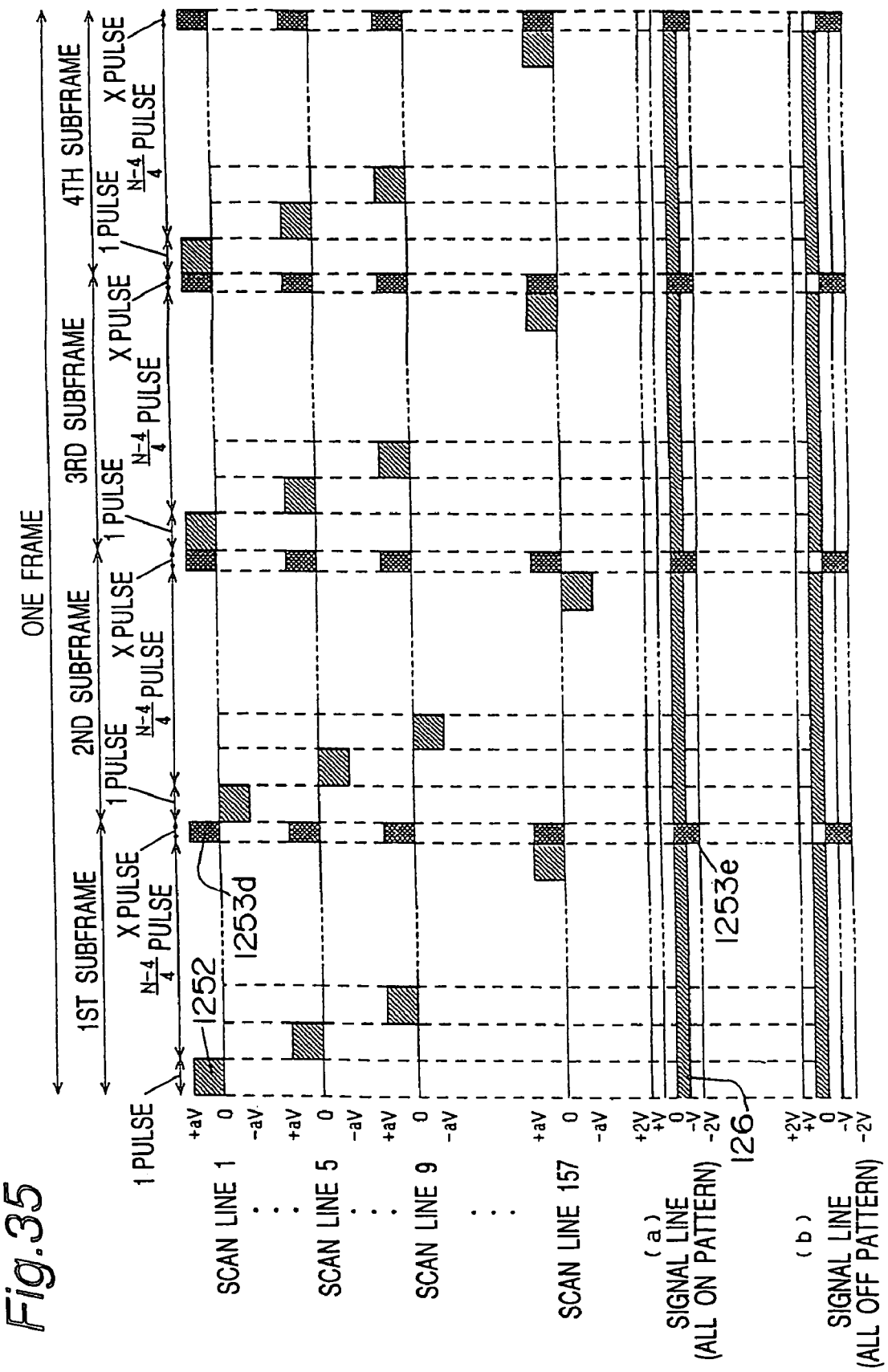

Fig.36

$$V_{ON} = V\sqrt{\frac{3(a+1)^2V^2+(a-1)^2V^2+(N-4)V^2+4x(a+2)^2V^2}{N+4x}}$$

$$= V\sqrt{\frac{4a^2+4a+N+4x(a+2)^2}{N+4x}}$$

$$V_{OFF} = V\sqrt{\frac{(a+1)^2V^2+3(a-1)^2V^2+(N-4)V^2+4x(a+2)^2V^2}{N+4x}}$$

$$= V\sqrt{\frac{4a^2-4a+N+4x(a+2)^2}{N+4x}}$$

Fig.37

$$V = V_{th}\sqrt{\frac{N+4x}{4a^2-4a+N+4x(a+2)^2}}$$

$$V_{ON}/V_{OFF} = \sqrt{\frac{4a^2+4a+N+4x(a+2)^2}{4a^2-4a+N+4x(a+2)^2}}$$

Fig.38

| DUMMY PULSE WIDTH X | STANDARD VOLTAGE V | SIGNAL SIDE TOLERANCE VOLTAGE 4V | SCAN SIDE TOLERANCE VOLTAGE 2aV | ON/OFF RATIO $V_{ON}/V_{OFF}$ |
|---|---|---|---|---|
| 0.00 | 1.44 | 5.75 | 17.24 | 1.082 |
| 0.10 | 1.38 | 5.51 | 16.52 | 1.076 |
| 0.20 | 1.32 | 5.30 | 15.89 | 1.070 |
| 0.30 | 1.28 | 5.11 | 15.32 | 1.065 |
| 0.40 | 1.24 | 4.94 | 14.82 | 1.061 |

Fig.44

$$x < \frac{-(4a^2-4a+N)\alpha^2+(4a^2+4a+N)}{(12a+3N)\alpha^2-(4a+3N)}$$

Fig.45

$$V_{ON}=V\sqrt{\frac{3(1-x)(a+1)^2V^2+3x(a+2)^2V^2+(1-x)(a-1)^2V^2+x(a-2)^2V^2+(1-x)(N-4)V^2+x(N-4)(2V)^2}{(1+x)N}}$$

$$=V\sqrt{\frac{4a^2+4a+N+x(4a+3N)}{N}}$$

$$V_{OFF}=V\sqrt{\frac{3(1-x)(a-1)^2V^2+3x(a+2)^2V^2+(1-x)(a+1)^2V^2+x(a-2)^2V^2+(1-x)(N-4)V^2+x(N-4)(2V)^2}{(1+x)N}}$$

$$=V\sqrt{\frac{4a^2-4a+N+x(12a+3N)}{N}}$$

Fig.46

$$V = V_{th} \sqrt{\frac{N}{4a^2 - 4a + N + x(12a + 3N)}}$$

$$V_{ON} / V_{OFF} = \sqrt{\frac{4a^2 + 4a + N + x(4a + 3N)}{4a^2 - 4a + N + x(12a + 3N)}}$$

Fig.47

$$x = \frac{-4a^2 + 4a + \left[\left(\frac{V_{th}}{V}\right)^2 - 1\right] N}{12a + 3N}$$

Fig.87
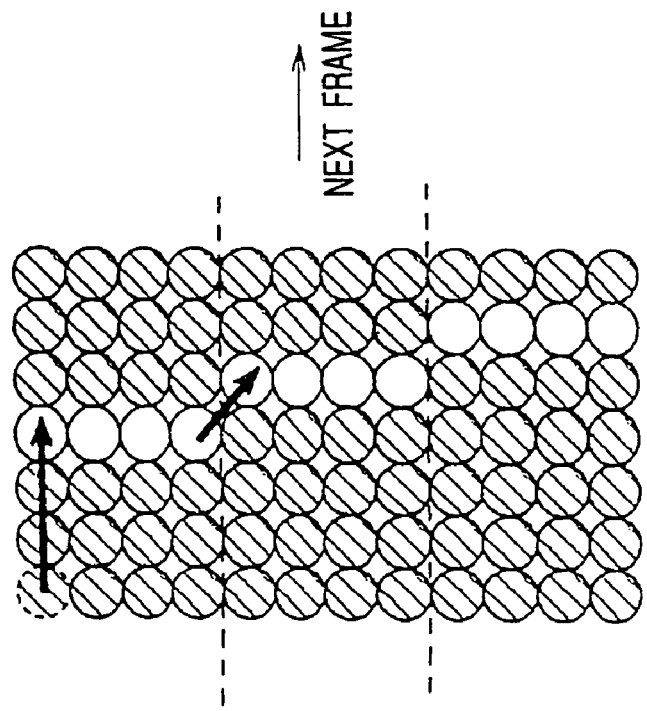
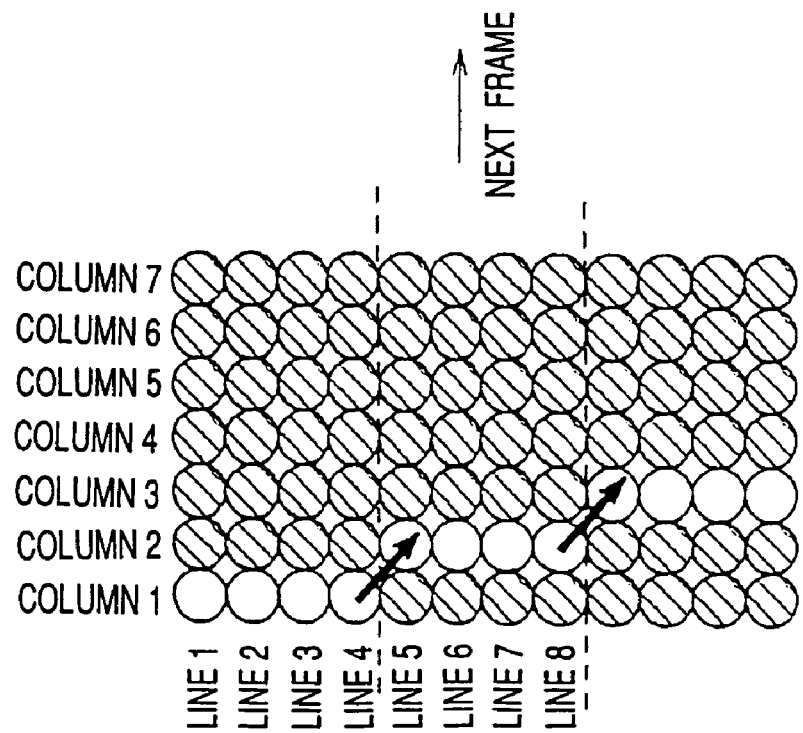

Fig.95

| No. 0 | 0/1 | ◐ |
| No. 1 | 1/7 | ○◐◐◐◐◐◐ |
| No. 2 | 2/7 | ○○◐◐◐◐◐ |
| No. 3 | 3/7 | ○○○◐◐◐◐ |
| No. 4 | 4/7 | ○○○○◐◐◐ |
| No. 5 | 5/7 | ○○○○○◐◐ |
| No. 6 | 6/7 | ○○○○○○◐ |
| No. 7 | 1/1 | ○ |

Fig. 103
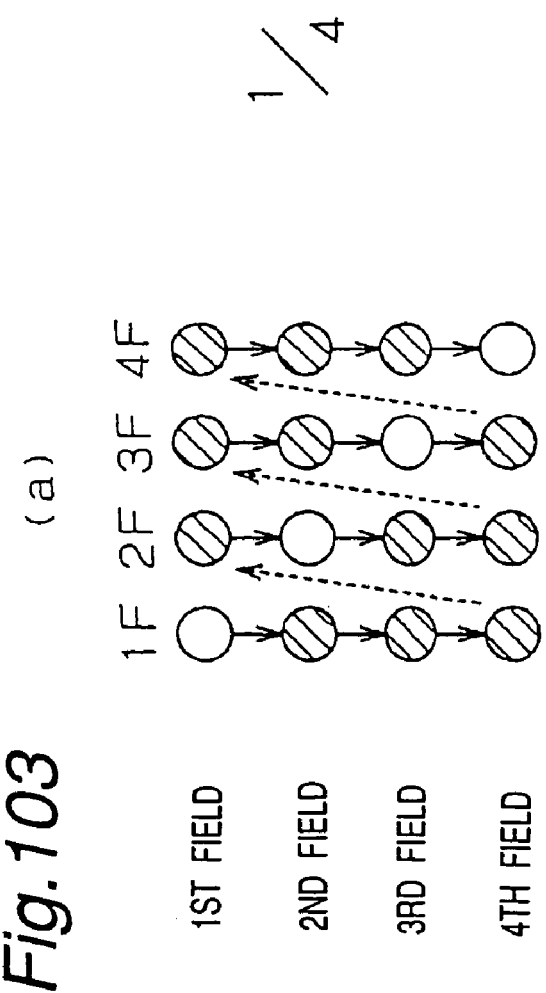
(a)
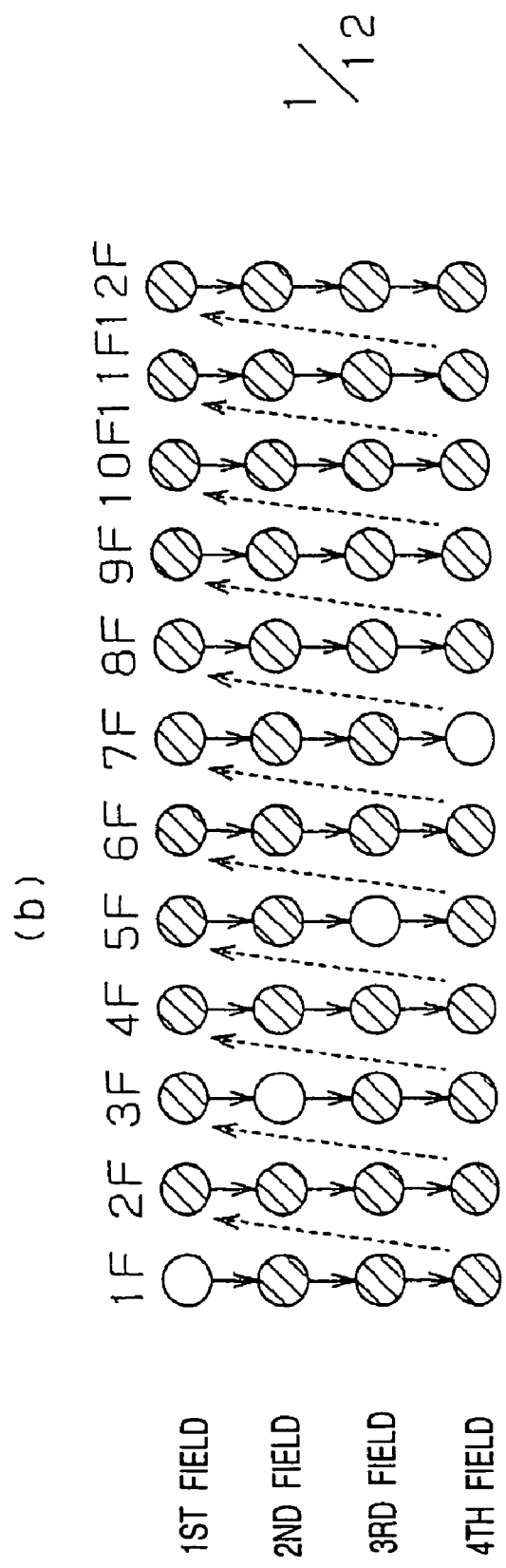
(b)

Fig.115
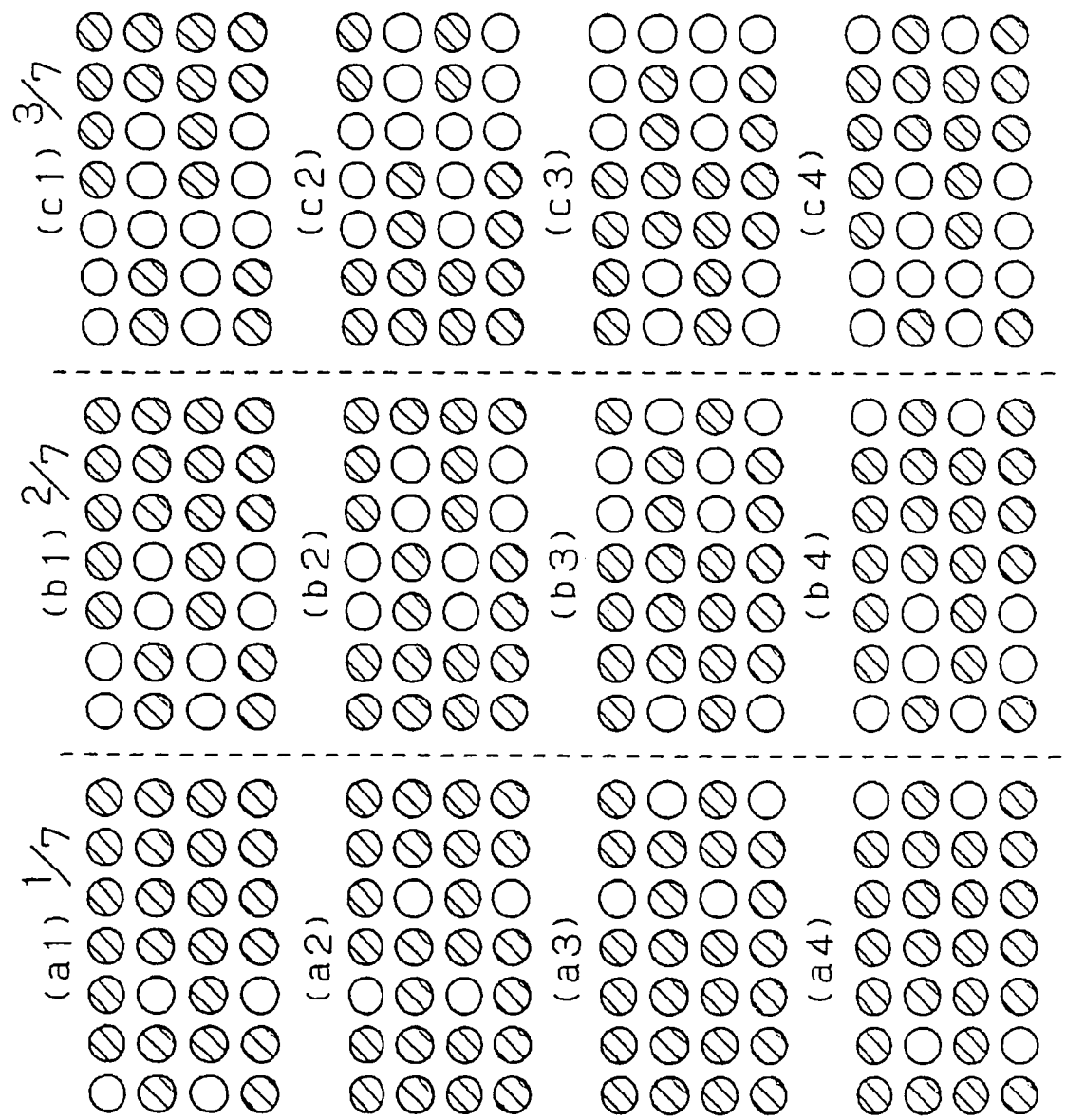
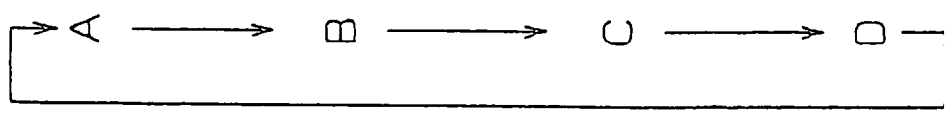

Fig.119

OSCILLATION FREQUENCY/FRAME RATE

| OSCILLATION \ DIVISION | 1/1 | 1/2 | 1/4 | 1/8 |
|---|---|---|---|---|
| 160KHz | 160KHz | 80KHz | 40KHz | 20KHz |
| 100KHz | 100KHz | 50KHz | 25KHz | 12.5KHz |

Fig.120

| DISPLAY COLOR | LIQUID CRYSTAL RESPONSE TIME (msec) | |
|---|---|---|
| | 70 | 250 |
| 8 | 45 (Hz) | 35 (Hz) |
| 256 | 120 (Hz) | 80 (Hz) |
| 4096 | 140 (Hz) | 100 (Hz) |
| MOVING PICTURE (EXCEPT 8 COLORS) | 160 (Hz) | 120 (Hz) |

Fig.130

| BIT SEQUENCE / FORMAT | b8 | b7 | b6 | b5 | b4 | b3 | b2 | b1 |
|---|---|---|---|---|---|---|---|---|
| INFORMATION TRANSMISSION I FRAME | $2^2$ | $2^1$ | $2^0$ | P | $2^2$ | $2^1$ | $2^0$ | 0 |
| | RECEIVING ORDER NUMBER N(R) | | | | TRANSMISSION ORDER NUMBER N(S) | | | |
| SUPERVISORY S FRAME | $2^2$ | $2^1$ | $2^0$ | P/F | SUPERVISORY FUNCTION S BIT | | 0 | 1 |
| | RECEIVING ORDER NUMBER N(R) | | | | | | | |
| UNNUMBERED SYSTEM U FRAME | M | M | M | P/F | MODIFIER M FUNCTION BIT | | 1 | 1 |
| | MODIFIER FUNCTION BIT | | | | | | | |

Fig. 131

(a)
NUMBER OF COLORS

| NUMBER | DISPLAY COLOR |
|---|---|
| 0 | WHITE/BLACK |
| 1 | 8 COLORS |
| 2 | 256 COLORS |
| 3 | 4096 COLORS |
| 4 | 65K COLORS |
| 5 | 260K COLORS |
| 6 | TRUE COLOR |
| 7 | RESERVE |

(b)
RATE

| NUMBER | RATE |
|---|---|
| 0 | 20 |
| 1 | 40 |
| 2 | 60 |
| 3 | 80 |
| 4 | 100 |
| 5 | 120 |
| 6 | 160 |
| 7 | RESERVE |

SEED FUNCTION

1ST LINE  1 −1 1 1
2ND LINE  1 1 1 −1
3RD LINE  −1 1 1 1
4TH LINE  1 1 −1 1

(b)

| ORTHOGONAL FUNCTION | VOLTAGE | LOGIC |
|---|---|---|
| 1 | aV | H |
| −1 | −aV | L |

(c)

| B | H | Q |
|---|---|---|
| 0 | 0 | 1 |
| 0 | 1 | 0 |
| 1 | 0 | 0 |
| 1 | 1 | 1 |

Fig.146

| DATA | VOLTAGE | LOGIC |
|---|---|---|
| 1 (ON) | −V | 1 |
| 0 (OFF) | V | 0 |

Fig.147

| GRADATION NUMBER | FRC FORMAT | GRADATION NUMBER | FRC FORMAT |
|---|---|---|---|
| 0 | 0/1 | 15 | 1/1 |
| 1 | 1/13 | 14 | 12/13 |
| 2 | 1/7 | 13 | 6/7 |
| 3 | 1/5 | 12 | 4/5 |
| 4 | 1/4 | 11 | 3/4 |
| 5 | 1/3 | 10 | 2/3 |
| 6 | 2/5 | 9 | 3/5 |
| 7 | 6/13 | 8 | 7/13 |

Fig. 148A

| HSEL [1:0] | SELECTED LINE |
|---|---|
| 0 | 1ST LINE |
| 1 | 2ND LINE |
| 2 | 3RD LINE |
| 3 | 4TH LINE |

Fig. 148B

| PM | POLARITY |
|---|---|
| 0 | NEGATIVE |
| 1 | POSITIVE |

Fig. 148C

| NW/NB | DISPLAY |
|---|---|
| 0 | NB |
| 1 | NW |

Fig. 148D

| NW/NB | PM | H [3:0] |
|---|---|---|
| 0 | 0 | $\overline{IH[3:0]}$ |
| 0 | 1 | IH [3:0] |
| 1 | 0 | IH [3:0] |
| 1 | 1 | $\overline{IH[3:0]}$ |

Fig.149

| Q3 | Q2 | Q1 | Q0 | S[2:0] |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 2 |
| 0 | 1 | 0 | 0 | 1 |
| 0 | 1 | 0 | 1 | 2 |
| 0 | 1 | 1 | 0 | 2 |
| 0 | 1 | 1 | 1 | 3 |
| 1 | 0 | 0 | 0 | 1 |
| 1 | 0 | 0 | 1 | 2 |
| 1 | 0 | 1 | 0 | 2 |
| 1 | 0 | 1 | 1 | 3 |
| 1 | 1 | 0 | 0 | 2 |
| 1 | 1 | 0 | 1 | 3 |
| 1 | 1 | 1 | 0 | 3 |
| 1 | 1 | 1 | 1 | 4 |

Fig.150

| MLS OPERATION RESULTS | SELECTED VOLTAGE |
|---|---|
| 4 | V2 |
| 3 | V1 |
| 2 | Vc |
| 1 | MV1 |
| 0 | MV2 |

1791
1792
POSITION OF LEE 1791
c
1793

DISPLAY UNIT AND DRIVE SYSTEM THEREOF AND AN INFORMATION DISPLAY UNIT

TECHNICAL FIELD

The present invention relates to a display unit using a liquid crystal display (LCD) panel and the like that can achieve a high light-utilization efficiency in both a transparent mode and a reflective mode, and to a driving system therefor, and further relates to a portable information terminal device such as a viewfinder, video camera, and a mobile or portable telephone.

BACKGROUND ART

Since LCD panels have the advantages of being slim and low power consumption, they are commonly used in many portable appliances such as word processors, personal computers and televisions, as well as the viewfinders and monitors of video cameras. In recent years, there has been adopted a reflective-type LCD panel using external light as a light source in place of backlight.

However, in a display panel using a liquid crystal layer as a light modulation layer, there arises a problem that flickers are generated when a frame rate (i.e., frames number to be rewritten on a display screen per a second) is lowered. On the other hand, when a frame rate is made higher to suppress the occurrence of flickers, the circuit scale of the display unit is increased to be a problem.

In a simple matrix type LCD panel, an amplitude of a common selection signal for selecting a common driver IC is much larger than an amplitude of a segment data signal for a segment driver IC. Therefore, when a common driver IC and a segment driver IC are to be assembled as one semiconductor chip, it is necessary that a tolerance voltage of the semiconductor chip must be matched with an amplitude of the selection signal. Accordingly, a high tolerance voltage processing is required as an IC process, and it was difficult in cost to combine a common driver and a segment driver as one semiconductor chip. This is because it was difficult to achieve a display panel having a construction of three free sides having no driver IC and only one side thereof formed with driver IC chip thereon.

Recently, information terminals of mobile or portable telephones are progressing, and there is a demand for realizing a high quality or good contrast display of a moving picture even in a mobile telephone. In order to achieve a high contrast display of a moving picture, the frame rate must be made high. The frame rate is proportional to a power consumption, and the power consumption is increased when the frame rate is made high. However, suppression of power consumption is essentially required in a mobile telephone, and therefore there is a demand for realizing both a good display of a moving picture and a low power consumption compatibly.

In a mobile telephone network, there is adopted a charge system in which a charge for usage is decided in accordance with a data transmission time or data transmission amount. Namely, it is required that image data should be transferred in a short time with suppressing the transmission data amount as small as possible. Moreover, when the image data amount is increased, the circuit operation of a mobile telephone is complicated and the power consumption is increased to be problematic.

An essential object of the present invention is to provide a display device and driving system, construction and method solving these shortcomings.

DISCLOSURE OF INVENTION

In order to achieve the object, in a display panel according to the present invention, in consideration of a fact that flickers are generated when a data frame rate is lowered, a predetermined voltage signal, namely, a dummy pulse having amplitude greater than an amplitude of a data signal is superimposed on the data signal in synchronization with a selection signal, namely, a scanning signal. By applying the dummy pulse, the signal waveform to be applied to a light modulation layer such as a liquid crystal layer is made high in frequency, and the flicker occurrence is remarkably suppressed.

The applying position of the dummy pulse on the data signal may be varied according to each color of R, G and B. By this arrangement, the flicker occurrence can be more effectively suppressed. Also, by varying the applying position of the dummy pulse in frames or fields, the flicker occurrence can be further effectively suppressed. Moreover, by adjusting the amplitude of the dummy pulse or varying the applying position thereof, the flicker can be further effectively suppressed.

The dummy pulses may be made continuous in applying position between adjoining scanning lines, for example, between an even numbered scanning line and an adjoining odd numbered scanning line. By this arrangement, the variation in amplitude of the data signal can be reduced and the power consumption can be accordingly reduced. Also, the amplitude or applying position of the dummy pulse may be adjusted or varied, and by this arrangement, a luminance (i.e., brightness or contrast) of an image can be easily adjusted.

According to another aspect of the present invention, regarding gradation data subject to a frame rate control (FRC), the first gradation data may be comprised of common divisors of 12 and the second gradation data may be comprised of common divisors of 8. By performing a gradation display with the gradation data, the flicker occurrence can be effectively suppressed. Also, a good display with a high contrast can be compatibly achieved both in display of a moving picture and a still picture.

A gradation selection circuit may be provided on each segment (or source) signal line for selecting gradation data corresponding to image data based on the image data and output data of a gradation data shift circuit. Regarding gradation registers of the gradation data shift circuit, there is omitted a gradation register which can be formed by mirror reversion of the data, and the data of the omitted gradation register is restored by reversing the data of the gradation data shift circuit in the gradation selection circuit. By this arrangement, the circuit scale can be reduced to half and an IC chip size can be also reduced to thereby realize a reduction in cost.

In specific, in a simple matrix type LCD panel, an amplitude of a selection signal for a common driver IC is much larger than an amplitude of a data signal for a segment driver IC. According to the present invention, a dummy pulse is superimposed on the data signal to thereby comparatively reduce the amplitude of the selection signal.

Moreover, by carrying out a multi line selection (MLS) drive to be described later, the amplitude of the selection signal can be further reduced. By this arrangement, the amplitude difference between the selection signal and the data signal can be remarkably reduced. Accordingly, a circuit of a common driver IC and a circuit of a segment driver IC can be configured as one semiconductor chip. By forming the driver IC circuits as one semiconductor chip, a display panel of a construction having three free sides can be easily achieved where only one side of the display panel is provided with the common and segment driver ICs thereon.

In mobile telephones and the like according to the present invention, in order to compatibly achieve both a good display contrast of a moving picture and a reduction in power consumption, the operating clock for operating a circuit is gradually switched into a plurality of frequency levels. The frame rate is made high in a display of a moving picture, and the frame rate is reduced to the lower limit in a display of a waiting still picture. The switching of the clock in frequency levels is performed using a microcomputer or a user switch device. By switching the circuit clock, the frame rate can be easily varied while reducing the power consumption. Thus, both a good display of a moving picture and a reduction in power consumption can be achieved compatibly.

In a mobile or portable telephone according to another aspect of the present invention, there is provided a means for implementing a reverse dither process or reverse error diffusion process to the data subjected to a dither process or an error diffusion process. There is further provided a means for implementing a dither process to the data subjected to the reverse dither process. By this arrangement, the optimum image processing can be performed to a display panel to thereby improve the contrast properties in the gradation display.

In a data transmission method according to another aspect of the present invention, the data format transmitted to such as a mobile telephone includes information of a number of colors such as 256 or 4096 colors, frame rate, and image processing method such as a dither process written therein. The written data is reproduced by a mobile telephone and the transmitted image is displayed on the display panel achieving the optimum image display based on the written information.

BRIEF DESCRIPTION OF DRAWINGS

FIGS. 1(a) and 1(b) are respectively schematic plan and section views of a display unit of the present invention;

FIGS. 5(a) to 5(c) are explanatory section views of the display unit of the present invention;

FIG. 11 is an explanatory equation drawing of the drive system for the display unit of the present invention;

FIG. 12 is an explanatory equation drawing of the drive system for the display unit of the present invention;

FIG. 13 is an explanatory equation drawing of the drive system for the display unit of the present invention;

FIG. 14 is an explanatory drawing of a drive system for the display unit of the present invention;

FIG. 15 is an explanatory drawing of a drive system for the display unit of the present invention;

FIG. 17 is an explanatory equation drawing of the drive system for the display unit of the present invention;

FIG. 18 is an explanatory equation drawing of the drive system for the display unit of the present invention;

FIG. 19 is an explanatory equation drawing of the drive system for the display unit of the present invention;

FIG. 20 is an explanatory equation drawing of the drive system for the display unit of the present invention;

FIG. 21 is an explanatory equation drawing of the drive system for the display unit of the present invention;

FIG. 22 is an explanatory equation drawing of the drive system for the display unit of the present invention;

FIG. 23 is an explanatory equation drawing of the drive system for the display unit of the present invention;

FIG. 24 is an explanatory equation drawing of the drive system for the display unit of the present invention;

FIG. 25 is an explanatory equation drawing of the drive system for the display unit of the present invention;

FIG. 27 is an explanatory drawing of the drive system for the display unit of the present invention;

FIG. 28 is an explanatory equation drawing of the drive system for the display unit of the present invention;

FIG. 29 is an explanatory equation drawing of the drive system for the display unit of the present invention;

FIG. 30 is an explanatory table drawing of the drive system for the display unit of the present invention;

FIG. 32 is an explanatory equation drawing of the drive system for the display unit of the present invention;

FIG. 33 is an explanatory equation drawing of the drive system for the display unit of the present invention;

FIG. 34 is an explanatory table drawing of the drive system for the display unit of the present invention;

FIG. 35 is an explanatory drawing of the drive system for the display unit of the present invention;

FIG. 36 is an explanatory equation drawing of the drive system for the display unit of the present invention;

FIG. 37 is an explanatory equation drawing of the drive system for the display unit of the present invention;

FIG. 38 is an explanatory table drawing of the drive system for the display unit of the present invention;

FIG. 44 is an explanatory equation drawing of the drive system for the display unit of the present invention;

FIG. 45 is an explanatory equation drawing of the drive system for the display unit of the present invention;

FIG. 46 is an explanatory equation drawing of the drive system for the display unit of the present invention;

FIG. 47 is an explanatory equation drawing of the drive system for the display unit of the present invention;

FIG. 87 is an explanatory drawing of the drive system for the display unit of the present invention;

FIG. 95 is an explanatory drawing of the drive system for the display unit of the present invention;

FIGS. 103(*a*) and 103(*b*) are explanatory drawings of the drive system for the display unit of the present invention;

FIG. 105 is an explanatory drawing of the drive system for the display unit of the present invention;

FIG. 107 is an explanatory drawing of the drive system for the display unit of the present invention;

FIG. 115 is an explanatory drawing of the drive system for the display unit in the present invention;

FIG. 119 is an explanatory table drawing of the display unit of the present invention;

FIG. 120 is an explanatory table drawing of the display unit of the present invention;

FIG. 121 is a block diagram of the display unit of the present invention;

FIG. 122 is a block diagram of the display unit of the present invention;

FIG. 123 is a block diagram of the display unit of the present invention;

FIG. 124 is a schematic drawing of an information terminal of the present invention;

FIG. 125 is an explanatory drawing of the information terminal of the present invention;

FIG. 126 is a schematic drawing of an information terminal of the present invention;

FIG. 127 is a section view for explaining the information terminal of the present invention;

FIG. 128 is an explanatory drawing of the information terminal of the present invention;

FIG. 129 is an explanatory drawing of a data transmission format of the present invention;

FIG. 130 is an explanatory drawing of the data transmission format of the present invention;

Figure 132:
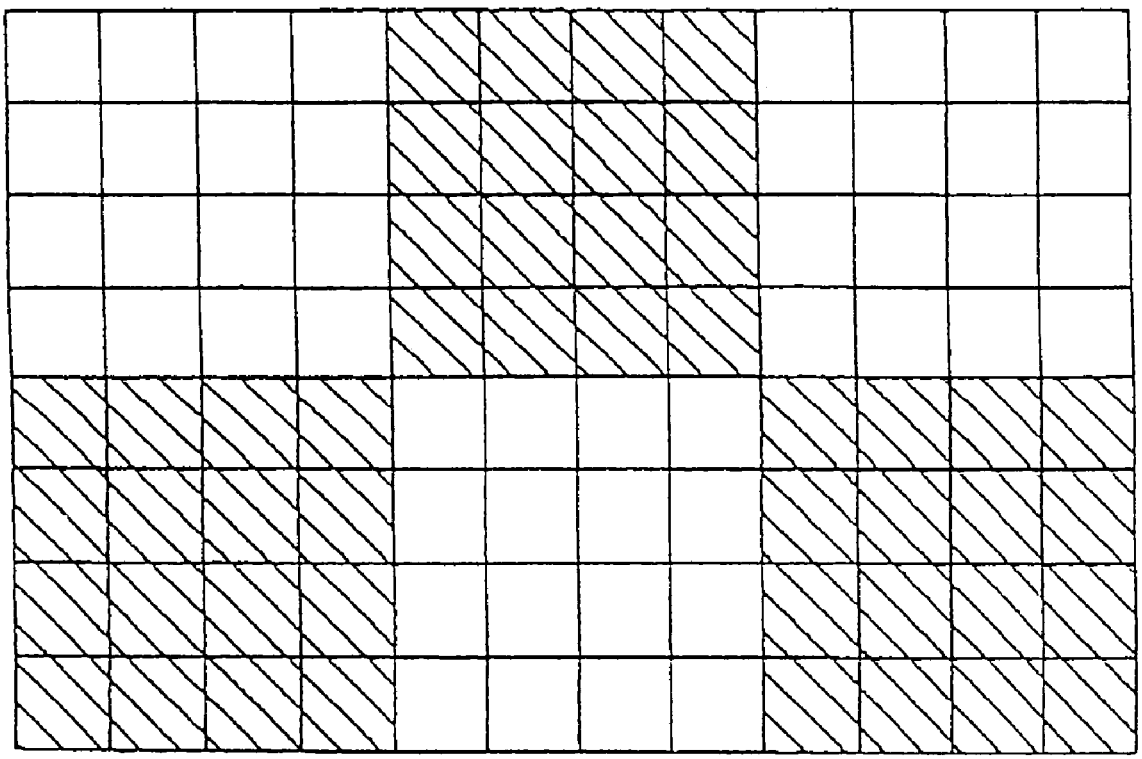
Figure 133:
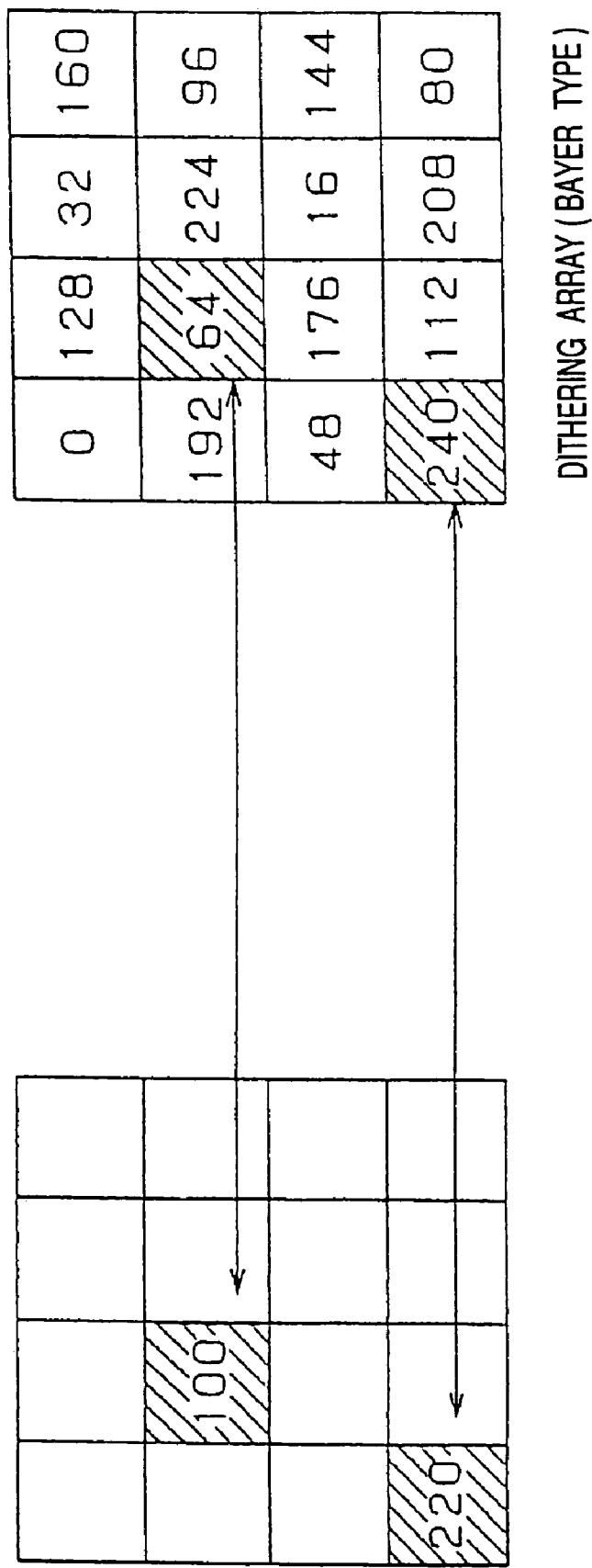
Figure 134:
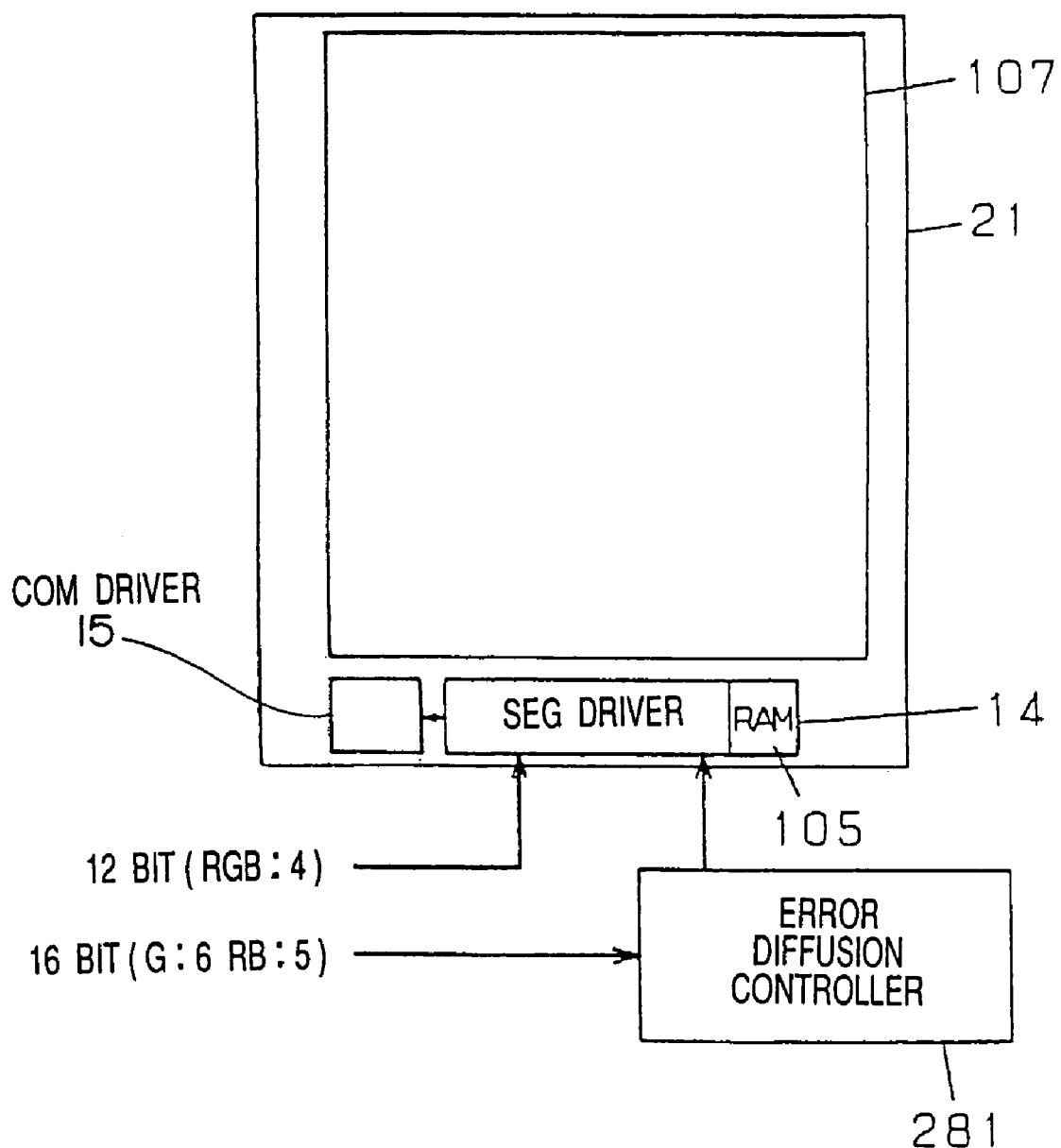
Figure 135:
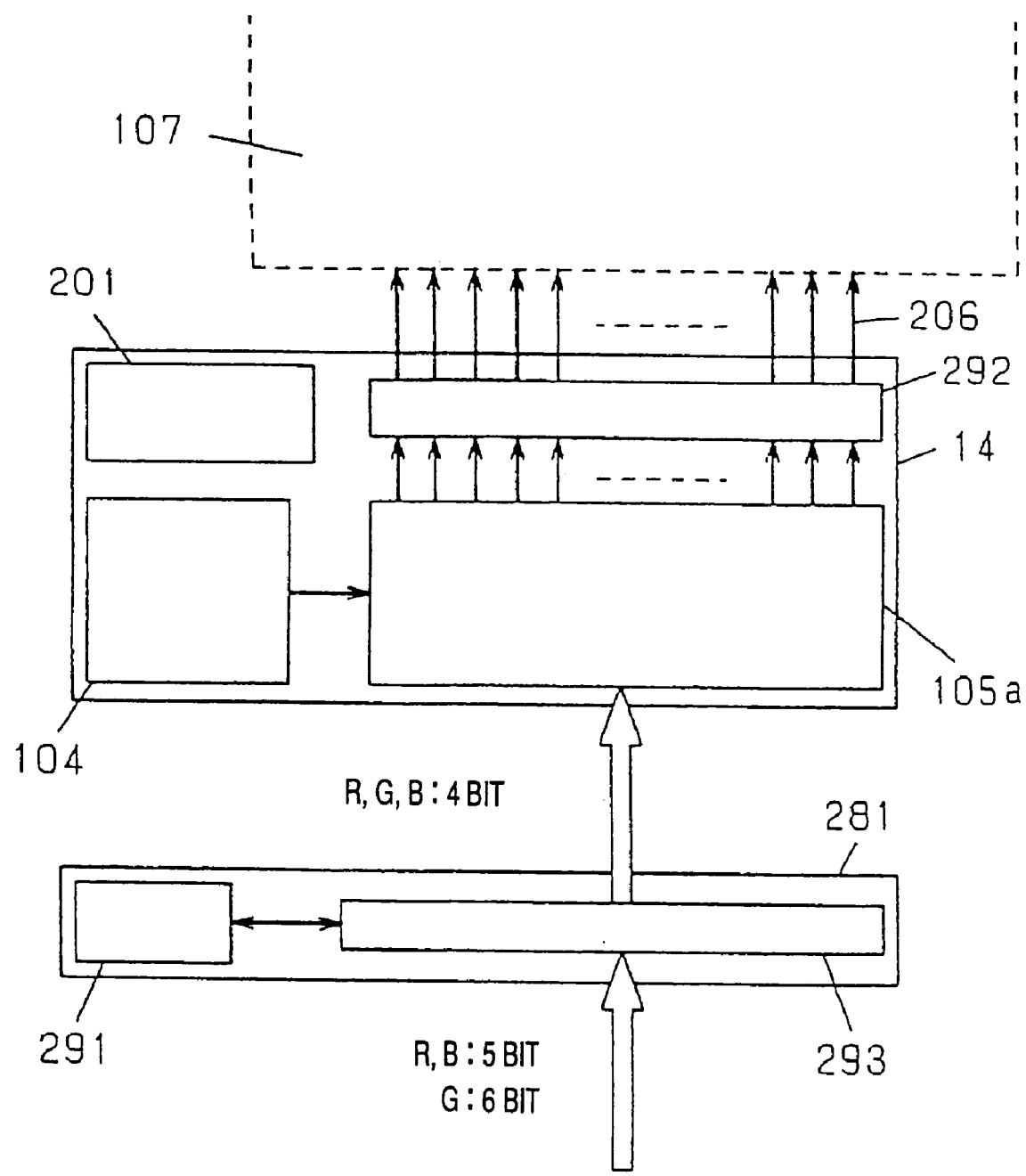
Figure 136:
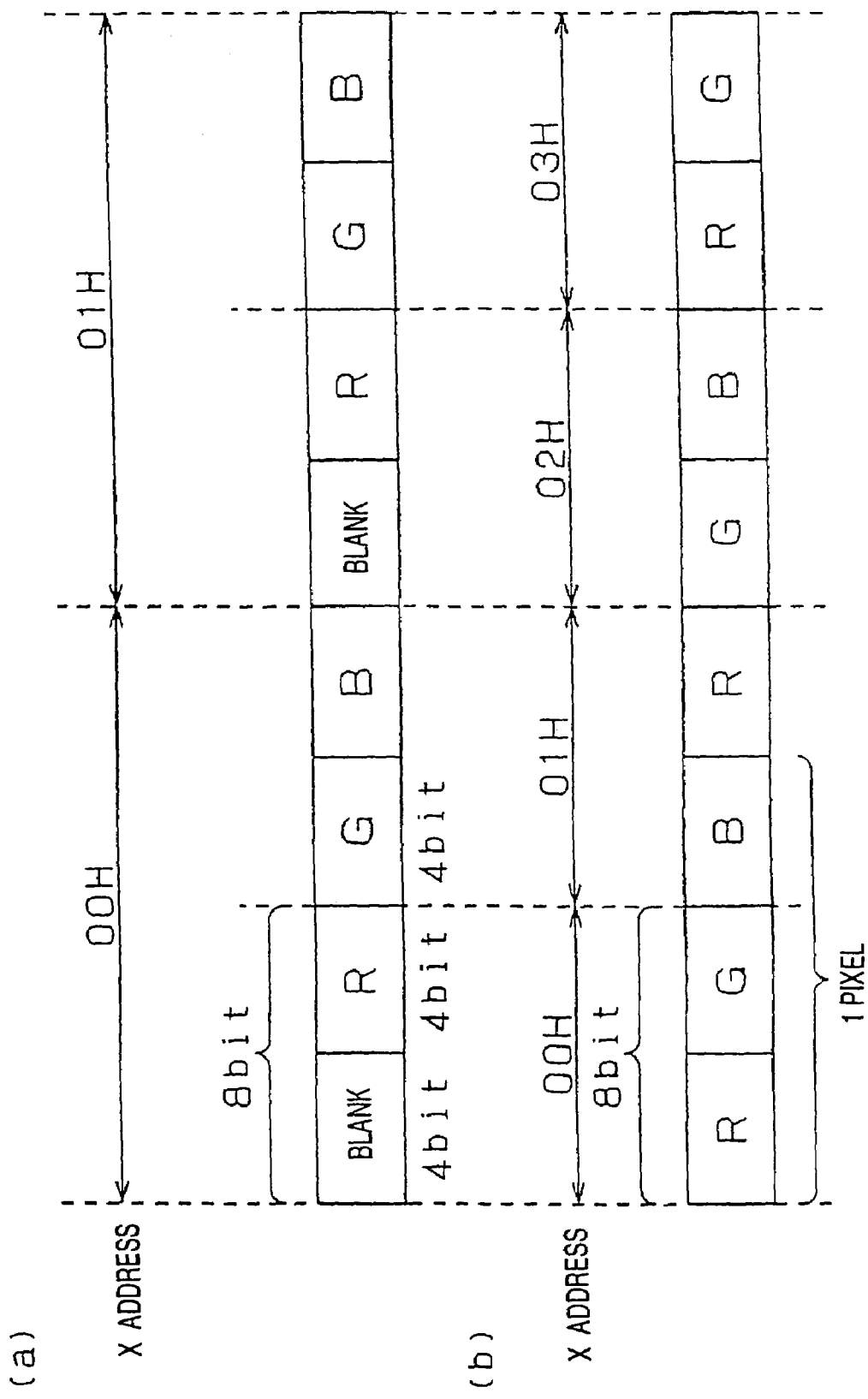
Figure 137:
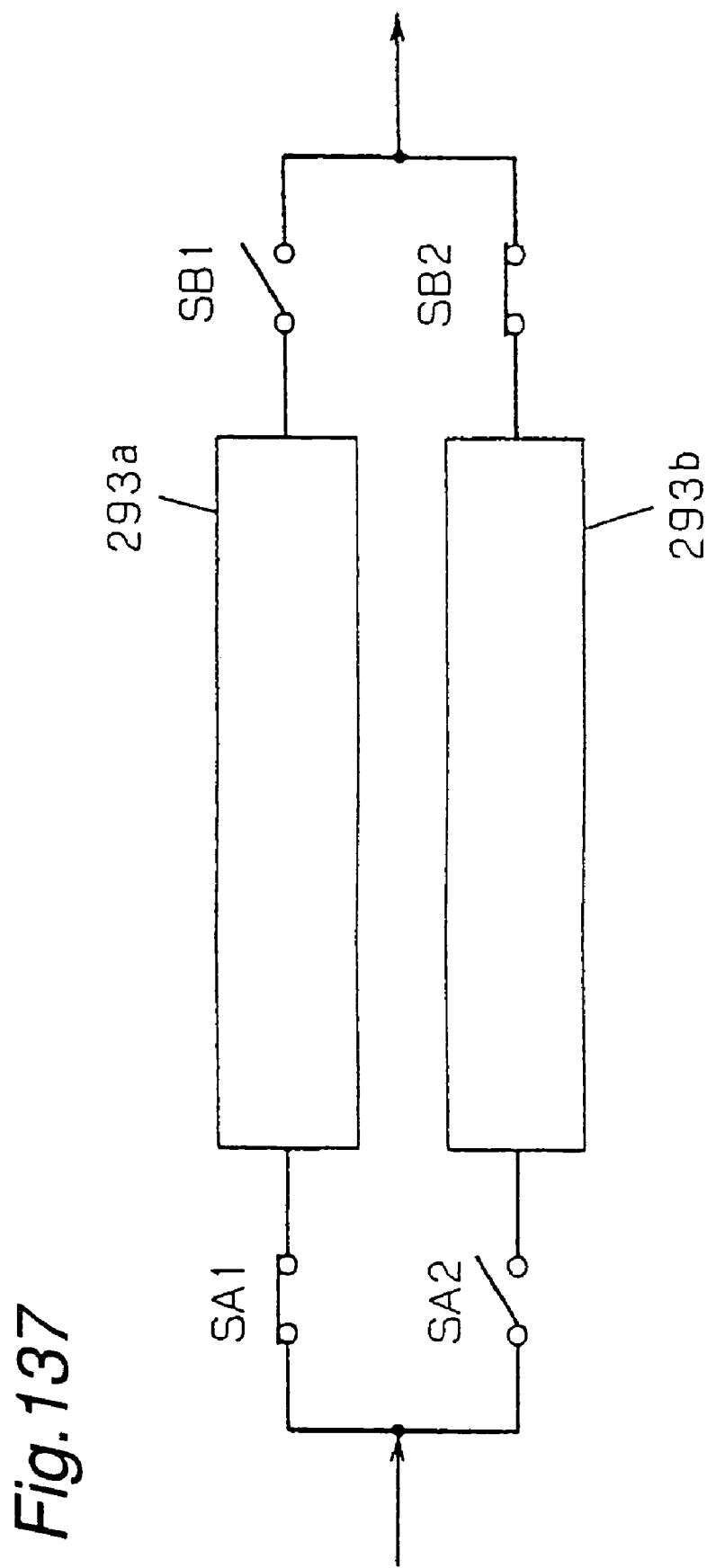
Figure 138:
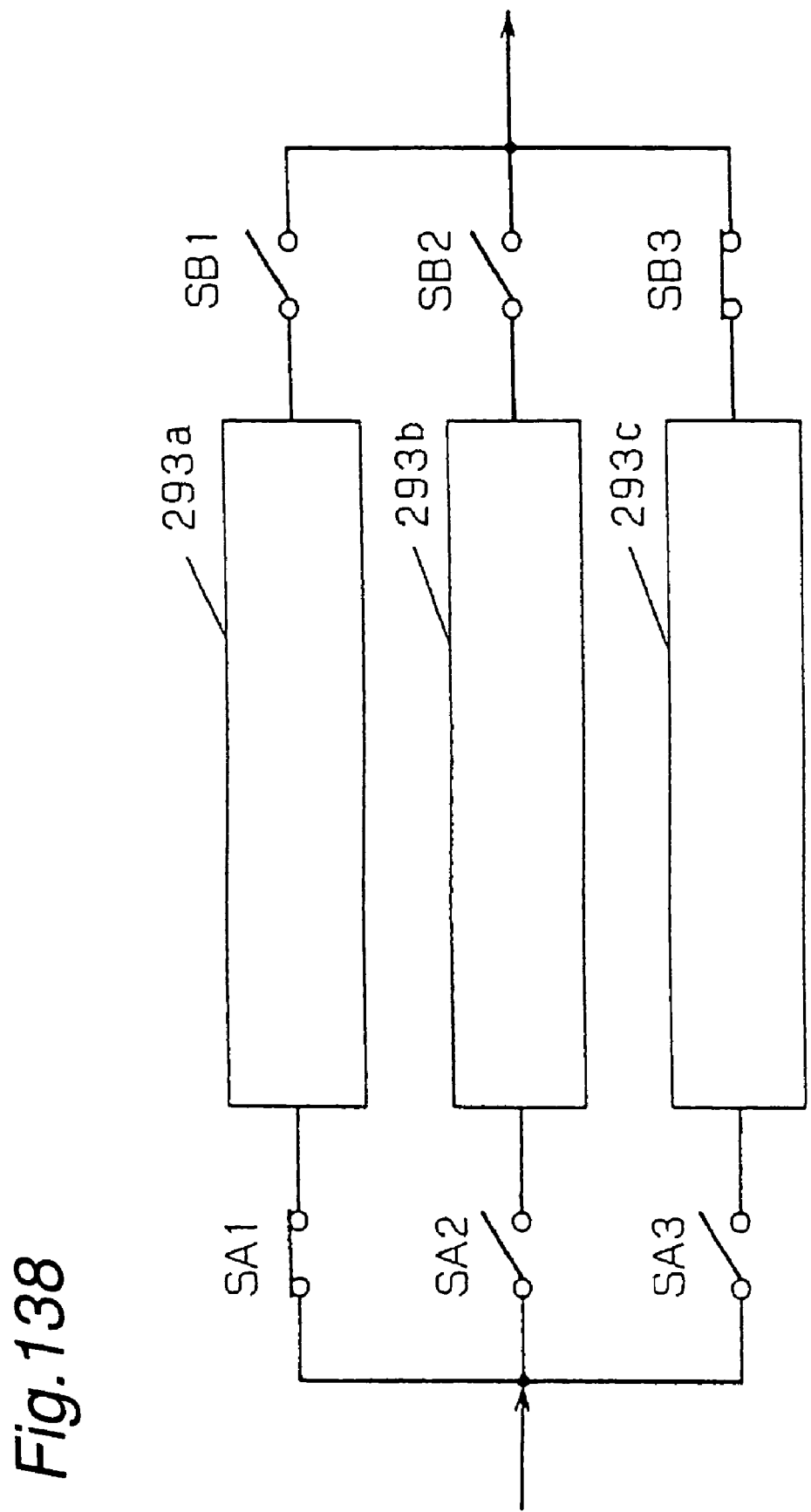
Figure 140:
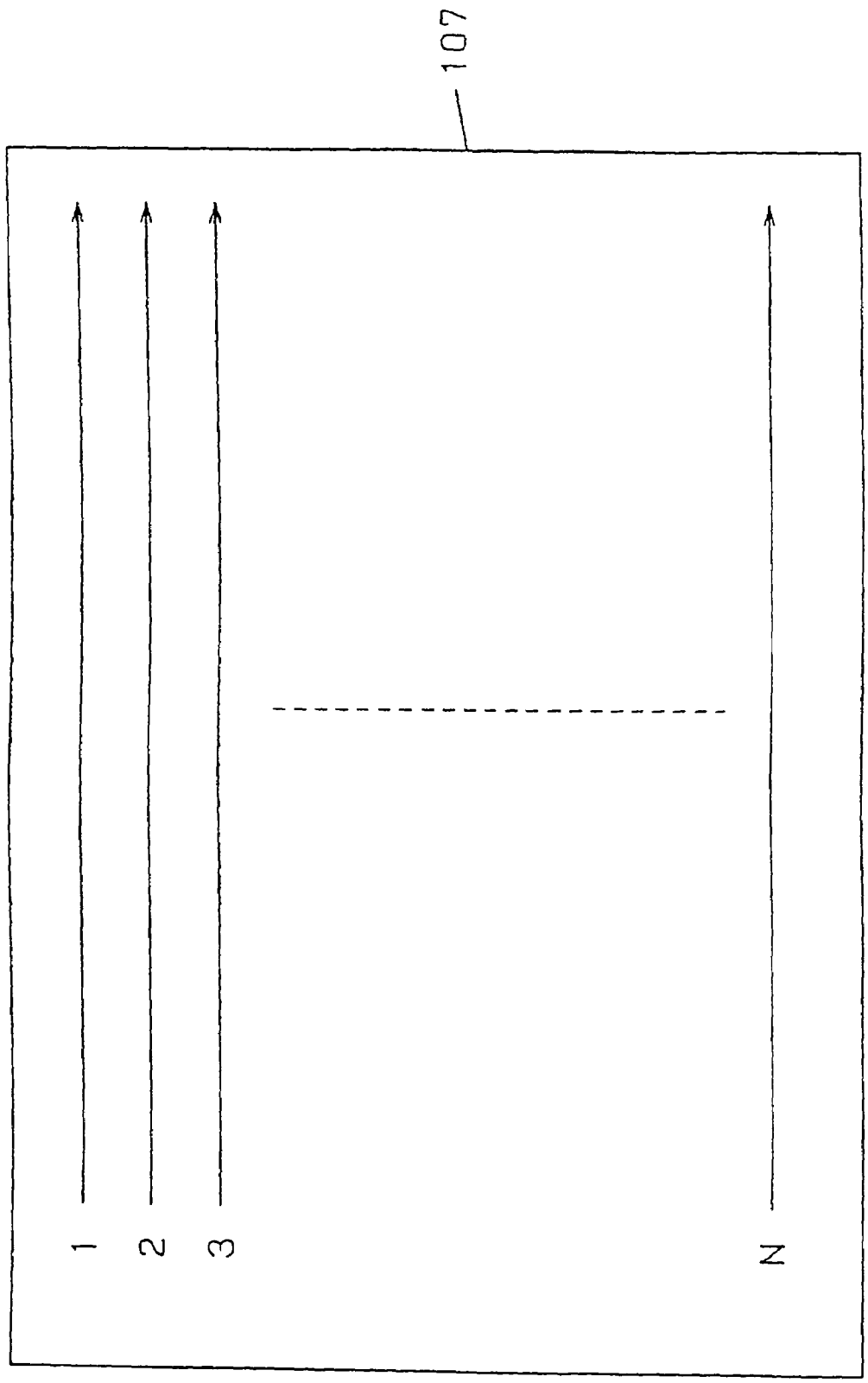
Figure 141:
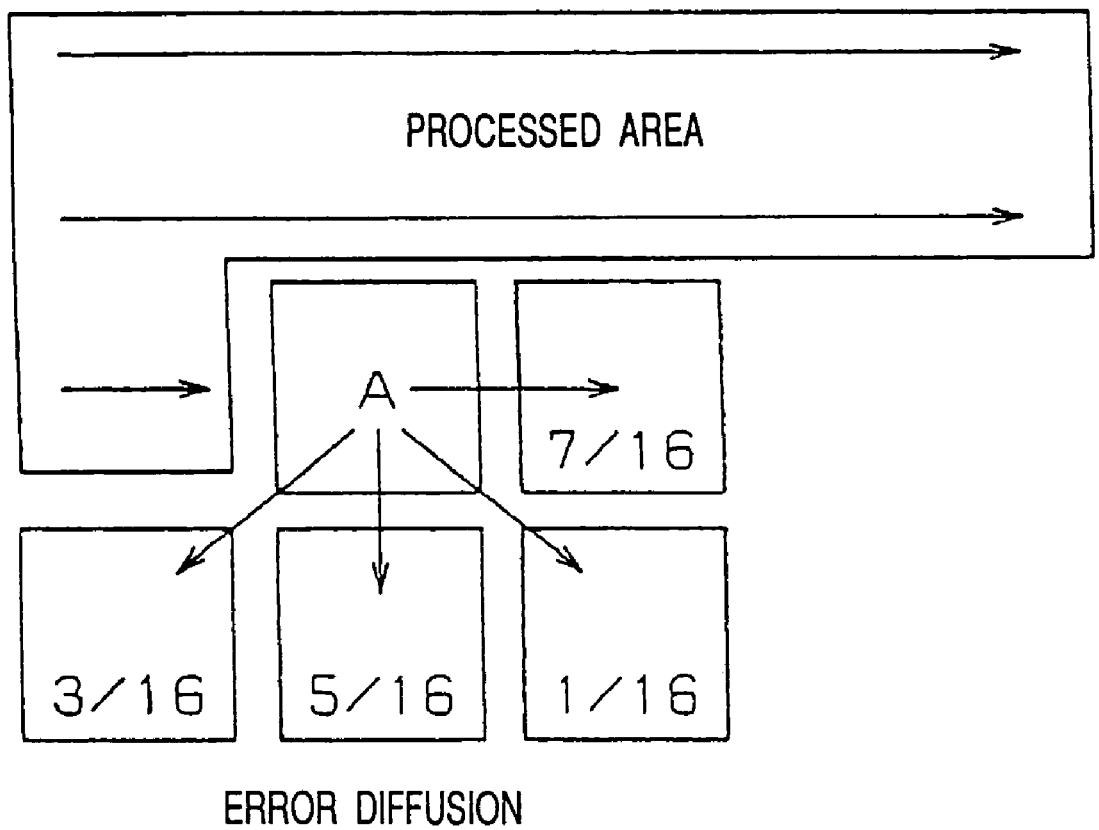
Figure 142:
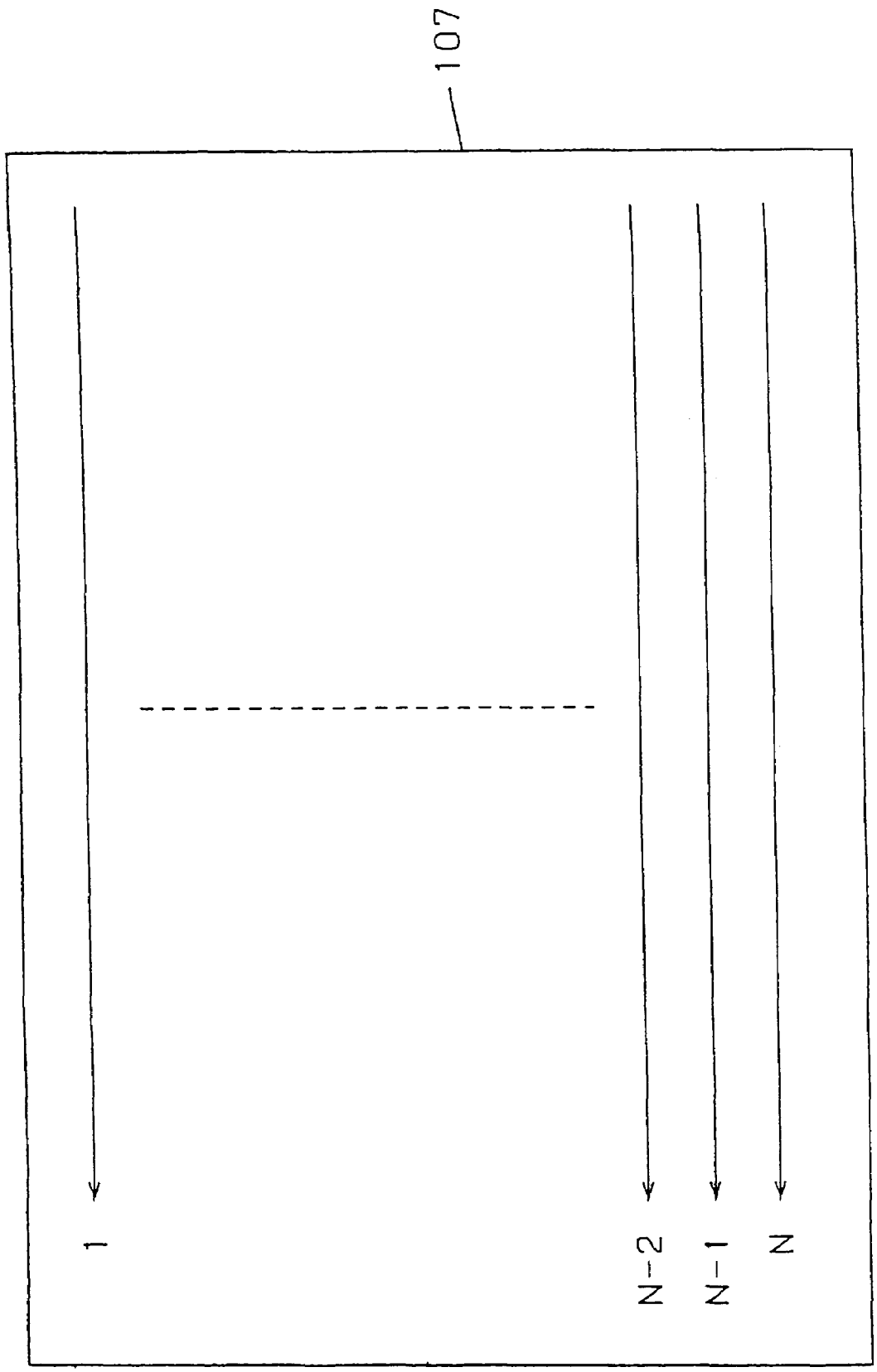
Figure 143:
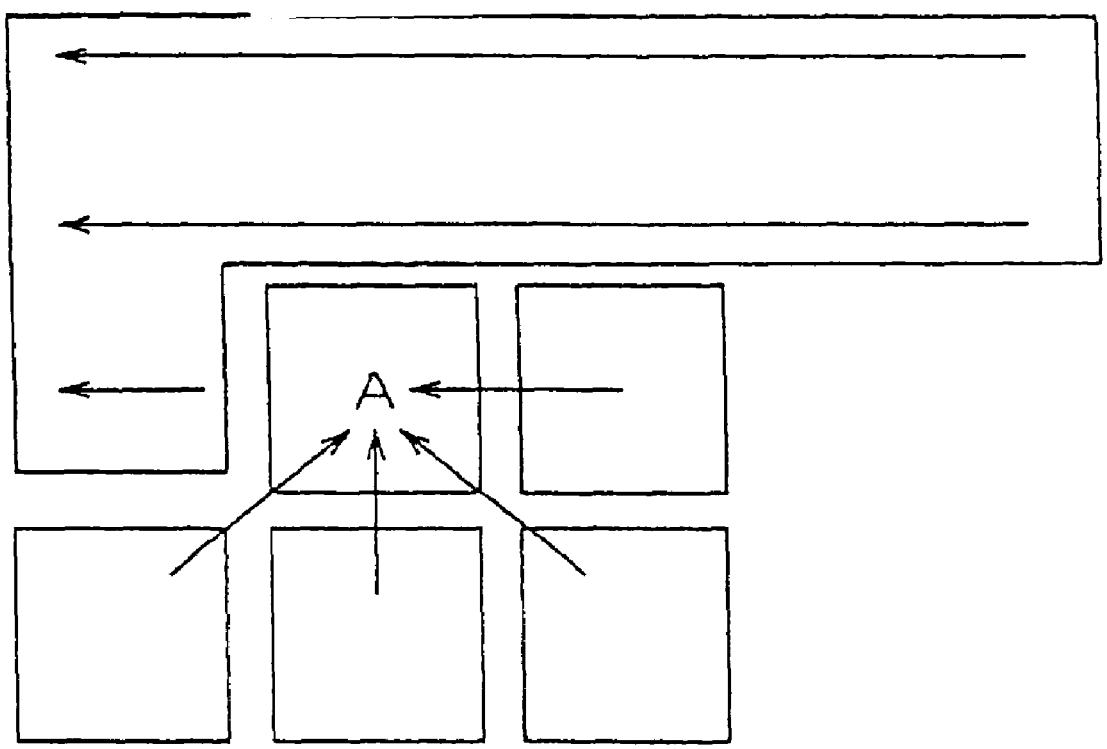
Figure 144:
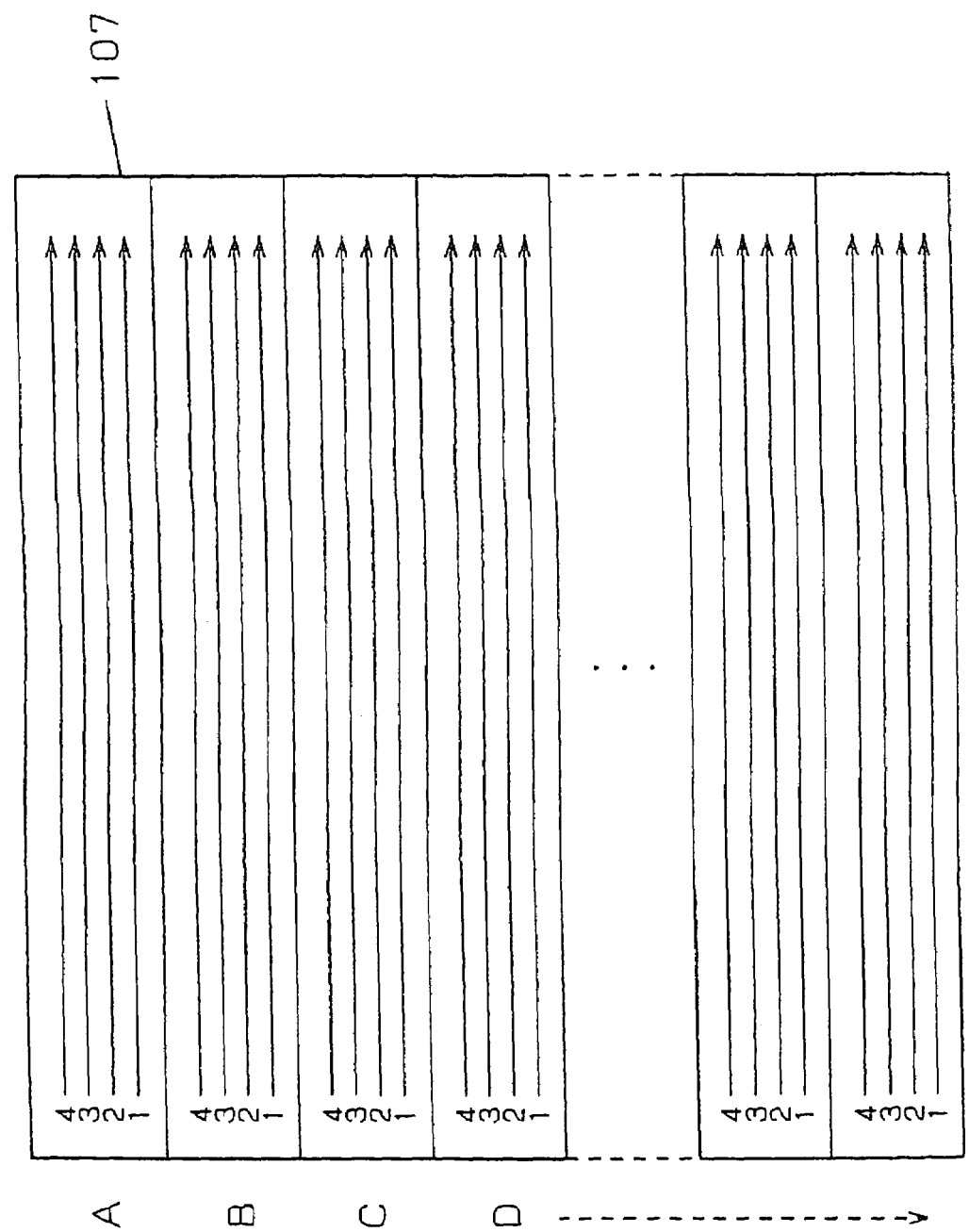
Figure 151:
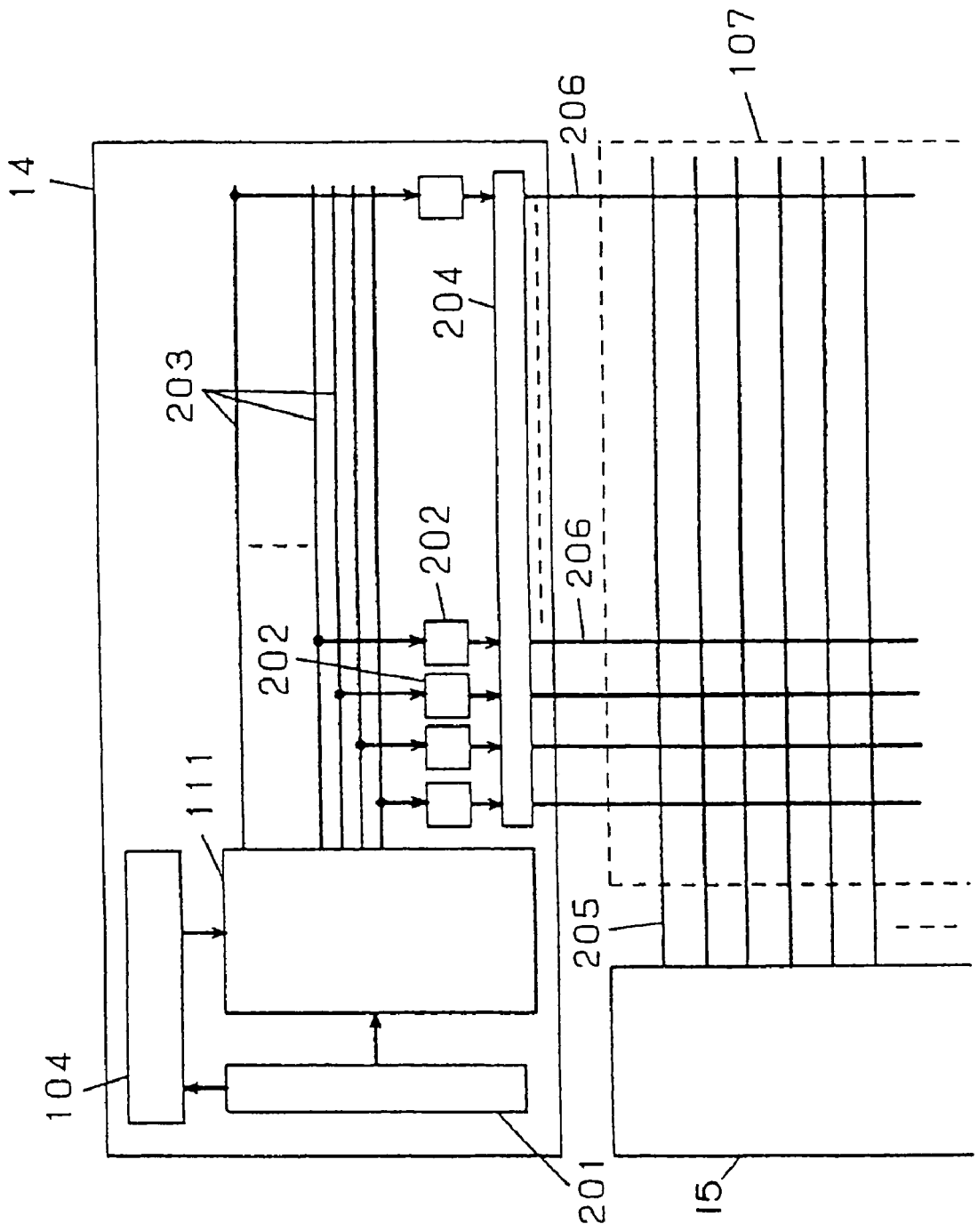
Figure 153:
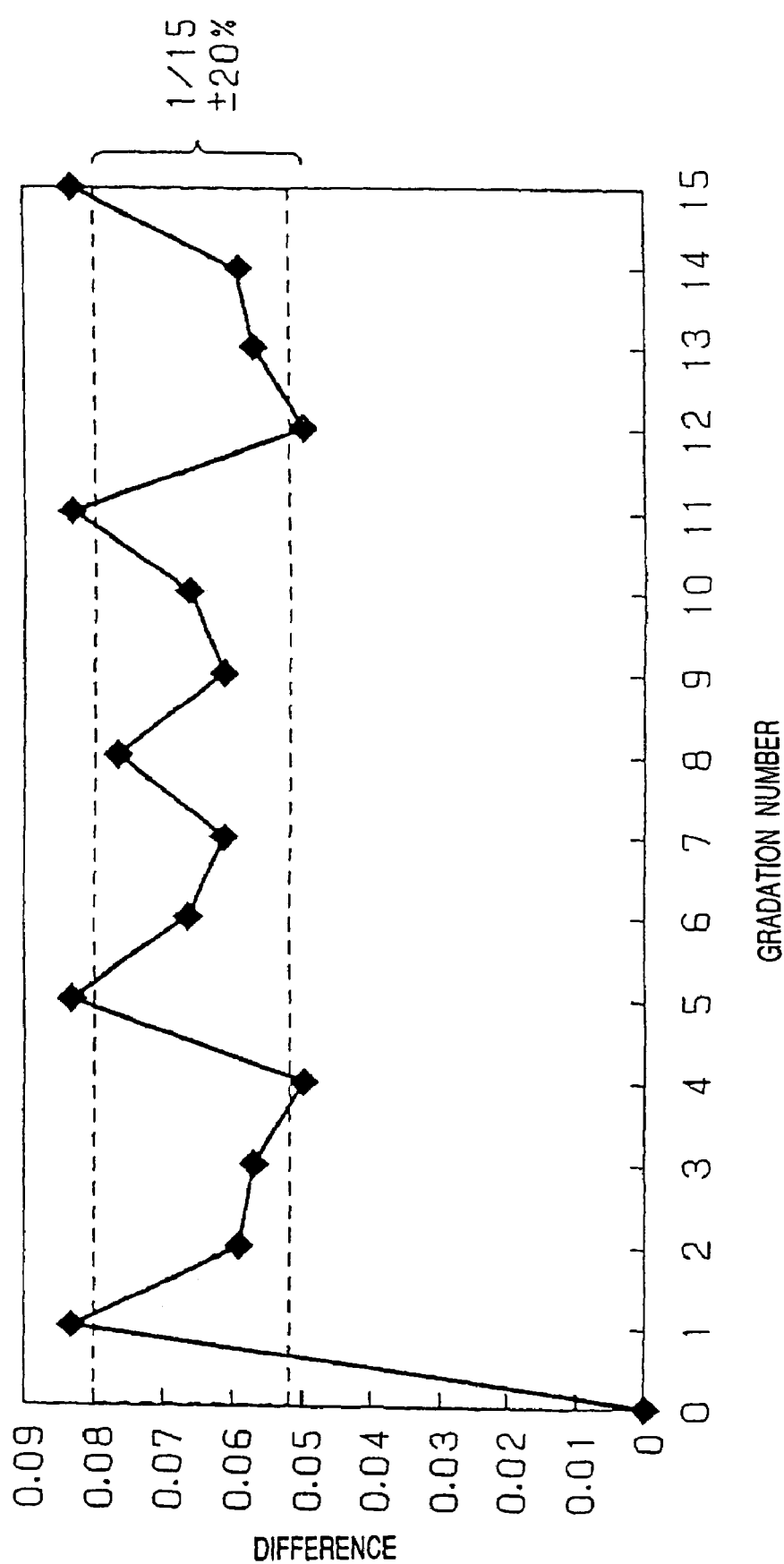
Figure 154:
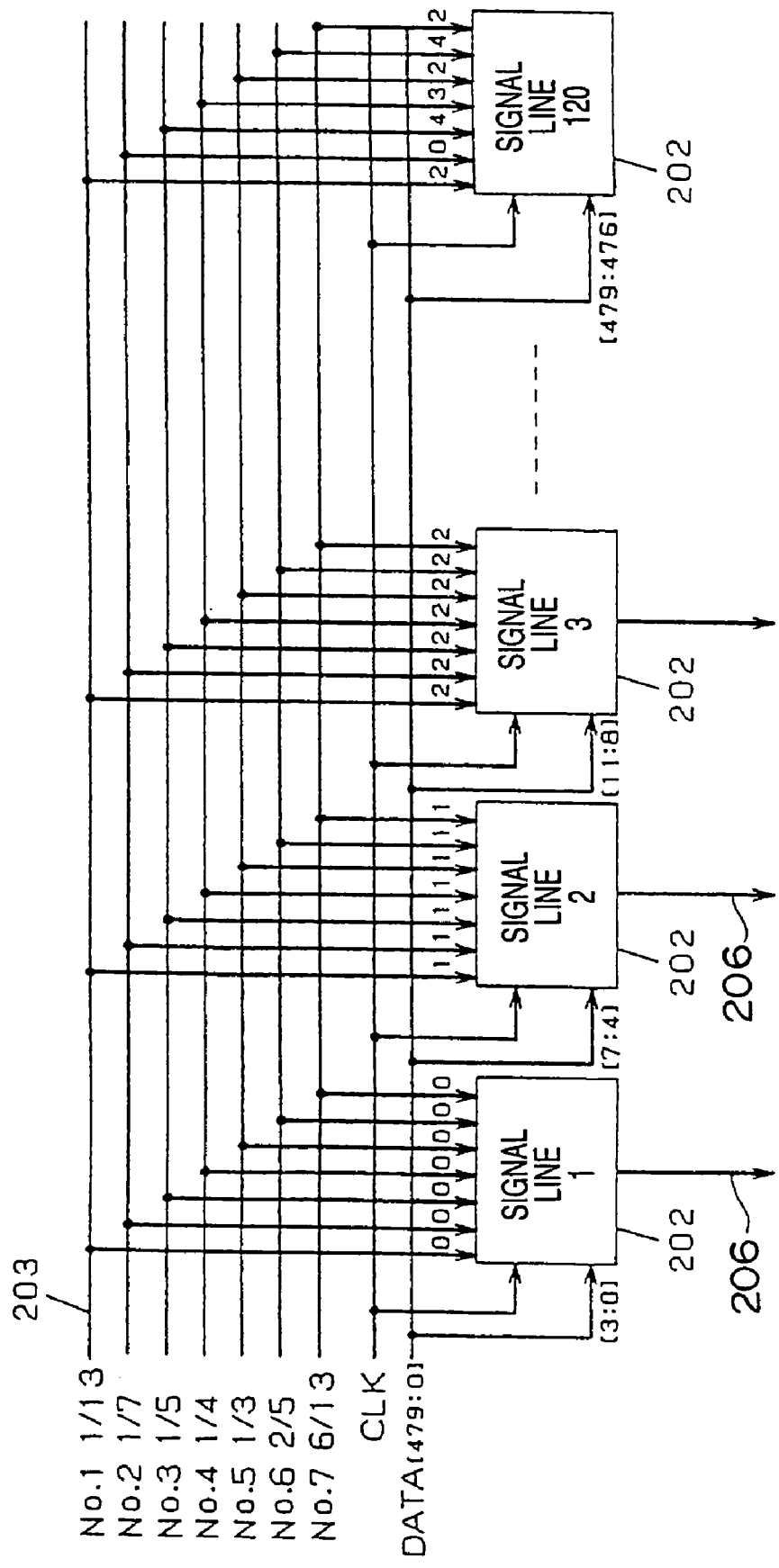
Figure 155:
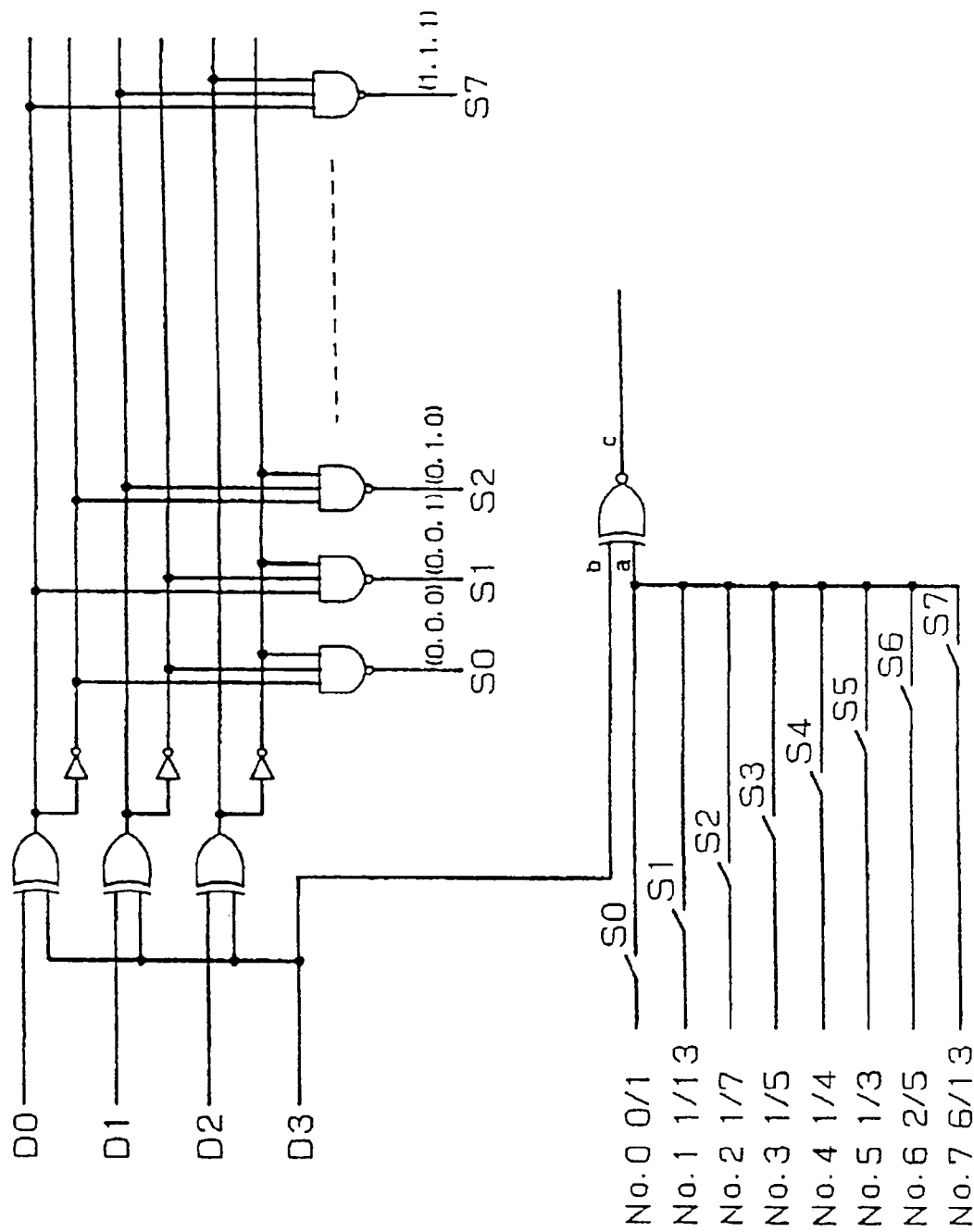
Figure 156:
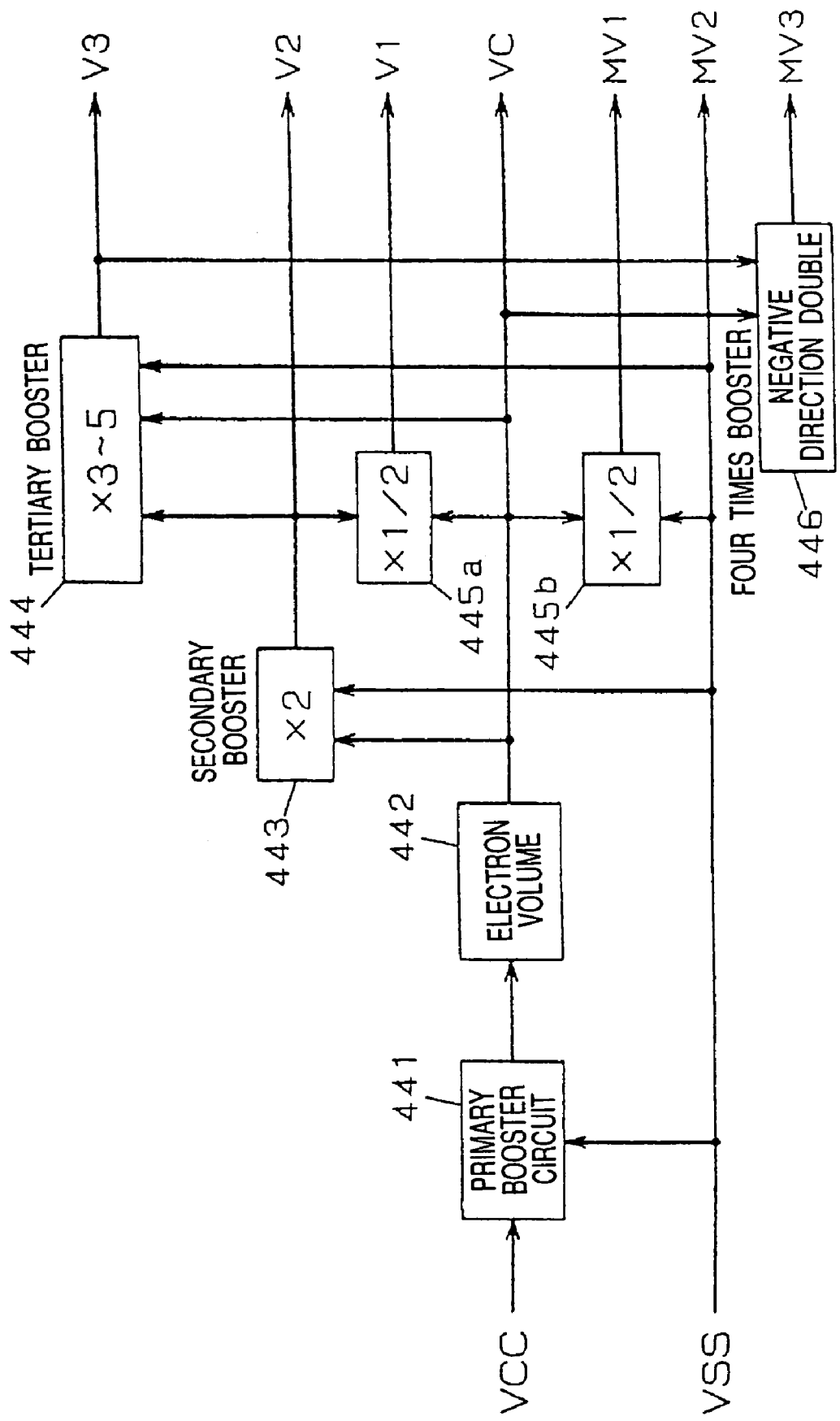
Figure 157:
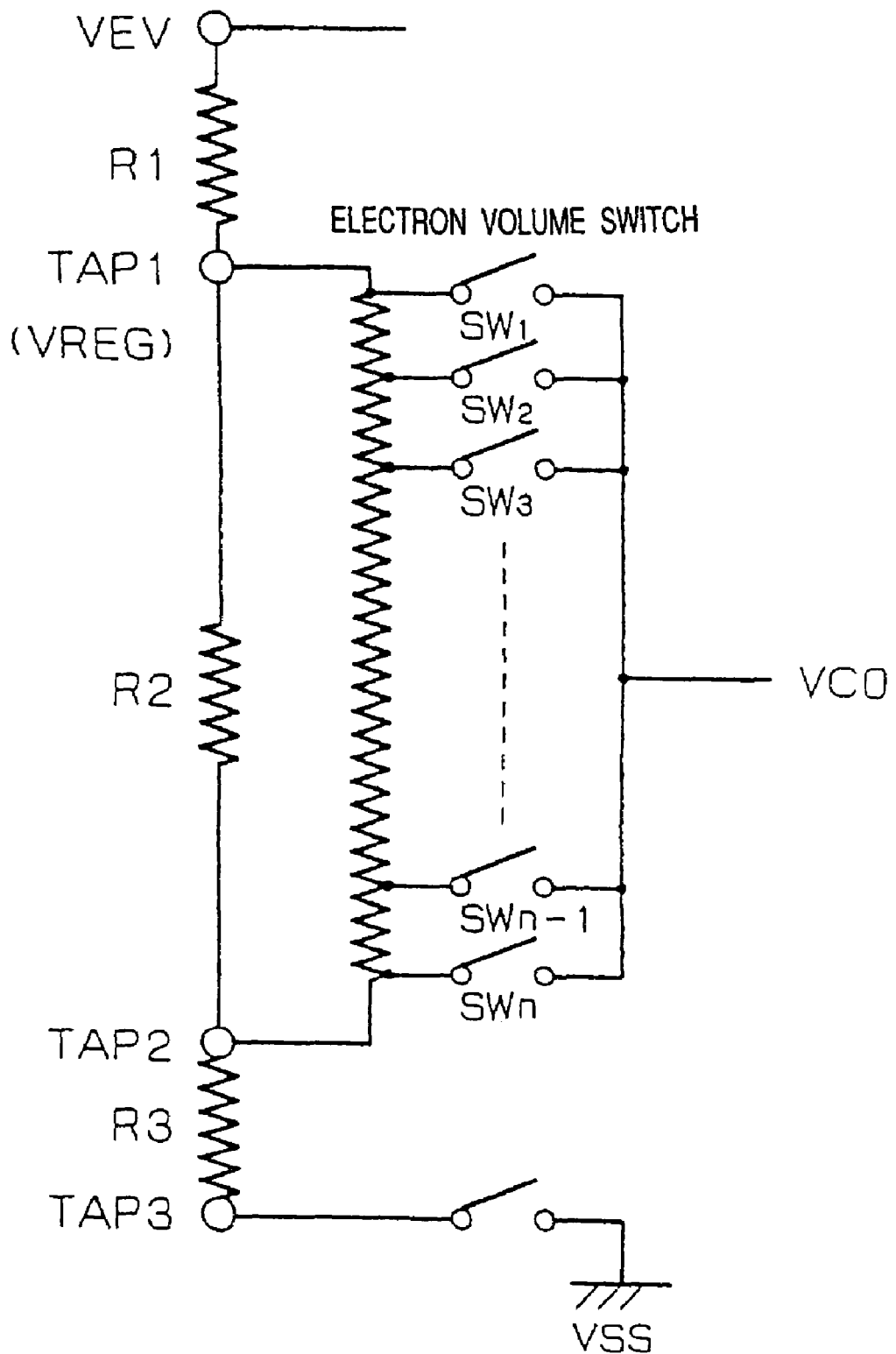
Figure 158:
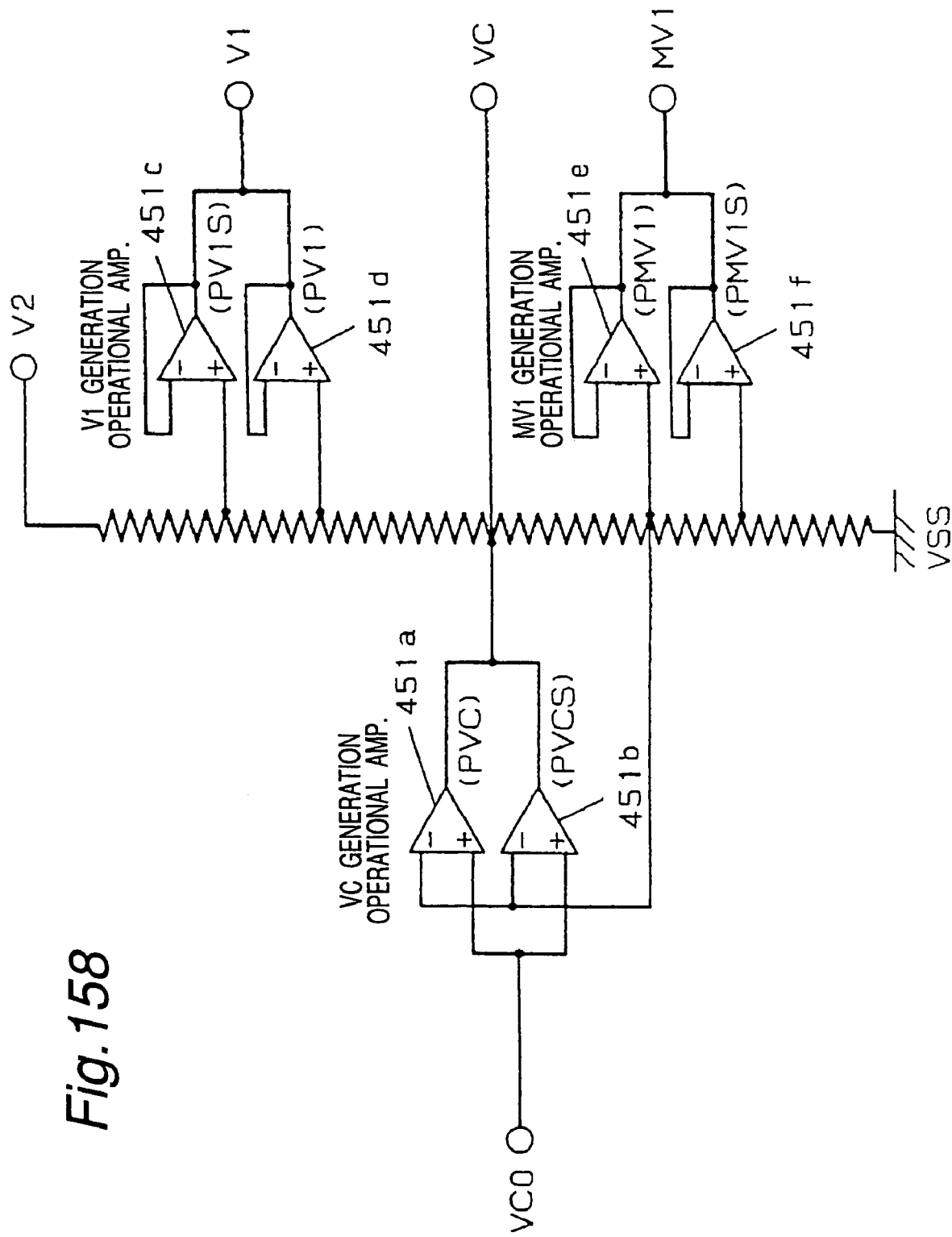
Figure 159:
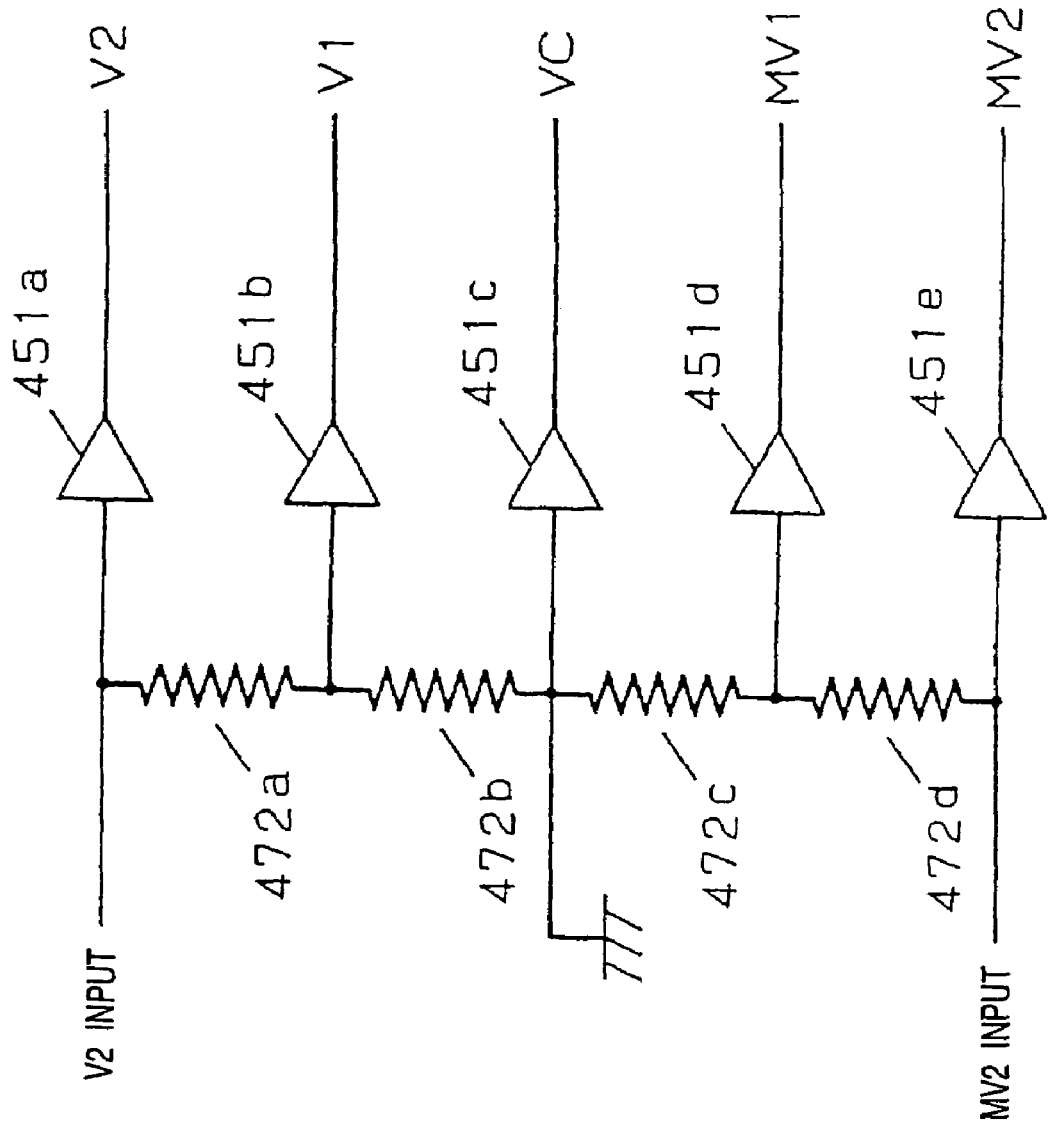
Figure 160:
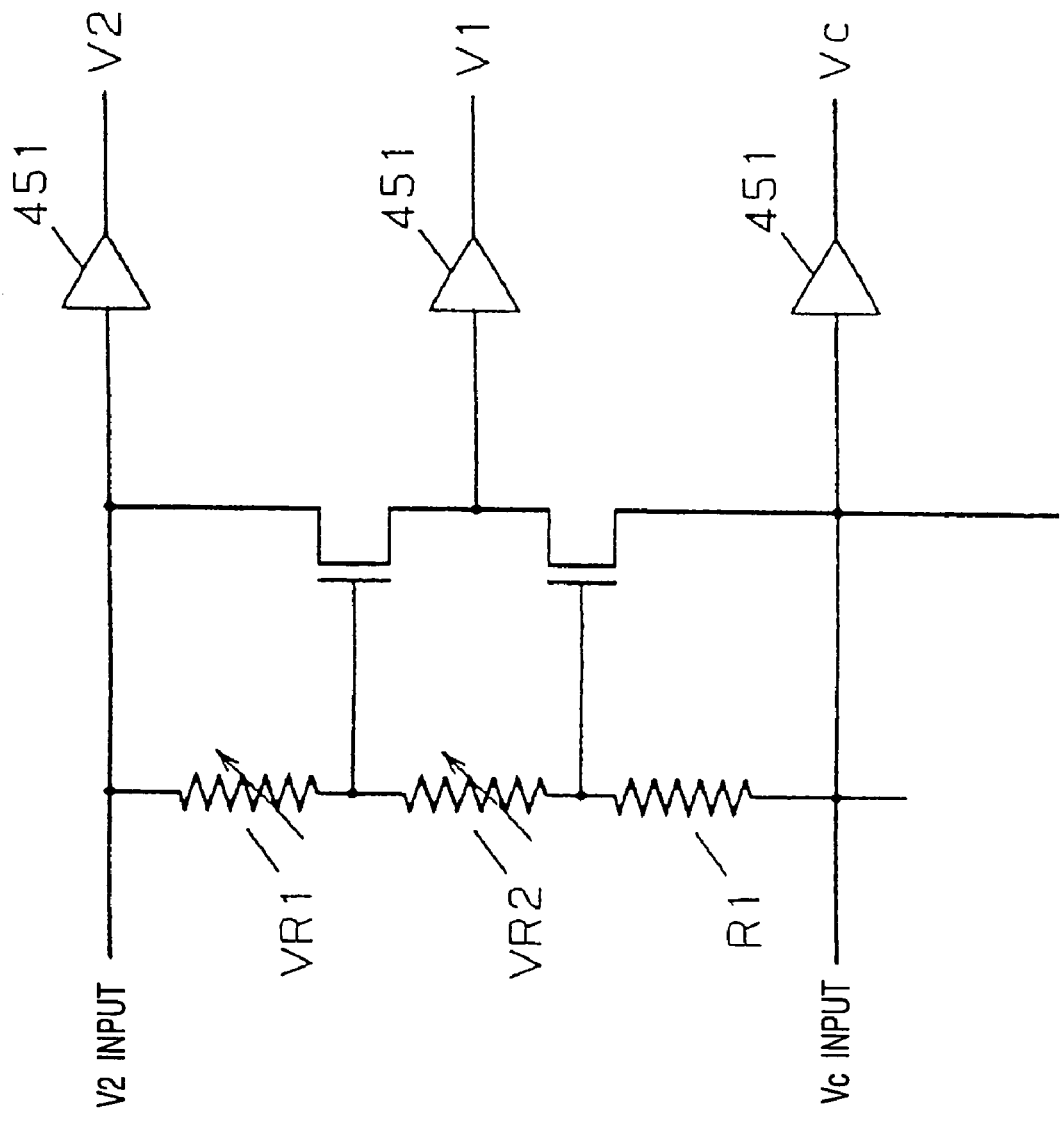
Figure 161:
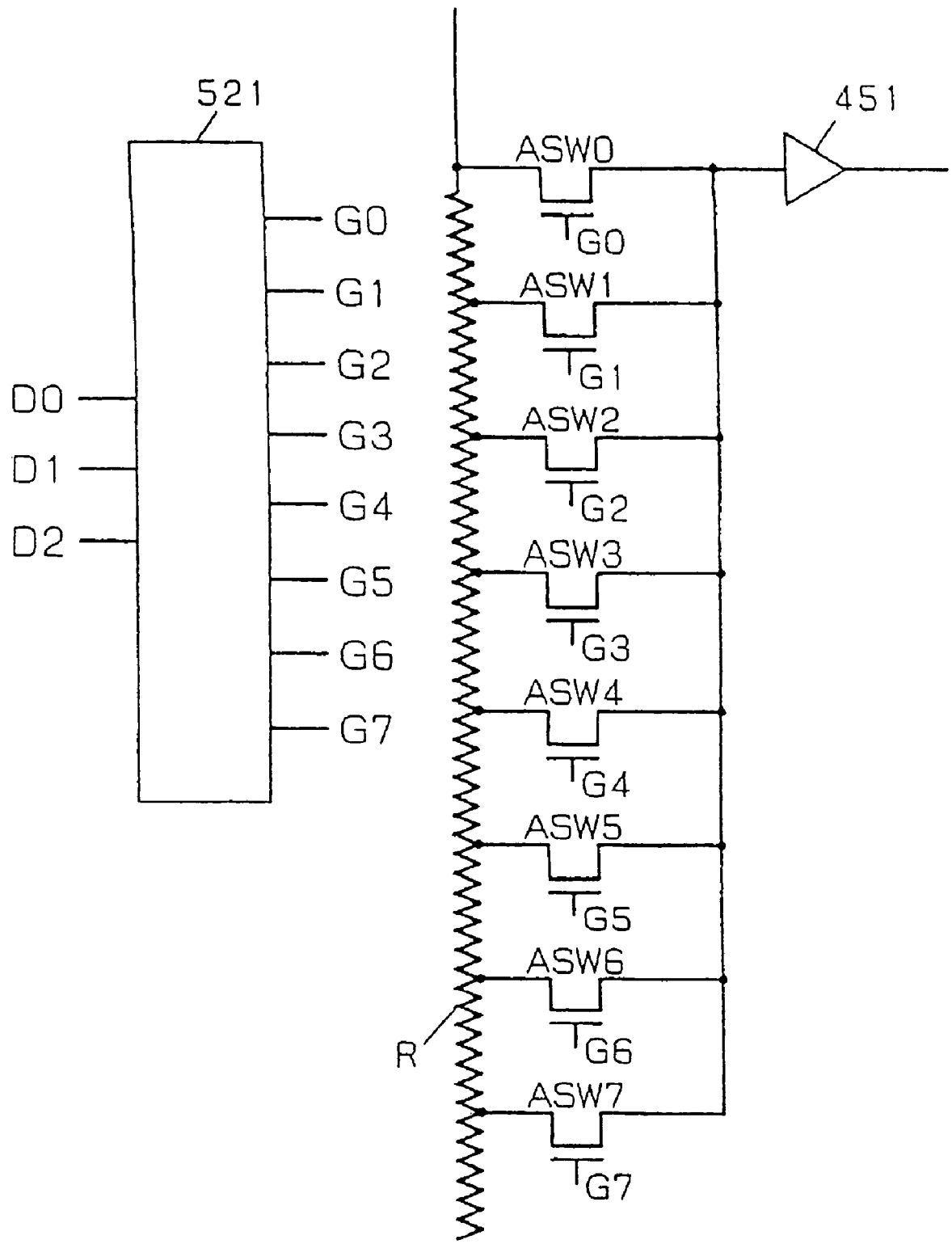
Figure 162:
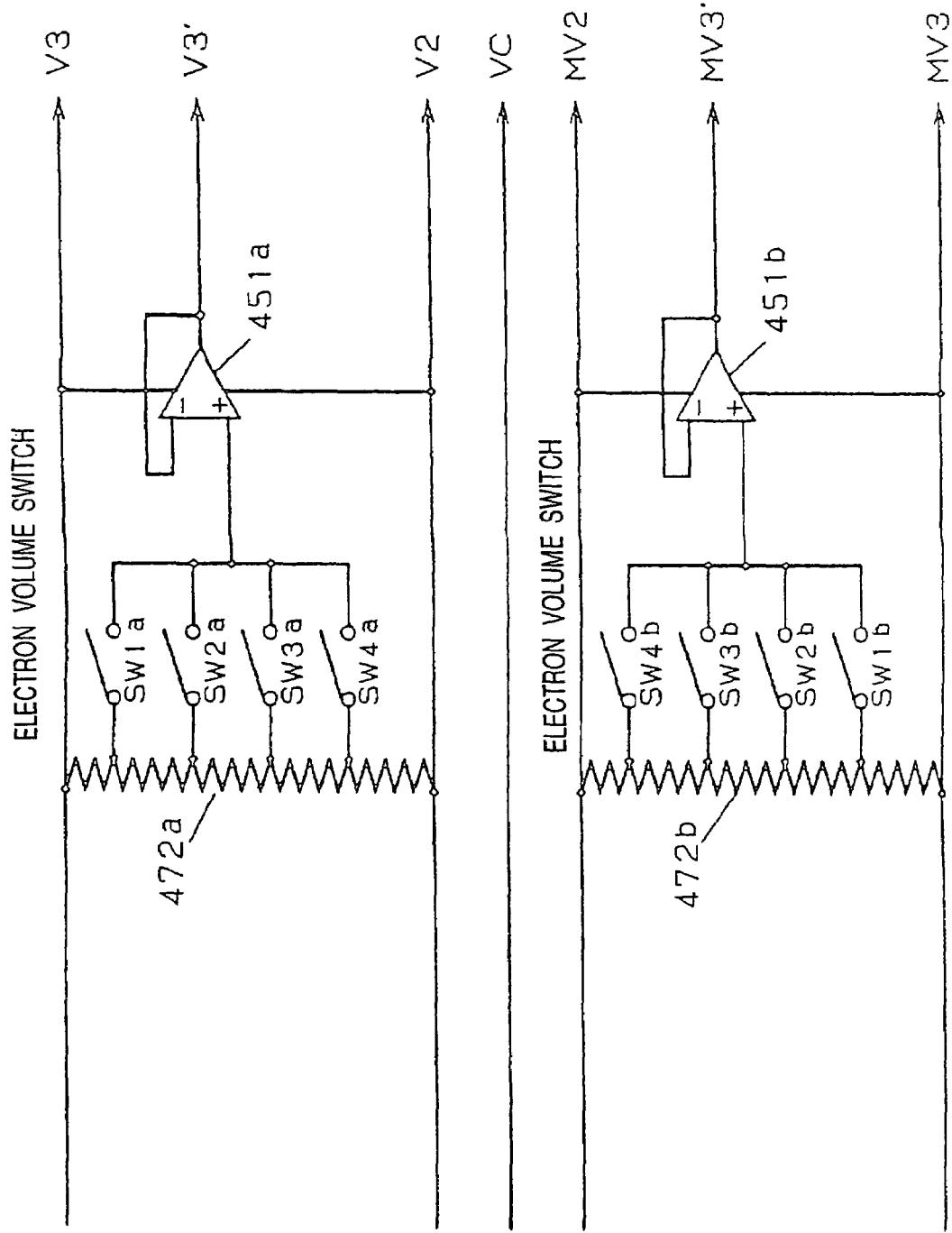
Figure 164:
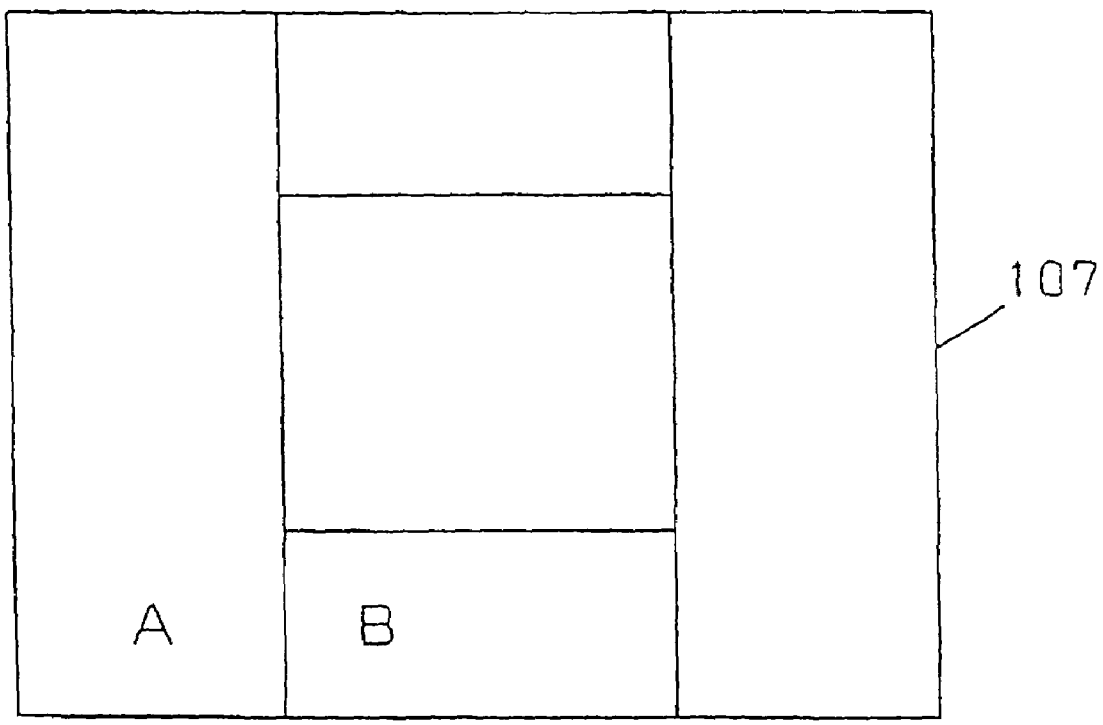
Figure 165:
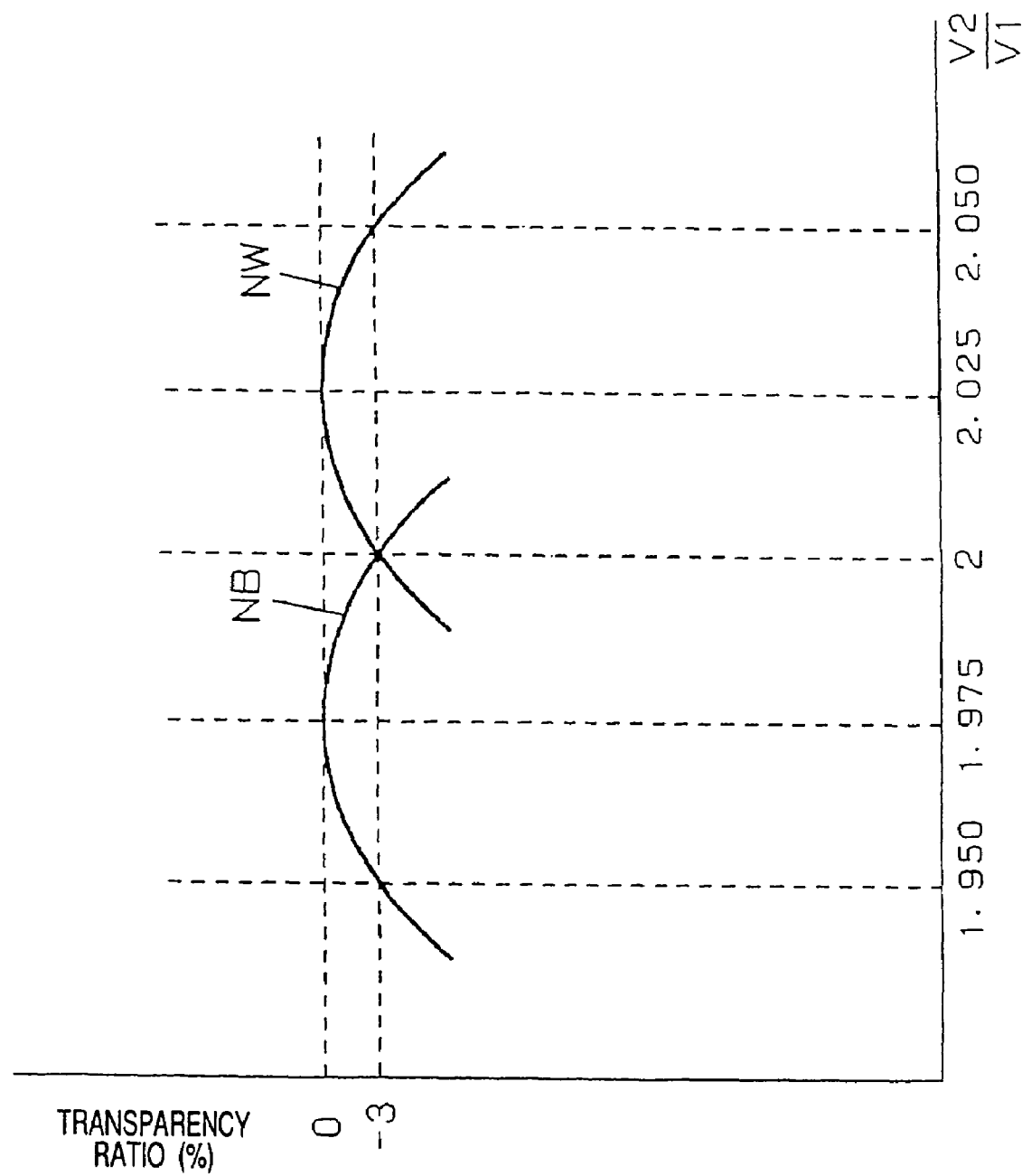
Figure 166:
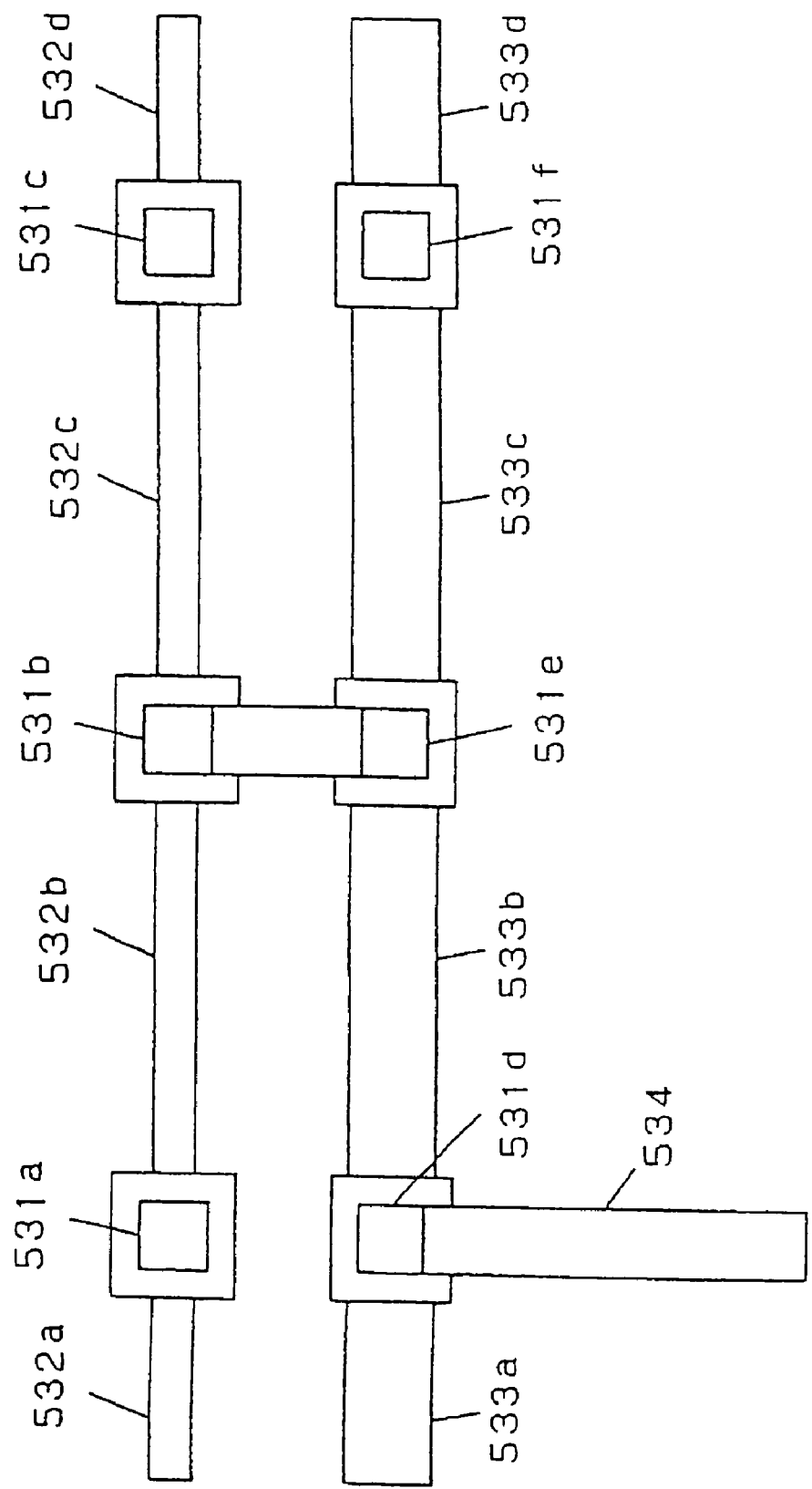
Figure 167:
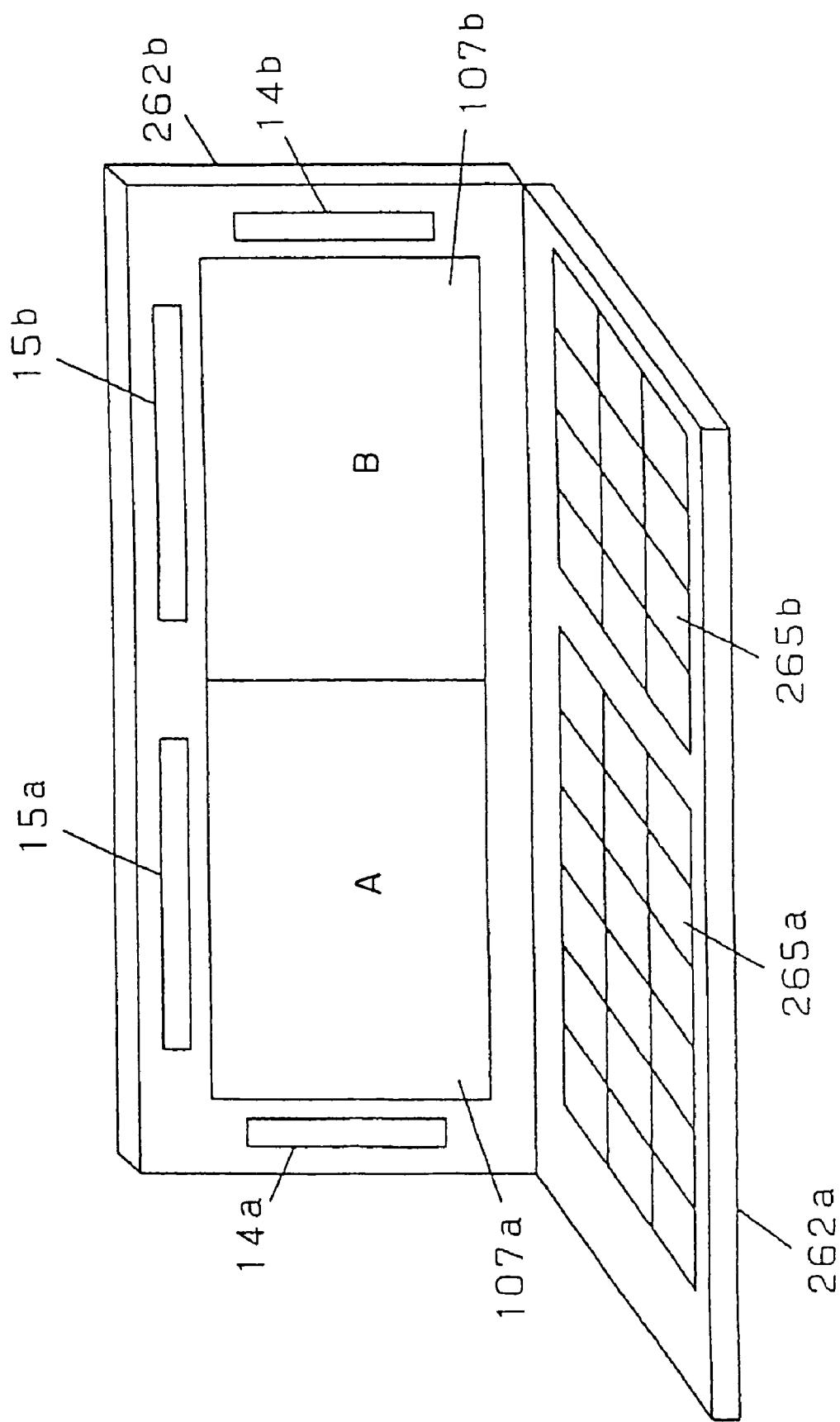
Figure 168:
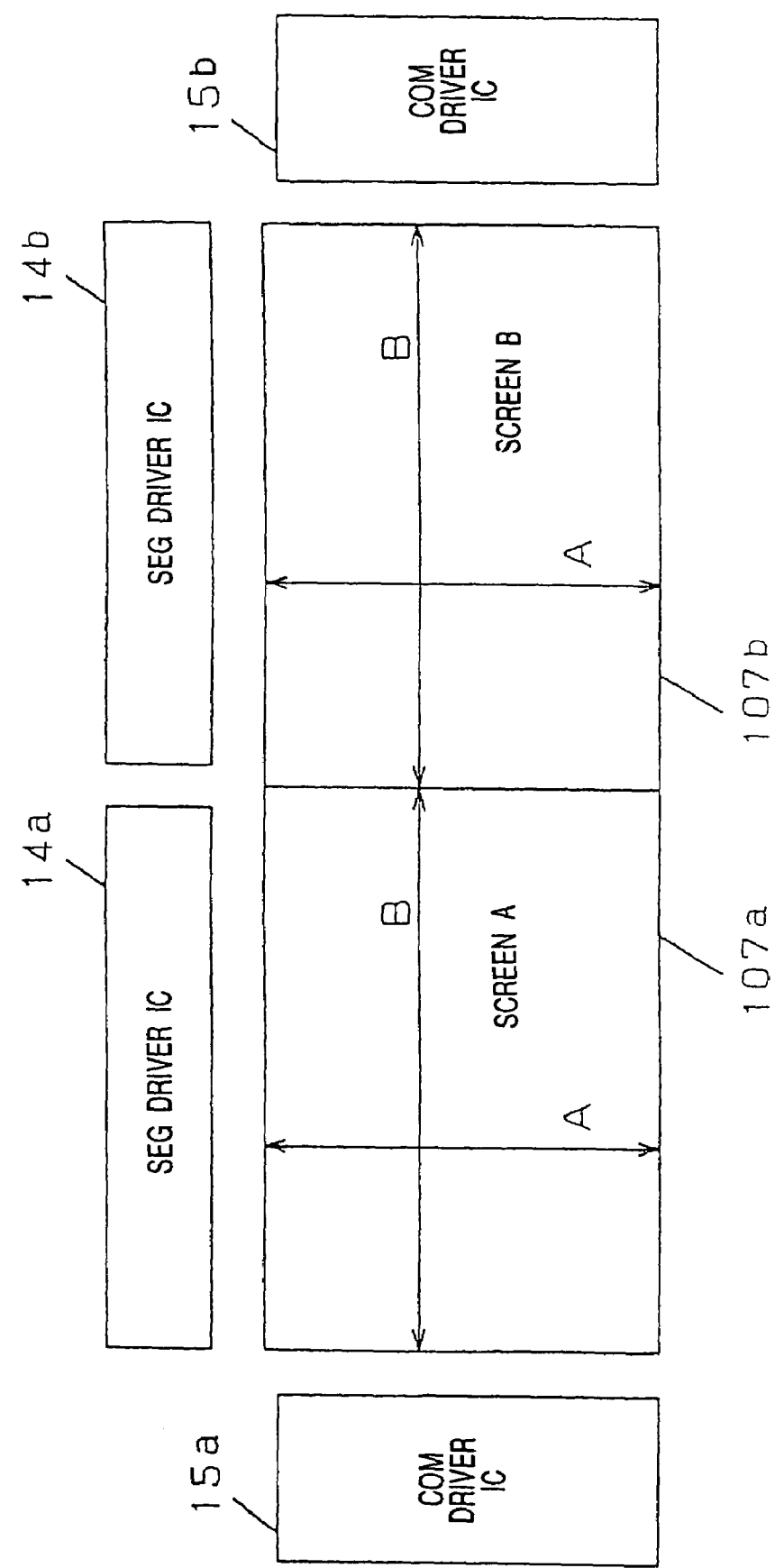
Figure 169:
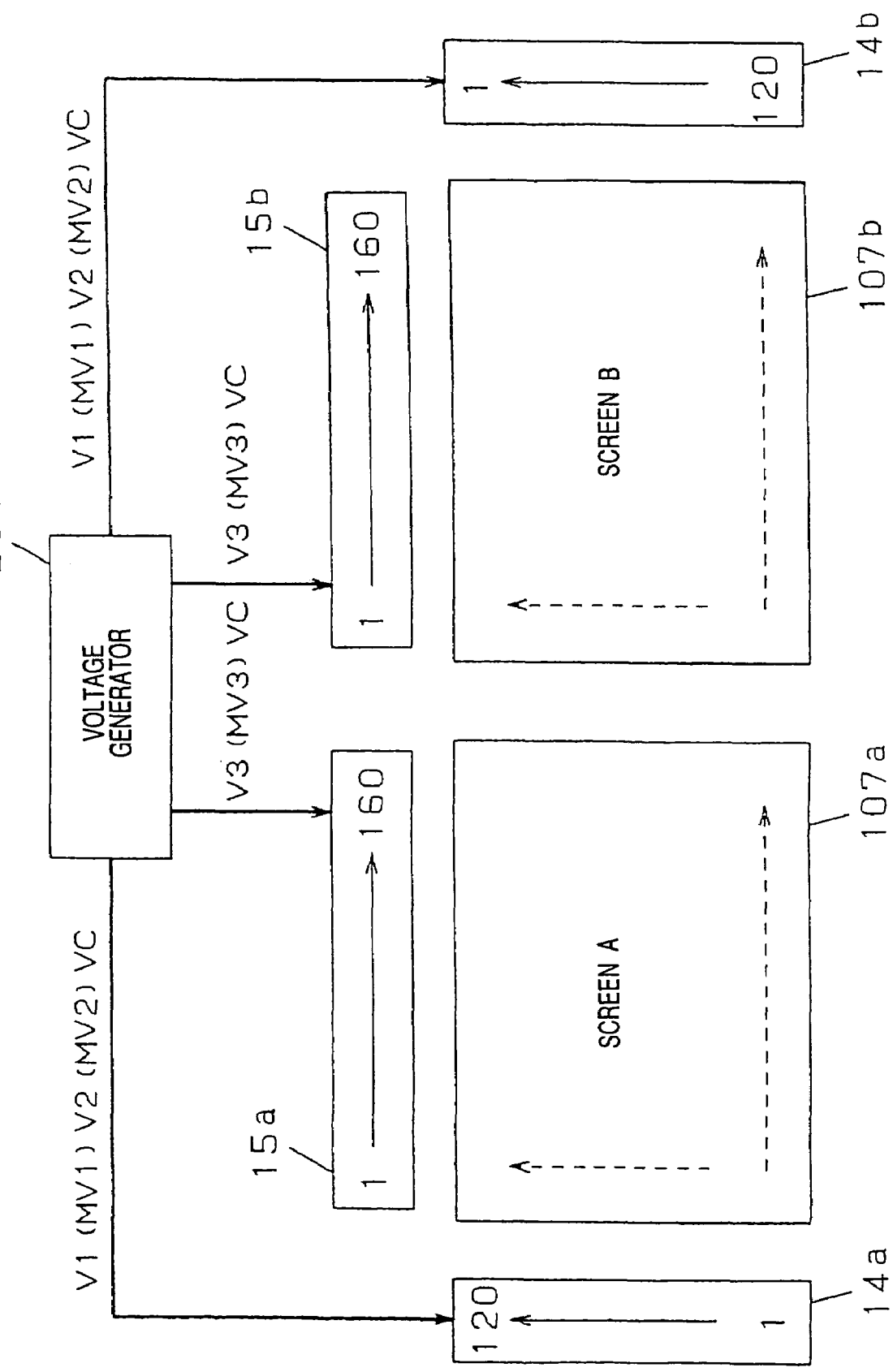
Figure 170:
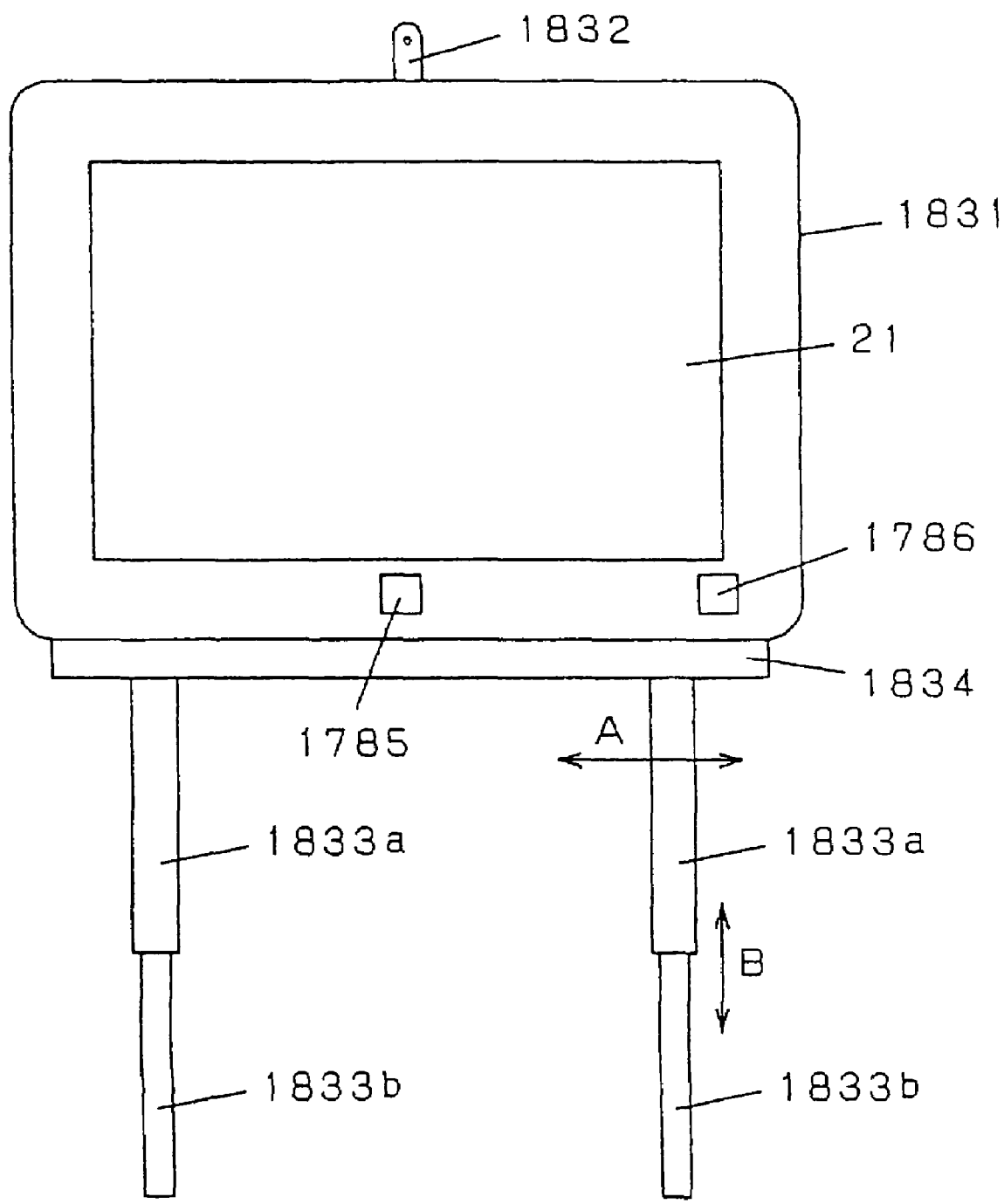
Figure 171:
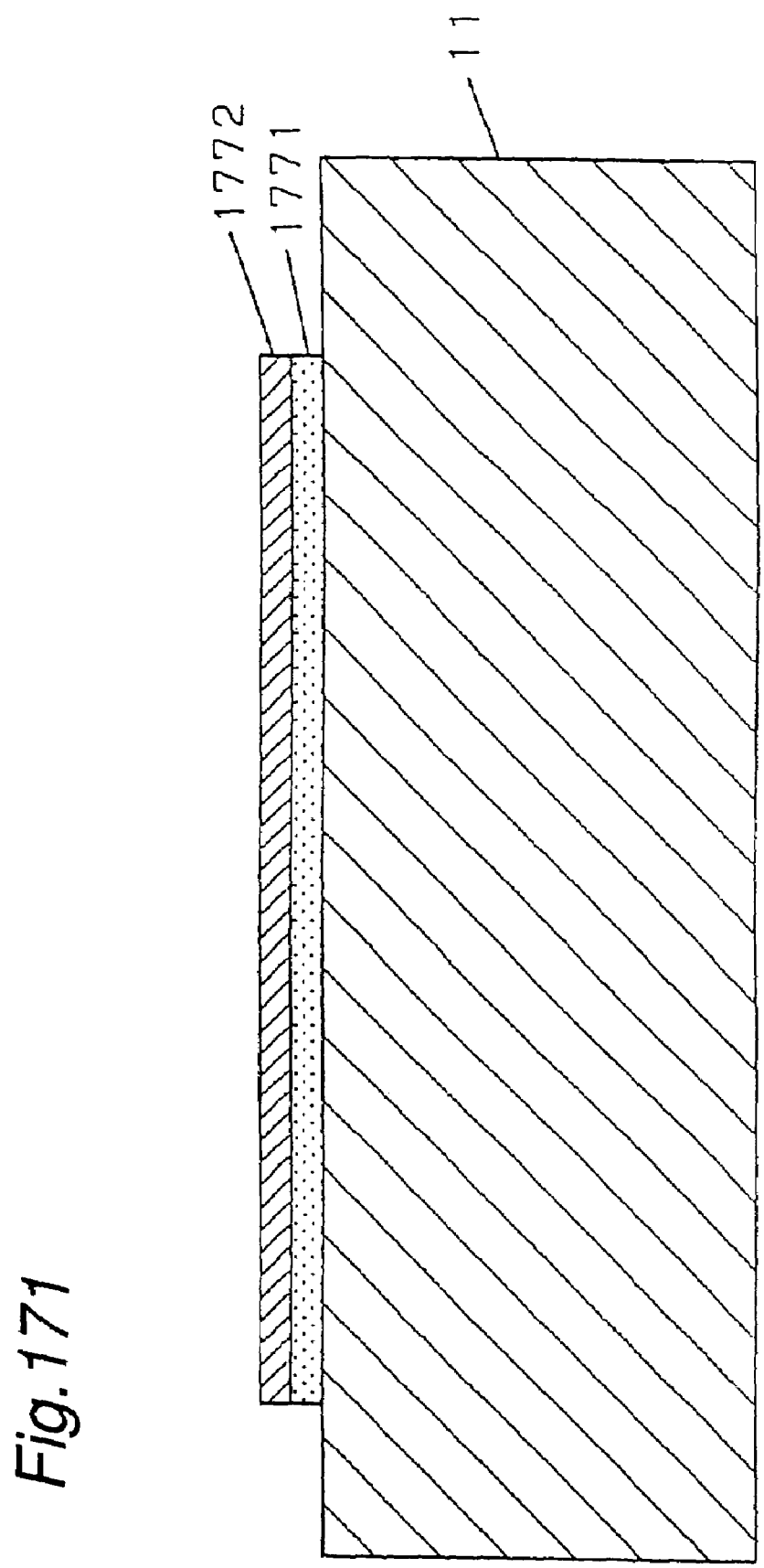
Figure 172B:
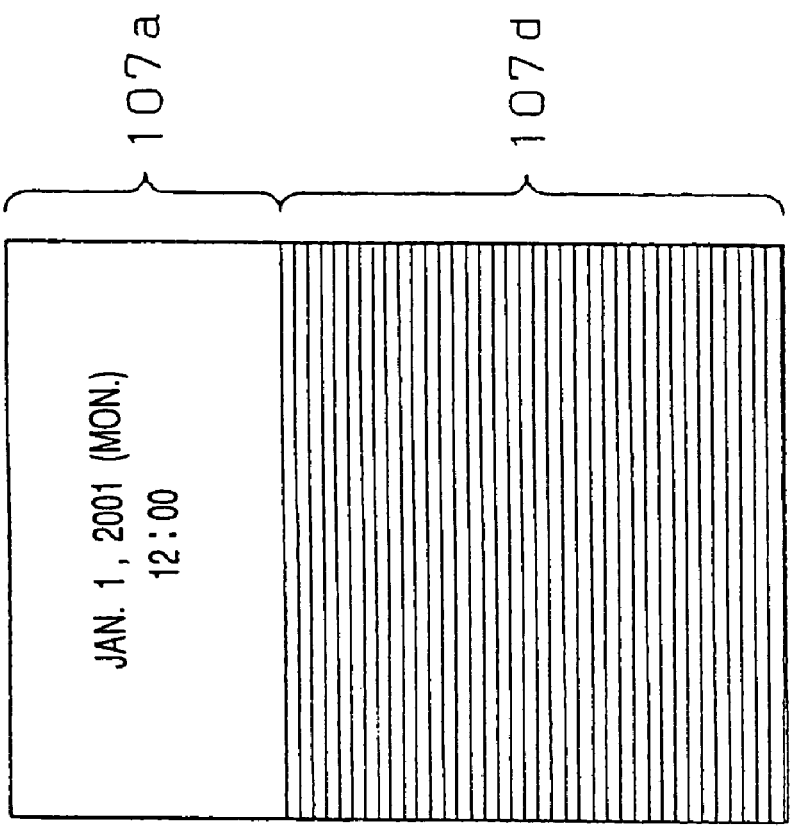
Figure 172A:
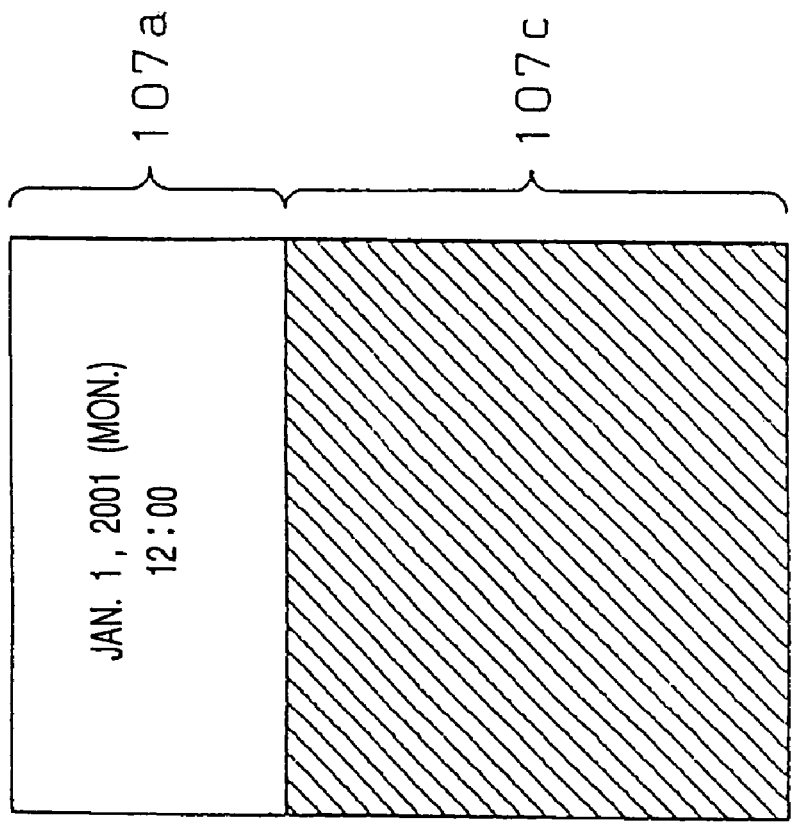
Figure 173:
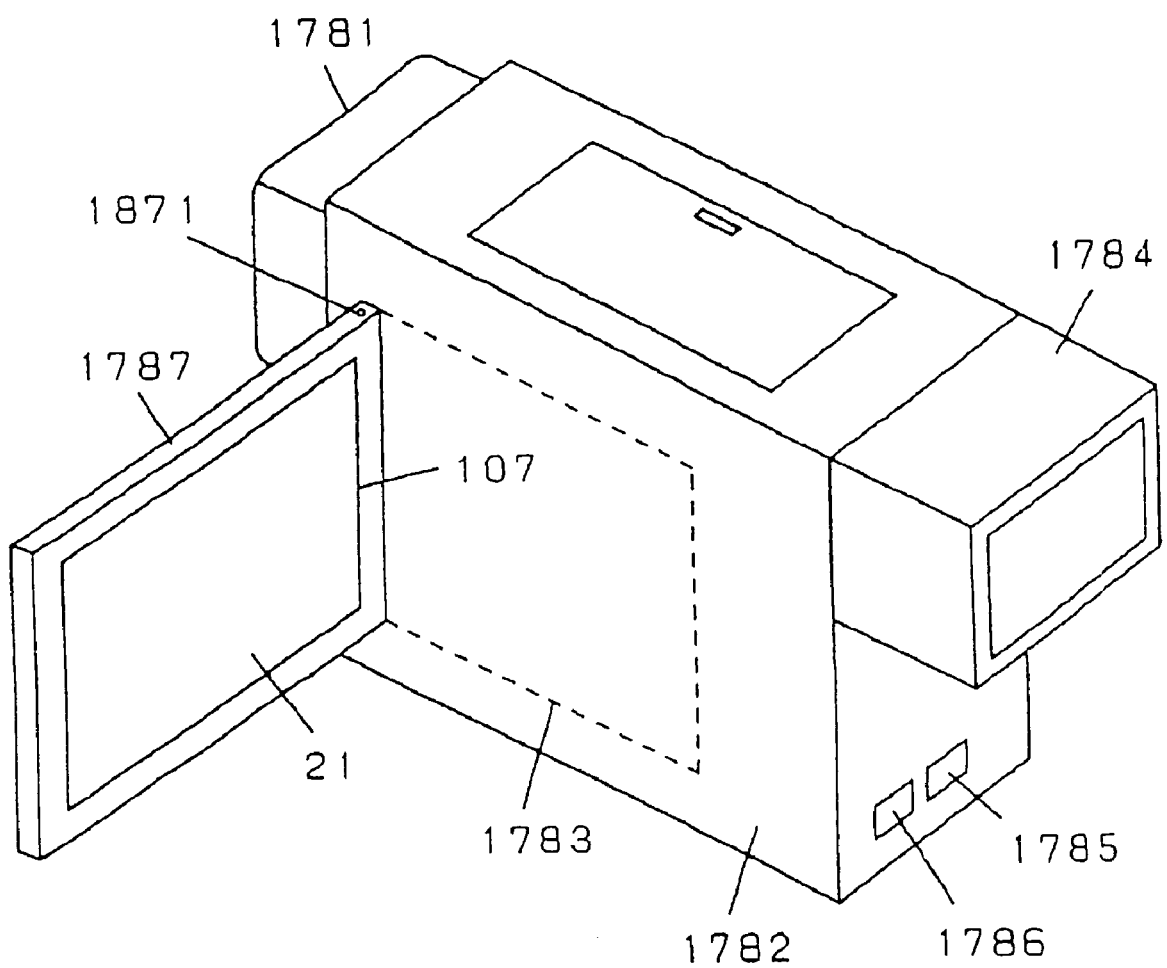
Figure 174:
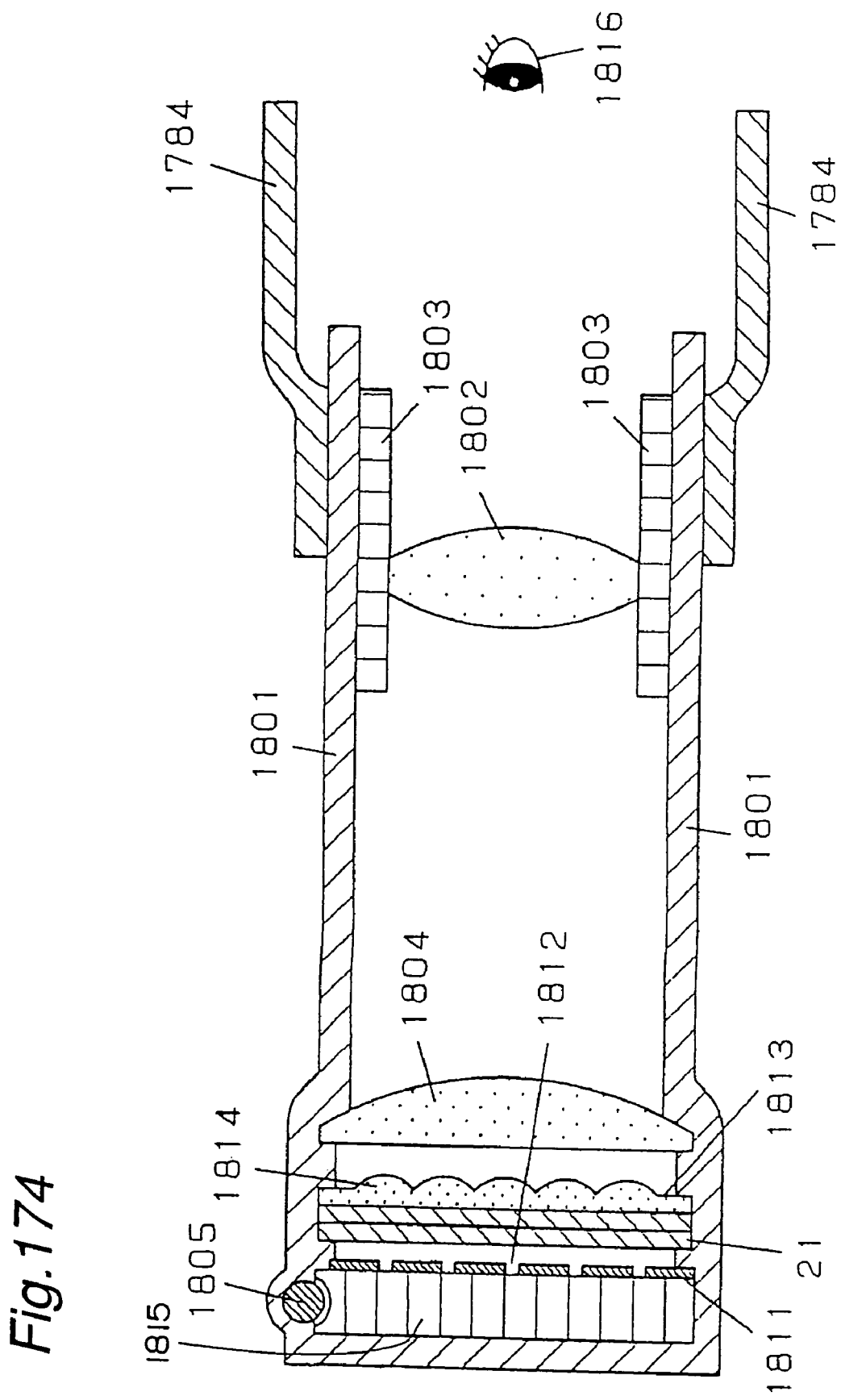
Figure 175:
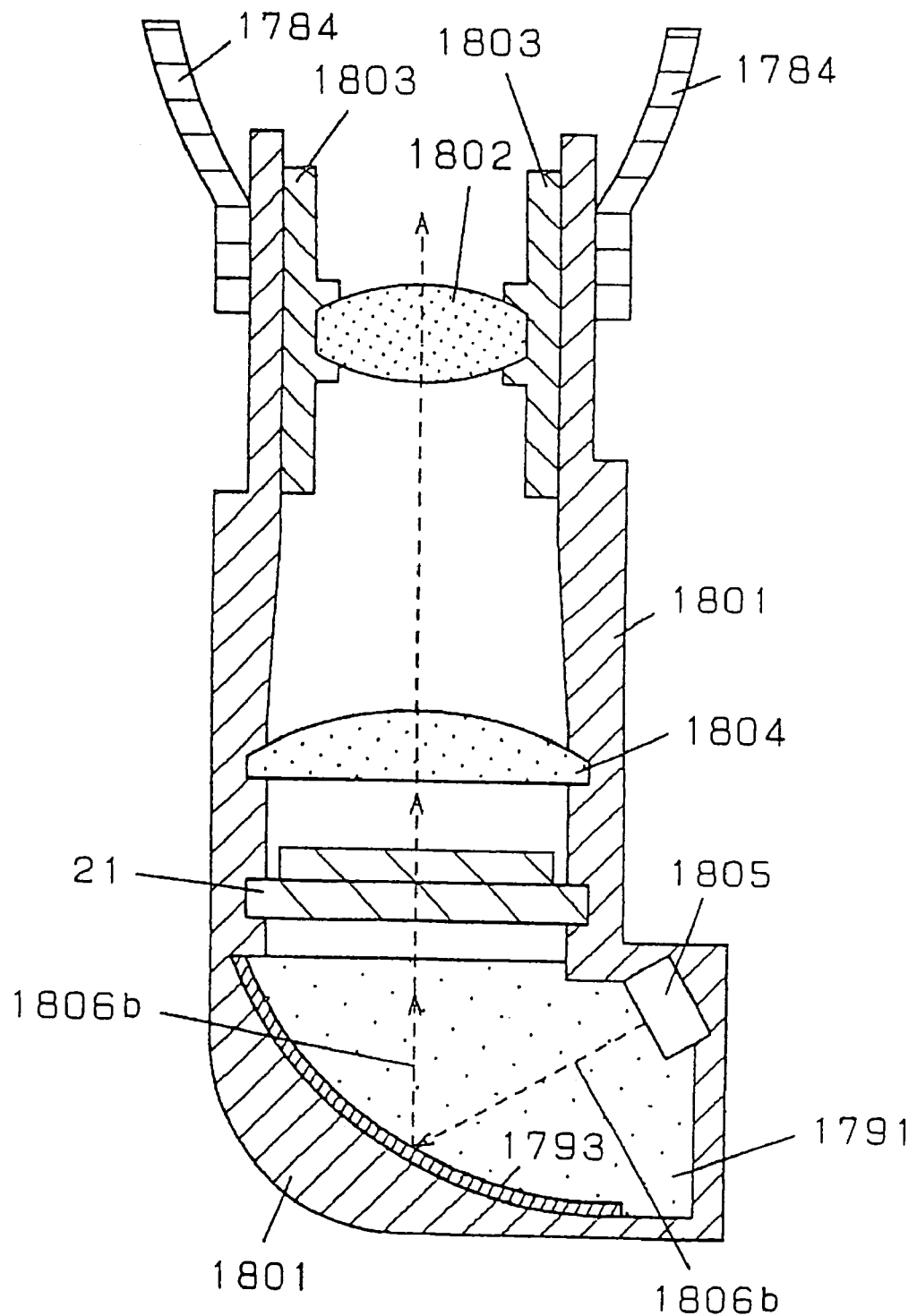
Figure 176A:
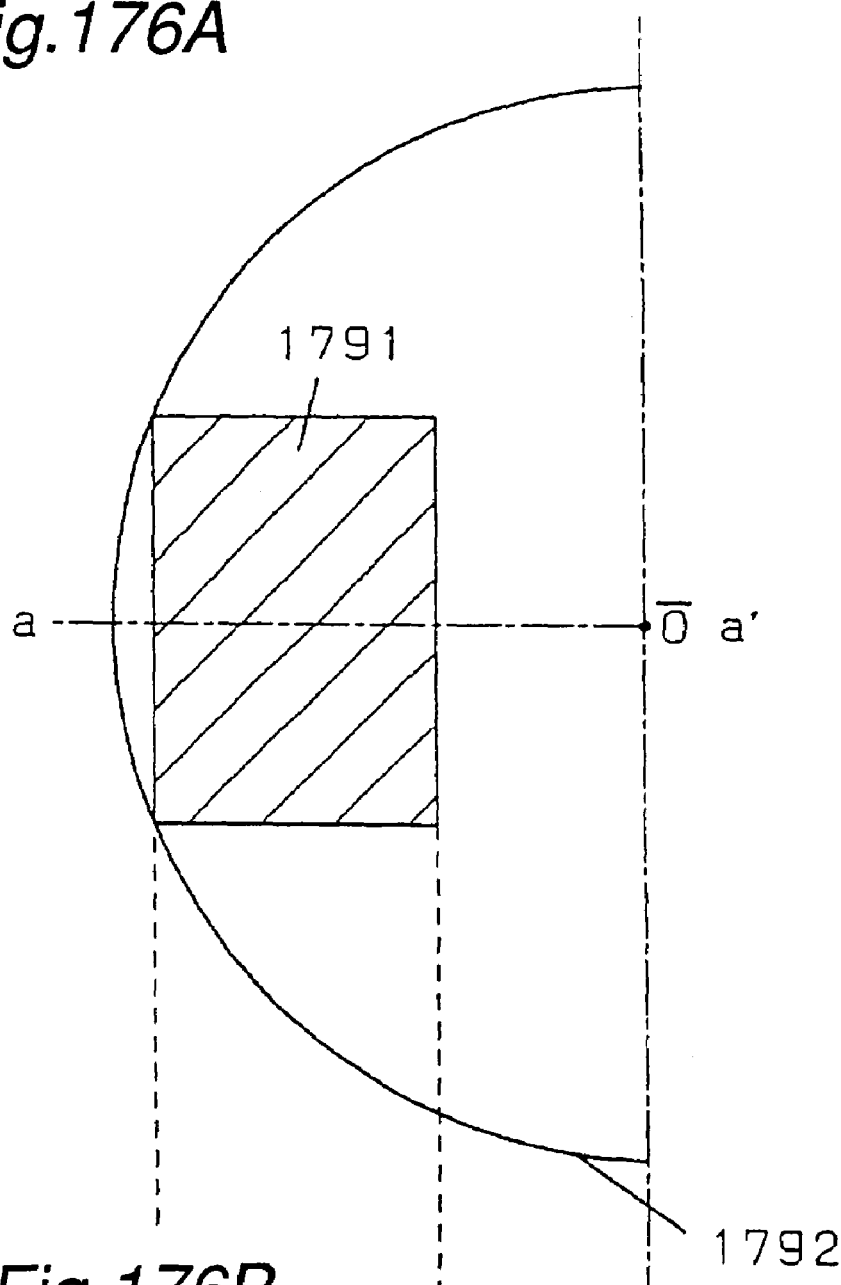
Figure 176B:
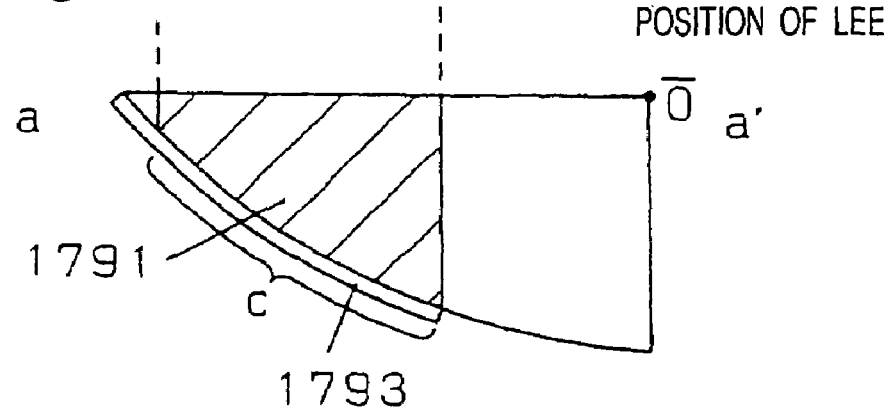
Figure 177:
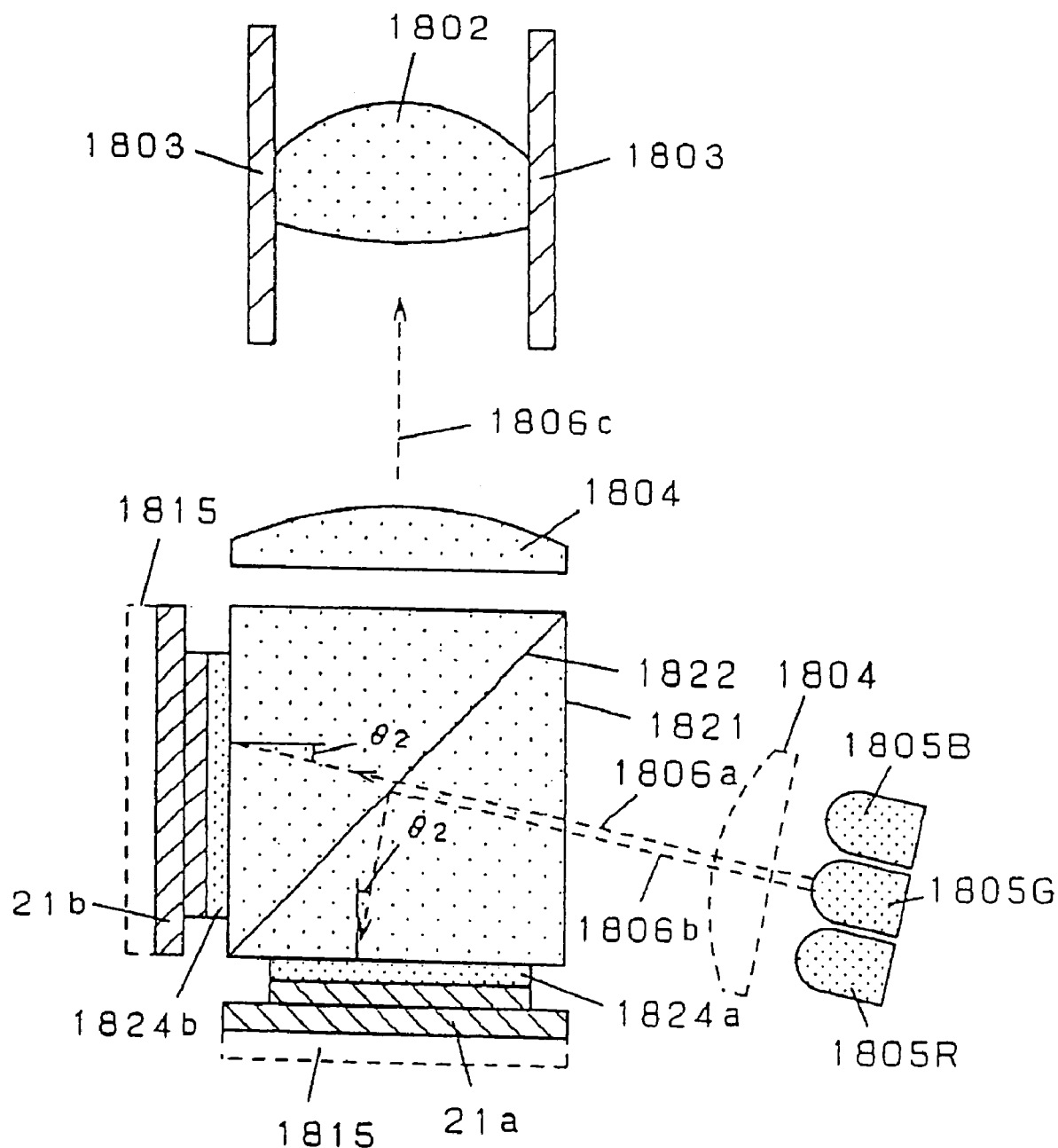
Figure 178:
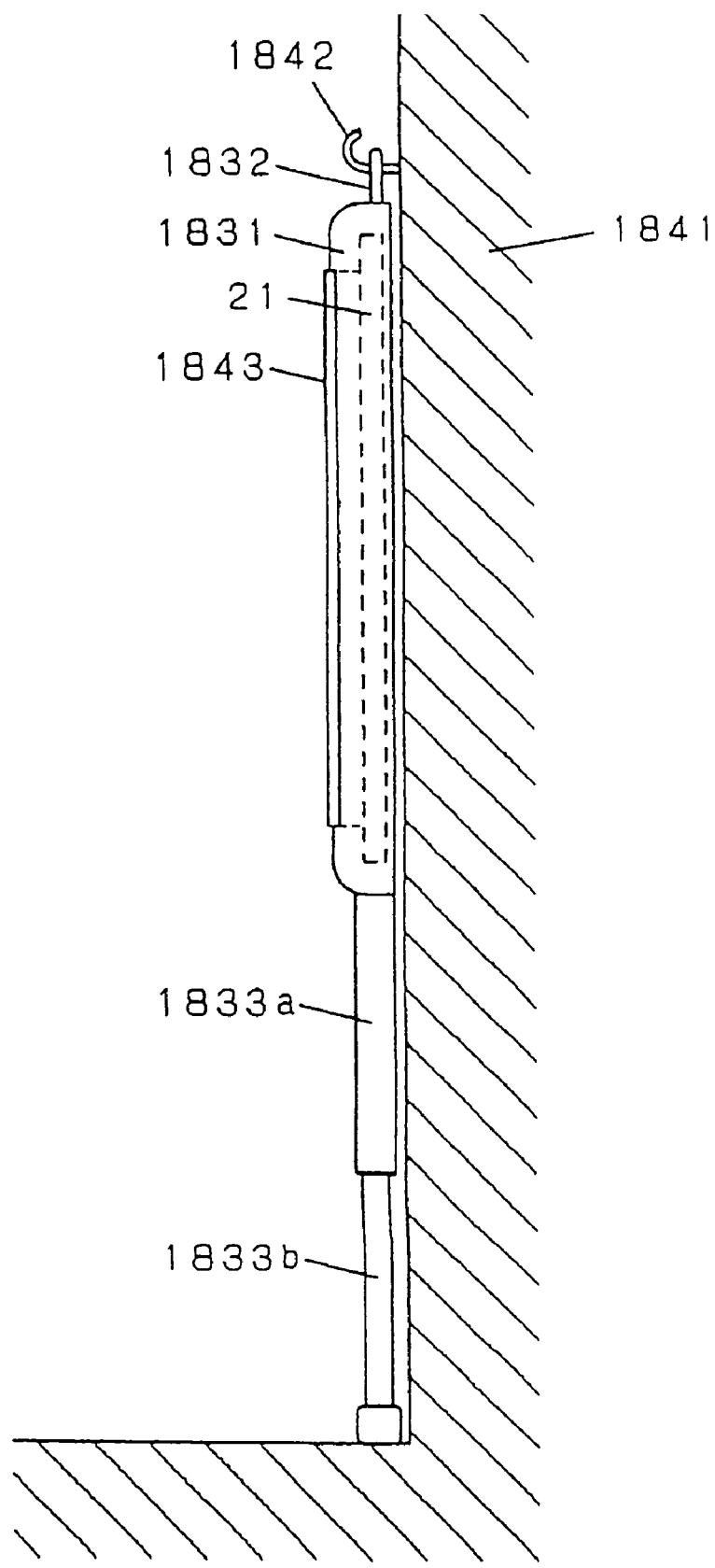

FIGS. 131(a) and 131(b) are explanatory drawings of the data transmission format of the present invention;

FIG. 132 is an explanatory drawing of the drive system for the display unit of the present invention;

FIG. 133 is an explanatory drawing of the drive system for the display unit of the present invention;

FIG. 134 is an explanatory plan view of the display unit of the present invention;

FIG. 135 is an explanatory drawing of the display unit of the present invention;

FIG. 136 is an explanatory drawing of the display unit of the present invention;

FIG. 137 is an explanatory drawing of a part of the display unit of the present invention, FIG. 138 is an explanatory drawing of a part of the display unit of the present invention;

FIGS. 139(a) to 139(c) are explanatory drawings of the data transmission format of the present invention;

FIG. 140 is an explanatory drawing of the drive system for the display unit of the present invention;

FIG. 141 is an explanatory drawing of the drive system for the display unit of the present invention;

FIG. 142 is an explanatory drawing of the drive system for the display unit of the present invention;

FIG. 143 is an explanatory drawing of the drive system for the display unit of the present invention;

FIG. 144 is an explanatory drawing of the drive system for the display unit of the present invention;

FIGS. 145(a) to 145(c) are explanatory drawings of the display unit of the present invention;

Figure 146:
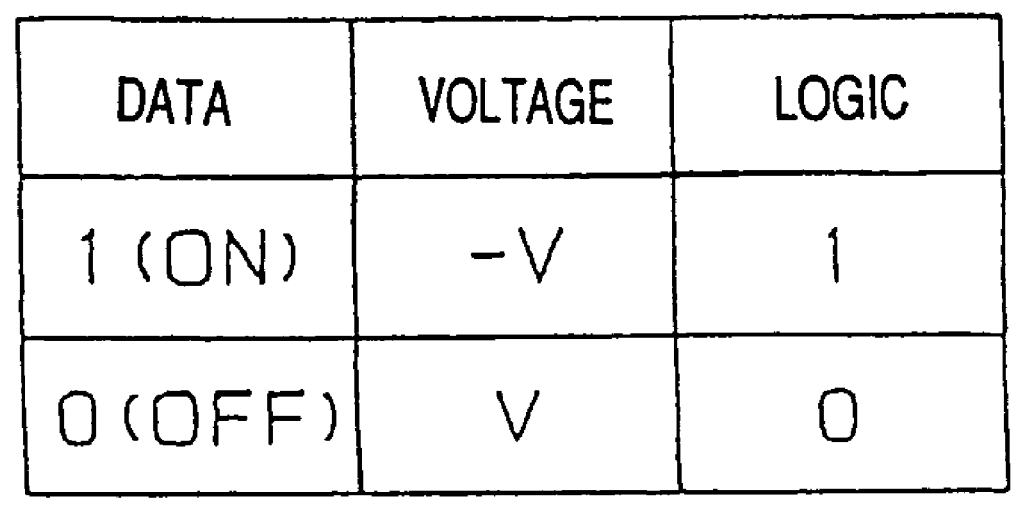

FIG. 146 is an explanatory drawing of the display unit of the present invention;

FIG. 147 is an explanatory table drawing of the drive system for the display unit of the present invention;

FIGS. 148(a) to 148(d) are explanatory drawings of the display unit of the present invention;

FIG. 149 is an explanatory table drawing of the display unit of the present invention;

FIG. 150 is an explanatory drawing of the display unit of the present invention;

FIG. 151 is a block diagram of a display unit of the present invention;

Figure 152:
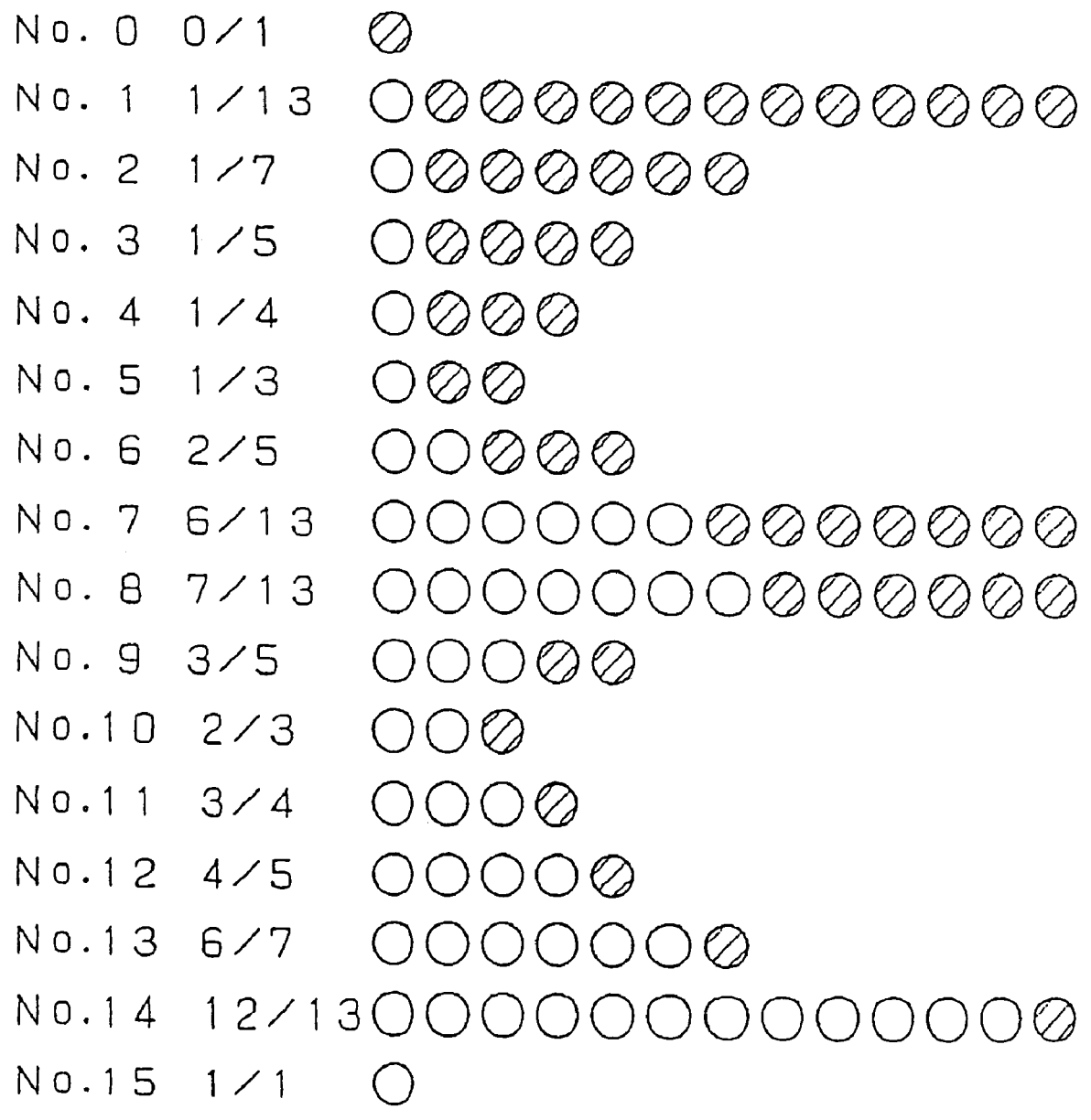

FIG. 152 is an explanatory drawing of the drive system for the display unit of the present invention;

FIG. 153 is a graph view for explaining the drive system for the display unit of the present invention;

FIG. 154 is an explanatory drawing of the display unit of the present invention;

FIG. 155 is a circuit drawing of a part of the display unit of the present invention;

FIG. 156 is an explanatory drawing of the display unit of the present invention;

FIG. 157 is a circuit drawing of a part of the display unit of the present invention;

FIG. 158 is a circuit drawing of a part of the display unit of the present invention;

FIG. 159 is a circuit drawing of a part of the display unit of the present invention;

FIG. 160 is a circuit drawing of a part of the display unit of the present invention;

FIG. 161 is a circuit drawing of a part of the display unit of the present invention;

FIG. 162 is a circuit drawing of a part of the display unit of the present invention;

FIGS. 163(a) and 163(b) are explanatory drawings of the display unit of the present invention;

FIG. 164 is an explanatory drawing of the display unit of the present invention;

FIG. 165 is a graph view for explaining the display unit of the present invention;

FIG. 166 is an explanatory drawing of the display unit of the present invention;

FIG. 167 is a schematic view of an information terminal of the present invention;

FIG. 168 is an explanatory drawing of the information terminal of the present invention;

FIG. 169 is an explanatory drawing of the information terminal of the present invention;

FIG. 170 is a schematic view of the display unit of the present invention;

FIG. 171 is a section view of a part of the display unit of the present invention;

FIGS. 172(a) and 172(b) are explanatory drawings of the display unit of the present invention;

FIG. 173 is a schematic perspective view of a video camera of the present invention;

FIG. 174 is a section view of a view finder of the present invention;

FIG. 175 is a section view of a view finder of the present invention;

FIG. 176 is an explanatory drawing of the view finder of the present invention;

FIG. 177 is an explanatory section view of the view finder of the present invention; and FIG. 178 is a partial section view for explaining a display unit of the present invention.

BEST MODES FOR CARRYING OUT THE INVENTION

Figure 95:
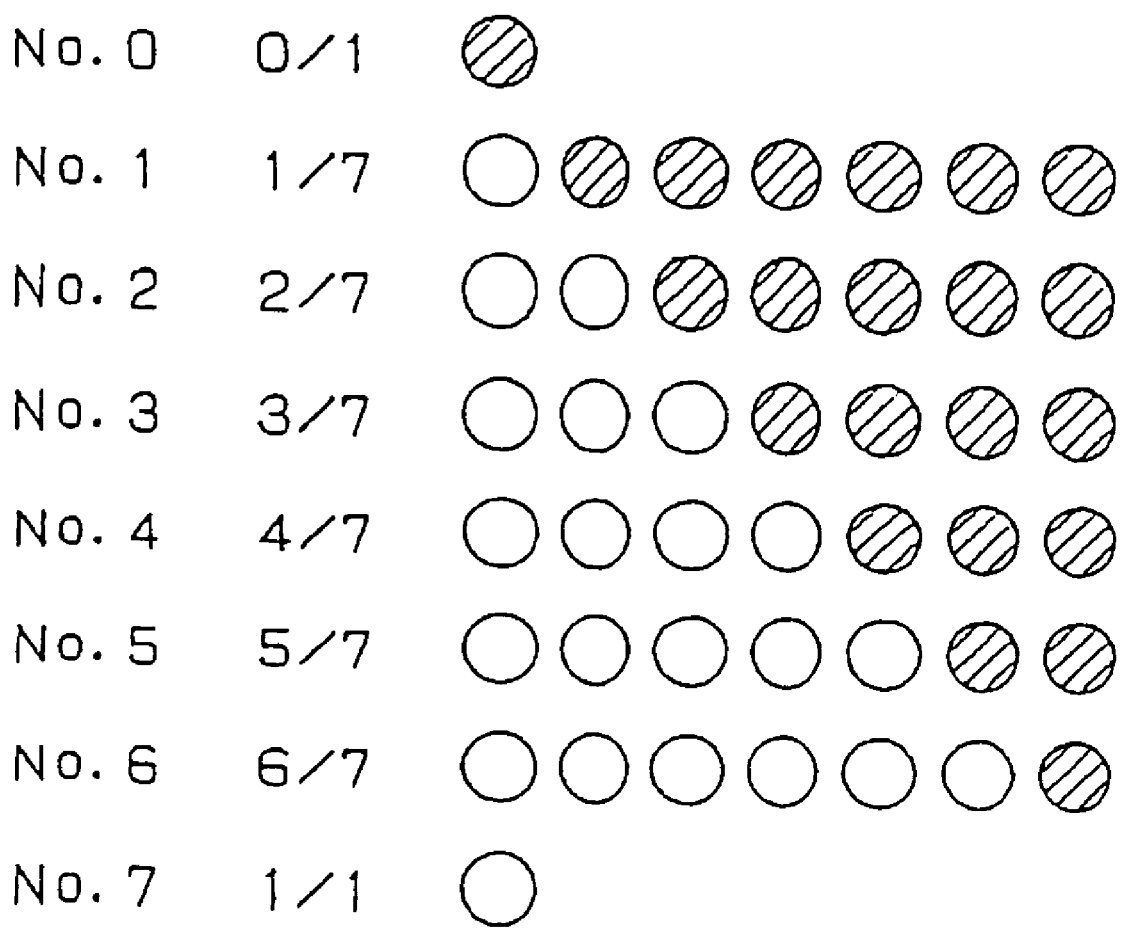

There are sections of this specification statement which have been abbreviated and/or scaled up or down to simplify the drawings and/or to clarify the technical drawings. For example, in the LCD panel in FIG. 86, the 24 sections of the liquid crystal layer is clearly indicated in the illustration. In FIG. 95, the phase film has been truncated. The above points also apply to the technical drawings below.

Sections which refer to identical numbers and symbols have identical or similar embodiment or material, or alternatively function or operation.

Unless otherwise noted, the content described by the technical drawings and so on can be integrated with other embodiments. For example, lighting systems and mirrors that reflect light can be added to the display panels or the display units in FIG. 50, FIG. 1, and FIG. 6. Moreover, the display units in FIGS. 50, 1 and 6 can be utilized with the liquid crystal television in FIG. 170. The display units in FIGS. 50, 1 and 6 can also be utilized with the mobile telephones pictured in FIGS. 124, 126, 128 and 167. To put it briefly, the display panel items described in the technical drawings and specification statement have not been described individually but, rather, can be mutually combined to form an embodiment configuration of the display unit. It goes without saying that the base material in FIG. 162 can be used with the display units in FIGS. 50, 1 and 6.

In addition, FIGS. 86, 116 through 155 primarily describe the hardware for display units. The semiconductor circuits (IC chips made from silicon materials) needed to realize any subsequent hardware are also within the technical realms of the present invention. FIGS. 85 through 115 describe, principally, the drive system, but the semiconductor circuits (IC chips made from silicon materials) needed to realize the drive system are, of course, within the technical realms of the present invention. To put it briefly, the production and retail of these IC chips based on the method developed here will violate this patent.

Even if they are not exemplified in the specification statement, the matters, content and specifications explained or described in the specification statement or in the technical drawings can be combined with one another and defined in the claim.

An explanation of the invention display panel and display unit will be given below while referring to the technical drawings. In order to simplify the explanations in the specification statement, the LCD panels and display unit are described and illustrated with an example. However, the present invention is not restricted to just these items. Organic EL (OEL, OLED) and inorganic EL and other display panels or units are also technical categories covered by this specification statement.

The present invention primarily pertains to simple matrix LCD units or EL display units. In particular, it pertains to the drive systems that simultaneously select multiple common signal lines (MLS: multi-line selection, and; MLA: multi-line addressing systems).

However, the present invention is not restricted to just these items. It is also well suited to the APT and IAPT drive systems and the voltage oscillation system (A method whereby varying the basic electric potential of the voltage efficiently impresses the voltage in the light modulation layer). It can also be applied to the PHM (pulse-height resolution method) system.

In addition, the present invention can be applied to active matrix LCD units or EL display units. For example, for active matrix LCD units or EL display units, instances where multi-contrasting is displayed can be illustrated by using the FRC (frame rate control) system and the analogue contrast display system. Loading IC 14 or IC 15 onto one side of the display panel is illustrated in FIG. 1, and the transmission systems are explained in FIGS. 131 and 139. The processing systems and image display methods for image data are exemplified in FIGS. 132 through 144.

The active matrix type refers to one formed in each pixel by thin film transistor (TFT) switching elements. In addition to these thin film transistors, ring diodes, thin film diodes (TFD) and varistor elements can also be used as switching elements. In other words, any plasma addressing system capable of changing the current impression condition in the pixel is sufficient.

For the substrate 11 and 12 made from glass or organic materials, a striped electrode has been formed (not shown in the drawing). Sapphire glass, soda glass, lead glass, and quartz glass have been illustrated as types of glass base materials. Among them, the good heat conductance of sapphire glass base material makes it the preferred choice.

For substrate 11 and 12 made from organic material, (metal) plate, anything with a suitable surface and film are all acceptable. Materials made from epoxy resin, polyimide resin, acrylic resin and polycarbonate resin have been illustrated. It is preferable that the board thickness be 0.2 mm or greater and less than 0.9 mm.

When substrate 11 and 12 are a comparatively thick 0.5 mm to 1.0 mm, a striped electrode or a TFT switching device is formed. The base thickness can then be reduced to 0.25 mm to 0.5 mm by chemical etching or mechanical polishing technology.

At least one of substrate 11 and 12 should be optically transparent, and the other substrates can be constructed from silicon or metals such as aluminum, copper and stainless steel. Resin film can also be applied to the metal substrate to form a composite board. By forming such a substrate, the heat release capacity of the board and the reliability of the display panel will improve.

Also, it can be constructed by fixing several layers of resin film or glass together. Part of or all of boards 11 and 12 are made from colored plastic. These boards are coated with a light dispersing agent. Improvements made by narrowing and widening the angle of view can be done by forming convex and concave curves on 1556. The reflective film which reflects incident light into the pixels is attached directly to boards 11 and 12.

The display panel becomes reflective when the reflective film is connected to the pixel electrode. In case of having transparent type, the alignment of liquid crystal will change. A change in viewing angle becomes apparent depending on the how small the bumps are on the surface of the ITO pixel. The reflection system recognizes images according to how small is a reflective section part on a small metallic film and the bumpy section on the ITO pixel electrode. Thus even the display panel operates normally outdoors or in strong sunlight.

The 561 pixel electrode of the reflective pixel that reflects transmitted light can be made from aluminum, chrome, titanium, and silver. It is also possible to use alloys of two or more metals such as aluminum and magnesium, aluminum and molybdenum, and aluminum and titanium.

Figure 2:
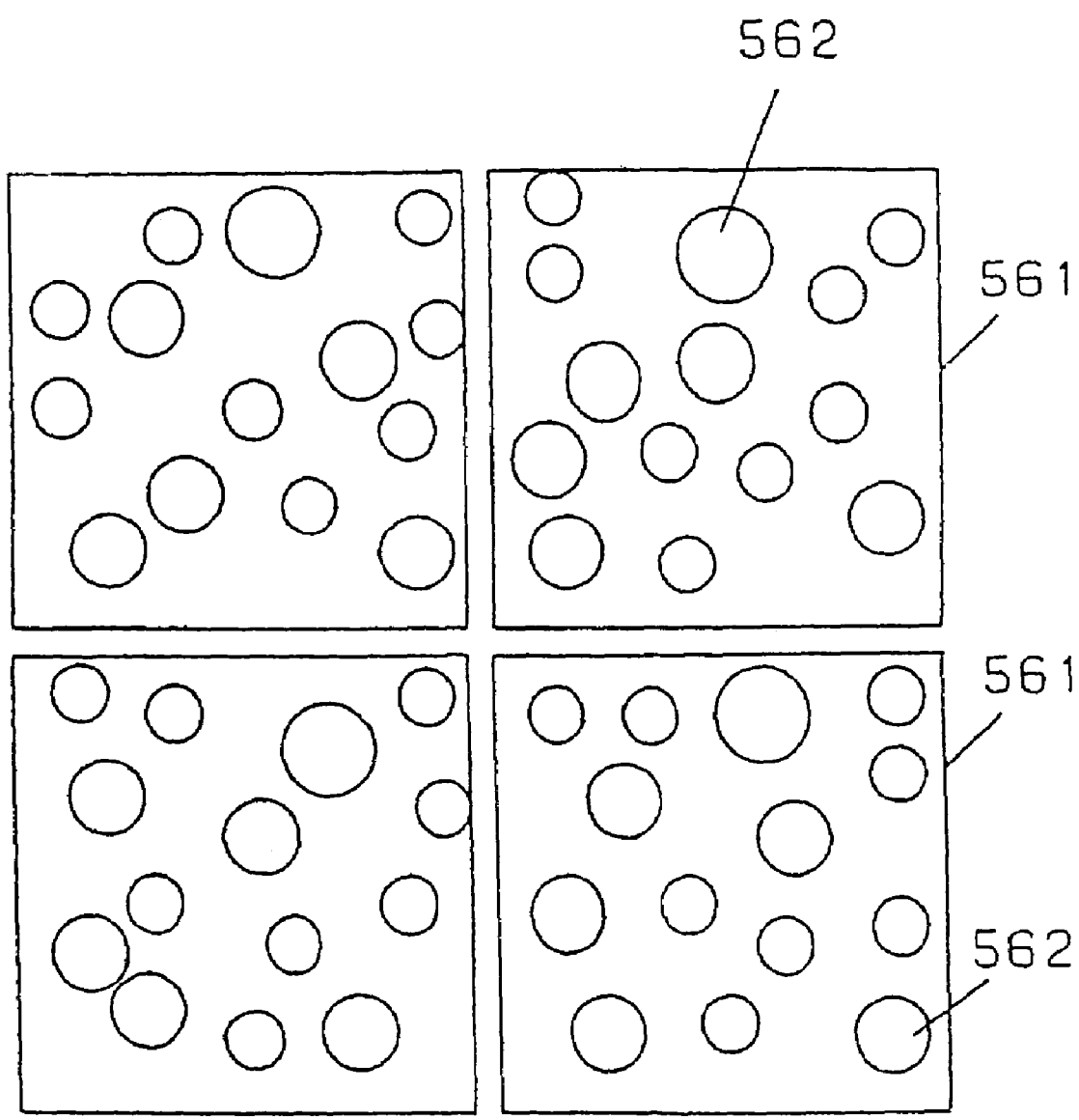
FIG. 2 is an explanatory drawing of the display unit of the present invention.

Scattering of transmitted and reflected light can be achieved by placing a convex (or curve) surface 562 on the surface of pixel electrode 561 (or striped electrode). The transmitted light is dispersed by 562 convex surfaces. (See FIG. 2)

Normally color filters are made from filters painted with light scattering pigment resins. Pigments absorb long wavelengths of light while being transparent to other long wavelengths. During our development we added a light scattering agent of diameters between 0.2 µm and 2 µm in the center of the color filters. We used titanium oxide, aluminum oxide, and opal glass as light dispersing agents. These agents disperse incident light coming into the filters. The Angle of view changes according to the amount of light dispersed. The color filters in substrate boards 11 and 12 are made in one direction. Ideally color filters should be placed on top of the transparent electrode (pixel electrode and the striped electrode.)

For the reflective pixel, the pixel electrode 561 is made using the spattering method by using a 200 nm aluminum film. The convex section 562 is laid on the surface of the liquid crystal layer pixel electrode 561. With a simple matrix type display panel a striped pixel electrode is used. The convex surface 562 is not limited to being convex it can also be concave. The concave and convex sections can be made at the same time. Light scattering agent can be placed on the upper and lower layer pixel electrode 561.

The ideal material used in the construction of the striped electrode pixel electrode is aluminum, but silver can also be used. The ITO is made from a conductive material. This gives the ITO its transparent properties. Adjusting of the thickness of the aluminum film effects the transparent and reflection properties of the semitransparent film. Ideally the transparency rate of the semitransparent film should be in the range of 10 to 30%.

One hole or many holes are made in the reflection film. That part of the film becomes transparent. The pixel electrode becomes semitransparent. The reflection film and semitransparent film becomes a multi-layer dielectric film.

Ideally the surface should be as even as possible when the electrode (Striped and matrix pixel electrodes) is attached to the reflection film. The height of the convex section should be between 0.5 and 1.5 µm thick. It is important that the insulation of the convex section be uneven. Beads or titanium oxide should be mixed in with the materials used when making the convex section. It can be formed by directly forming the convex section on the reflective film: This is outlined in FIG. 2.

Figure 3:
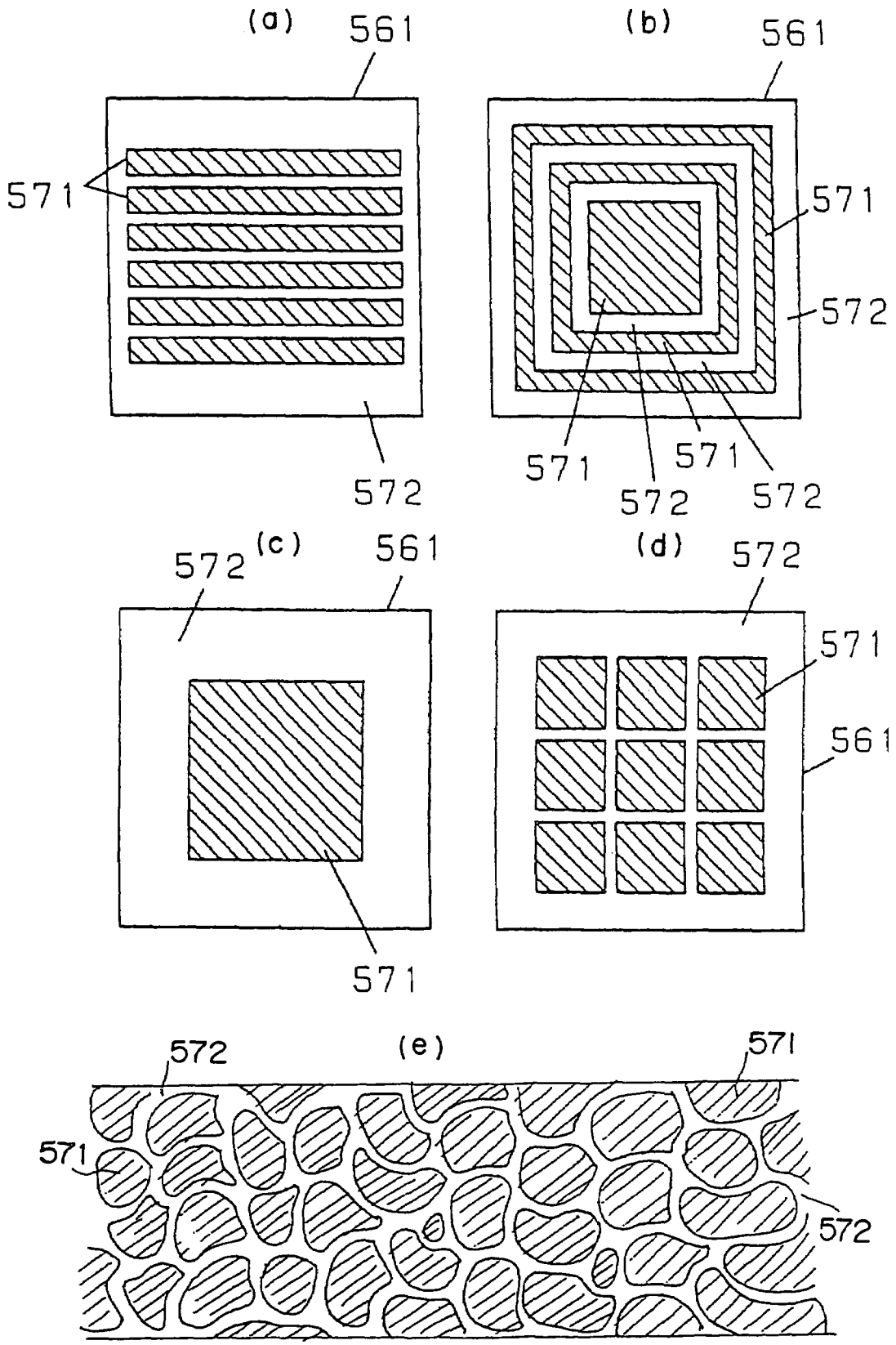
FIGS. 3(a) through 3(e) are explanatory drawings of the display unit of the present invention.

FIG. 3 shows the pixel electrode 561 (this includes the striped electrode) transparent light window open and the mechanism of semi-transparency. The diagonal line on every drawing is the transparent section 571. An actual hole should be open in transparent section 571 leading to reflection section 572. Fix the reflection electrode on top of the ITO transparent electrode.

Figure 63:
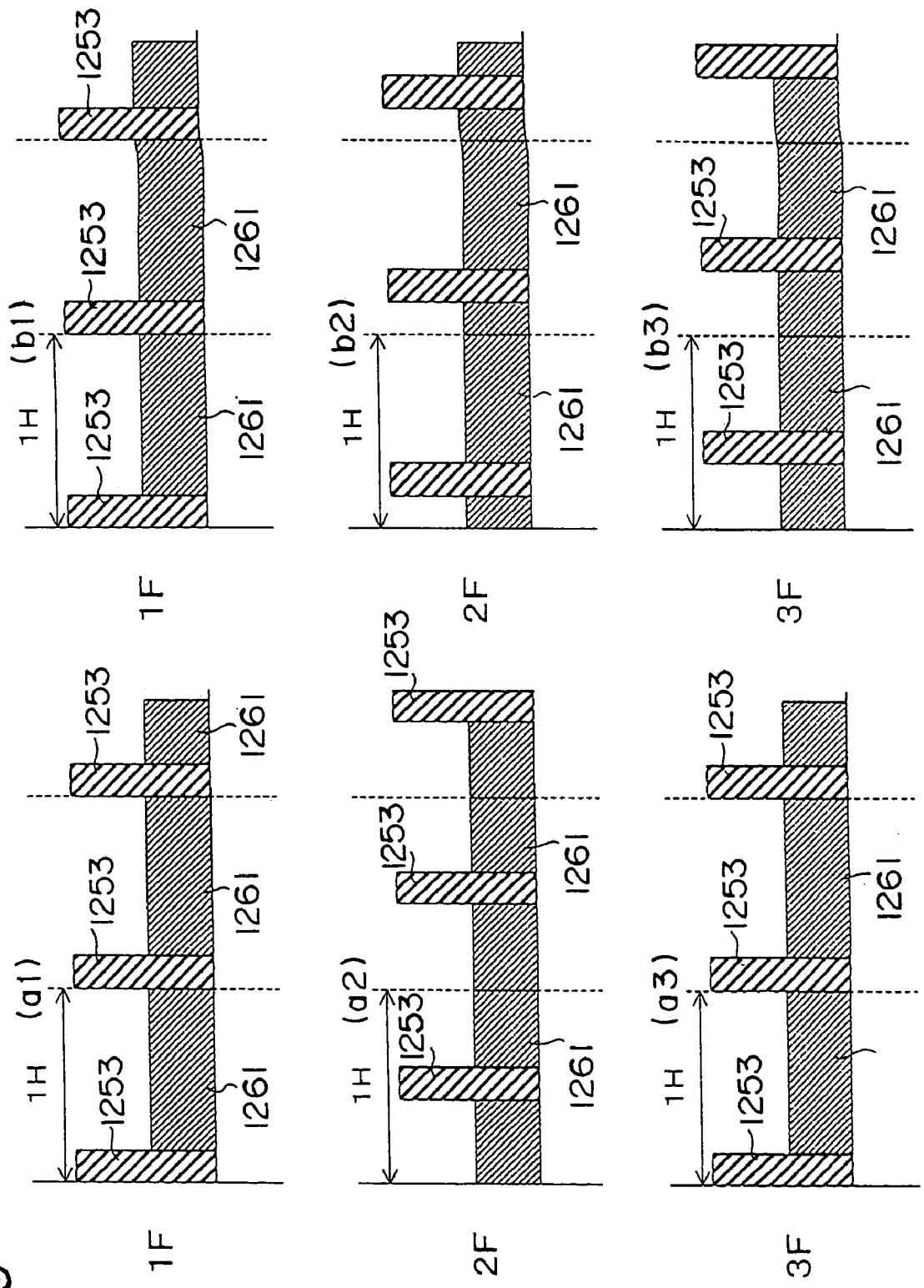
FIGS. 63(*a*1) to 63(*a*3) and 63(*b*1) to 63(*b*3) are explanatory drawings of the display unit of the present invention.

FIG. 63(*a*) is an example of how a number of short transparent sections 571 are fixed on the reflection electrode. FIG. 3(*c*) shows one transparent section 571. FIG. 3(*b*) shows a ring formed transparent section 571. FIG. 3(*d*) shows a number of short transparent sections 571.

FIG. 3(*e*) shows a random (or comparatively random) array of stripes (including the pixel electrode matrix) uneven surface 562. It shows the convex section transparent section 571 and the concave or flat section reflection section 572. The convex section is the transparent section 571 and the concave or flat section is the reflective section. The converse is also possible. The transparency rate setting of the semi-transparent film can be adjusted by varying the surface area of the convex section in FIG. 3.

Making substrate boards 11 and 12 from sapphire glass improves their heat releasing properties. Making the films thicker or thinner improves heat convection. For example, a board made from a thin diamond (or DLC-diamond like carbon) film. Other examples include boards made from alumina or ceramics or metal boards made from steel. A metal film is heat fixed onto the insulation film. Metallic coating can also be used.

It is without a doubt that plastic boards can also be used for the substrate. Lightweight plastic boards are well suited for use in mobile phone displays. Please refer to FIGS. 2, 5, 6, and 7 for explanations on the use of plastic boards.

Figure 4:
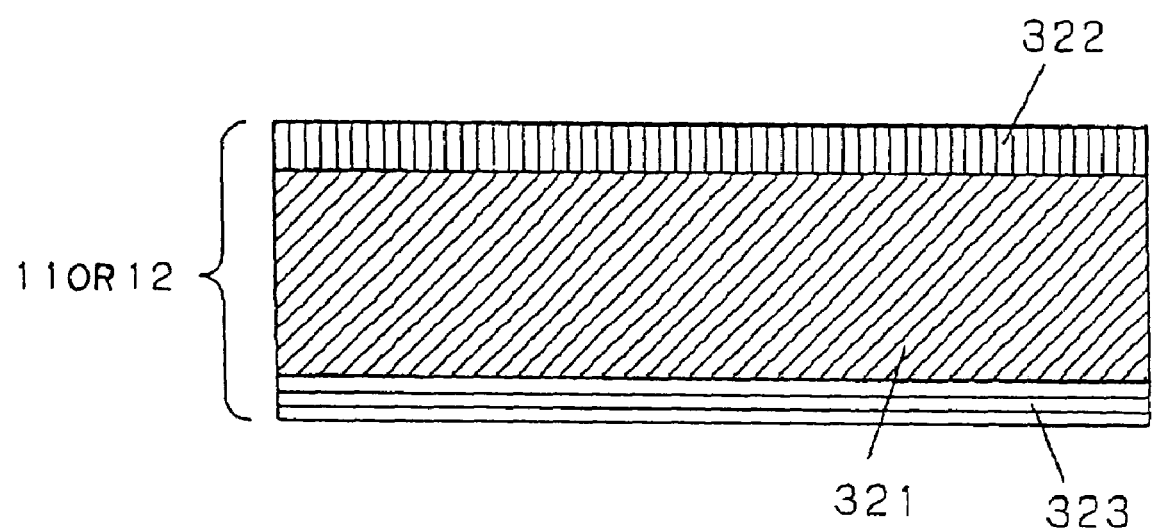
FIG. 4 is an explanatory section view of the display unit of the present invention.

The plastic boards were developed for liquid crystal displays, as shown in FIG. 4, are laminated boards. They are made by fixing the support board 322 to substrate 321 on one side. On the other side the support board 323 is fixed to substrate 321. Film between 0.05 and 0.3 mm thick can also be used.

As shown in FIG. 5(*a*) ideally polyolefin resin is used in the substrate 321. An example of a polyolefin board is the ARTON 200 µm board made by Japan Synthetic Rubber Co., Ltd.

FIG. 5(*b*) shows the heat resistance, the hard board layer's solvent resistance and moisture resistance and the polyester resin gas barrier board's aerotolerence of the 321 substrate. It also shows the polyethylene or polyester 322 support board (film or film).

On the other side of the 321 substrate is the hard coat layer (same properties as above) and the polyester resin gas barrier layer of the 323 support board (film or film). Ideally the 322 support board and the 323 board optical lag axis angles should be set to 90 degrees. The 321 substrate and the 323 support board are fixed together with adhesive bond.

Ideally a UV (ultra-violet light) hardened fluoro-acrylic resin adhesive should be used, but it is also possible to epoxy adhesive or bond with a refractive index between 1.47 and 1.54. It is desirable to have the refractive index of board 31 below 0.03. It is especially important to coat the boards with a light dispersion agent such as titanium oxide before applying any adhesives.

When fixing the 322 and 323 support boards to the 321 substrate, the optical lag axis angle should be set an angle should be more than 45 degrees and less than 120 degrees or preferable at angles between 80 degrees and 100 degrees. At these angles the effect of phase difference caused by the polyester 322 and 323 support boards is completely negated in the laminated boards. The liquid crystal display panel plastic board then can be used as a non-phase difference isotropic board.

With this structure the non-phase difference film board and film laminated board become more versatile. Namely, it becomes possible to change straight polarized light into elliptical polarized light by modifying the film phase difference. If there is a phase difference in board 11 etc. an error in the design setting will occur.

Here, as the hard coating layer, use epoxy, urethane, or acrylic resins may be used, and also the striped electrode and the pixel electrode may share the role as the first under coat layer for transparent electrical inductive film.

It is also possible to use such inorganic materials such as $SiO_2$ and SiOx etc. and organic materials such as polyvinyl alcohol, and polyimide as the gas barrier layers. The use of acrylic, epoxy resin, and polyester adhesives bonds is possible. Ideally the thickness of adhesive should be less than 100 µm and the thickness of the uneven surface of the boards should be more than 10 µm.

The thickness of the 322 and 323 support substrates should be between 40 µm and 400 µm. If the 322 and 323 support substrates becomes less than 120 µm thick, it becomes possible to lower the risk of phase difference that occurs when solvent seeps out at the polyethersulfone resin dye-line. The ideal thickness for 322 support board is between 50 and 80 µm.

In the laminated board the undercoat layer of the transparent electrical inductive film is made from $SiO_x$ and as shown in FIG. 3101(c) the 325 transparent electric inductive film from ITO. It is made using the Spattering technique. By making display plastic board 325 transparent electric inductive film in this fashion the film attains a sheet resistance of 25 Ω/□ and a transparency rate of 80%.

If the 321 base substrate is between 50 and 100 μm thick, the display panel plastic board will melt during heat treatment in the manufacturing process and the striped electrode ITO will crack. This causes it to lose carrier ability, even if the circuits are connected. If one substrate is between 200 and 500 μm thick there will be no change in the board carrier ability. The transparent conductive film will remain stable. No problems will arise with the circuit connection. The best range of thickness is between 250 and 450 μm. This is due to having the moderate amount of flexibility and flatness.

The barrier layer that comes into contact with the liquid crystal layer should ideally be made from inorganic materials. The plastic substrate 11 is made from the same organic materials as mentioned above. The barrier layer made of inorganic materials should be identical to the AIR coat materials.

If the barrier film is made with a striped electrode ideally materials with a low inductive material should be used. This reduces the loss of amperage impressed on the liquid crystal optical module layer. Take for example a fluorinated amorphous carbon film (specific inductive capacity of 2.0 to 2.5). JSR manufactures and sells the LKD-T200 series (inductive capacity of 2.5 to 2.7), the LKDT400 series (inductive capacity of 2.0 to 2.2). The LKD series is made on a base of MSQ (methyl-silsesquioxane) and they have an inductive capacity ranging from 2.0 to 2.7. Other recommended material includes organic polyimide, urethane, acrylic, and the inorganic $SiN_x$ and $SiO_2$. No doubt using these materials in the barrier films of 32 and 33 support boards is recommended.

As it was pointed out before the boards in FIGS. 4 and 5 the boards 11 and 12 shown in FIG. 1 have two merits; they don't break easily and they are lightweight. They can also be made by pressing. The shape of the board can be chosen depending on whether the press or cut and plane processes are used. (See FIGS. 6 and 7) The shape and the thickness can be chosen according to what type of fusing and chemical handling method is employed. For example, it can optionally formed into a circular, spherical, or conical shapes. It is possible to make the uneven 155 surface and the light dispersal surface at the same time when making boards. It is easy to create a light dispersing surface on one or both sides of the board when using chemicals.

Figure 6:
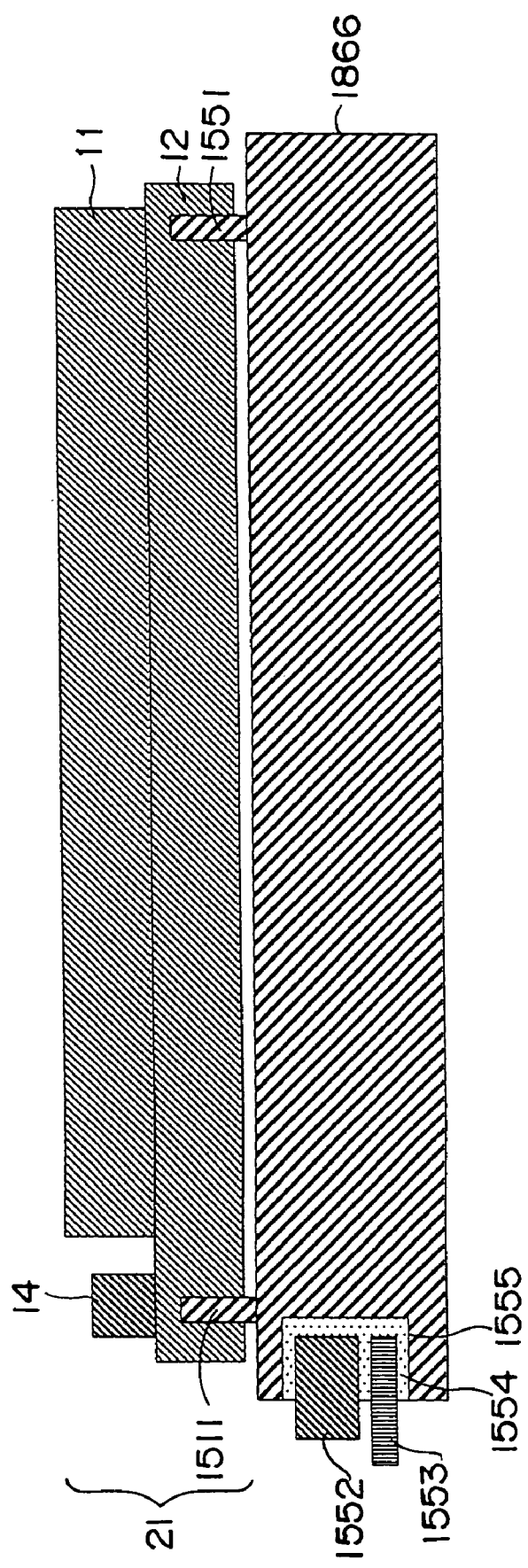
FIG. 6 is an explanatory section view of the display unit of the present invention.

FIG. 6 shows an example of how to determine the position of the holes in board 12 of the backlight by pushing in the 1552 pin when pressing plastic boards. The 1552 pin is made to accurately put holes in board 12. Backlight 186 can be made by polishing. The capacitor inside the boards 11 and 12 is made from a circuit. It is possible to fix the concave section of board 11 and the convex section of board 12 together by gently fitting them together.

Until now a lot of time was required to decide on a position and make a module from the backlight and panel 21. In the present invention, considerable amount of time can be saved by simply installing pin 1552. The pin can be put into the backlight 1866 hole when making board 12. (There is no drawing illustrating this process.) The front light 1861 can also be treated in the same way when making board 11. (See FIG. 127.) One of the technical features we have invented is that a single unit can be made by easily by aligning and fitting convex and concave sections into the concave and convex sections of boards 11 and 12. (The alignment of positions can be easily done.)

FIG. 6 outlines the lighting steps of the backlight 1555 insert. When white LED, fluorescent lamp, the temperature sensor 1553 that measures temperatures at different steps of luminescence is inserted to the insert section 1556.

The brightness of the fluorescence lamp changes with the temperature of the white LED. In the invention the electrical current in LED 1552 is controlled by temperature measurements made by temperature sensor 1553. The sealing resin 1654 seals the surrounds of the temperature sensor 1553 and LED 1552. This improves the transmission of heat. If the 1556 sealing resin is colored and a light dispersion agent is added, color mottling is reduced in LED 1552. The color temperature of the luminescence from LED 1552 should be adjusted.

Until now the areas surrounding of glass boards 11 and 12 were sealed off with sealing resin from the liquid crystal layer. The sealing resin had a convex structure and it was about 4 to 5 μm thick. The convex section was the same thickness as the liquid crystal layer. It was possible to make the convex section from this seal resin at the same time when making substrate boards 11 and 12. The convex section 1634 seal resin is made when boards 11 and 12 are being pressed. (See FIG. 7.) This has a large effect when making boards 11 and 12 from resin. A cost reduction and time saving becomes possible when the resin section is made at the same time as the boards. The dot convex section 1634 of the display region section is made at the same time as the boards. The convex section 1634 is made in the space next to the pixels. An effect is exhibited in the convex section 1634 liquid crystal layer 1631 according to the thickness of the film.

Figure 7:
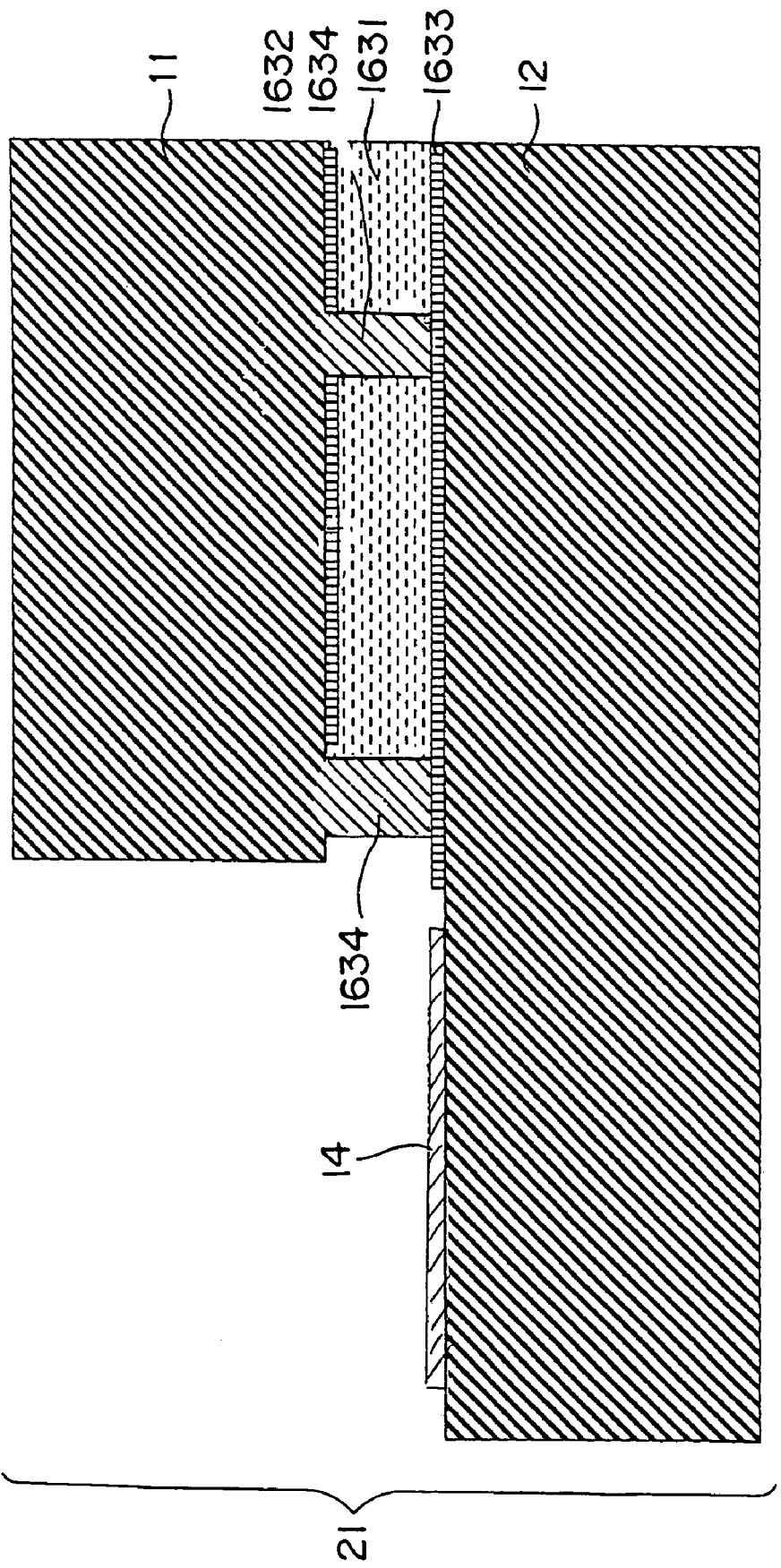
FIG. 7 is an explanatory section view of the display unit of the present invention.

Normally resin or glass (or a substitute) beads are scattered in the display region. This is because the thickness of the liquid crystal layer 1631 is predetermined for certain places. These beads have been replaced by convex section 1634 of boards 11 and 12. (See FIG. 7.) Boards 11 and 12 are made from resin. The convex section 1634 is pressed etc. from resin. Convex section 1634 is placed between pixel electrodes 1633 and 1632. The dispersal of the beads is not necessary because of the thickness of the liquid crystal film 14 in FIG. 7 is a low temperature polysilicon driver circuit.

One is not limited to making the convex section 1634 from resin and beads. Usually part of the resin convex section is left as it is. The liquid crystal section (pixel section) is pressed and gouged. The uneven section 1634 is made at the same time as the board. First the level board is made and when it is reheated then the uneven 1636 is made.

The mosaic color filter is made by directly applying color to the board. Pigments applied by ink-jet printing or painted on colors are left to permeate the board. The board is then dried in a high temperature dryer. The surface is then coated with materials like UV resin, or with the inorganic silicon oxides or nitrates. Also the photogravure, offset and spinner printing techniques can be used. Using the technique in a similar way, the color filter can be formed through the semiconductor pattern technique. As well the color filter, the above technique can be directly used to make the black matrix (BM). The black matrix is colored with black, dark colors, or adjusted light complimentary colors. The concave section of the board surface is made in relation to the board surface pixels. A color filter, BM, or TFT is built into the concave section. Ideally the surface should be coated with acrylic resin. The merit of such a structure is that the surface of the pixel electrode is leveled improving the alignment of the liquid crystal molecules.

The conductor polymer causes the board surface resin to get electrical conductive properties. The pixel electrode or the reverse electrode is made directly onto the board. A hole is made in the board. Electronic parts such as capacitors are inserted into the hole. Then a thinner board becomes possible.

A pattern of any design can be cut into surface of the board. (See 1556 in FIG. 7.) The seal opening of the liquid crystal is sealed by melting the resin on boards 11 and 12. The resin of surrounding area of the board is melted and sealed to prevent water entering the organic EL display.

Forming the board from resin and following the above procedures facilitates making holes in boards. Pressing them make it possible to form into countless board shapes. Make holes in boards 11 and 12. Plug the holes with inductive resin. This makes both the front and back of the board into electricity inductive. Now the multi-layer circuit boards and both sides of boards 11 and 12 can be used. Inductive pins can be used instead of inductive resin. Connectors of electronic parts and capacitors are pushed into the hole. Capacitors, coils, and circuit wiring of the thin film inside the board are made to be electrically resistant. The multi-layer of boards 11 and 12 are use for electrical wiring. The board multi-layer is made fixing several thin boards together. More than one board (or film) layer can be colored.

Coloring and filtering can be done by applying pigments and dyes directly to the board. Serial numbers can be printed at the same time as the boards are being made. To prevent malfunctions arising from problems occurring when IC chips are irradiated, only the areas outside the display region are colored.

The display board can be colored with two different colors. This is done by applying resin board production techniques (such as injection and complexion processes). The above techniques can also be used to produce a display panel that has two different thicknesses of liquid crystal layer films. It is possible to make the display and the circuit board at the same time. The display area and driver boards can be easily changed.

To explain in detail, it is possible to make small changes to the film thickness to center of one pixel and what it surrounds. Make small quadrangular pyramid, triangular pyramid, or cone projections in boards 11 and 12 (See 1634*a* in FIG. 7(*b*)). The liquid crystal molecules align themselves with the projections as in 1634*a*. The liquid crystal uses the dielectric constant load and aligns the molecules. The impression amperage controls the horizontal alignment of the liquid crystal molecules in the board. At that time the liquid crystal molecules should be aligned in a spiral pattern. This is realized when the directional film is rubbed. The direction film applies direction in the board. Pixels are important parts of the liquid crystal. Surrounding the area around the pixels with resin is not difficult. Resin is placed around the pixel. The resin controls the liquid crystal molecules.

A pixel or display region micro lens can be formed. A diffraction lattice is made when boards 11 and 12 are being produced. The size of the pixels determines how minute the irregularities there are on the surface. (See FIG. 7(*b*) 1634*a*; FIG. 7(*a*) 1556*a*, etc.) Improvements on the field of view angle and the preservation of the field of view angle dependency can also be done. The production of such options, micro production technologies and the micro lens developed by Omron has been realized because of the Stamper technology.

Striped electrodes (not shown in the drawing) are formed on substrates 11 and 12. An anti-reflection film (Air Coat) is molded on the sides of the substrate, which comes in contact with air. In the case where no polarizing plate has been attached to substrate 11 and 12, the anti-reflection film (AIR Coat) is molded directly on substrate 11 and 12. In the case where a polarizing plate (polarizing film) or other types of construction material are attached, then the anti-reflection film is molded to the surface of such construction material.

Additionally, in order to suppress or prevent foreign particles from bonding to the surface of the polarizing plate, the molding of a thin film comprising of fluorocarbon resin is effective: For the prevention of electrostatic, either the depositing or coating of conductive body film such as metallic film, conductive polymer film, or a thin film of the hydrophilic group is recommended.

Furthermore, the polarizing plate (polarizing film) which is either molded or configured on the optic incidence or optic output of the display panel should not be limited to polarized linear light but it can also be oval polarization. The use of an interlocking or glued together attachment of deflecting plates and wave plates, or the gluing together of multiple numbers of polarizing plates can also be done.

TAC film (triacetylocellulose film) is the most appropriate as the main material for the composition of the deflecting film. This is because TAC film contains superior optical characteristics, a smooth surface and manufacturing suitability.

The AIR Coat is illustrated by the example of its composition in which single or multiple layers of dielectric film are molded. Otherwise, it is possible to possible to coat the substrate using a material with a low refraction rate of 1.35 to 1.45; for example a fluorochemical based acrylic resin. Materials with refraction rates between 1.37 to 1.42 have particularly favorable properties.

The Air Coat is constructed as either a bi-layer or triple-layer coat. The triple-layer coat is used to prevent reflection in wavelengths that have a wide spectrum of visible light. This is called a Multi-coat. The bi-layer coat is used to prevent reflection in wavelengths that have a certain spectrum of visible light. This is called a V-Coat. The Multi-coat and V-coat are used respectively in accordance with the application. Furthermore, it is also possible to use single-layers and not limit use to bi-layers or above.

The Multi-coat is formed by laminating aluminum oxide ($Al_2O_3$) of nd=$\lambda/4$, zirconium (ZrO2) at nd1=$\lambda/2$, and magnesium fluoride ($MgF_2$) at nd1=$\lambda/4$ as the optical film thickness. Normally, the thin film is formed with the $\lambda$ at 520 nm or a value within that proximity.

The V-coat is formed by laminating silicon monoxide (SiO) at nd1=$\lambda/4$ and magnesium fluoride ($MgF_2$) at nd1=$\lambda/4$, or yttrium oxide ($Y_2O_3$) and magnesium fluoride ($MgF_2$) at nd1=$\lambda/4$ as the optical film thickness. In the instance where the blue light is to be modulated due to the existence of an absorption band on the blue light side, the use of $Y_2O_3$ is preferred. In terms of substance stability, also, $Y_2O_3$ is the more stable than others making it more favorable. Another alternative is the use of $SiO_2$ thin film. Naturally, it can be used as an AIR coat by using resin with a low refraction rate such as is illustrated in the example of acrylic resins such as fluoros. If using these types, ultraviolet curing types are more favorable.

Furthermore, in order to prevent the display panel from being charged with electrostatic, coating the surfaces of the display panel 21 and the conductive light board in the front light etc., with a hydrophilic resin is recommended. Additionally, in order to prevent surface reflection, an embossing finish may be applied to the front light conductive light board and/or the surface of the substrate (1556*a* and 1556*b* of FIG. 7). It should be noted that the embossing finish refers to all processes to ensure the prevention of reflection or alterations of the view angle or improvements of the view angle.

Striped Electrode is the generic term for electrodes of a specific length. However, it is not limited in definition to brachymorphic shapes. This actual panel invention is mostly a brachymorphic combination of striped electrodes. Accordingly, the Striped can have circular, curved, irregular shaped or transformational components within it. The pixel electrodes distributed in the matrix are also striped electrodes because they are brachymorphic.

As shown above, to simplify the explanation of the present invention, the display panel, the explanation is given using a simple matrix-type liquid display panel or a display device as the illustrated example. However, the materials and construction can also be applied to active matrix-type liquid display panels, organic (inorganic) EL display panels, PLZT display panels and fluorescent character display panels.

As shown in FIG. 1, a common driver (COM-IC) 15 and a segment driver (SEG-IC) are loaded above the display panel 21 through chip-on glass technology (COG). Metal wiring such as silver, aluminum and chrome wiring is used for the data wiring due to the thinness of the wiring width and the low-resistance achievable. The wiring is a material used to construct the reflection film for pixels, so it is preferable that the wiring is formed at the same time as the reflection film as it is a simple process.

The present invention is not limited to COG technology. It can also be used with configurations that connect with the signal lines of the display panel 21 by loading the above-mentioned driver IC onto chip-on film (COF). Additionally, the driver IC can be a 3-chip configuration by creating a separate IC power source.

TCF tape can also be used in the mounting of the IC chip. Polyimide film and Cu foil can be thermo compressing bonded on the film suitable for the TCF tape without using adhesive bond. Other methods for the film suitable for the TCF tape besides that of applying Cu to polyimide film without adhesive bonding include the method of cast molding by superimposing melted polyimide on top of the Cu foil. Another method is to apply the Cu on top of metal film molded by sputtering on top of the polyimide film by coating or deposition. Each of these methods is fine with the method of using TCP tape that has Cu applied to the polyimide without using adhesive bond being the most preferable. Cu coated laminated sheets with no adhesive bond are used for lead pitches of less than 30 μm. Among the Cu coated laminated sheets that do not use adhesive bond, the method by which the Cu layer is molded by coating or deposition is effective for the miniaturization of the lead pitch due to the fact that this method is suited to Cu layer thinning.

A color filter is either formed or constructed on the top or bottom layer of the striped electrode. Furthermore, forming of a black matrix (referred to as BM herewith), made from chrome or black color resin, in between the color filters is advisable in order to prevent contrast reduction due to light escape from the pixels or the mixture of colors of the color filter.

The color filter is made so that it can either respond to the primary colors of yellow (Y), mazenda (M) and cynaogen (C) or red (R), green (G) and blue (B) so that it can respond to all pixels. The planar layout includes mosaic sequence, delta sequence and strip sequence.

Color filters that can be used other than the color filter made from a resin that is dyed in acrylic and gelatin include a color filter formed by a multiple layer dielectric film and a color filter through a hologram. Another appropriate color filter is the selective reflection type composed of a layer of colestric liquid crystal. Additionally, the liquid crystal layer can be substituted by direct tinting. For example, if it is PD liquid crystal, a composition that tints the resin and/or a composition that distributes the color within the liquid crystal are two illustrations of this. Another option is to use the use the liquid crystal in the guest host mode.

Furthermore, the color filter is not limited to 3 colors. It can be a single color, two colors or even four or above. For example, a combination of six colors such as red (R), green (G), blue (B), cynaogen (C), yellow (Y), and mazenda (M). Additionally, the color filter is not limited to transmission methods. It can also be used as a reflection type formed by a multiple layer dielectric film as well as a simple reflection method.

When making a color filter with multiple layer dielectric film, the optical multiple layer film should be formed on whether the top or bottom of the striped electrodes. The color filter that has multiple dielectric layers is one which is made so that it has prismatic characteristics for a specific sphere through the laminating of multiple layers of dielectric film of both high and low refraction rates.

The Black Matrix (BM) is primarily used in order to prevent light escaping between the electrodes (striped electrodes and pixel electrodes). BM forms an isolation layer between the electrodes and striped electrodes (not displayed) and can be formed with either a metal film such as chrome (Cr) or with a resin composed of an acrylic resin with carbon or the like added to it.

Other possible materials for the film include optic-dispersing materials such as black metal like sexivalent chrome, coating compositions, materials, thin or thick film forming microscopic convexo-concaves on the surface, titanium oxide, aluminum oxide, magnesium oxide and opal glass. Additionally, not only dark or black colored materials, but also materials with tinted colors or pigments connected to complementary colors in relation to the light in which optic modulation layers modulate are acceptable. Holograms and diffraction gratings are also acceptable.

Black glass beads, black glass fiber, black resin beads or black resin fiber are used to suppress the film thickness of the modulator layer in the liquid crystal. In particular, black glass beads and black glass fiber are high in optical absorption and due to their hardness, they are preferable because of the low number of pieces dispersed in the liquid crystal layer.

Liquid crystal materials used in the liquid crystal layer include TN liquid crystal, STN liquid crystal, strong dielectric liquid crystal, strong anti-dielectric liquid crystal, guest host liquid crystal, OCB mode (Optical compensated Bend Mode) liquid crystal, smectic liquid crystal, colestric liquid crystal, IPS (In Plane Switching) mode liquid crystal and high particle dispersing liquid crystal (referred to as PD herewith). Furthermore, in the case where a movie display is not vital, the use of PD liquid crystal is preferable from the viewpoint of optical use efficiency. Also, in the case of still picture display being primarily used, the use of TN liquid crystal or STN liquid crystal is preferable.

It is possible to use TN liquid crystal in the liquid crystal layer, however STN liquid crystal is substantially better. Using liquid crystal with at least 100 scanning electrodes and a liquid crystal dispersing torsion angle of 180 to 360 degrees in the liquid crystal layer is effective. Most preferable is a torsion angle of between 230 to 280 degrees. Furthermore, it is possible to use a mixture of various publicly known varieties of liquid crystal materials for the composition of liquid crystal matter. If required, other non-liquid crystal material, color, chiral agent, and other additives can be added and used.

As shown above, in the liquid crystal cells filled with liquid crystal, deflection film, wave plates and deflecting film are also placed if required. In particular, in the present invention, the addition of such materials is suitable in the case of conducting a gradation (or tonal) display having contrast properties by means of a time-sharing drive of more than 1/100 duty as well as for the STN-type liquid crystal display arrangement that requires a torsion angle of 180 to 360 degrees. Additionally, it is also suitable for STN-type liquid crystal display arrangements for both black and white as well as color displays in which the compensating liquid crystal cells and the wave plates are laminated together in the STN-type liquid crystal cell.

Deflection plates with a resin film in which iodine is added to polyvinyl alcohol (PVA) resin is illustrated as an example. Deflection plates which use isolated pairs of polarized light are comparatively inferior in terms of use efficiency of light due to the fact that they isolate polarized light through the absorption of deflection fractions in the given axis of deflection of the incident light and those of from a different direction. Here, it is appropriate to use reflective polarizers which split the deflection by reflecting the deflecting fractions moving in the given axis direction and those going in a different direction. If configured in this way, the use efficiency of light is enhanced through the reflective polarizers making a brighter display than the example of using deflecting plates mentioned above possible.

As a method of isolating of polarized light, other usable materials in addition to this type of deflecting plate and reflective polarizer include a combination of colestric liquid crystal layers and (1/4)λ plates; separation of reflective polarizer and polarized light transmission by using the Brewster angle; use of holograms; use of polarizer beam splitter (PBS) etc.

One or more sheets of phase film (phase plate, phase rotation method, wave plate, wave film) is placed between the polarizing plate and the substrate 11 and 12 (not illustrated). The use of polycarbonate as the wave film is preferable. The wave film turns the incident light into outgoing light and contributes to the efficient running of modulation.

Other materials that can be used as phase film include polyester resin, PVA resin, polysulphon resin, polyvinyl chloride resin, zeonex resin, acrylic resin, polystyrene resin and other organic resins or organic films. Another possible alternative is rock crystal. The preferred setting of the phase difference of one phase plate is above 50 nm and below 350 nm in a uniaxial direction, or more preferable is above 80 nm and below 220 nm.

It is also possible to color part or all of the phase films or else give part or all of it diffusion functions. Again, another suitable process is to emboss the surface, or form a reflective protection film to prevent reflection (refer to FIG. 6 and 1556 or FIG. 7). Another suitable process is to bring out the benefits of improved contrast through the protection of halation or the tightening of the black pitch level in the display picture by forming an optic absorption film or light shielding film in places where no harm will be done or not of benefit to the picture display.

Additionally, it is a good idea to form micro-lens to the matrix through the format of bumps on the surface of the phase film. The micro-lenses are placed such that they can respond to either the 3 primary color pixels or one pixel electrode. Naturally, it is also possible to place one of the micro-lenses onto a multiple number of pixels.

Furthermore, the functions of a change in phase difference that the phase film creates can be applied to the color filter. For example, it is possible to create phase differences by making sure they occur in a certain way through the polymerization of light or by adjusting the color filter when molding.

Yet another possibility is to stimulate a phase difference through the polymerization of resin which is molded or coated on the side facing the optic modulator such as liquid crystal. By configuring in such a way, there is no need to construct or place phase film outside of the substrate, making the configuration of the display panel easier and reductions in cost possible.

Furthermore, these procedures also apply to polarizing plates. A rear light, 1866, is placed at the back of the liquid crystal display device. A front light can be placed on it also. Naturally, fluorescent cylinders, LED, organic or inorganic EL light sources and conductive light board combinations for lighting are possible also. External light (e.g. the sun etc.) can also be used as a source of light by trapping the light with the conductive light board. A transparent touch switch can be attached to the display panel.

As shown in FIG. 162, a COM Driver (COMIC or Scanning Driver IC) 15 and a SEG DRIVER 14 (SEGIC or Signal Driver IC) are placed surrounding the display part 107 of the display panel 21. The COM Driver outputs a selected voltage. Generally, a COM Driver refers to the scanning driver in the simple matrix-type liquid crystal display panel. In an active matrix-type liquid crystal display panel, it is often referred to as a Gate Driver.

However, in this specification, use of these drivers is not limited to one or the other. The SEG Driver outputs a picture signal. Generally, a SEG Driver refers to the Signal Driver in the simple matrix-type liquid crystal display panel. In active-type matrix liquid crystal, it is often referred to as a Source Driver. However, in this specification, use of these drivers is not limited to one or the other.

As shown above, in order to make the display panel instructions of the present invention easy, the simple matrix-type liquid crystal display panel and devices are used as illustrative examples. However, the materials and configuration etc. can also be applied to fluorescent character display panels, PLTZ display panels, organic or inorganic EL display panels and active matrix-type liquid crystal panels.

Furthermore, from the perspective of reducing power consumption, it is advisable to install memory to the SEGIC. Needless to say, an externally attached type with its memory inside the controller is also possible.

With the STN type, a conventional line sequential multiplex driver is used for large capacity displays. At the same time as selecting each row of electrodes in sequence, this method also selects the columns of electrodes in response to the pattern wanted to be displayed. When all rows of electrodes are selected, the screen finishes.

With the line sequence driver method, as the display capacity increases, it is a known fact that the problem called Frame Response occurs. In the line sequence drive method, a voltage that is relatively low when unselected and relatively high when selected is applied to the pixels. In general, the voltage variation increases as the number of column lines increase (the higher the duty drive). For this reason, when the voltage is small, the liquid crystal that responded to the voltage effective value, then starts to respond to the impressed waveforms.

Simply put, Frame Response is a phenomenon, which causes a reduction in contrast. This is the result of the reduction of the selected pulse and an increase in the rage of frequency transmission in OFF mode due to the large amplitude in the selected pulse.

In order to suppress the occurrence of frame response, the shortening of the selected pulse frequency by increasing the number of frame frequency waves is a well-known method. However, it has a large fault. That is, if the frame frequency is increased, then the impressed waveform frequency spectacles increase causing an unevenness in the display. Therefore, there is a limit to the frame frequency upper limits in order to prevent the selected pulse from becoming too narrow.

To solve this problem without increasing the frequency spectacles, the present invention uses a multiline simultaneous selection method, which selects multiple numbers of color electrodes (selected electrodes) at the same time. It selects a multiple number of row electrodes simultaneously and individually controls the column display pattern. This method enables the frame cycle to be shortened while maintaining the selected width at a certain point. Therefore, a high contrast display that controls the frame response is possible.

In the simple matrix-type liquid crystal panel, the use of liquid crystal display materials that have a fast speed of response (under 100 msec) is desirable. However, by increasing the response speed of the liquid crystal, the so-called 'frame response' phenomenon occurs, inviting with it problems such as the deterioration in contrast and flicker.

One known way of solving such problems is the conventional technology known as MLS—Multiline Select, which simultaneously selects a multiple number of scanning electrodes. A brief outline of the MLS Drive method, which selects 4 electrodes simultaneously (abbreviated below to MLS4), follows. The explanation centers on MLS4, but the present invention is not limited to this method. For example, drive methods such as MLS2, which selects 2 electrodes simultaneously, or MLS8, which selects 8 electrodes simultaneously, can also be used. It goes without saying, however, that these fundamental technology ideas can be applied to FRC, PCM and PWC drives also.

Figure 8:
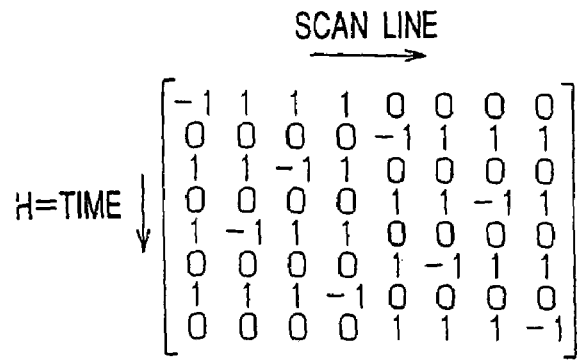
FIG. 8 is an explanatory drawing of a drive system for the display unit of the present invention.

For ease of explanation, FIG. 8 presupposes the situation of 8 scanning electrodes with an orthogonal function of H, which represents the driving pattern of the scanning electrodes. In the orthogonal function of H, rows respond to time and columns to the scanning electrodes. The numeric value of 1 represents a straight polarity selected signal, −1 a negative polarity selected signal, and 0, a non-selected signal.

In this example, if V is the reference voltage and a is the bias ratio, then for example, the first row vector (1,1,1,1,0,0,0,0) in contrast to the time at 1 and the virtual earth electrode potential (0) indicates an application as follows:

$1^{st}$ Scanning Electrode . . . negative selected signal (−aV)

$2^{nd}$, $3^{rd}$, $4^{th}$ Scanning Electrode . . . straight selected signal (+aV)

$5^{th}$, $6^{th}$, $7^{th}$, $8^{th}$ Scanning Electrode . . . non-selected signal (0)

Additionally, the second row vector (0, 0, 0, 0, −1, 1, 1, 1) with the time at 2, indicates an impress of $1^{st}$, $2^{nd}$, $3^{rd}$, $4^{th}$ Scanning Electrode . . . on-selected signal (0)

$5^{th}$ . . . negative selected signal (−aV)

$6^{th}$, $7^{th}$, $8^{th}$ Scanning Electrode . . . straight selected signal (+aV)

Next, the one certain signal line and picture data are presupposed at (−1, 1, 1, 1, −1, 1, −1, 1). In this picture data, the numeric value of 1 represents OFF and −1 ON.

Figure 9:
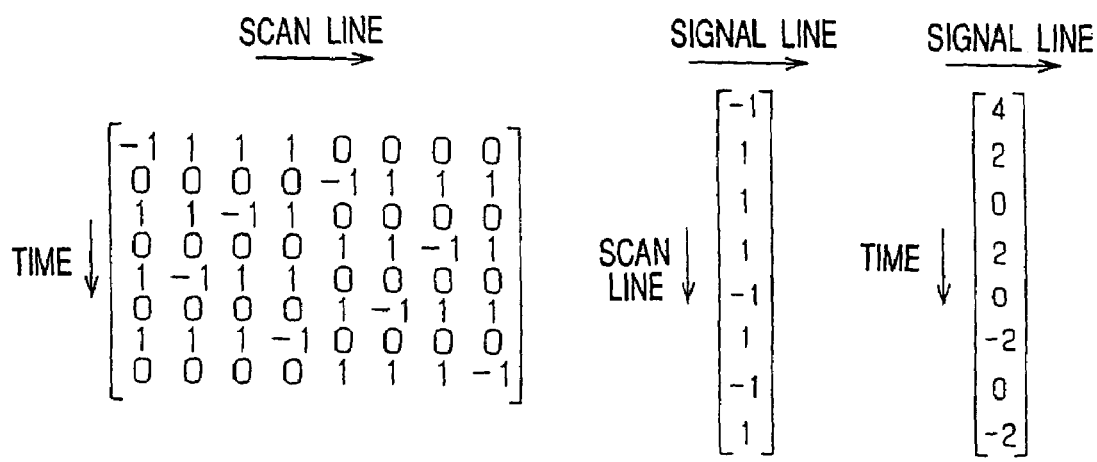
FIG. 9 is an explanatory drawing of a drive system for the display unit of the present invention.

Therefore, the following signal line picture data shows that:

$1^{st}$, 5t, $7^{th}$ Scanning Lines . . . ON $2^{nd}$, $3^{rd}$, $4^{th}$, $6^{th}$, $8^{th}$ Scanning Lines . . . OFF The accumulation of the rows and columns of the orthogonal electrode picture data are the drive patterns that should be impressed on to the signal electrode as is illustrated in FIG. 9.

Using the MLS4 method, the results taken of the rows and columns calculation is any of the numeric values of 4, 2, 0, −2, −4. Furthermore, the reference voltage is set at V and the values are labeled as 2V, V, 0, −V, −2V so as to respond and output to the signal line.

In the above example, the calculated results are (4, 2, 0, 2, 0, −2, 0, −2). Therefore, the drive pattern of the signal electrode is:

Time 1 . . . 2V
Time 2 . . . V
Time 3 . . . 0
Time 4 . . . V
Time 5 . . . 0
Time 6 . . . −V
Time 7 . . . 0
Time 8 . . . −V In general, in the case of the MLS drive, if L equals the simultaneously selected number of electrodes, the reference voltage of the signal electrodes, it becomes apparent that the values of −(L/2) V, −(l/2−1)V, . . . −V. 0, +V . . . +(L/2−1)V (L+1) are required (for example, when there are 5 reference voltages in the case of MLS4).

Figure 10:
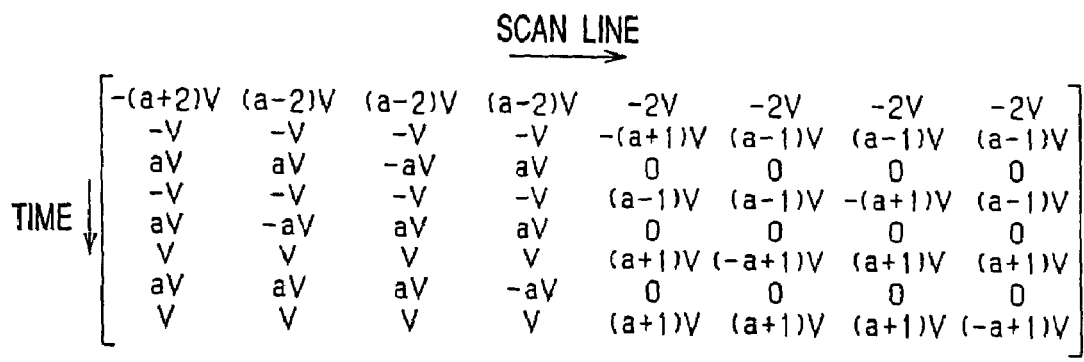
FIG. 10 is an explanatory drawing of a drive system for the display unit of the present invention.

The requirements of the differences in the applied voltage of the scanning and signal electrodes of the above example are shown in FIG. 10. Using the above mentioned method in requirement for the effective value voltage to be applied, for example, on the first scanning line, then the result is FIG. 11.

At the same time, by requiring the application of the effective value voltage on each line produces FIG. 12. Coordination of the ON/OFF connection, as shown in FIG. 13, with the effective value voltage, the $1^{st}$, $5^{th}$ and $7^{th}$ scanning lines are ON and the $2^{nd}$, $3^{rd}$, $4^{th}$, $6^{th}$, and $8^{th}$ scanning lines are OFF, and synchronizing with the signal line picture data (−1, 1, 1, 1, −1, 1, −1, 1) as presupposed at the beginning.

However, if the number of simultaneously selected electrodes is made larger using this multiline select (MLS) driver method, the drive voltage amplitude impressed on the scanning side will decrease. However, it is known that the drive voltage amplitude impressed on the signal side will increase. The reasons for this are explained as follows.

For ease of explanation, the same situation is presupposed as in the above conventional example, with the orthogonal function representing the scanning electrode drive pattern as H, with 8 scanning electrodes as N and 4 simultaneously selected electrodes as L. Requiring the drive waveform with certain signal lines an ALL ON pattern (−1, −1, −1, −1, −1, −1, −1, −1) and others an ALL OFF pattern (1, 1, 1, 1, 1, 1, 1, 1) shows the following findings.

The ALL ON pattern is shown in FIG. 14 and the ALL OFF pattern in FIG. 15. Simply put, because the calculated result of the ALL ON pattern is (−2, −2, −2, −2, −2, −2, −2), a −V voltage is continuously output by the signal line and the calculated result of the ALL OFF pattern is (2, 2, 2, 2, 2, 2, 2, 2) a V voltage is continuously output by the signal line.

Figure 16:
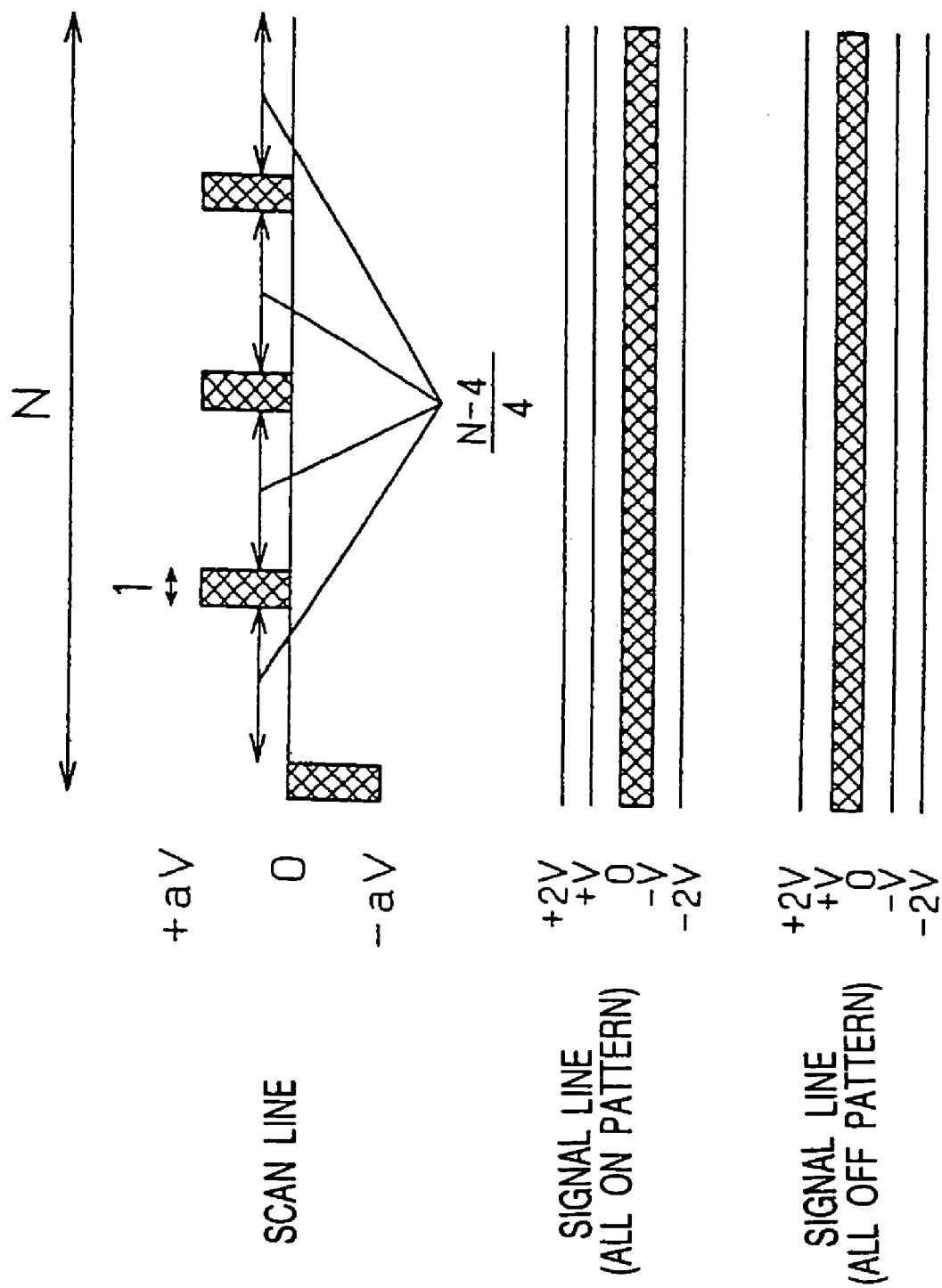
FIG. 16 is an explanatory drawing of the drive system for the display unit of the present invention.

Accordingly, the drive waveform of the signal and scanning line 1 is as is shown in display 129. However, in display 129, the number of scanning electrodes indicated has been expanded from 8 to the general N number. From FIG. 16, the effective value voltage give in FIG. 17 can be found. If N=8, then it matches with the effective value voltage of the ON/OFF results calculated in the conventional example.

FIG. 17 is the result in the case of the simultaneously selected electrodes being L=4. However, if the number of simultaneously selected electrodes is L, then it is known that the ON/OFF effective value voltage is supplied using the method in FIG. 18.

Furthermore, it is also know that that the method in FIG. 18 will not rely on the orthogonal pattern if it is a Hadamard matrix. From the above method, the ON/OFF ratio becomes that of FIG. 19. If the function within the square root is the differential by α, then the results become that of FIG. 20.

When the numerator in FIG. 20 method starts from 0, and the bias ratio is $N^{1/2}/2$, the ON/OFF ration reaches its largest number that is shown in FIG. 21.

Next, the necessary drive voltage amplitude is required for the signal and scanning line drives in the most suitable bias conditions ($a=n^{1/2}/2$) using the MLS drive.

The setting must be that of FIG. 22 as the effective value voltage of the OFF pattern must be set to the liquid crystal threshold voltage of Vth. In particular, if the most suitable bias $\alpha=n^{1/2}/2$ is used, then the reference voltage is supplied in FIG. 23.

On the signal line side, a drive voltage of between (−L/2V) to (+L/2V) is required. On the scanning line side, a 2aV drive voltage is required at −aV to +aV, and so for the most suitable bias, the amplitude of the drive on the signal side is that shown in FIG. 24 and the drive on the scanning drive is that shown in FIG. 25.

In other words, the drive amplitude of the signal line side increases at a ratio of $L^{1/2}$ on the scanning drive side (L refers to the number of simultaneously selected electrodes).

From FIG. 24, in particular, if the most probable number of simultaneously selected electrodes to be used is L=4, then the signal line drive amplitude required will be 5.6V in the case of the number of scanning line electrodes being N=160 and the liquid crystal threshold voltage being 1.9V. When considering the margin etc in the most well used 5V process (largest guaranteed voltage is 5.5V) after being made into IC, these values seem almost impossible.

The only methods available are to either increase the number of scanning electrodes (N) or lower the voltage (threshold), in order to lower the drive amplitude on the signal side.

However, by increasing the number of scanning line electrodes (N), the ON/OFF ratio is reduced which means an inadequate contrast is received affecting the picture quality. Additionally, by reducing the liquid crystal threshold voltage, the liquid crystal response speed becomes slow which in turn affects movie displays.

In order to achieve the above-mentioned objective, the drive method employed in the present invention's simple matrix-type display panel finds the effective value voltage applied in the pixels and increases them by impressing a dummy pulse (set amplitude/width pulse) to the scanning and signal electrodes.

Through this method, the reduction in power consumed can be achieved at the same time as lowering of the drive width of both the signal and scanning lines in comparison to the conventional multiline select drive. The production of IC in the low-pressure tolerance process in which the process unit is low is made possible.

Figure 26:
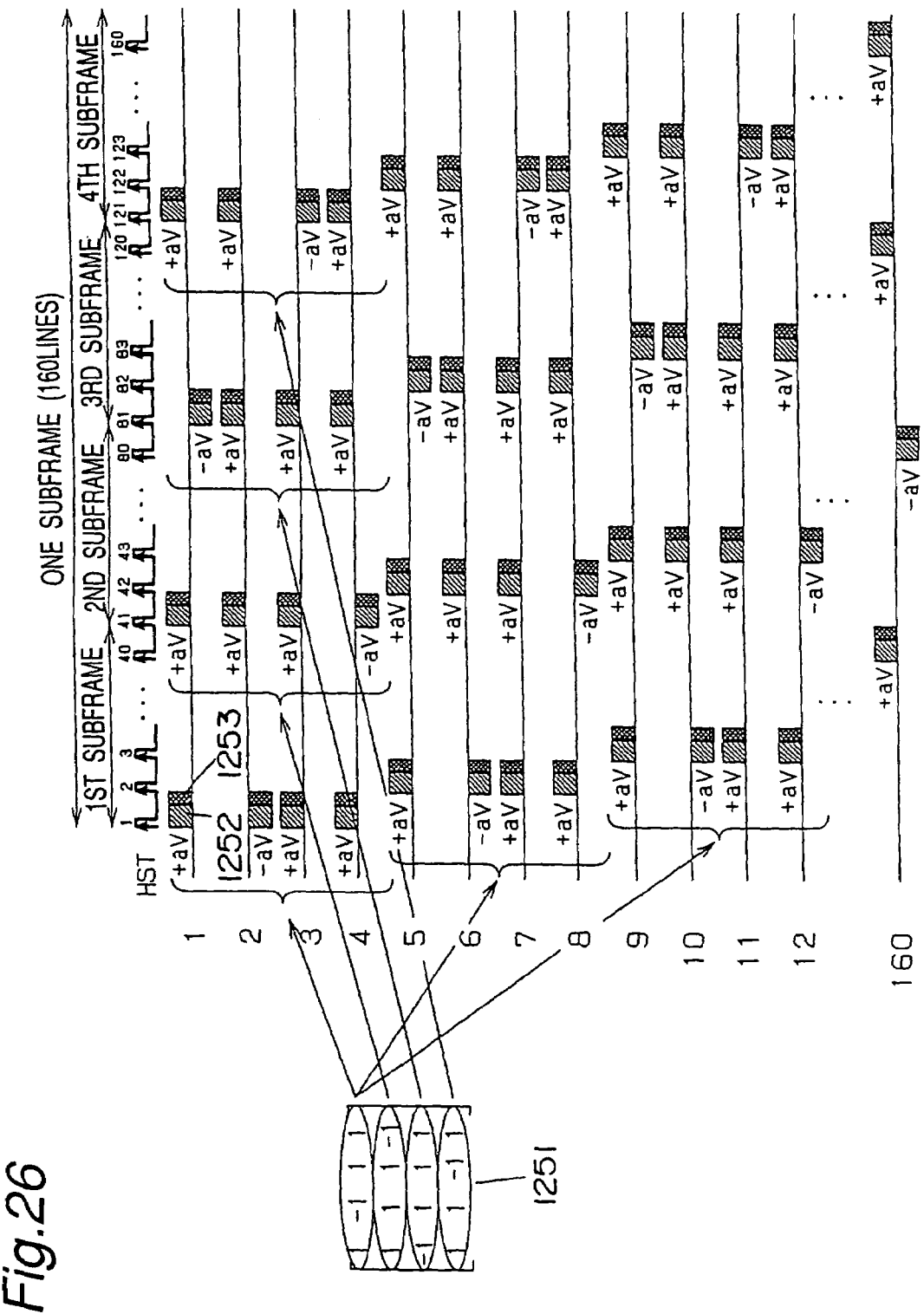
FIG. 26 is an explanatory drawing of the drive system for the display unit of the present invention.

FIG. 26 indicates the signal waveform of each scanning line in response to the 1251 orthogonal function supplied when the number of scanning lines is N=160. 1252 represents the selected signal which is impressed onto the scanning electrode and 1253 the dummy pulse which is impressed onto the scanning electrodes.

In FIG. 26, one frame is comprised of the $1^{st}$ to $4^{th}$ subframes using the MLS4 method. In each subframe, every $4^{th}$ scanning line has the selected signal 1252 impressed in accordance with the orthogonal function of 1251. For example, in the $1^{st}$ subframe, the impressed selected signals are +aV in scanning line 1, −aV in line 2, +aV in line 3 and +aV in line 4 (V refers to the reference voltage and a the bias ratio).

As shown in FIG. 26, the dummy pulse 1253 impressed in the scanning lines of the present invention are impressed at a set pulse width and the same voltage values as the selected signal by all selective signals in each scanning line.

Next, in FIG. 27, the connection between the drive waveforms of the signal line and the signal waveforms of the scanning lines is shown. In this drawing, 1252 represents the scanning line, 1261 the signal line drive waveform, 1252a the scanning line dummy pulse and 1253b the signal line dummy pulse.

The scanning line indicates the signal waveform of the representative scanning lines of 1, 5 and 9. Furthermore (a) refers to the ALL ON pattern and (b) to the ALL OFF pattern of the signal waveform. In the ALL ON pattern, the drive signal of the signal line is V and in the ALL OFF pattern, the drive signal is +V.

The dummy pulse 1253b on the signal line of the present invention is impressed at the exact same pulse width and timing as the scanning line dummy pulse 1253a. Additionally, the voltage value of the dummy pulse 1253b impressed in the signal line uses a reference voltage of (L/2) V which is derived from a polarity with multiple selected signals of scanning electrodes and the opposite polarity (L is the number of simultaneously selected electrodes).

In the scanning line signal waveform shown in FIG. 26, there is one negative polarized selected signal and three straight polarity selected signals with L=4 using the MLS4 method. Therefore, the voltage value of the dummy pulse 1253b impressed onto the signal lines uses a reference voltage of −2V as shown in FIG. 27.

In FIG. 27, when the canning line selected signal pulse width is standardized to one pulse and the dummy pulse width is set at x pulse, the effective value voltage of the ALL ON and ALL OFF patterns becomes that of FIG. 28. Furthermore, N equals the number of scanning line, a the bias ratio and V the reference voltage.

From FIG. 28, the ON/OFF ratio and reference voltage V are supplied in FIG. 29. On the signal line side, −2V to +2V, totaling 4V of drive voltage, is required, and on the scanning side, −aV to +aV, totaling 2V of drive voltage is required. Therefore, the connection between the ON/OFF ratio and the signal and scanning side tolerance voltage to the dummy pulse width is as is shown in FIG. 30 (bias ratio a=6, number of scanning lines N=160, threshold value voltage Vth=1.9)

From FIG. 30, when the dummy pulse is set, the necessary tolerance voltage on both the signal and scanning sides decreases and the longer pulse width is made, the further it decreases. In particular, if the dummy pulse width is set at 0.2, the tolerance voltage on the signal side drops below 5V making 5 v process applications such as the 0.35 µm process possible. However, in comparison to the case where the value (1.082) when the dummy pulse is not impressed, the value decreases to 1.052.

Figure 31:
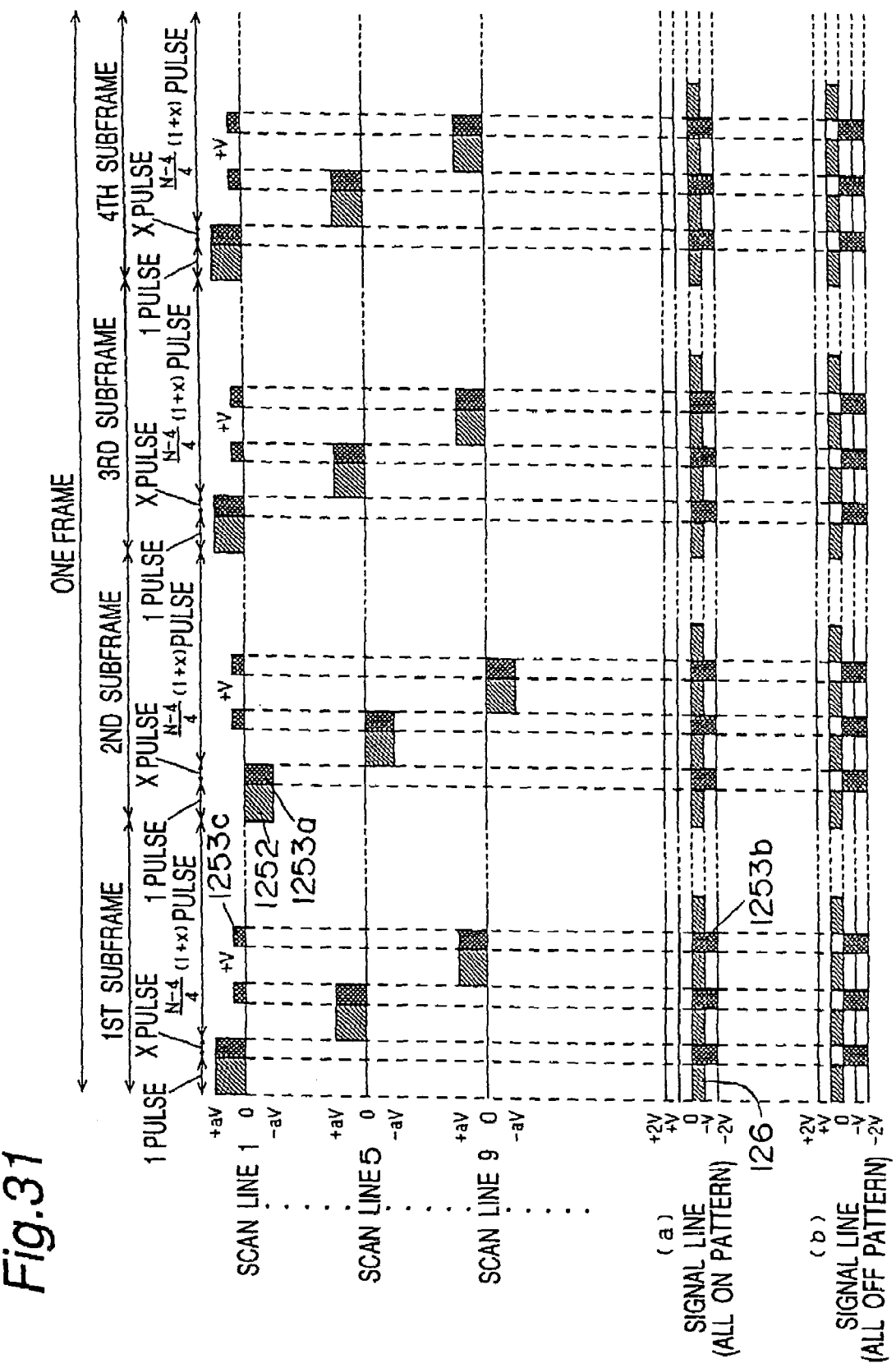
FIG. 31 is an explanatory drawing of the drive system for the display unit of the present invention.

Using FIG. 31, the following explanation covers the state of other embodiments of the present invention. This drawing, as in FIG. 27 also, 1252 represents the scanning lines selected signal dummy pulse, 1261, the signal line drive waveform, 1253a, the scanning line dummy pulse and 1253b, the signal line dummy pulse.

As shown in FIG. 31, the scanning line dummy pulse 1253a is characterized as being added to the scanning line as a second dummy pulse width, 1253c, with the exact same timing and pulse width as 1253b which is impressed onto the signal line, not only for a selected time in the scanning line, but also for a non-selected time.

The reference voltage of V, which is the voltage value with the same polarity as that of the larger polarity of the scanning line selected signal, is used as the voltage value of the second dummy pulse of the scanning line (L equals the number of simultaneously selected lines).

In this embodiment, there are three straight polarity selected signals and one negative polarity selected signal. Therefore, the voltage value of the second dummy pulse 1253*c* added to the scanning line is the +V reference voltage used as shown in FIG. 31.

In FIG. 31, the effective voltage values for the ALL ON and ALL OFF patterns are those shown in FIG. 32. In this case, N=the number of scanning lines, a=the bias ratio and V, the reference voltage.

The ON/OFF ratio and reference voltage V would be supplied by the equation in FIG. 33 by FIG. 31. On the signal line side, −2V to +2V, totaling up to 4V of drive voltage is required, and on the scanning side, −aV to +aV, totaling 2aV of drive voltage is required. Therefore, the connection between the ON/OFF ratio and the signal and scanning side tolerance voltage to the dummy pulse width x is as is shown in FIG. 34 (bias ratio a=6, number of scanning lines N=160, threshold value voltage Vth=1.9)

From FIG. 34, when the dummy pulse is set, the necessary tolerance voltage on both the signal and scanning sides decreases and the longer pulse width is made, the further it decreases. In particular, when the dummy pulse width is set at 0.075, the tolerance voltage on the signal side drops below 5V making 5V process applications such as the 0.35 μm process possible. Furthermore, in embodiment 1, the ON/OFF ratio was 1.052, but in this embodiment it was found to have improved to 1.058.

Using FIG. 35, the following explanation covers the state of embodiment 3 of the present invention. In this drawing, 1252 represents the spanning lines selected signal, 1261, the signal line drive waveform, 1253*d*, the scanning line dummy pulse and 1253*e*, the signal line dummy pulse.

In embodiment 3 of the present invention, as is shown in FIG. 35, the dummy pulse 1253*d* impressed onto the, scanning line, is characterized by the fact that the straight polarity (+aV) selected signals are applied at a certain pulse width to all scanning lines at once each time all of the scanning lines have been scanned (sub-frame).

The dummy pulse 1253*e* on the signal line of the present invention is impressed at the exact same pulse width and timing as the scanning line dummy pulse. Additionally, the voltage value of the dummy pulse impressed onto the signal line uses a reference voltage of (L/2) V which is derived from a polarity with multiple selected signals of scanning electrodes and the opposite polarity (L is the number of simultaneously selected electrodes): In this embodiment, L=4, so the reference voltage of −2V as indicated in FIG. 31 is used.

Furthermore, although not indicated in FIG. 35, the dummy pulse polarities of the scanning line and signal line are inverted at a certain frequency.

In this case the effective voltage values of ALL ON and ALL OFF patterns are that of FIG. 36. N equals the number of scanning lines, a equals the bias ratio and V the reference voltage. From the system mentioned above, the sub-voltage and ON/OFF ratio are supplied by using the method in FIG. 37.

On the signal side, a drive voltage of up to 4V, from −2V to +2V, is required and on the scanning side, −aV to +aV, in total 2V of drive voltage is required. Therefore, the connection between the ON/OFF ratio and the signal and scanning side tolerance voltage to the dummy pulse width x is as is shown in FIG. 38 (bias ratio a=6, number of scanning lines N=160, threshold value voltage Vth=1.9).

From FIG. 38, when the dummy pulse is set, the necessary tolerance voltage on both the signal and scanning sides decreases and the longer pulse width is made, the further it decreases. In particular, when the dummy pulse width is set at 0.4, the tolerance voltage on the signal side drops below 5V making 5V process applications such as the 0.35 μm process possible. Furthermore, the ON/OFF ratio, which was 1.058 in embodiment 2, was found to have improved in this embodiment to 1.061.

As shown above, according to the drive method of the simple matrix-type display panel through the multiline select drive (MSL) which is the present invention's dummy pulse impressed onto the scanning and signal electrodes, it is possible to reduce the tolerance voltage required by the scanning and signal drive circuits. As a result, IC design by a conventional low tolerance voltage process becomes possible. In turn, this makes the realization of low power consumption and cost reduction possible. From this, it is found that the practical benefits are large.

At this point, further explanation regarding other embodiments of the present invention will be give with reference to the technical drawings. The impression of a dummy pulse produces benefits in terms of reducing common voltage. Other benefits include an improvement in display picture quality. By impressing the dummy pulse at a certain voltage value and the same pulse width to all signal electrodes, and not just the signal voltage, improvement of display picture quality can be achieved. The most significant improvement is a reduction in flickering.

Figure 39:
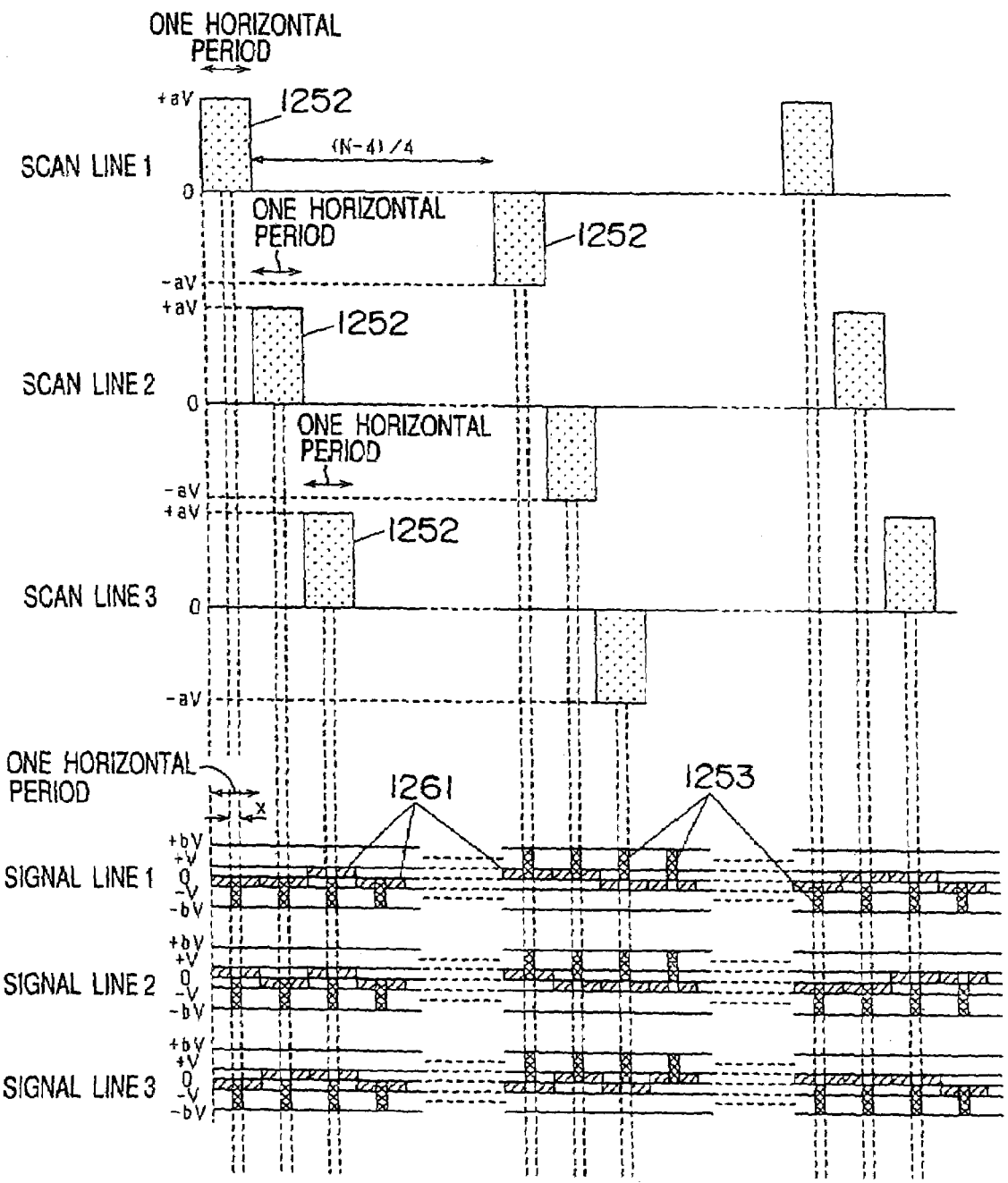
FIG. 39 is an explanatory drawing of the drive system for the display unit of the present invention.

In FIG. 39, the drive waveforms of the present invention are shown. As is indicated in FIG. 26, reference numeral 1252 represents the selected pulse in the scanning line by the scanning signal. If the reference voltage is V and the bias ratio is a, the signal voltage during the selected length is a straight polarity (+aV) or negative polarity −aV. It is 0 during the non-selected length. Additionally, 1261 represents the signal voltage in the signal line. When the scanning signal is a straight polarity selected signal, the signal voltage is ON at the negative electrode (−V) and OFF at the straight electrode. When the scanning signal is a negative polarity selected signal, the signal voltage is OFF at the straight polarity (+V) and OFF at the negative polarity electrode. 1253 refers to the dummy pulse. The dummy pulse 1253 is impressed at the same timing, pulse width (x) and voltage value to each signal line. By adjusting the voltage value and pulse width x of 1253, the effective value voltage applied to the liquid crystal changes. Additionally, the timing for the application of the dummy pulse is in an optional position of the 1 horizontal scanning time period.

Furthermore, in the specifications, the illustrated examples of the optic modulator can be applied to plasma displays (PDP) and organic EL (OLED) and meets the conditions in the embodiment mentioned previously. Also, same thing can be said as in above for the following embodiments.

In this way, if the dummy pulse 1253 is impressed at the same timing, pulse width and voltage value, there is no difference of voltages between each signal line. This means that the interaction found by the integration of the floating capacity formed between each signal line disappears. Also, the occurrence of display irregularities and vertical lines can be reduced. Furthermore, there is a visual improvement in display picture quality because the signal voltage is set at a high frequency. In other words, it produces benefits in the reduction of cross talk and flickering.

By setting the dummy pulse 1253 to the same value of the scanning line selected signal, the reduction of the ON/OFF ratio of the effective value voltage impressed onto the pixels of the LCD panel can be suppressed immensely.

Figure 40:
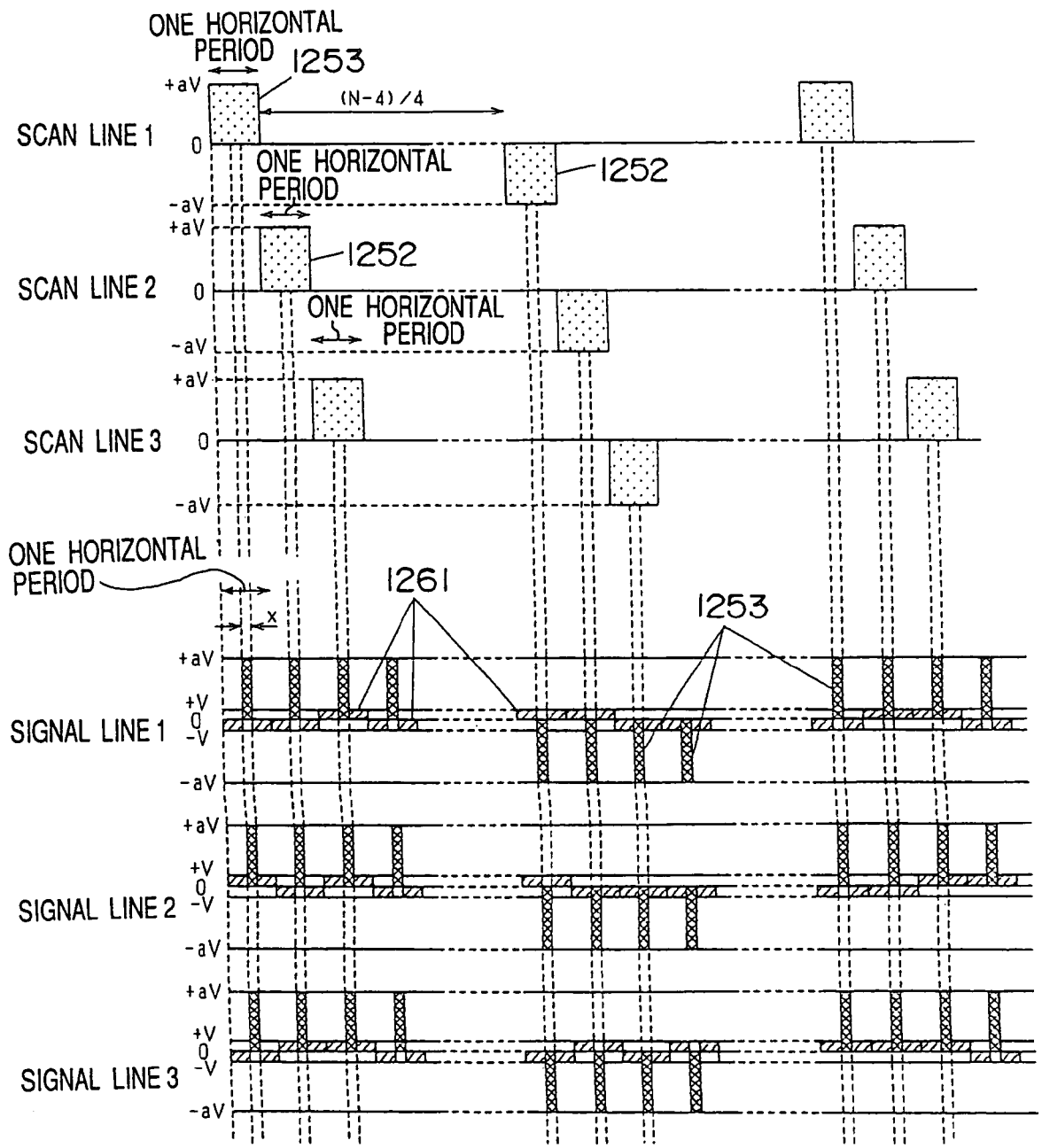
FIG. 40 is an explanatory drawing of the drive system for the display unit of the present invention.

FIG. 40 indicates the drive waveform of the present invention in other embodiments. The dummy pulse 1253 is applied to each signal line at the exact same voltage value, pulse width and timing. The voltage value is set at the same value as the scanning line selected signal. By doing so, the padding of the effective value through the dummy pulse 1253 is gone. Accordingly, the reduction of the ON/OFF ratio of the effective value voltage impressed onto the pixels of the LCD panel can be suppressed immensely. Also, because the signal voltage applied to the liquid crystal display layer is set at a high frequency, a reduction in flickering can be achieved, producing an improvement in display picture quality.

In other embodiments of the present invention, the simple matrix-type display panel containing multiple scanning and signal electrodes is applied to the Multiline Select (MLS) drive method through the simultaneous selection of L amount scanning electrodes. Either the Frame Rate Control (FRC) method or Pulse Width Modulator (PWM) method is used as the contrast display method. By applying the dummy pulse 1253 to the signal electrode, the reference voltage V decreases and the picture display quality improves.

As explained previously, in the MLS method, which simultaneously selects L number of scanning electrodes, the scanning signal becomes $1/\sqrt{L}$ times, the data signal $\sqrt{L}$ times that of the conventional APT drive method. For that reason, the bias ratio of the scanning and signal electrode voltages decrease in size and the effects the signal electrode voltage has on the effective value voltage has is large in comparison to the APT drive method. As a result, if there are waveform irregularities or interference in the signal electrode voltage series, the affects placed on the display quality are larger compared to conventional methods.

In the present invention, when the dummy pulse is impressed onto the signal electrode, the same effective value voltage is applied to the liquid crystal even if the reference voltage V of the signal electrode voltage is reduced. This means a lower signal voltage is achieved, reducing the affects on picture display quality, thus producing improvements.

In other embodiments of the present invention, the dummy pulse applied to the signal electrode using the MLS drive method is characterized by the fact that the amplitude value is set at the same value as the largest value of the signal electrode voltage and also that its polarity opposes the polarity of scanning line with larger selected signal.

Figure 41:
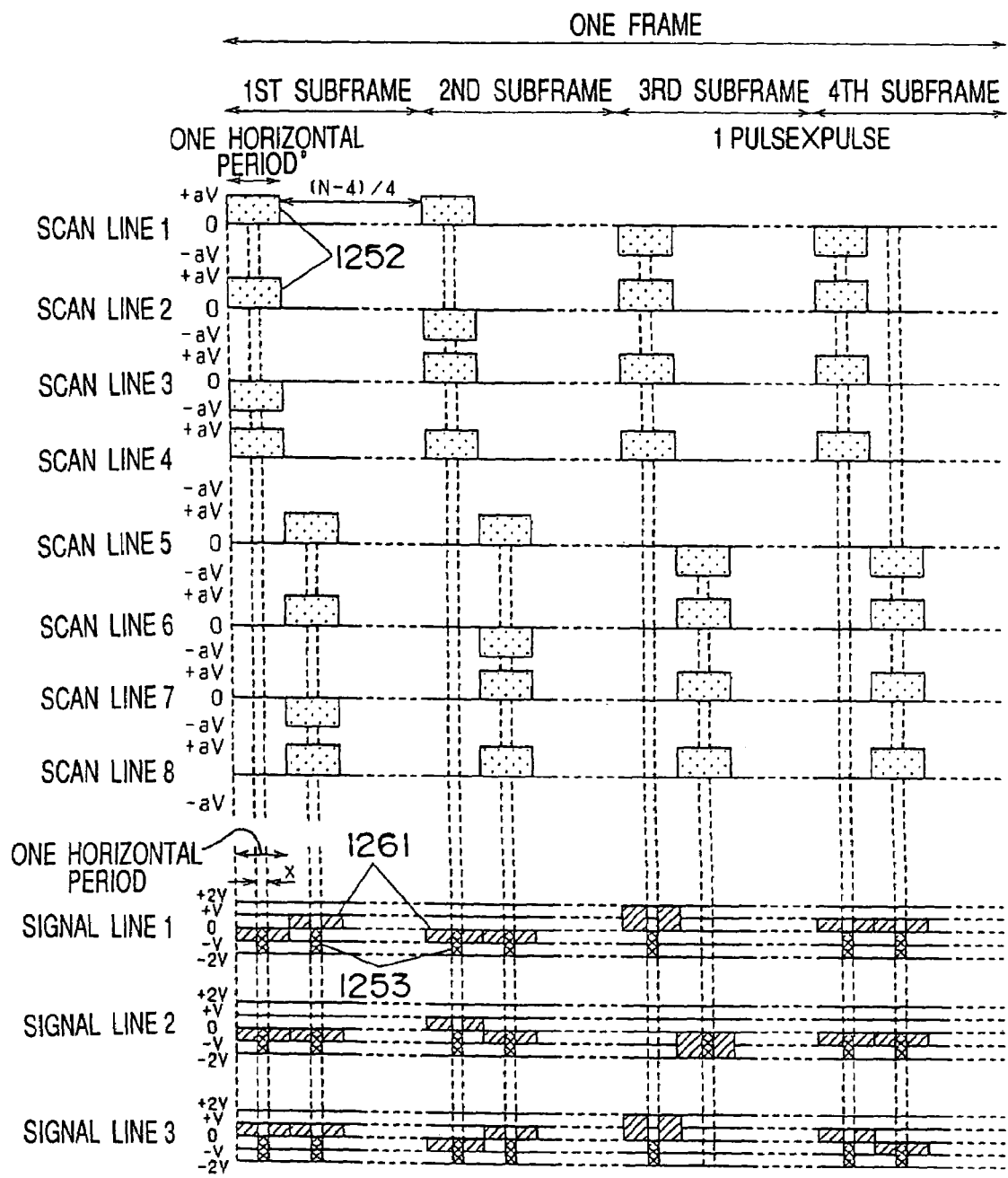
FIG. 41 is an explanatory drawing of the drive system for the display unit of the present invention.

In FIG. 41, the drive waveform pattern of the present invention is indicated. The scanning lines here represent the signal waveform of lines 1 to 8. In this drawing, the number of straight polarity selected signals in the 4 scanning lines simultaneously selected is 3. There is one negative electrode selected signal. Accordingly, the impressed dummy pulse 1253 is set at 2V, the largest amplitude of the signal electrode voltage it is a negative electrode.

When impressing the dummy pulse 1253 at this setting, the effective value voltage is applied to the liquid crystal at its most efficient rate, there enabling the reference voltage V of the signal electrode voltage to be lowered. In turn, the affects on the picture display quality are softened meaning an improvement.

In another embodiment of the present invention the timing of the impression of the dummy pulse is set at the beginning of end of 1 horizontal scanning period, which then suppresses the increase in power consumption.

Figure 42:
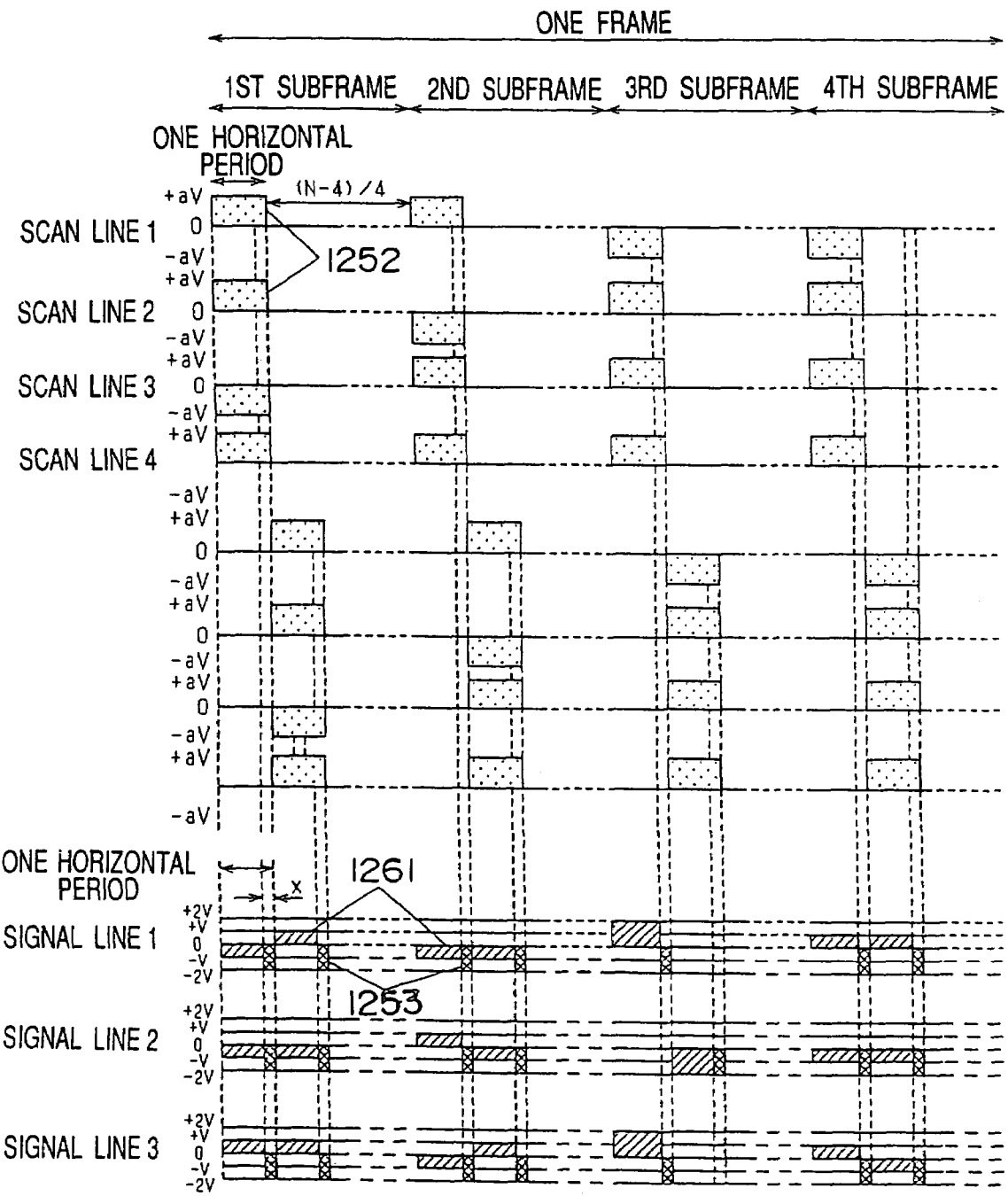
FIG. 42 is an explanatory drawing of the drive system for the display unit of the present invention.

FIG. 42 shows the drive waveforms of the present invention. As this drawing shows, by impressing the dummy pulse 1253 at the end of one horizontal scanning period (or beginning), the amount of signal voltage change decreases and enables the suppression of an increase in power consumption by the segment driver IC. It also makes the lowering of the reference voltage V of the signal voltage possible. As a result, the affects on the picture display quality are softened meaning an improvement.

In another embodiment of the present invention the timing of the impression of the dummy pulse is characterized by being alternatively set at the beginning and end of one horizontal scanning period at each sub frame.

Figure 43:
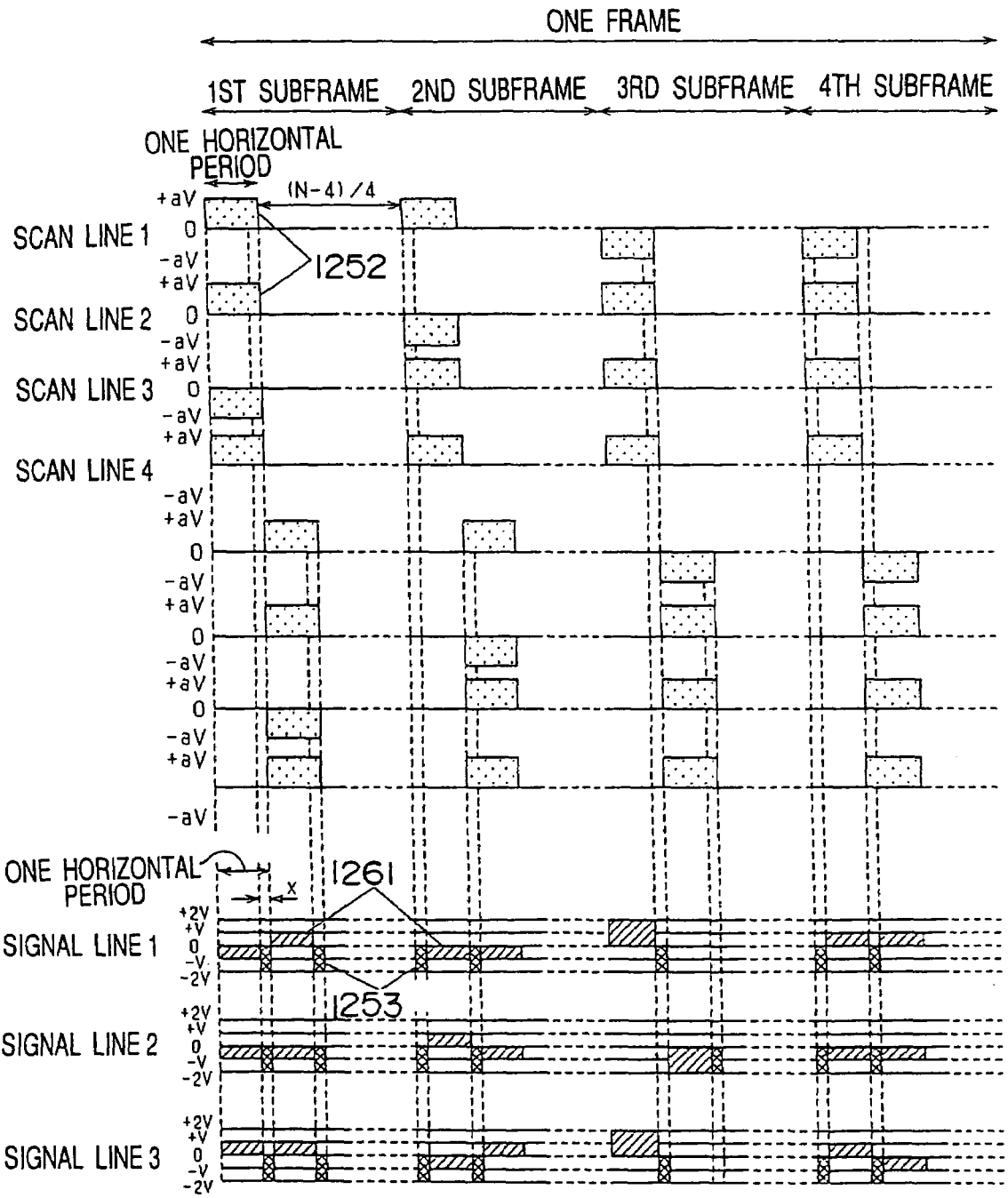
FIG. 43 is an explanatory drawing of the drive system for the display unit of the present invention.

FIG. 43 shows the drive waveforms of the present invention. By changing the timing of the impression of the dummy pulse 1253 at each sub frame, the time in which it doesn't interfere is irregular, and so the display picture quality can be improved. Therefore, by setting the timing of the impression of the dummy pulse at the start or end of one horizontal scanning period alternatively, the suppression of increases in power consumption continue, in turn enabling the realization of an high-grade display picture quality.

In another embodiment of the present invention, the ON/OFF ratio applied to the display panel pixels of the above a when the bias ratio is a and the number of scanning lines is N, is set in relation to FIG. 44 as a dummy pulse width ratio x (0 <x<1) in the one horizontal period impressed onto the signal electrode. This is done in order to secure an effective value voltage.

In FIG. 41, when making the dummy pulse width ratio x in relation to the one horizontal period of the scanning line selected signal, the effective value voltage of the ALL ON and ALL OFF pattern becomes the relationship shown in FIG. 45. Furthermore, N=the number of scanning lines, a=the bias ratio and V=the reference voltage.

From FIG. 45, the reference voltage V and ON/OFF ratio is supplied using the method shown in FIG. 46. From FIG. 46, the dummy pulse width ratio x, which enables the maintenance of the above a in the ON/OFF ratio, is supplied using the method shown in FIG. 44.

Furthermore, it is preferable to set the effective value voltage of the ON/OFF ratio applied to the LCD panel pixels at above 1.05 (1.065 or above is even better) as the pulse width for the impressed dummy pulse in the signal electrode. According to this drive method, even impressing a dummy pulse on the scanning and signal electrodes, the ON/OFF ratio is adequately secured, meaning that there is no concern of contrast deteriorating.

Another effective process as a contrast display method contrast is to adjust the dummy pulse width in the 8-color, 256-color and 4096-color display modes when using the FRC method. In the frame modulator method, the larger the contrast numbers, the more the interference due to the integration of stray capacitance formed between each signal line, making it easy for vertical lines and irregularities to occur. At this point, when there is a large amount of contrast numbers, the occurrence of vertical lines and irregularities is suppressed by extending the dummy pulse width. When the amount of contrast numbers is small, an excellent display picture quality can be obtained by shortening the dummy pulse width and increasing the contrast.

Additionally, in the case of a 16 contrast display using PWM, the preferred dummy pulse width is 1/16 the horizontal period. When using the pulse width modulator method to conduct 16 contrast display, the pulse width is classified as 1,2,4,8 giving a 15 pulse width overall. Through the creation of a one horizontal period by increasing clocks, it becomes 16 clocks, so at 15 pulses one clock is left over. By using the remaining one clock in the dummy pulse, the one horizontal period can be configured as a hexadecimal counter. Therefore, at the same time as being able to reduce the size of the circuit scale without requiring extra circuits, improvement in display picture quality can also be made.

Furthermore, it is advisable to configure it in such a way that the RGB gamma curve can be compensated by changing the amplitude or pulse width of the dummy pulse in each of the colors of red, green, and blue. Generally in the case of reflective panel, the voltage-reflectance characteristic varies between red, green, and blue, and especially, the threshold voltage at which the reflectance shows up differs. At that point, when width x of each red, green, and blue dummy pulse are set with each threshold voltage Vth accordingly, as in FIG. 47, against the reference voltage, γ curve of RGB can be corrected.

The following is a summary of the contents explained above as well as supplementary explanation in order to explain the hardware configuration.

In order to show the voltage size of the signal line in FIG. 27, the segment signal was explained as +2V, +V, 0, –V, –2V (V referring to the unit voltage). +2V is the straight polarity and is twice the +V voltage. However, when explaining hardware, it is easier to understand by using symbols rather than the size of the voltage. Accordingly, from here on+2V voltage is V2, +V voltage is V1, 0 voltage is VC, –2V is MV2 and –V is called MV1 (or explained by thus renaming the figures).

The common signal was also explained with the bias ratio as a, +aV,0,–aV. From this point on, the +aV voltage will be referred to as V4 and the –aV as MV3.

Figure 48:
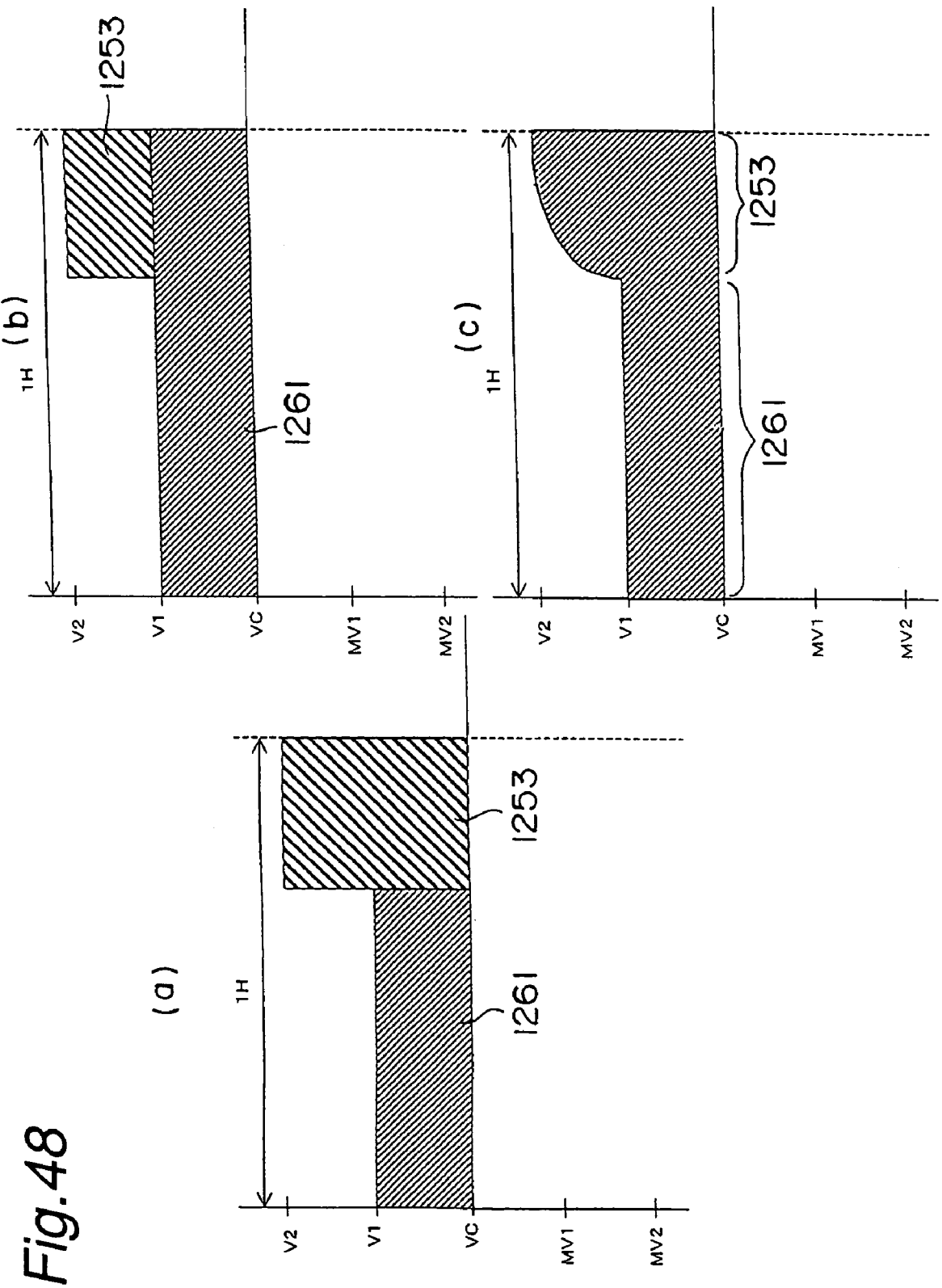
FIGS. 48(a) to 48(c) are explanatory drawings of the display unit of the present invention.

In the explanation of FIGS. 26 and 35, the writer explained it in terms of switching regarding the dummy pulse 1253, common signal 1252, or dummy pulse 1253 and segment signal 1261 (please refer to FIG. 48(*a*)). However it is not limited to these. For example, as shown in FIG. 48(*b*), the segment signal (or common signal) 1261, the dummy pulse 1253 can be arranged to be mounted. Also, as shown in FIG. 48(*c*), the signal 1261 and dummy pulse 1253 can be switched gradually with no restrictions.

Figure 49:
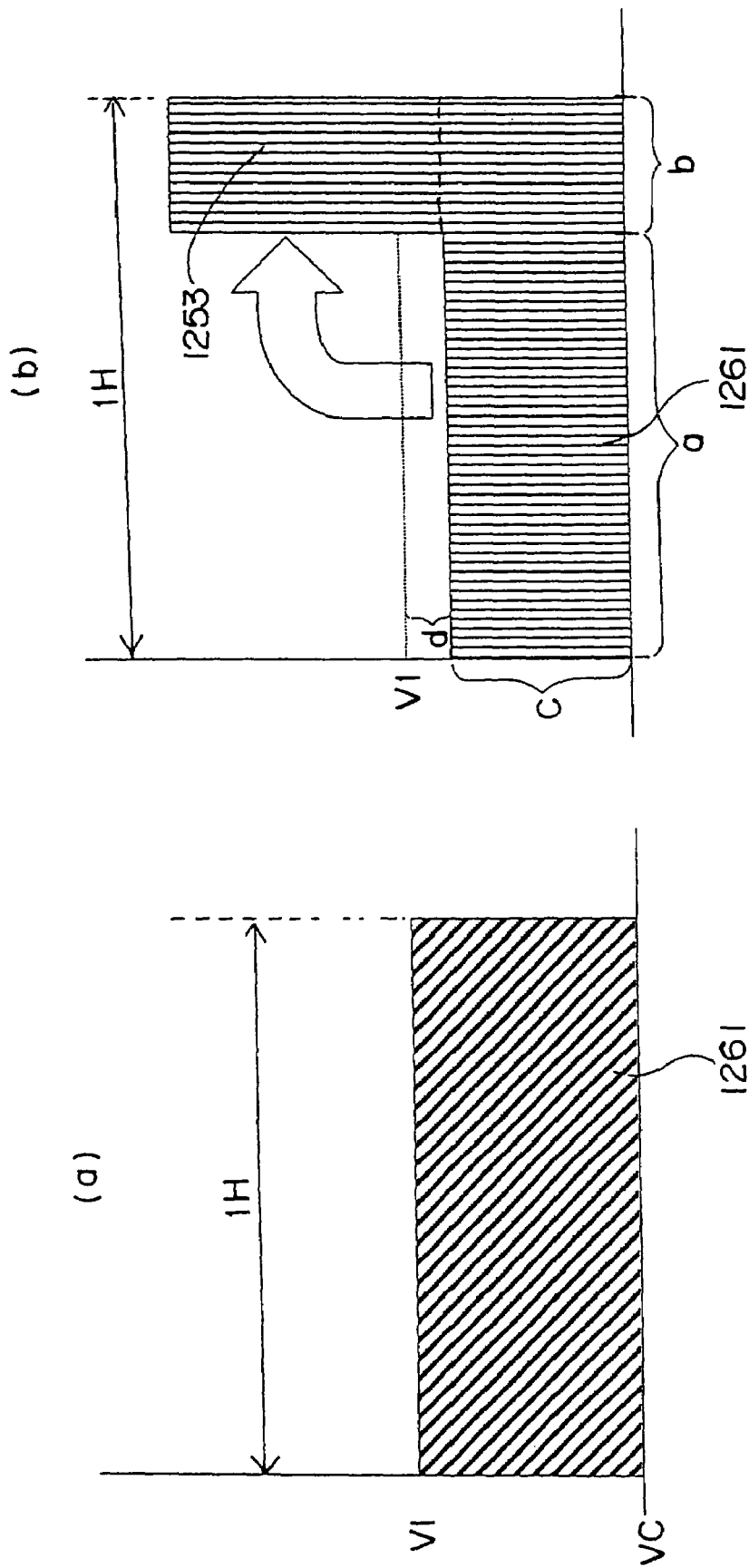
FIGS. 49(a) and 49(b) are explanatory drawings of the display unit of the present invention.

As shown in FIG. 49(*b*), in order to impress the dummy pulse 1261 so that the ON/OFF ratio (contrast) is not changed, part of the effective voltage on the signal should be controlled so that it becomes the effective value voltage of the dummy pulse 1253. In other words, this can be done by configuring the dummy pulse 1253 with the reduced effective value (a+b)×d coming about from making the signal 1261 in 150(*a*) effective value voltage that of 150(*b*), i.e. (a+b)×c. By impressing the dummy pulse in this way, high picture quality with absolutely no change in the display panel contrast can be maintained.

In the liquid crystal layer, the transmission rate of the liquid crystal changes according to the effective voltage value. Through the application of the dummy pulse 1261, the transmission rate of the liquid crystal changes if the effective voltage value does. The effective voltage value is determined by the dummy pulse 1253, the segment signal 1261 and the common signal 1252.

The increase in the effective voltage value due to the application of the dummy pulse 1253 can be canceled by lowering the effective voltage value of the common signal 1252. Normally, the common signal 1252 amplitude value is high. The adjustment of the increased effective voltage value due to the application of the dummy pulse 1253 using the common signal 1252 means that the amplitude value will decrease.

Accordingly, the common signal 1252 can be lowered through the application of the dummy pulse 1253. For that reason, it then becomes possible to reduce the tolerance voltage of the common driver IC15. As a result, cost reductions are achievable as the IC can be made using a low-tolerance voltage, low-cost semi-conductor process.

The benefits of reducing the common voltage also appear in the reduction of unwanted electromagnetic radiation. Such reduction benefits are large, particularly in the use of mobile telephones. This is due to the interfering noise created if the unwanted electromagnetic radiation enters the circuit with a the mobile telephone wave processor set at a high frequency.

When the display panel 21 is used as an information display device in mobile telephones, it is best to mount drivers IC14 and IC15 on—side of the display panel as shown in FIG. 1 (the mount of the IC drivers in—side is referred to as 3sidefree configuration). Conventionally, the common driver IC 15 is mounted in the X side of the display area and the segment driver IC14 in the Y side). The design is such that it is easy to make the center line of the screen 107 the center of the display device. Also, this is because the mount of the driver IC is simple.

Figure 50:
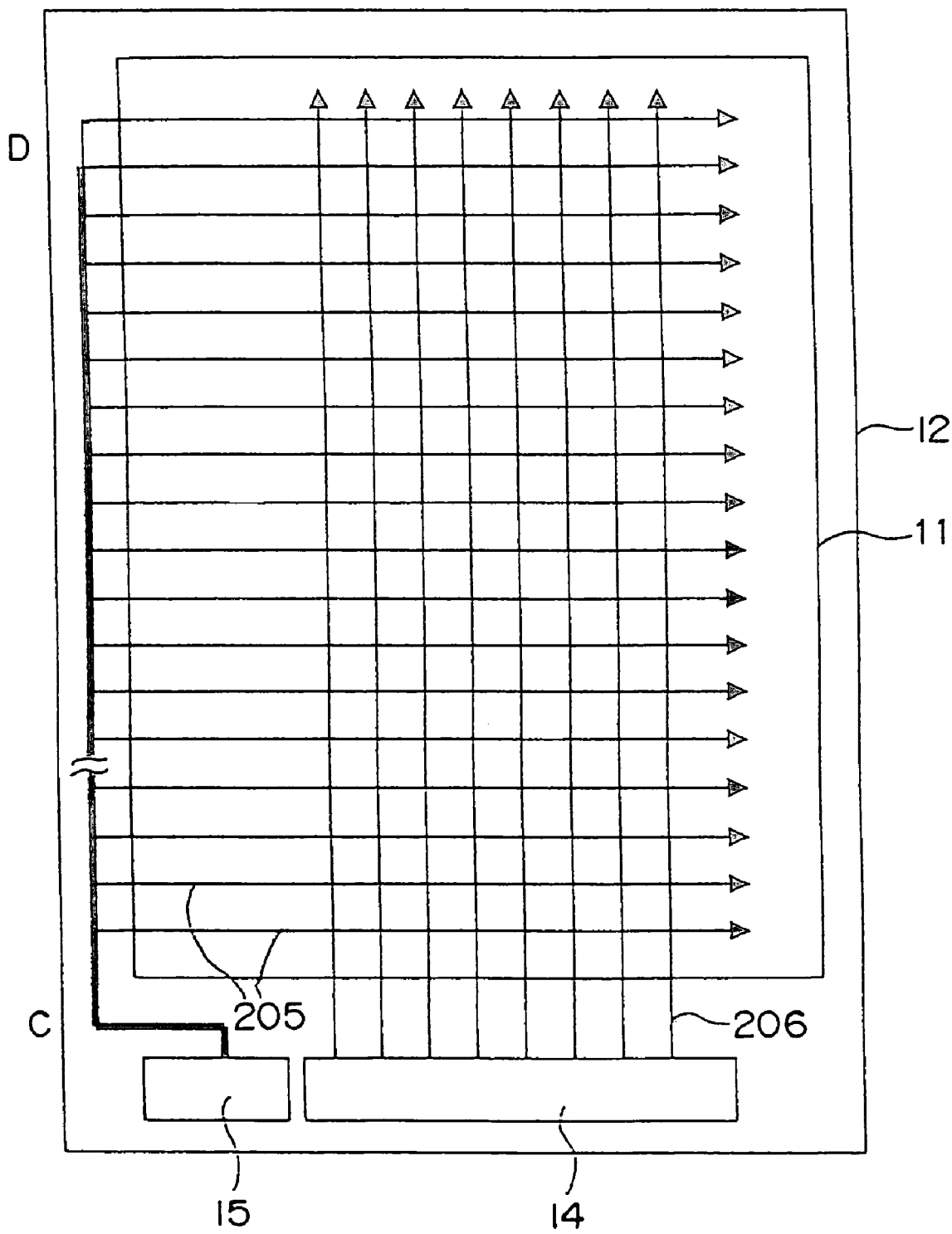
FIG. 50 is a schematic plan view of the display unit of the present invention.
Figure 53:
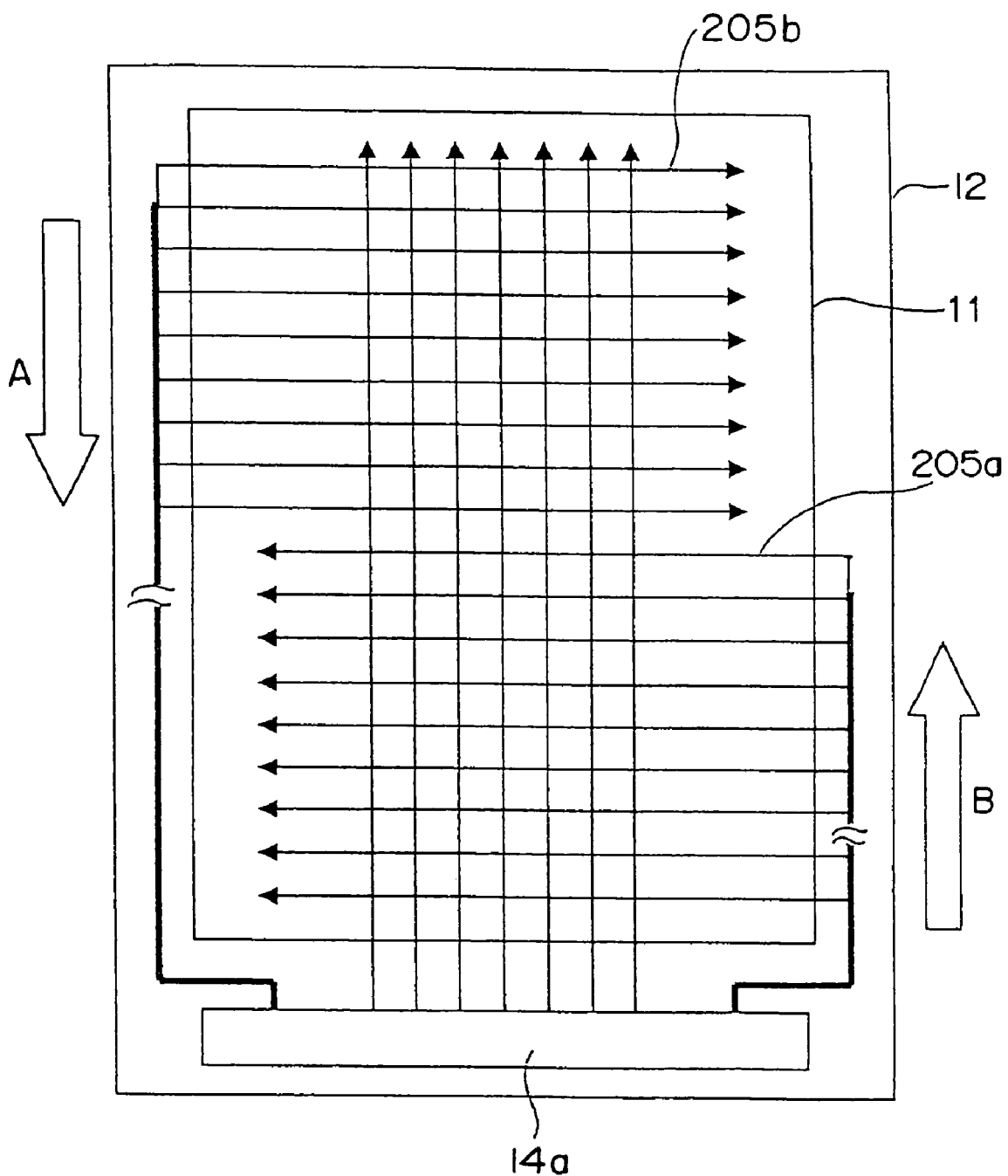
FIG. 53 is a schematic plan view of the display unit of the present invention.

However, if the common driver 15 is placed to the side of the segment driver 14, the common signal line 205 needs to be molded in line with side C and formed to the screen display area 107 (refer to FIGS. 50 and 53).

Also, the pitch of the common signal line 205, which is molded to C side, is set at above 5 μm and 12 μm. If the level is under 5 μm, noise remains due to the influence of the parasitic capacitance the adjoining common signal line. According to experiments, the influence of the parasitic capacitance occurs at pitch levels under 7μ and picture noise such as beats occur on the display screen.

The occurrence of noise is different at the right and left of the screen which makes it especially difficult to reduce the beat picture noise. Also, if the reduction exceeds 12 μm, the width of the screen frame becomes too large and impracticable.

In order to reduce the picture noise mentioned above, a grunt pattern (a conductive pattern set at a electric potential which is stable at fixed voltage) is placed at the bottom or top layer of the part forming the common line 205. Also, a separately attached sealed board ca be placed on top of the common signal 205 (sealed foil [a conductive pattern set at a an electric potential which is stable at a fixed voltage])

The common signal line 205 of C side in FIG. 1 can be formed by ITO electrodes. To create low resistance, it is advisable to mold with metallic film or laminate with an ITO and metallic film mix. When laminating with ITO, a titanium film is formed on top of the ITO. On top of that a thin alloy film of molybdenum and aluminum or just aluminum is molded. Another alternative is to mold a chrome film on top of the ITO. IN the case of metallic film, aluminum thin film or chrome thin film is used. The above-mentioned contents are the same for other embodiments in the present invention.

Furthermore, by reducing the voltage in common signal 1252, the tolerance voltage used moves close to the segment signal 1261. In the MLS drive method, the segment signals and common signals, in particular, are characteristically close. The width is close meaning that the tolerance voltage of the semi-conductor IC chips for the common driver IC 15 and the segment driver IC14 are close. If the tolerance voltage is close, it is possible to mold both drivers on one chip simultaneously (see FIG. 53).

In FIG. 53, the common driver IC 15 and the segment driver IC 14 are made from silicon semiconductor wafers into 1-chip driver (IC 14a), and are mounted to the display panel 21. This method can reduce the number of the chips that is to be mounted to the display panel. At the same time, The voltage for various processing in the 1-chip driver IC.

In the past paragraph it is mentioned that the common driver IC 15 and the segment driver IC 14 are made from silicon semiconductor wafers into 1-chip driver (IC 14a), and that they are mounted to the display panel 21. However, this is not the limit as the wafers can be molded directly onto display panel 21 using high or low temperature poly-silicon technology.

The above explanation not only applies to the MLS drive, but can also be applied to display panels that implement other driver methods such as the PCM drive and the PWM drive. It also applies to active matrix-type display panels, not only simple matrix-types.

The above explanation was done taking a simple matrix-type display as example. However, the scope is not limited, needless to say, to this; the principle can be applied to active matrix-type display panels. All that needs to be done is to replace the common driver IC15 with a gate signal line. The benefits through the reduction of the gate signal amplitude are parallel. As a result, this drive method, which is impresses the dummy pulse and 3-sidefree configuration, can be applied to all display panels.

Figure 56:
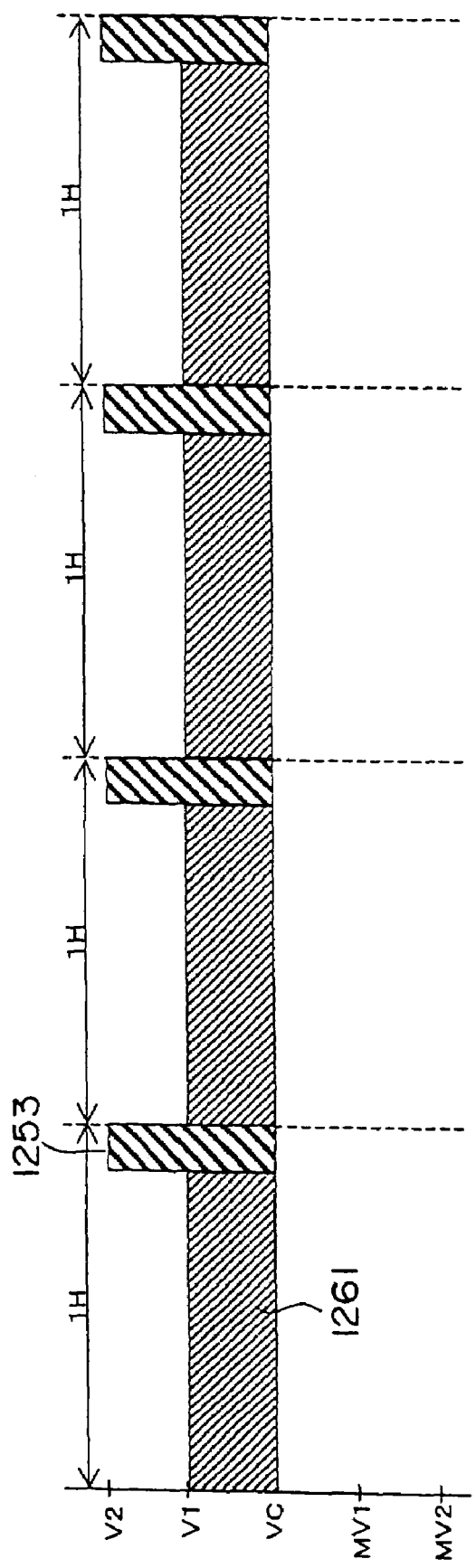
FIG. 56 is an explanatory drawing of the drive system for the display unit of the present invention.

As shown in FIG. 56, there is also the benefit of being able to reduce flickering by impressing the dummy pulse 1253. The breakthrough of this mechanism is difficult, however it is possible to attribute this to the following reasons.

The signal amplitude for the dummy pulse 1253 is comparatively large (using MV2 or V2). The number of high cycle components in the signal impressed in the signal line 206 is higher. For that reason, the number of high cycle components in the signals impressed in the liquid crystal layer increases and responds faster. Furthermore, the effective voltage value supplied to the liquid crystal layer by the dummy pulse is comparatively large. Also the dummy pulse 1253 is applied evenly over the entire screen.

In the STN LCD panel, the amount of cross talk changes due to the signal frequency components impressed onto the segment signal. However, when a dummy pulse is impressed, the frequency components across the entire screen become even. Also, it becomes harder for cross talk to occur due to the fact that the effective value voltage is relatively large. As a result, a high grade of picture quality and evenness can be achieved.

Figure 57:
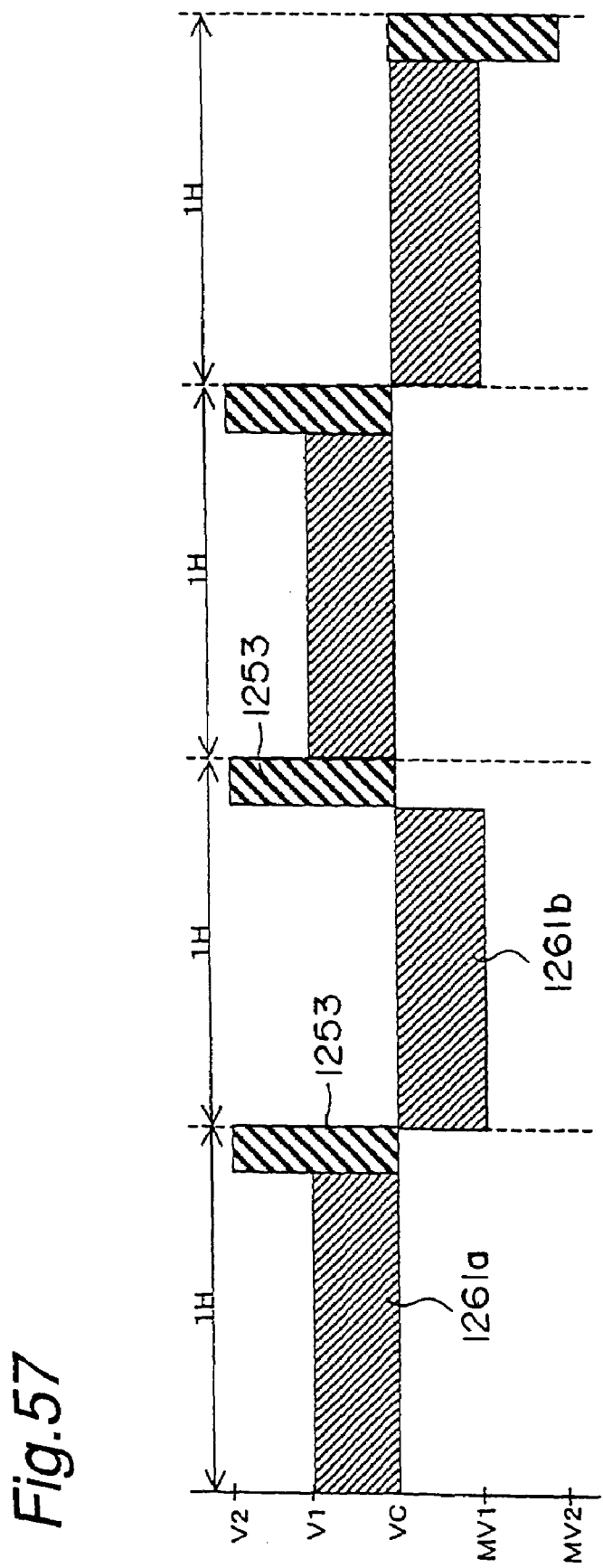
FIG. 57 is an explanatory drawing of the drive system for the display unit of the present invention.

As FIG. 57 illustrates, fixing the direction of the voltage applied is of benefit even if the signal 1261 changes. Generally, in the STN LCD panel, when the frame lowers, it becomes easier for low frequency flickering to occur due to the difference in low frequency components (change in brightness which is under 10 Hz and relatively slow).

The low frequency flickering can be controlled by impressing a dummy pulse 1253. By doing so, the occurrence of flickering under 40 Hz can be prevented. It is presumed that the reason is due to the dummy pulse 1253 being impressed evenly across the entire liquid crystal layer, which then causes the application of high frequency components. If a low frame rate can be achieved, then low power consumption can be realized.

Figure 58:
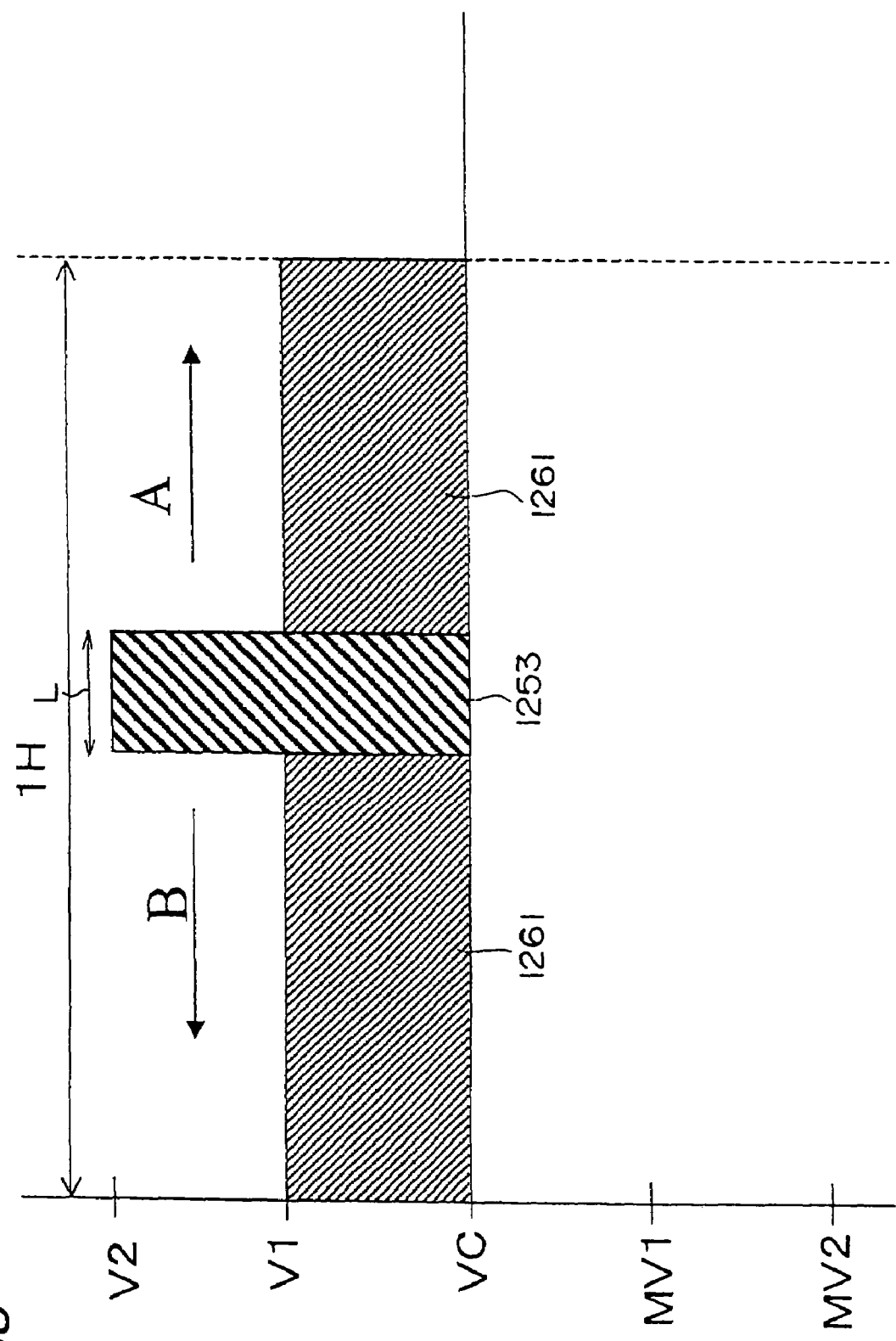
FIG. 58 is an explanatory drawing of the drive system for the display unit of the present invention.

Furthermore, in order to prevent the occurrence of low frequency flickering at a low frame rate (under 30 Hz), the impression position of the dummy pulse can be changed as shown in FIG. 58. However, as the ideal impression position of the dummy pulse 1253 differs depending on the liquid crystal material, it requires the user to look at the picture while adjusting. In experiments, an excellent result was obtained in the case when the dummy pulse 1253 was applied in the center of one horizontal scanning time period using liquid crystal material with a response time of 200 to 300 msec. The best results were achieved with the range above 0.5 but under 0.75 with the center measuring 0.5 and the one horizontal scanning time period being 1.

Figure 59:
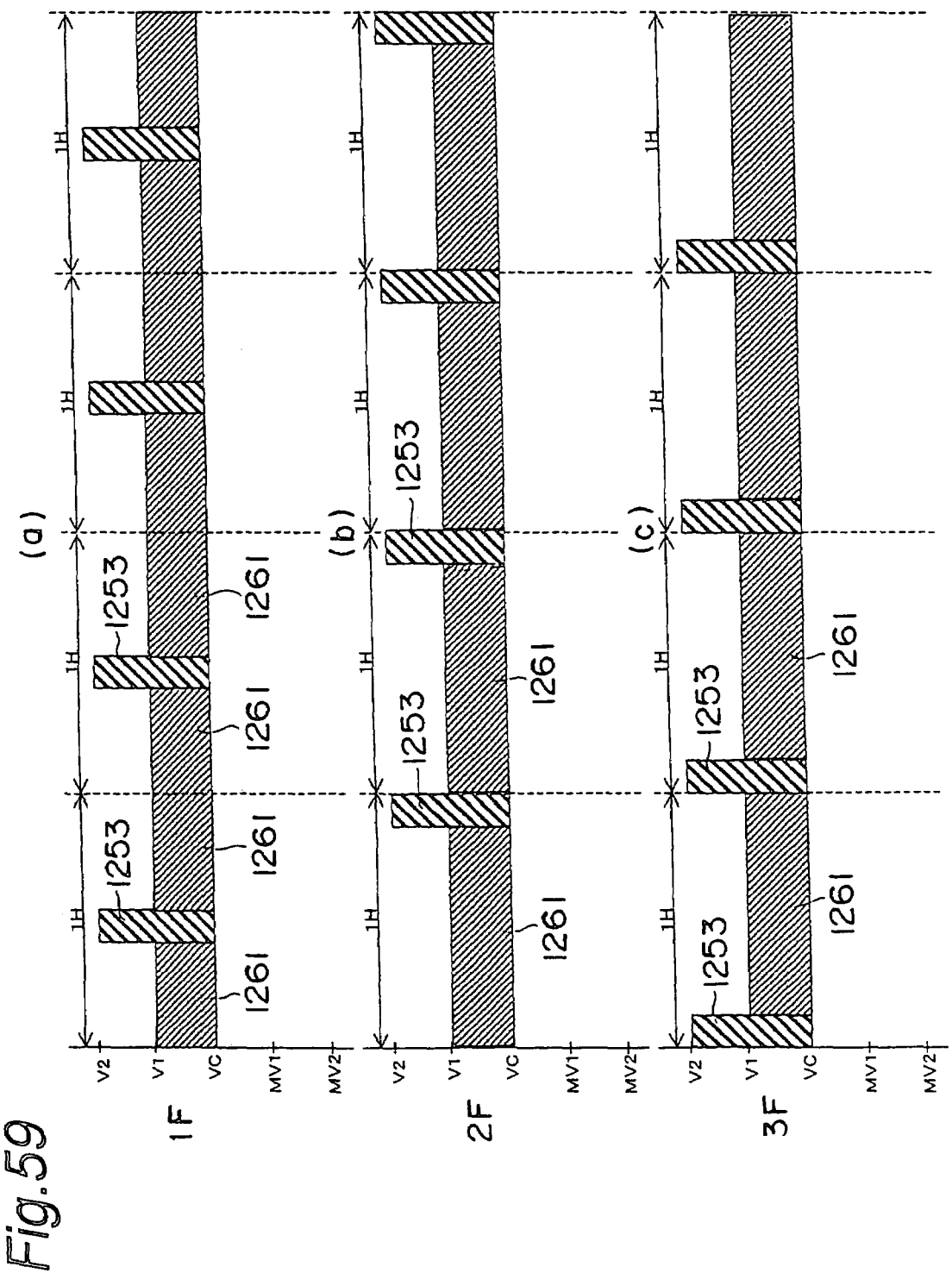
FIGS. 59(*a*) to 59(*c*) are explanatory drawings of the drive system for the display unit of the present invention.

Also, for extremely slow frame rates of under 25 Hz, the position of the dummy pulse 1253 can be moved in either A or B direction manually in response to the picture type (8-color font display, nature or person) to the position where flickering decreases (see FIG. 58). Adjustment is possible by the user through the pressing of the information display unit button 256. Another method is to adjust it automatically through the control by microcomputer after detecting flickering using the photo-sensor etc. Yet another way to reduce flickering is by altering the width of the dummy pulse shown in FIG. 58. This can be done by pressing of the information display unit button 256 as well as adjusting it automatically through the control by: microcomputer after detecting flickering using the photo-sensor etc as mentioned above As FIG. 59 illustrates, flickering is reduced also by changing the position of impression of the dummy pulse 1253 at each field (or frame F). In FIG. 59, the dummy pulse is impressed in the middle of 1H in the first F. In the second F, it is impressed at the end, and in the $3^{rd}$ F, at the beginning of 1H. At the $4^{th}$ F, it then returns to the center of 1H.

As stated above, by changing the position of the dummy pulse 1253 impression at each field (frame), high frequency components are applied to the liquid crystal layer, and the signals impressed on the liquid crystal layer are randomized. As a result, low frame drive is realized.

Figure 60:
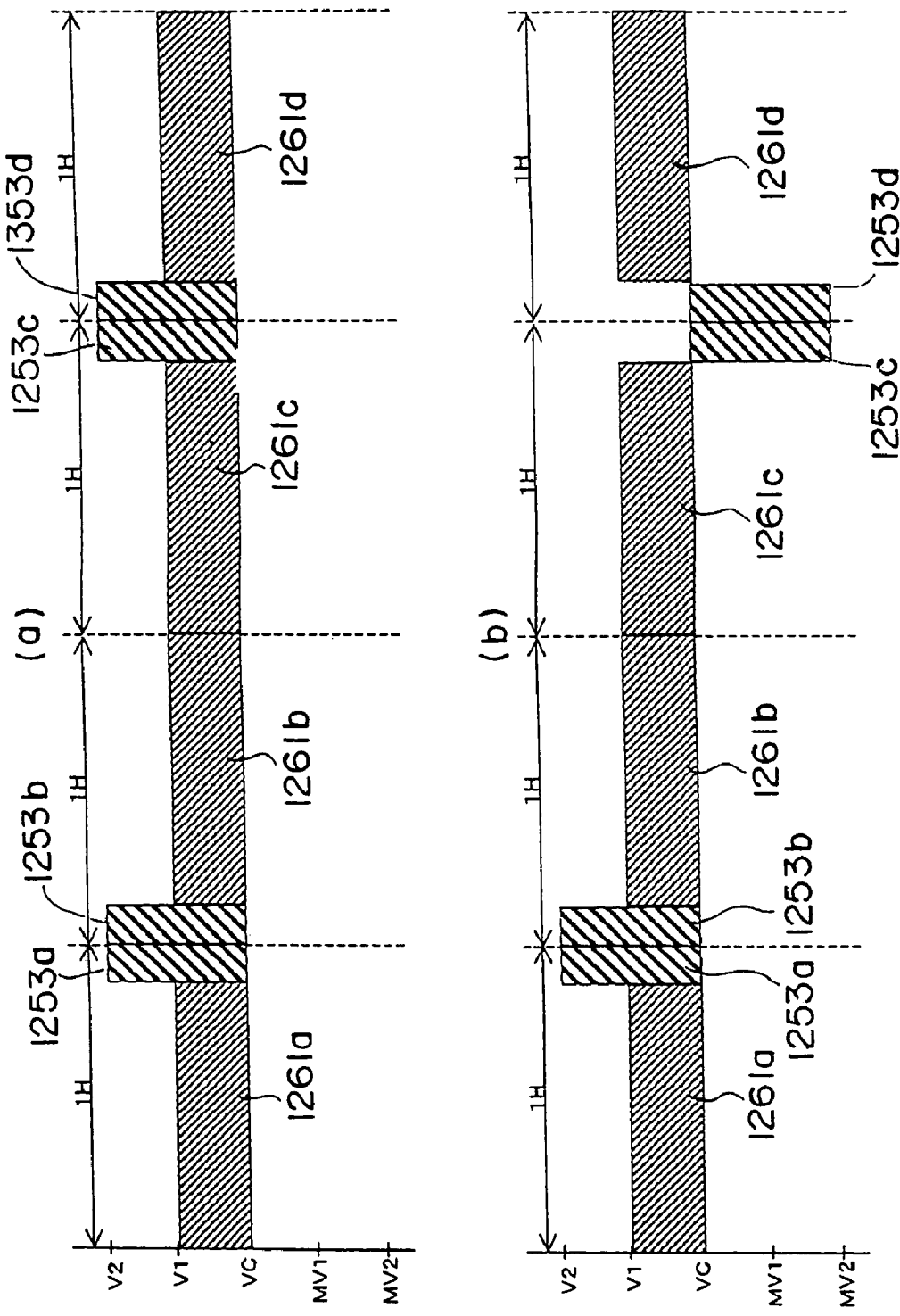
FIGS. 60(*a*) and 60(*b*) are explanatory drawings of the drive system for the display unit of the present invention.

The control of the waveform change ratio can be done by making the dummy pulse 1253 continuous at the adjoining horizontal scanning periods ($1^{st}$ and $2^{nd}$ periods) as shown in FIG. 60. At the $1^{st}$ H period, a dummy pulse 1253b is impressed at the end, and at the $2^{nd}$H at the beginning. In this way, if the dummy pulse 1253 is impressed the changes in the signal, which are impressed on the signal line 206, will become lower. If the change decreases then low power consumption becomes possible. Again, as shown in FIG. 60(b), if the dummy pulse impressed can be reversed either at 1H scanning time or multiple scanning times, then a high frequency voltage is impressed onto the liquid crystal layer enabling the suppression of flickering.

Figure 61:
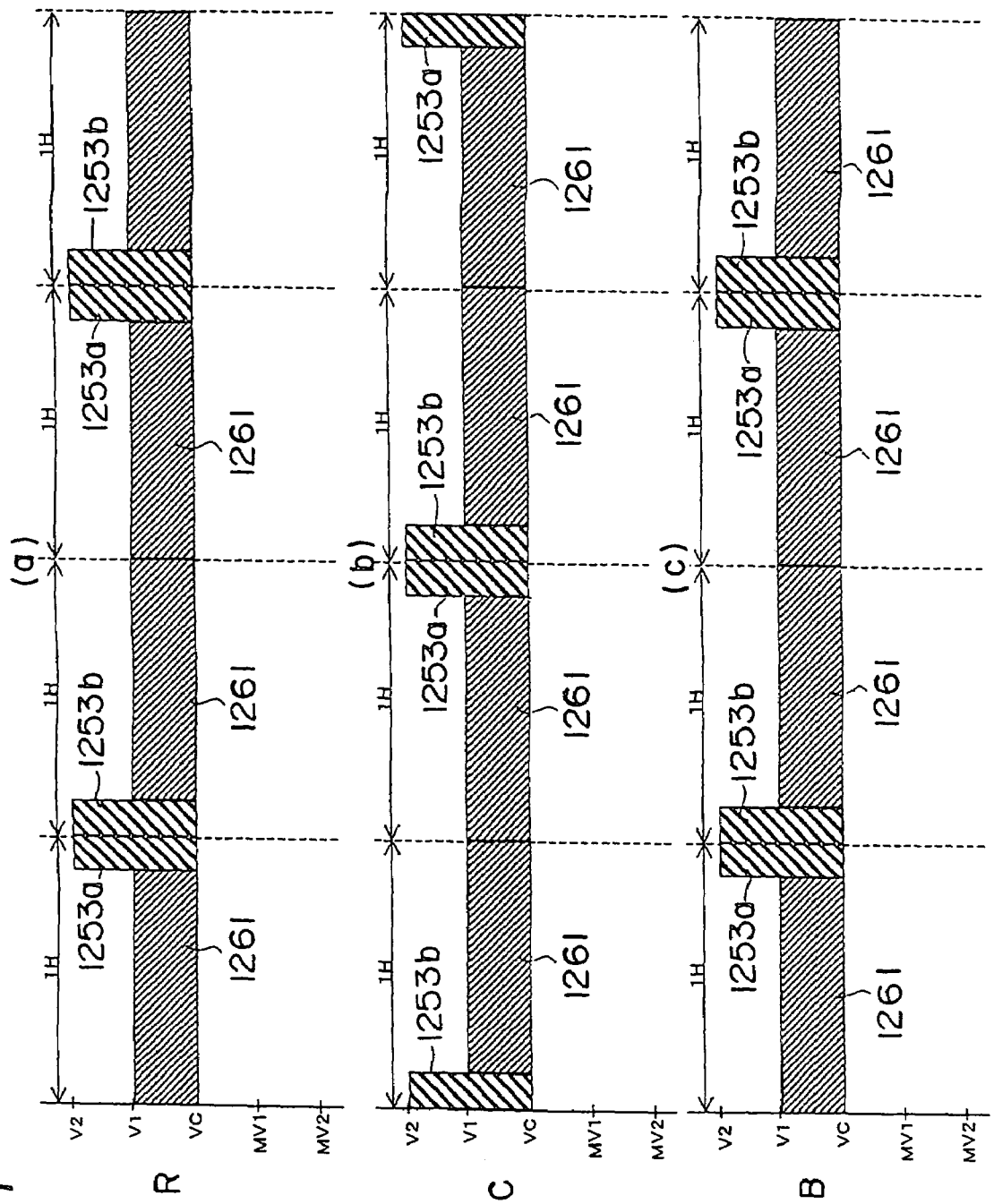
FIGS. 61(*a*) to 61(*c*) are explanatory drawings of the drive system for the display unit of the present invention.

Furthermore, by using red, blue and green to change the position of the dummy pulse 1253 impression, as shown in FIG. 61, is beneficial in suppressing the occurrence of flickering. RGB pixels are formed adjacent to one another, because they wipe out the flickering.

Figure 62:
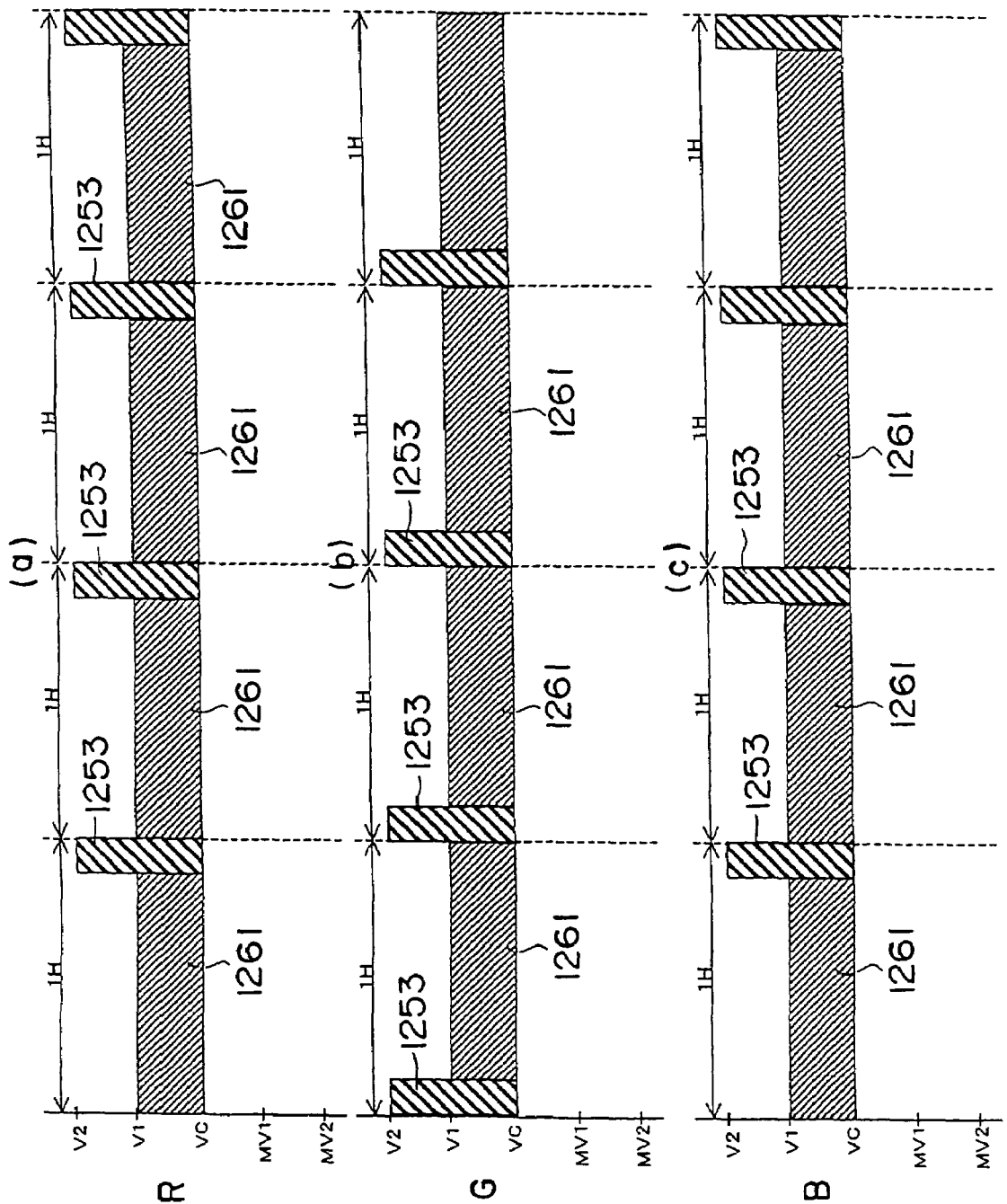
FIGS. 62(*a*) to 62(*c*) are explanatory drawings of the drive system for the display unit of the present invention.

In FIG. 61, the position of the R & B pixel dummy pulse 1253 impression is the same and only the G pixel pulse is positioned differently. Naturally, it is possible to make the R & G pixels the same position and change the B pixel position, or as shown in FIG. 62, position all three pixel dummy pulses in different places.

LCD panels, including STN LCD panels, differ in electric optical characteristics (gamma characteristics) in red, green and blue. In particular, in the STN LCD pixel, if the film phase compensation is not perfectly in sync in RGB, due to the fact that oval polarized light becomes linear polarized through the film compensations the gamma properties curve being uneven.

The synchronization of this gamma properties curve is indeed extremely difficult. In the present invention, as shown in FIG. 61, the dummy pulse 1253 is impressed to the segment signals. The effective value applied to the segment signal lines by adjusting the voltage (or adjusting the pulse width and amplitude value) of the dummy pulse in each of the colors R, G and B is changed. Accordingly, the electro-optical characteristics (gamma characteristics) can be adjusted at R, G or B through the dummy pulse 1253.

The gamma compensation dummy pulse 1253 is applied to at least one of the R, G or B signals. By doing so, the impressed signal gamma properties are changed. Furthermore, the RGB gamma properties can be synchronized by adjusting the compensation amount.

As FIGS. 63(*a*1), (*a*2) and (*a*3) illustrated, the high frequency components are impressed onto the liquid crystal layer by making changes at each field (frame). The signal that is impressed onto the liquid crystal layer is randomized. Therefore, low frame drives become possible. In the same way, the high frequency components are impressed onto the liquid crystal layer by altering the dummy pulse gradually, as shown in 152(*b*1) (*b*2) (*b*3). Additionally, the signal that is impressed onto the liquid crystal layer is randomized.

Another method shown in 153(*a*) includes the high frequency components being impressed onto the liquid crystal layer by changing the position of the dummy pulse 1253 impression at one of multiple horizontal scanning periods (1H). The signal that is impressed onto the liquid crystal layer is randomized. Therefore, low frame drives become possible.

Figure 64:
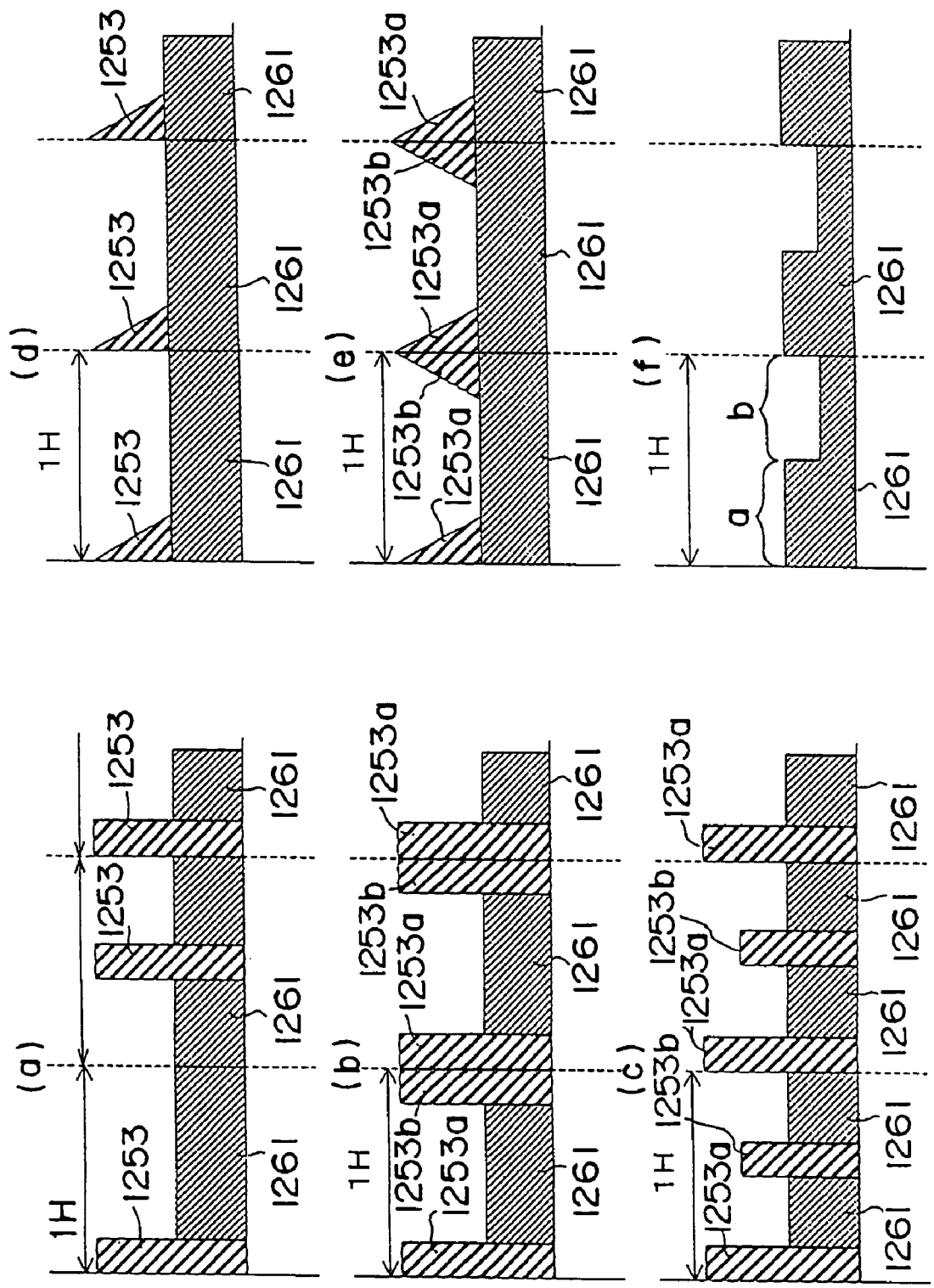
FIGS. 64(*a*) to 64(*f*) are is an explanatory drawings of the display unit of the present invention.

In the above embodiments, the method was to impress one dummy pulse to each horizontal 1253(*b*), it is obviously possible to impress multiple dummy pulses (1253*a*, *b*) at each (1H) horizontal scanning period. Also, the amplitude value and width of the dummy pulse 1253 can be changed, as shown in FIG. 64(*c*). The dummy pulse id not limited to short wave, but can also be triangular wave or other types as shown in FIG. 64(*d*). Also, the triangular wave can be placed in a row next to each other between the horizontal scanning periods as in FIG. 64(*e*). As this FIG. 64(*e*) shows, power consumption can also be reduced by making the triangular wave continuous. Additionally, as is illustrated in FIG. 64, changing to the higher frequency of the signal impressed on the liquid crystal layer is also possible by changing the signal 1261.

The majority of the above-mentioned are related to FRC drives. Below, one type of drive among the MLS drives of the present invention, the PWM drive, will be explained. Also, it should be noted that the FRC drive procedures could be applied to the PWM drive explained below.

The following information primarily concerns PWM drives. It is, however, difficult to illustrate the 4 types (8, 4, 2, 1) pulse widths of PWM (herewith referred to as 15 PWM). To make it easier to understand and to simplify the illustrations, the explanation will focus on the PWM, which uses 3 types of pulse width (herewith referred to as PWM 7). Furthermore, in the 7PWM, 8 graduations can be displayed. The explanation will focus on the output waveform (referred to as signal pulse 1261 or signal waveform 1261) of the segment driver.

Figure 65:
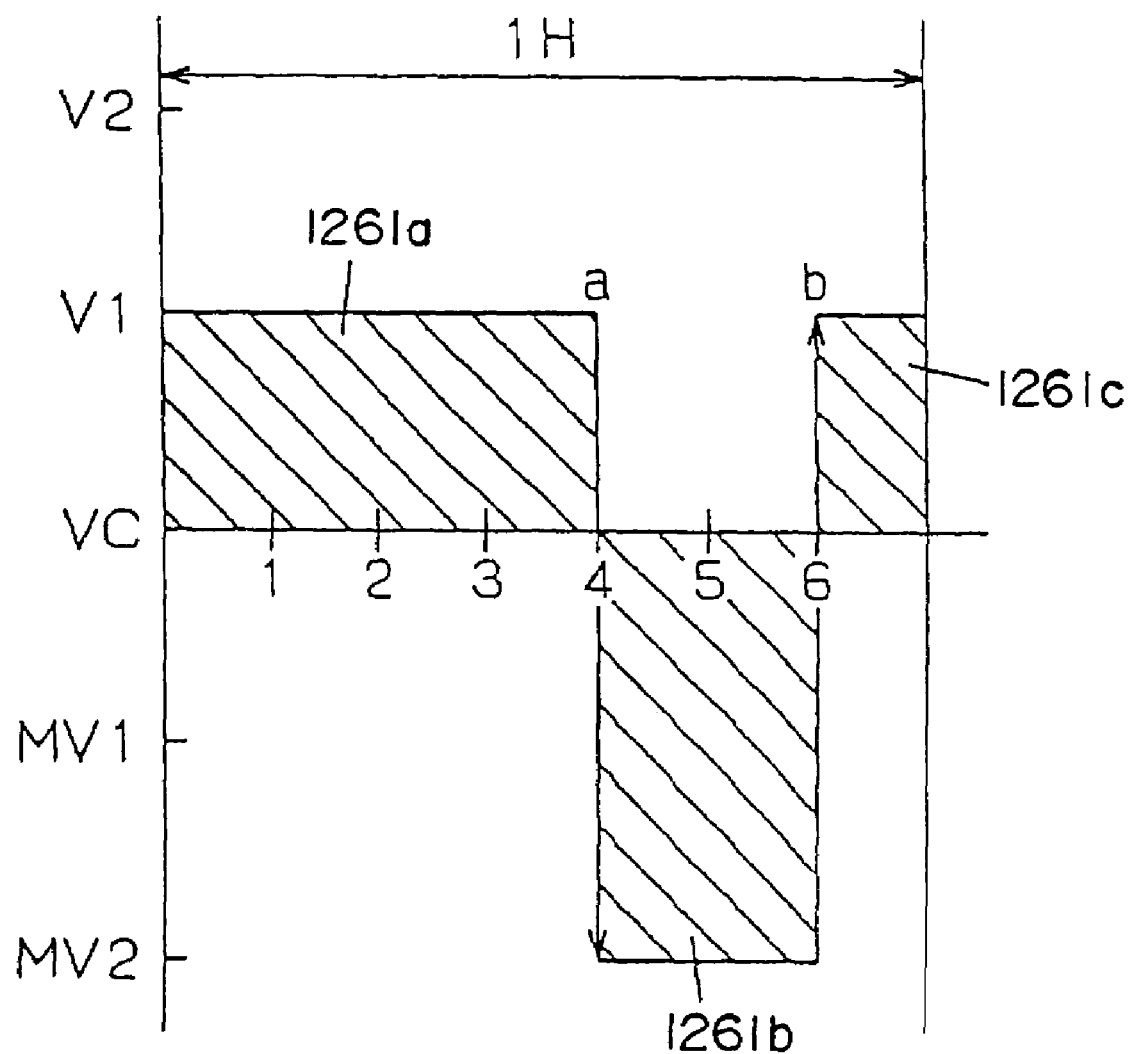
FIG. 65 is an explanatory drawing of the drive system for the display unit of the present invention.

FIG. 65 shows the drive waveform impressed onto the segment signal line when engaged in PWM. It is comprised of a 4 pulse width—signal pulse 1261*a*, a 2 pulse width—signal 1261*b* and a 1 pulse width—signal pulse 1261*c*.

The part which consumes the most power is the one in which the voltage value alters. For example, point A (voltage changes from V1 to MV2) and point B (voltage changes from MV2 to V1) in FIG. 65. This is due to the operation of operation amp 451*b* and 451*e* at point A and operation amp 451*e* and 451*b* at point B in FIG. 136.

At this point, power is required to recharge modulator layers such as the liquid crystal layer. Also, the driver output IC14 electric current is generated.

It is not shown in the present invention, however, an analog switch has been molded onto the output terminal of the operation amp 451. Among the numerous operation amp 451 outputs, this one is configured in such a way that only one voltage is impressed onto one segment signal line. This control is made possible through the configuration of other analog switches closing once another, which was closed, has opened.

Ideally, the period of time that all analog switches are closed is between 20 nsec to 100 nsec.

Taking the above into account, the points of change such as point A and point B indicated in FIG. 65 should be lowered in order to achieve lower power consumption. Power consumption lowers as the points of change decrease. As one example, the breakdown of power consumption of the liquid display panel modulator, 10% is sent to the logic circuit, 30% to the analog circuit and 60% to the drives of the liquid crystal layer. Most of the power that drives the liquid crystal layer is the charge and discharge power in conjunction with the changes in signal waveform that has been impressed onto the liquid crystal layer. Also, it enables a reduction in driver IC power in organic EL display panels.

Figure 66:
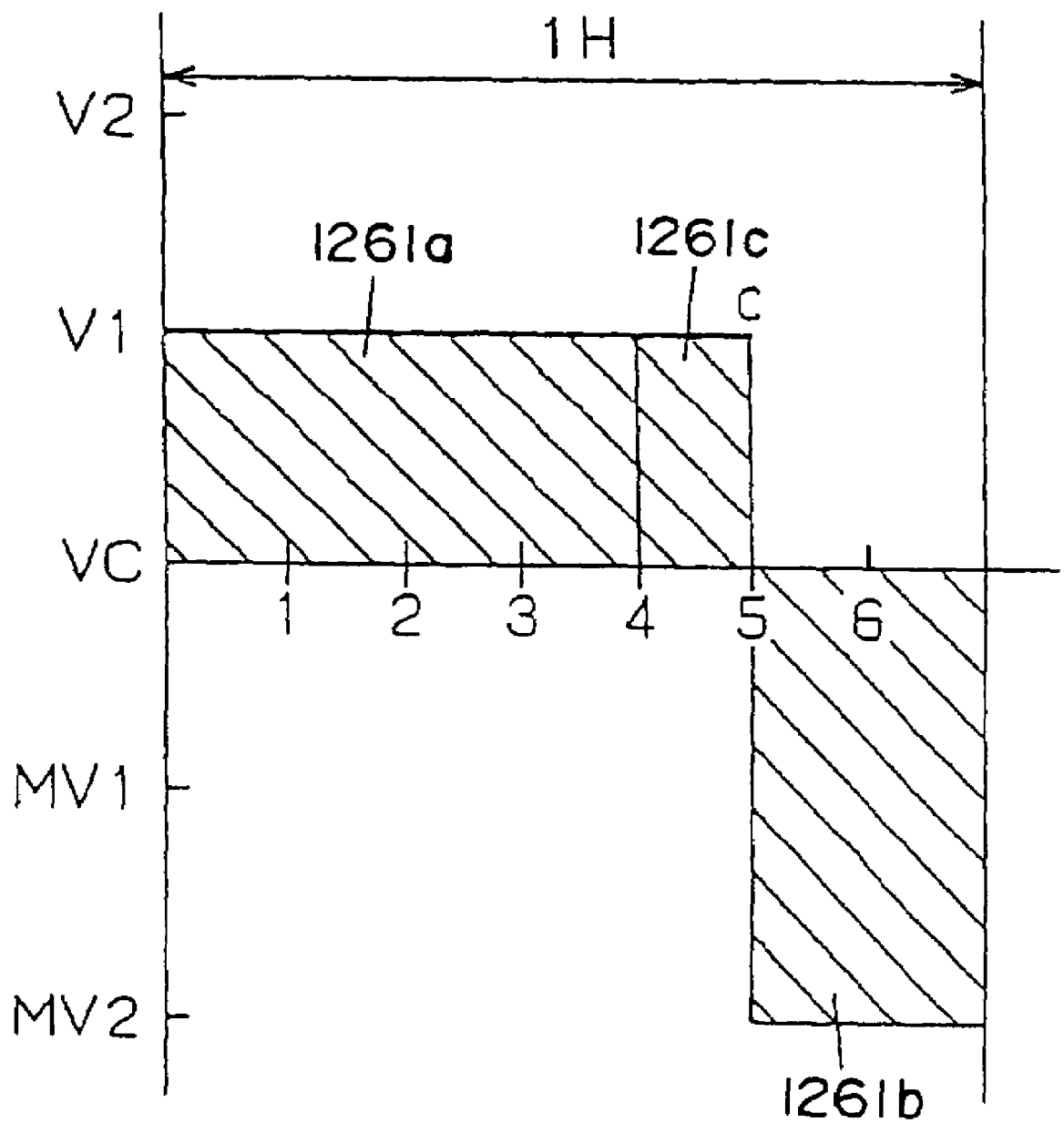
FIG. 66 is an explanatory drawing of the drive system for the display unit of the present invention.

By connecting signal pulses 1261*a* and 1261*b*, as shown in FIG. 66, the points of change in FIG. 65 are reduced. Accordingly, the amount of power consumed at the points of change is halved in comparison to FIG. 65.

The calculations for these are simple. In MLS calculations, the required voltage is V1 and V2 (otherwise, number 3 corresponding to voltage due to the fact that the 5 segment voltages-V2, V1, VC, MV1 and MV2—can be expressed in 3 bits). Additionally, the PWM method has been implemented under MLS calculations at each bits/byte. Each bits is set at a period of one pulse. For example, in the case of 16 graduations, the period of the 4th bits is 8 and the 1st bits is 1. In the case of 8 graduations, the period of the 3rd bits is 4 and the 1st bits is 1. Furthermore, the above conditions the same for normal PWM drives.

In other words, the pulse width is weighted at each of the required bits and voltages should be added. As a result, the period of the V2 voltage is L1, V1 is L2, VC is L3, MV1 is L4 and MV2 is L5. The calculations (additions) can be output from the segment signal line in response.

Figure 67:
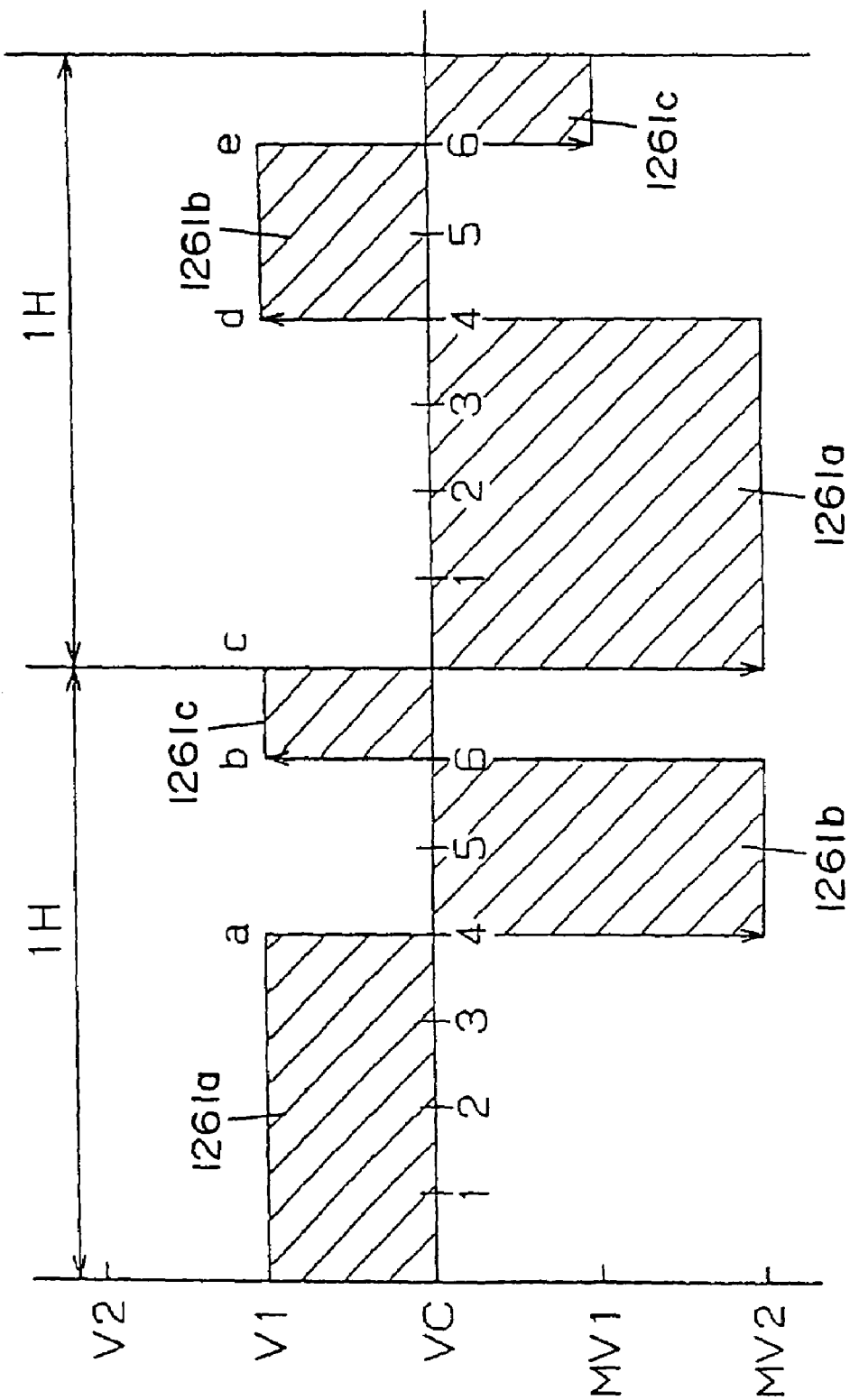
FIG. 67 is an explanatory drawing of the drive system for the display unit of the present invention.
Figure 68:
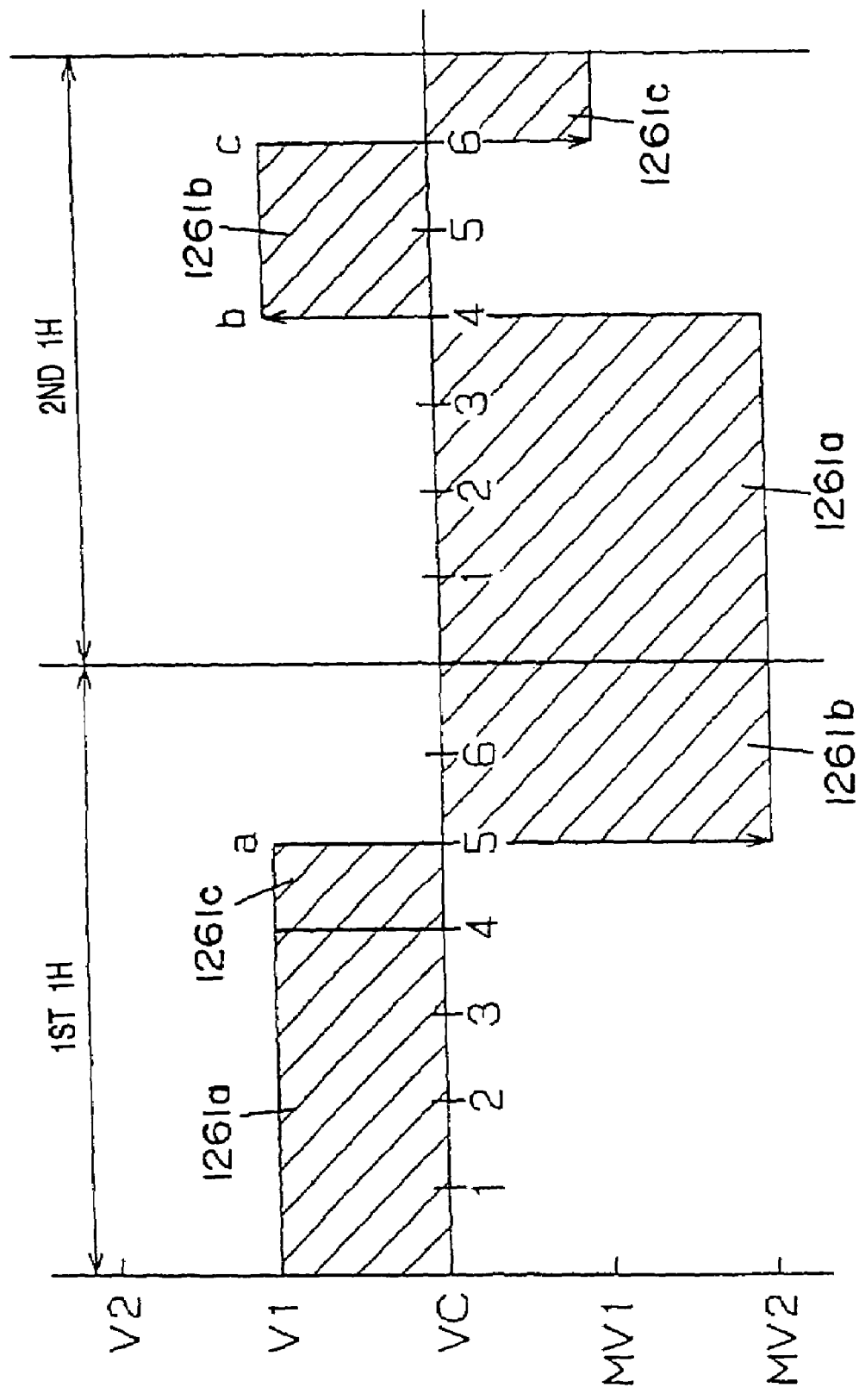
FIG. 68 is an explanatory drawing of the drive system for the display unit of the present invention.

FIG. 67 shows the PWM waveform of the dual (2H) horizontal scanning period. There are 5 points of change—a, b, c, d and e. As shown in FIG. 68, the points of change by calculation are a, b and c. Also, FIG. 68 shows the point of connection of the 2H period signal pulse 1261*a* and the 1H period signal pulse 1261*b*. Simply put, the points of change are reduced by adding the 2H periods together. This is a simple calculation. The process of calculation can be implemented through the 2H period.

Furthermore, all or part of the segment driver IC14 function and part or all of the controller 281 function can be molded as one with the display part 107 using a low temperature polysilicon technique. The low temperature polysilicon process is conducted at a temperature of under 600 degrees and can use large glass boards similar to those for SITFT amorphous. At this process temperature, the stable, high through-put crystallized technology can be established. The moving degree of the TFT, which uses low temperature polysilicon for the low temperature process, is approximately 300 cm2 V1 ·S−1. Approximately 10 MHz of operation in the logic circuit is possible and it adequately covers the microcomputer clock 4 MHz in cellular phones.

By using low temperature polysilicon technology, a picture controller and driver can be built into the display panel. Multiple picture signals are input into the panel in which they are controlled and displayed. In comparison to the separate attachment of a circuit, the reduction in power consumption, low cost and the narrow frame shape can be possible.

In the 1st frame, odd (1) and even number (2) lines, then in the 2nd frame, even (2) and odd (1) number lines can be connected. This process wipes out the slowness in the liquid crystal start up and shut down because the transmission rate variations are decreased by the pulse width. Additionally, the even and odd lines in the 2nd frame and the odd and even number lines in the 4th frame can be connected.

Ideally, the above embodiments should be applied to other embodiments. For example, applying them to connection methods of the dummy pulse 1701 and the calculation pulse: 1321.

Figure 69:
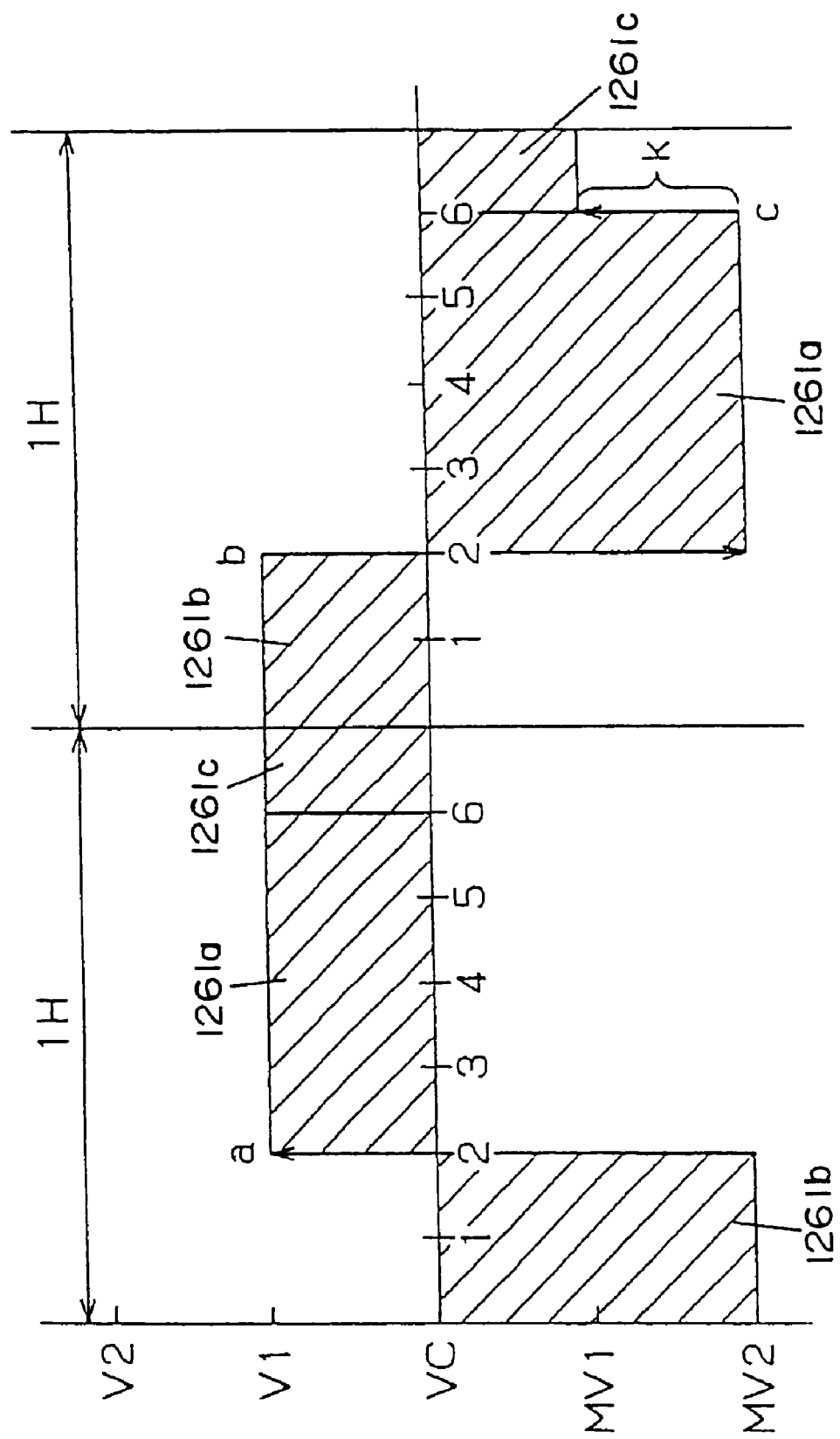
FIG. 69 is an explanatory drawing of the drive system for the display unit of the present invention.

In FIG. 68, the 1st IH period signal pulse 1261b and the 2nd 2H period signal pulse were connected. However, there are other methods, such as is shown in FIG. 69. In FIG. 69, there are also three points of change—a, b, and c. The point of change C is from MV2 to Mv1 (change k). It is ½ in contrast to the change from V1 to MV1 at point C of FIG. 68. Accordingly, power consumption is more possible in FIG. 69 due to the small change in voltage.

As shown above, a number of calculation results occur even within the same PWM waveform by reducing the size of the changes. The most appropriate calculation can be achieved by calculating while taking the amount of change into consideration.

Figure 70:
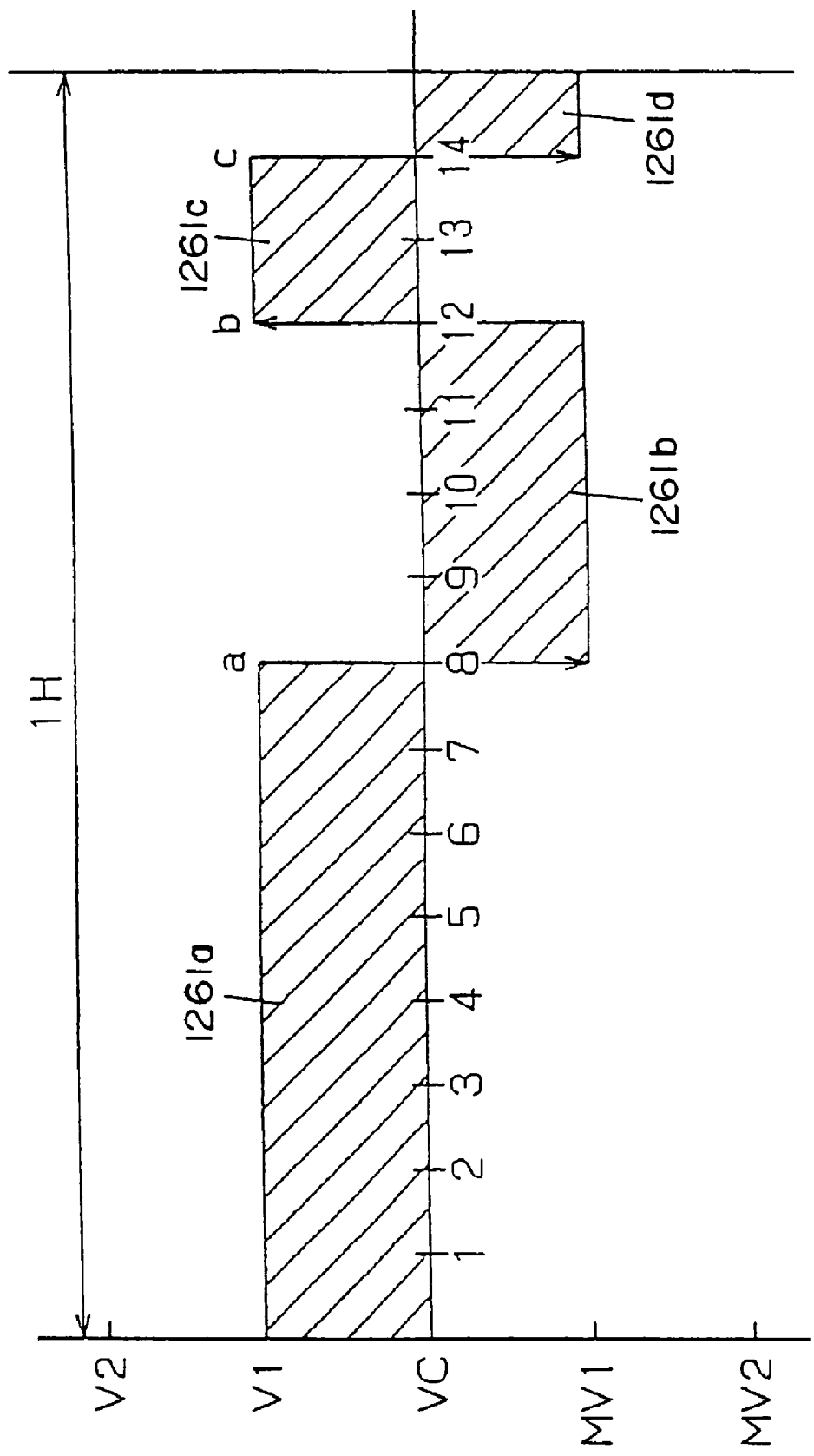
FIG. 70 is an explanatory drawing of the drive system for the display unit of the present invention.
Figure 71:
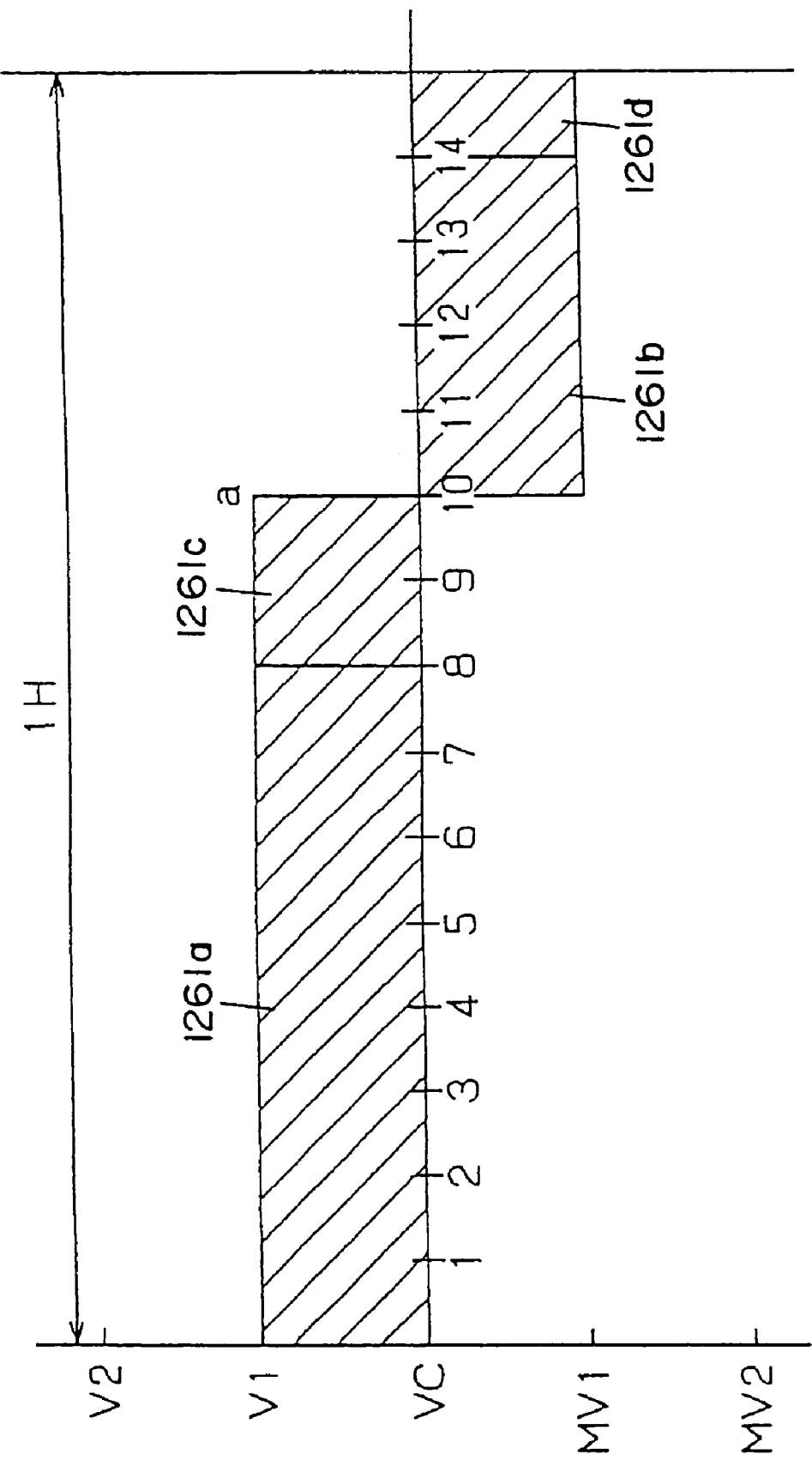
FIG. 71 is an explanatory drawing of the drive system for the display unit of the present invention.

FIG. 70 is concerned with 15PWM. There are 3 points of change—a, b and c. By conducting the process as shown in FIG. 71, the point of change becomes a. As a result, the power used at the point of change is ⅓.

Figure 72:
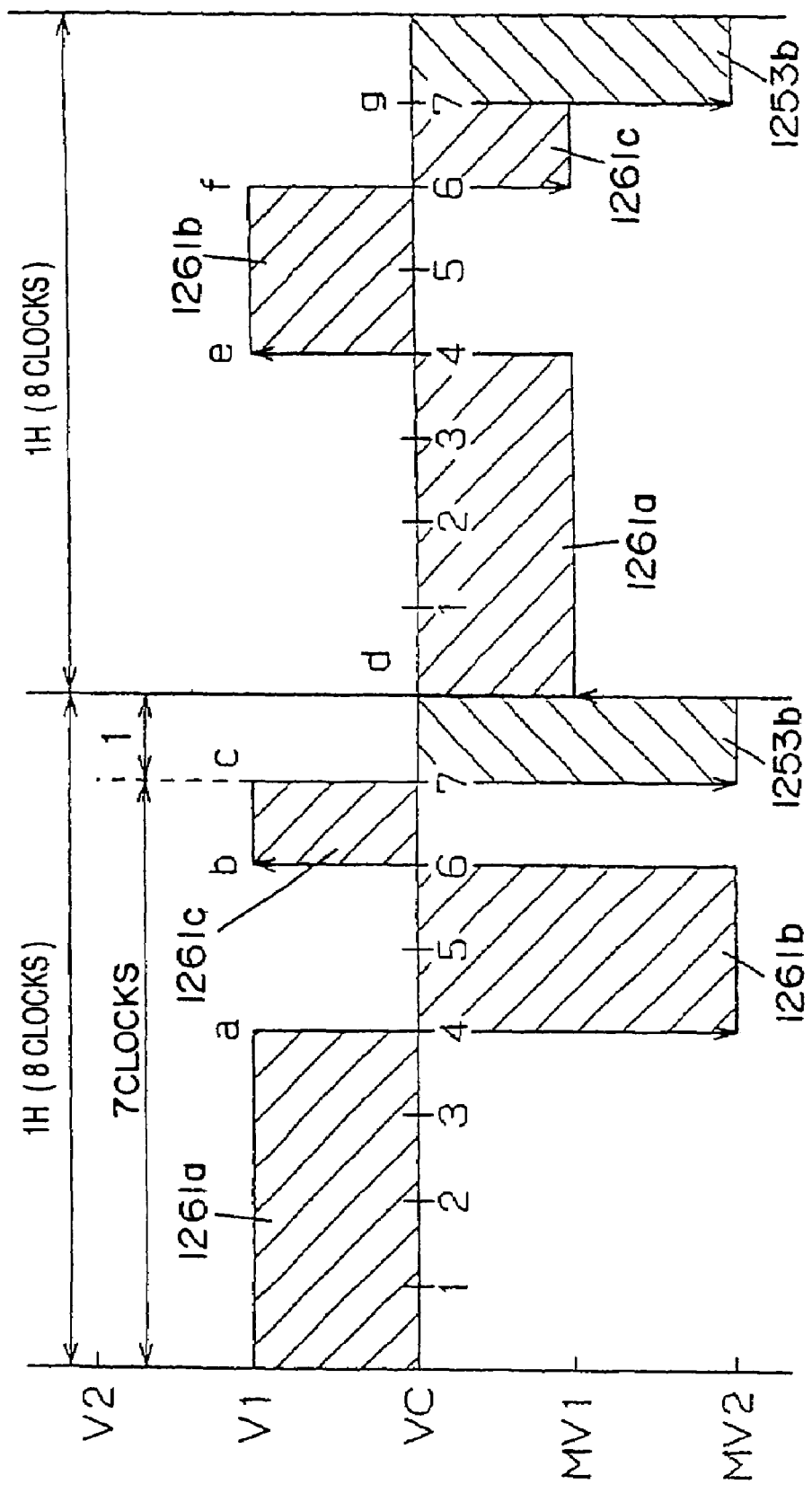
FIG. 72 is an explanatory drawing of the drive system for the display unit of the present invention.

FIG. 72 is an example of the impression of one dummy pulse 1253 onto 7PWM. Accordingly, a 1H clock becomes 8 clocks with 2 multipliers. This makes circuit configuration simple. Similarly, if the one-pulse dummy pulse method is used in 15PWM, it then becomes 16 clocks with 2 multipliers. In other words, in the PWM method, when adding a dummy pulse, making sure there are 2 multipliers for the 1H clock can produce the benefits of simple circuit configuration.

Figure 73:
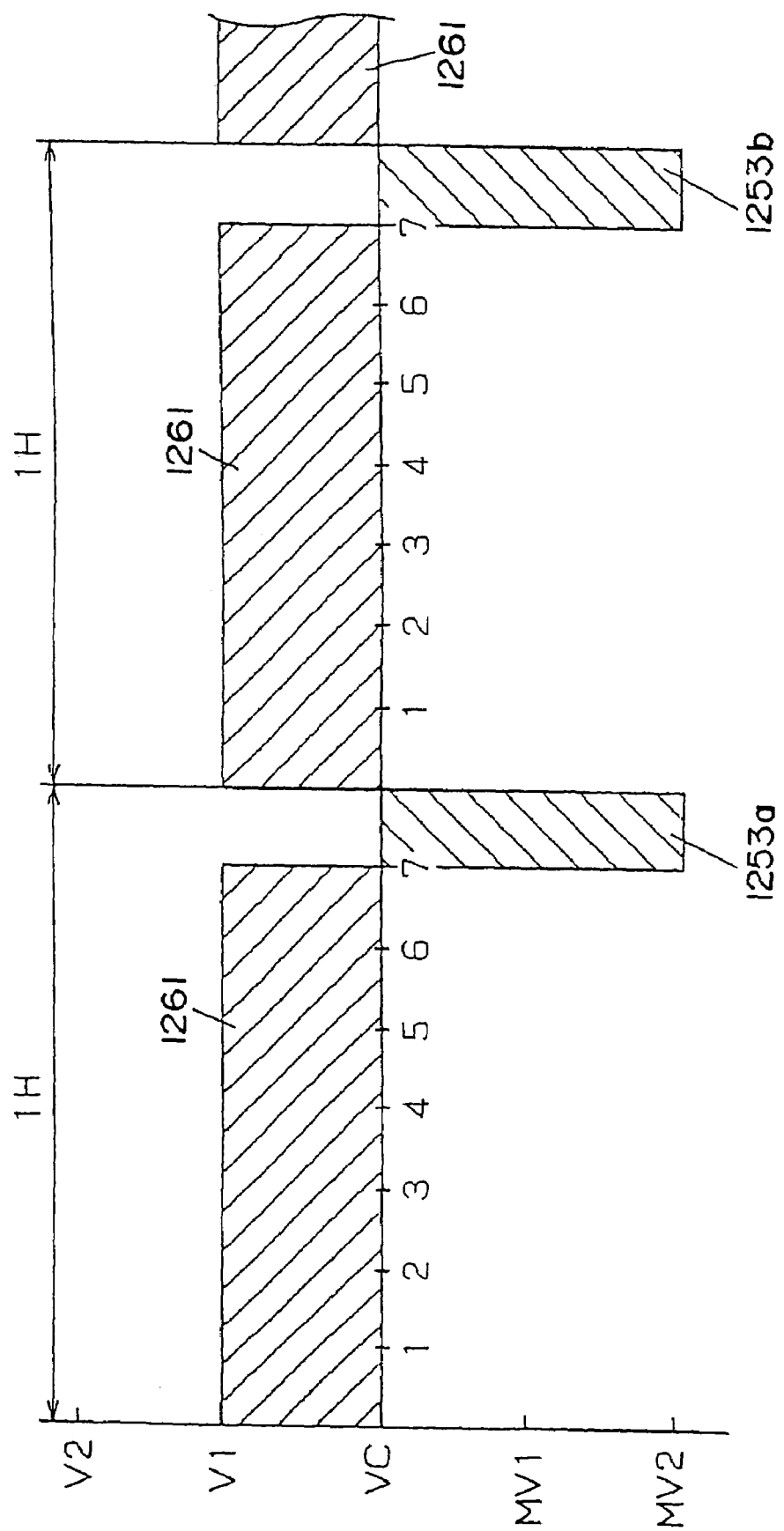
FIG. 73 is an explanatory drawing of the drive system for the display unit of the present invention.

Furthermore, the above does not apply only to the PWM method, but also, for example, the FRC method in FIG. 73 (the signal pulse 1261 width becomes 7 clocks and the dummy pulse 1253 becomes 1 clock). The signal is created so that 1H-scanning period becomes 8 clocks. As a result, the circuit configuration is simplified. By configuring in such a way that there are 2 multipliers for the signal pulse period and dummy pulse period (so that 1H clock has 2 multipliers). The benefit of easy circuit configuration is produced.

Figure 74:
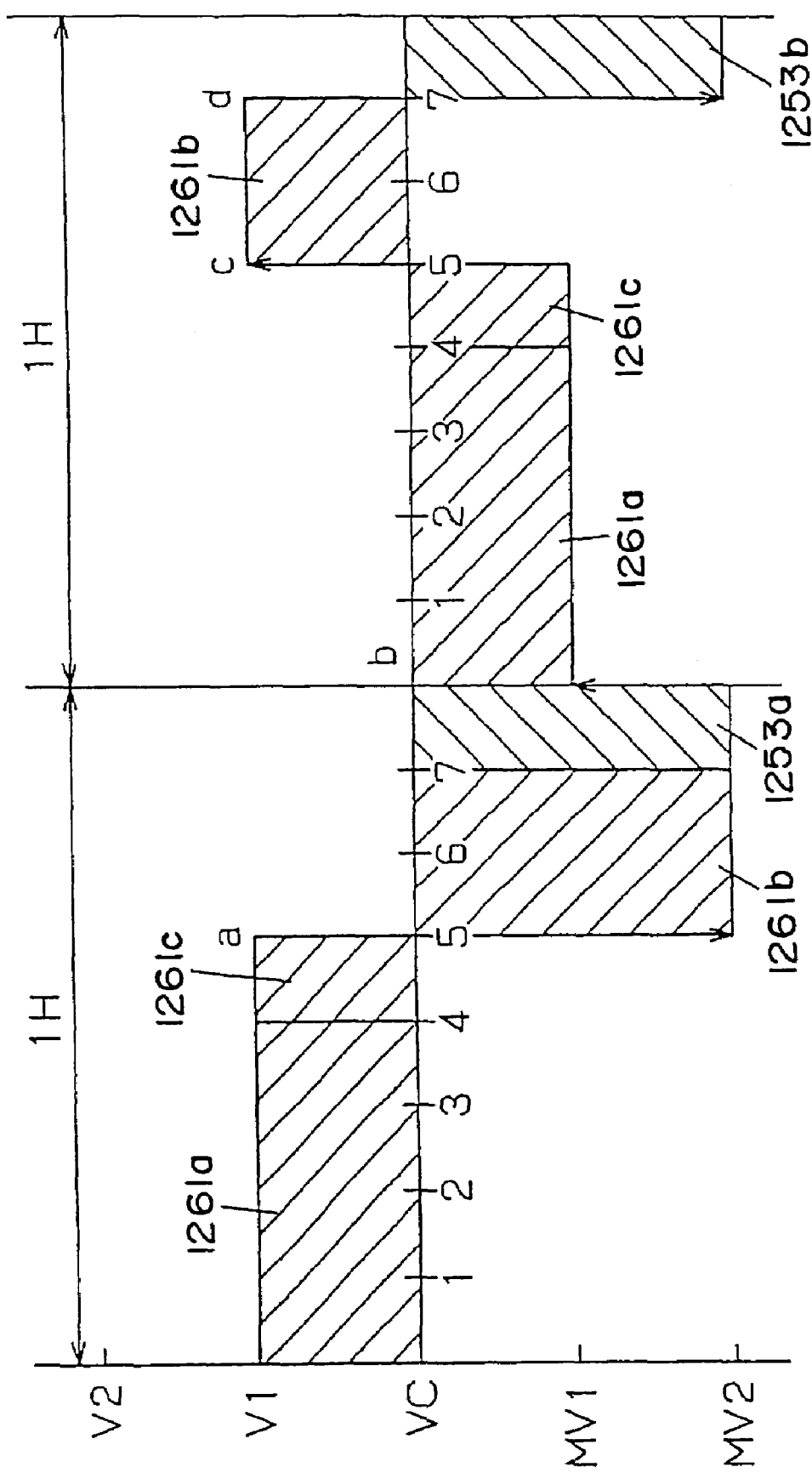
FIG. 74 is an explanatory drawing of the drive system for the display unit of the present invention.

In FIG. 72, there are 7 points of change in 1H—a, b, c, d, e, f, g—and as shown in FIG. 74, the points of change are reduced to 4 (a, b, c, d) by implementing the calculation process. As a result, a large reduction in power consumption can be achieved.

Figure 75:
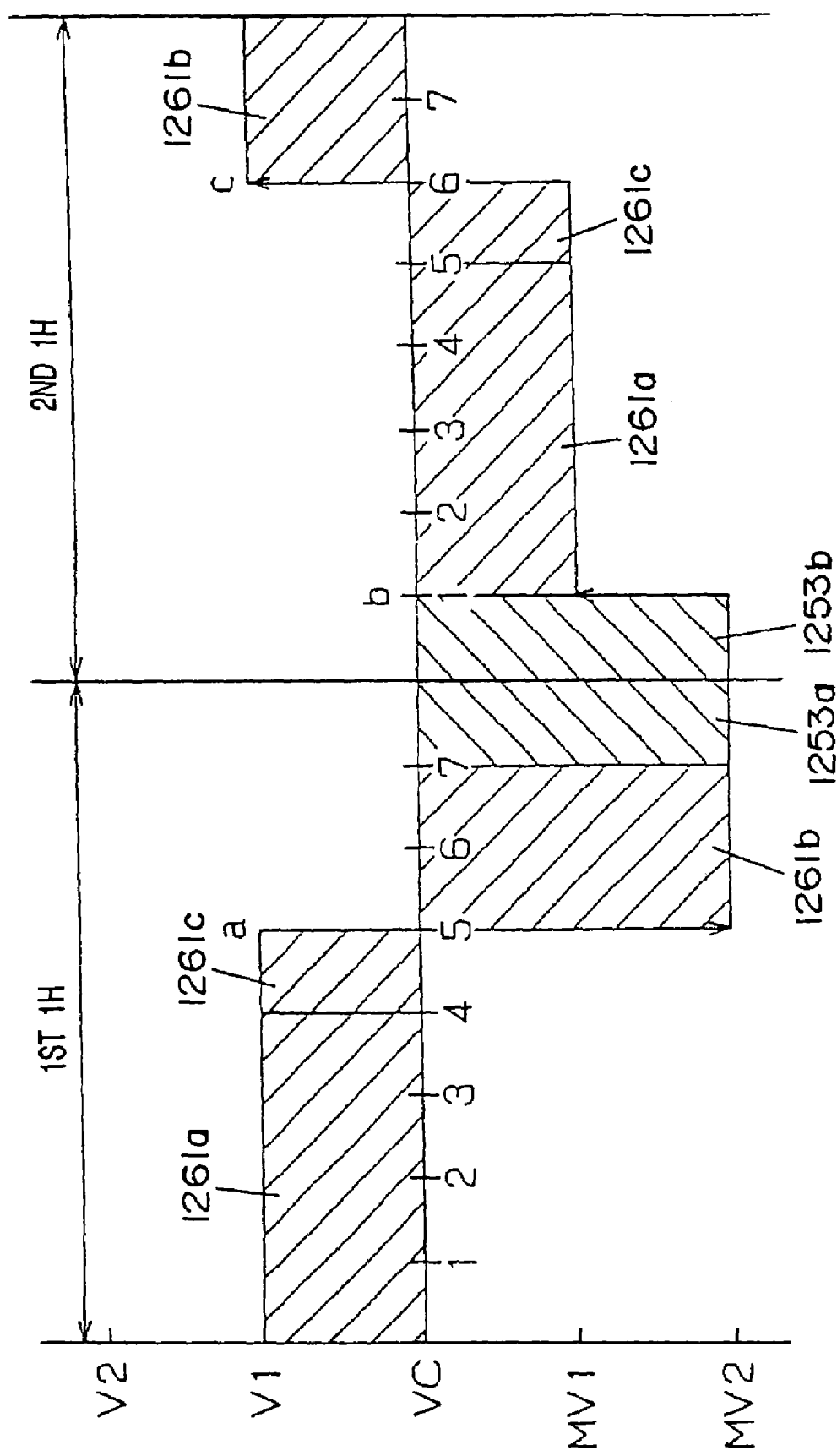
FIG. 75 is an explanatory drawing of the drive system for the display unit of the present invention.

FIG. 75 is characterized be the connection of the 1st H period dummy pulse 1253a and the 2nd H dummy pulse 1253b. In other words the dummy pulse is placed at the end of 1H in the odd number horizontal scanning period and the beginning of the even number horizontal scanning period. By changing the dummy pulse positions in this way, the number of points of change can be reduced.

Figure 76:
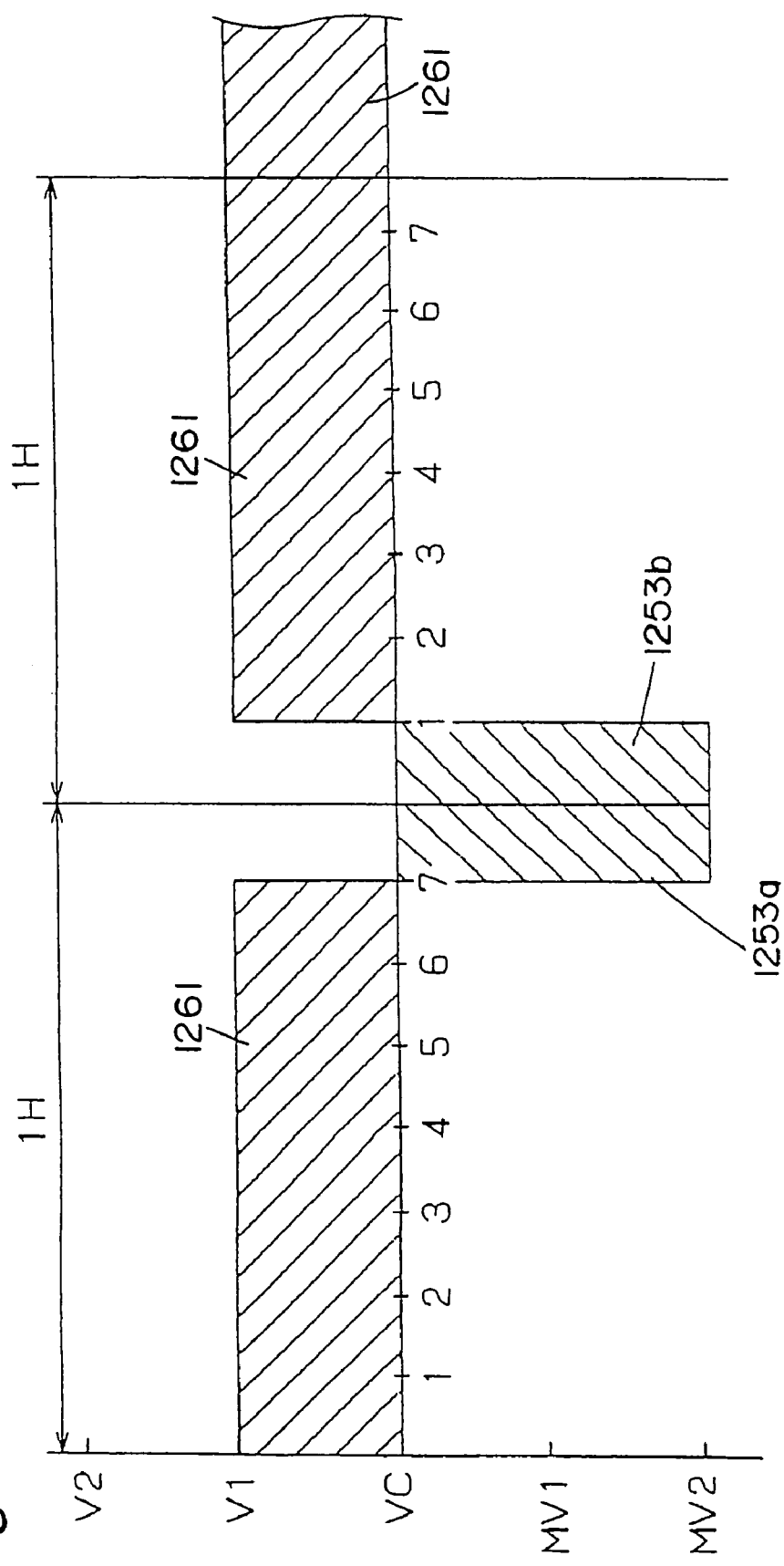
FIG. 76 is an explanatory drawing of the drive system for the display unit of the present invention.

The above does not apply only to the PWM method, but also, for example, the embodiment of impressing a dummy pulse using the FRC method. The dummy pulse 1253 is for 1 clock. By connecting the dummy pulse as in FIG. 76, the number of change points decrease and a reduction in power consumption is achieved. There is no need for calculations in FIG. 76. Simply put, the dummy pulse is placed at the end of 1H in the odd number horizontal scanning period and the beginning of the even number horizontal scanning period. In this way, changing the dummy pulse at odd and even horizontal scanning periods using the FRC method can reduce the number of points of change.

Figure 77:
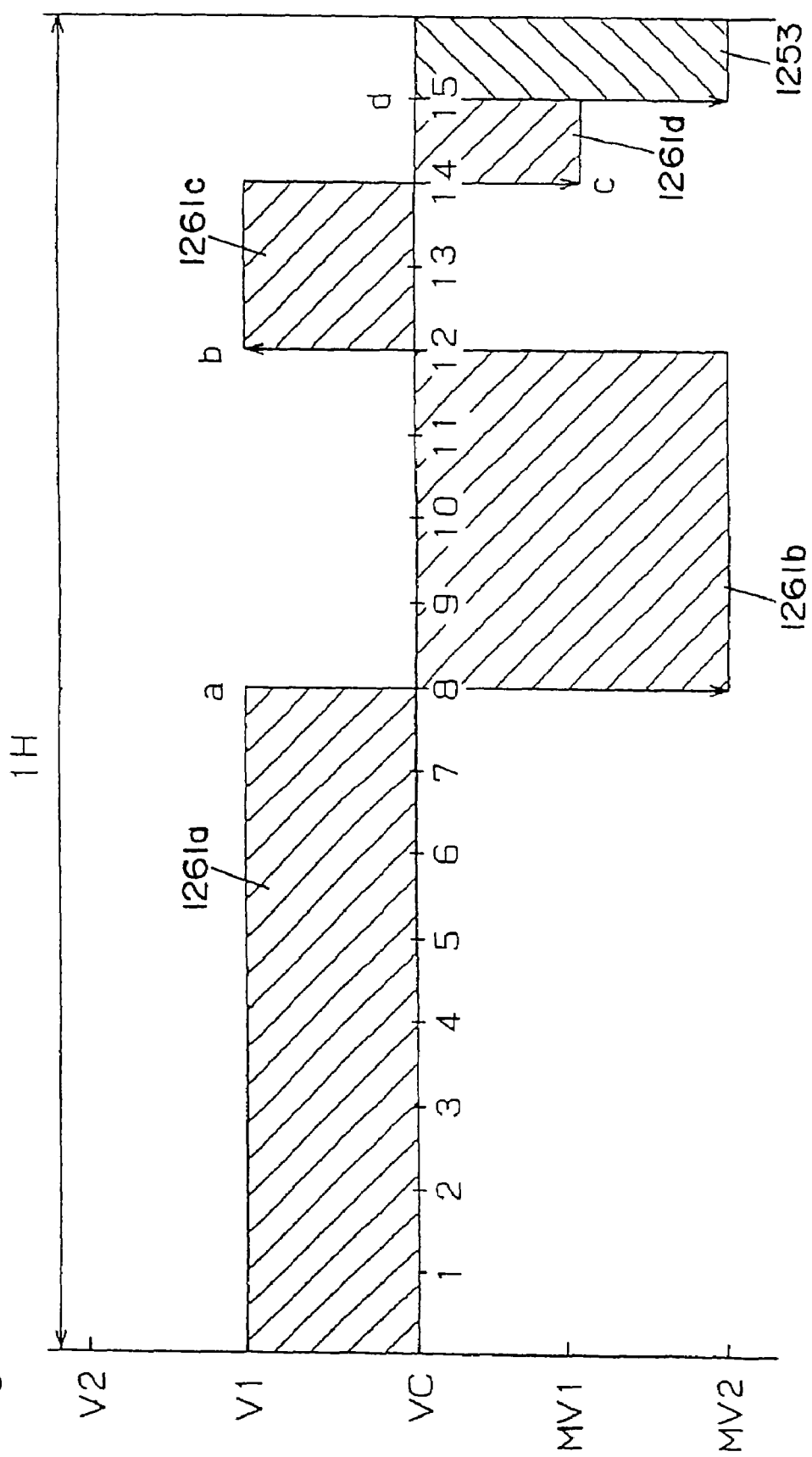
FIG. 77 is an explanatory drawing of the drive system for the display unit of the present invention.
Figure 78:
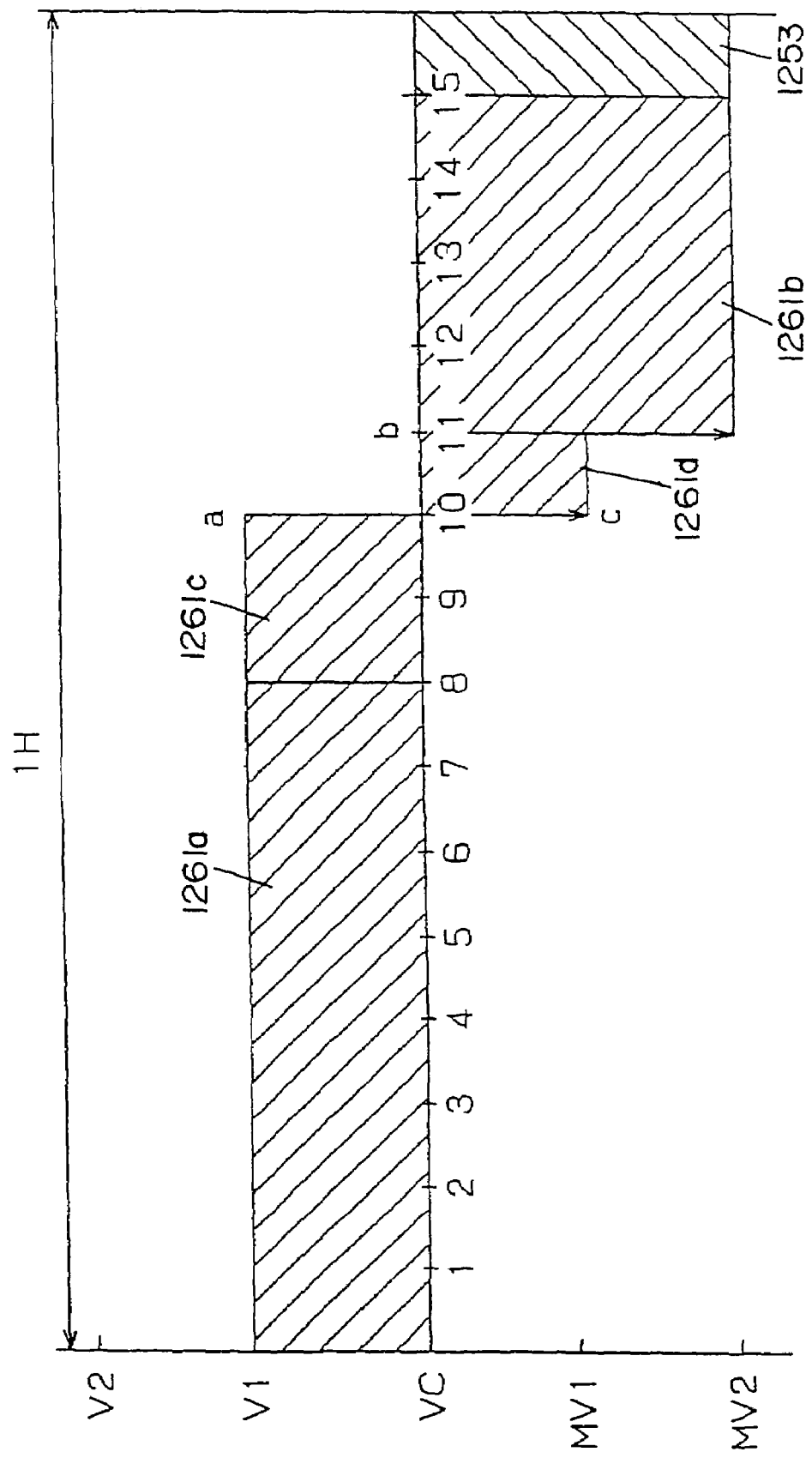
FIG. 78 is an explanatory drawing of the drive system for the display unit of the present invention.
Figure 79:
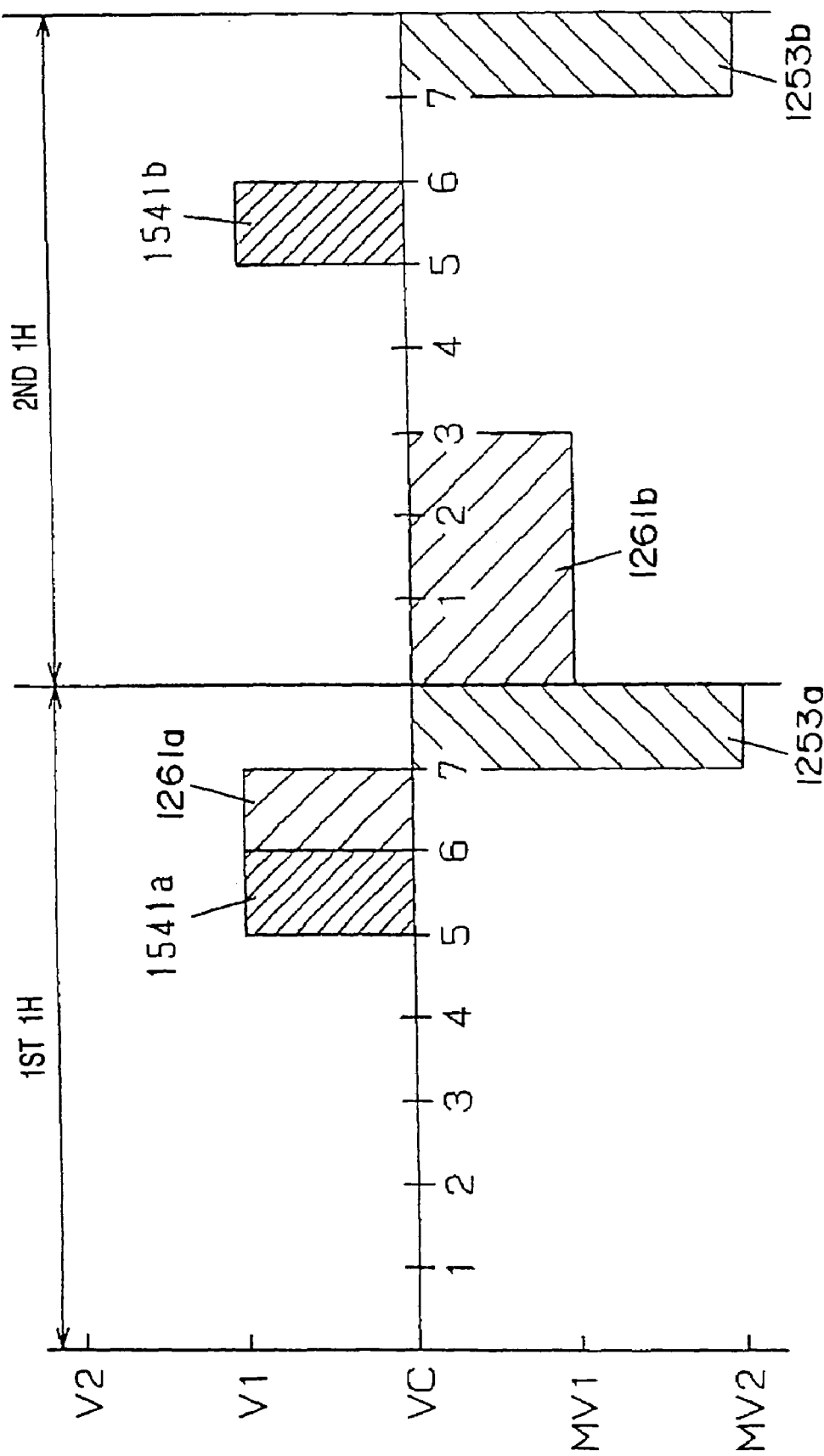
FIG. 79 is an explanatory drawing of the drive system for the display unit of the present invention.

FIG. 77 is the embodiment by impressing 1 dummy pulse using the PWM method. At 1H, there are four (a, b, c and d) points of change are reduced to 4 (a, b, c, d) by implementing the calculation process. As a result, a large reduction in power consumption can be achieved.

Additionally, the straight polarity V1 & V2 voltages are concentrated in the first half of the 1H and the negative polarity MV1 and MV2 voltages are concentrated in the latter half. By doing so, a reduction in the number of points of change can be achieved.

Also, in the odd numbered horizontal scanning period, the straight polarity V1 & V2 voltages are concentrated in the latter half of the 1H and the negative polarity MV1 and MV2 voltages are concentrated in the first half. By implementing this process, a reduction in the number of points of change in signal waveforms can be achieved, making it an ideal process.

LCD panels, including STN LCD panels, differ in the red (R), green (G) and blue (B) electric optical characteristics (gamma properties). In particular, in the STN LCD pixel, if the film phase compensation is not perfectly in sync in RGB, due to the fact that oval polarized light becomes linear polarized through the film compensations the gamma properties curve being uneven. Furthermore, the gamma curve differs in RGB due to the fact that their light emitting materials and laminating configurations are different.

The synchronization of this gamma properties curve is indeed extremely difficult. In the present invention, a compensating pulse 1541 is impressed onto the segment signal, as shown in 178. The compensating pulse 1541 changes the effective value impressed onto the segment signal. Accordingly, the electric optical characteristics (gamma properties) can be adjusted at R, G or B through the compensation pulse.

The compensation pulse is applied to at least one of the R, G or B signals. By doing so, the impressed signal gamma properties are changed. The amount of compensation changes by adjusting the pulse width and the time of impression of the compensation pulse 1541. As a result, the synchronization of the RGB gamma properties can be done well by adjusting the amount of compensation.

Also, a reduction in power consumption can be achieved by connecting the compensation pulse 1541 and signal pulse 1261 as illustrated in FIG. 66.

The explanation given above is for the MLS drives PWM method, but it is not limited to this method. The explanation can also be applied to normal PWM drives. Also, neither is it limited to simple matrix-type display panels, but can also be applied to active matrix-type display panel, for example, because the fundamental technology concepts are shared regarding the reduction of power consumption through the connection of signal pulse 1261. Furthermore, this explanation is not limited to LCD panels, but can also be applied as a drive method for organic EL (OLED) display panels.

Figure 80:
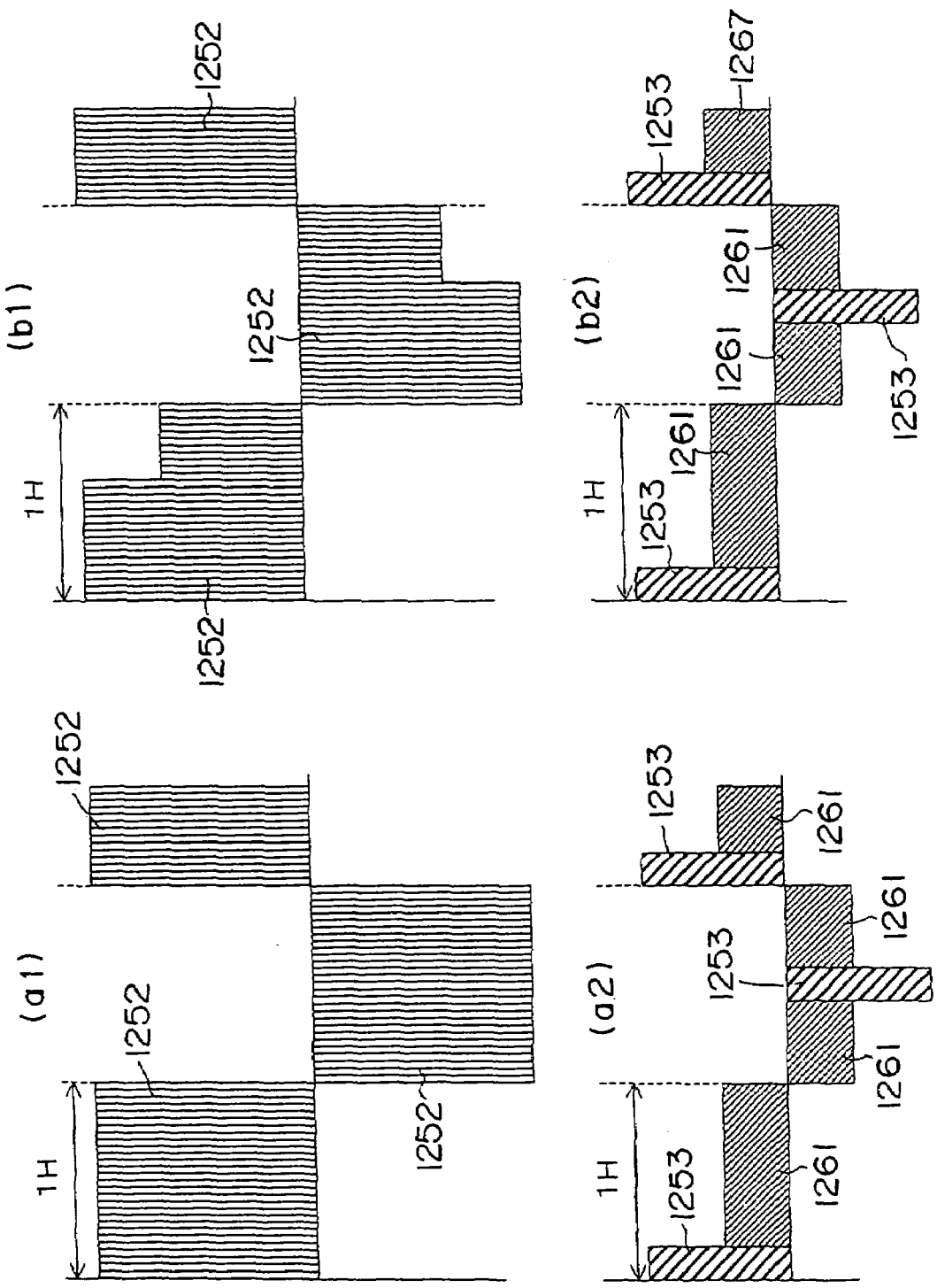
FIG. 80 is an explanatory drawing of the display unit of the present invention.

The above embodiments are what control the segment signal side (please refer to FIGS. 80(a1) and (a2)). However, as shown in FIGS. 80(b1) and (b2), two short waved common signals (1252) can be used (indicated by a and b, please refer to FIG. 26). Simply put, a dummy pulse can be impressed onto the segment signal side 1252 or 1253, or both.

Figure 81:
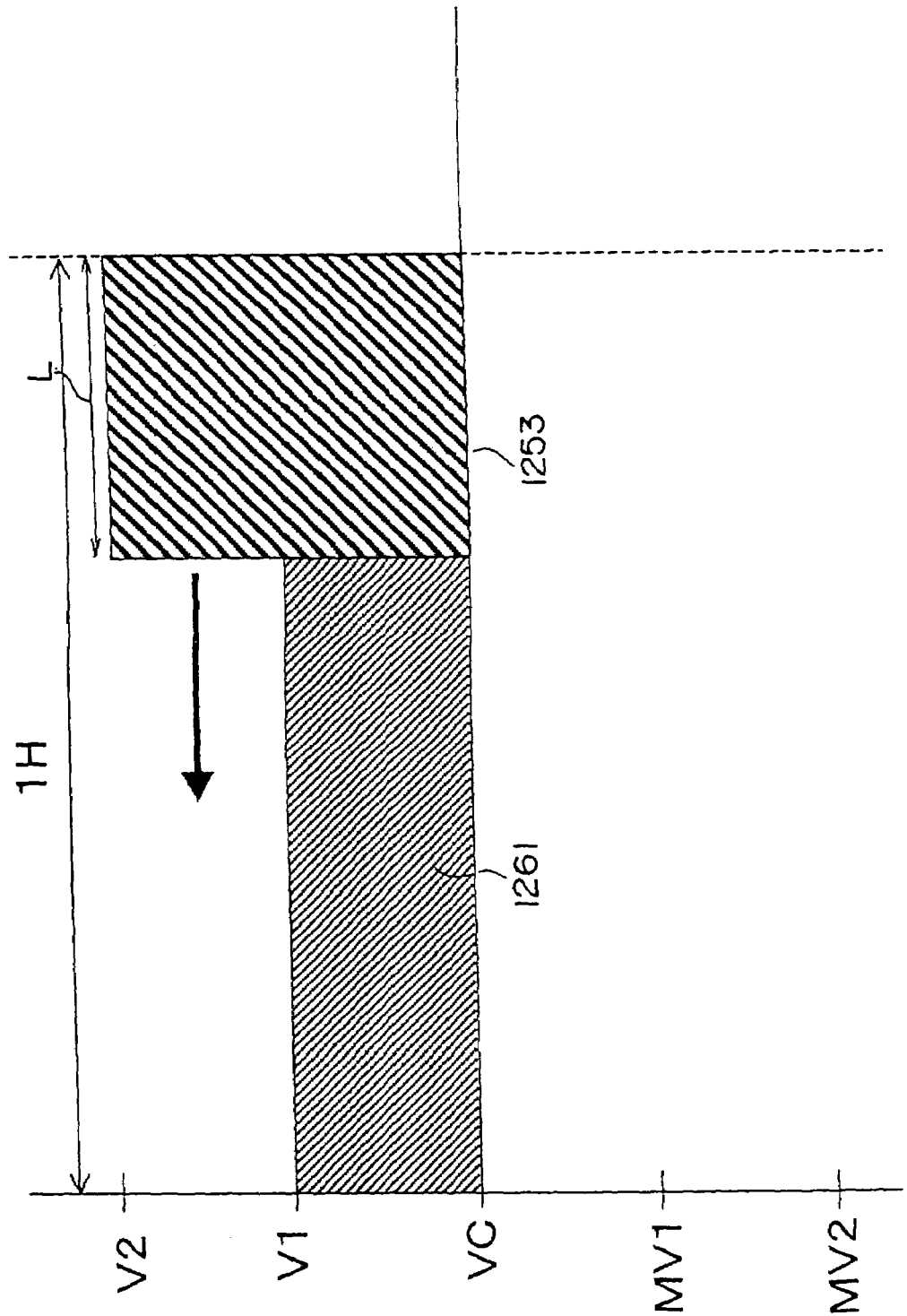
FIG. 81 is an explanatory drawing of the drive system for the display unit of the present invention.

Additionally, the dummy pulse 1253 changes the effective value voltage applied to the liquid crystal layer. As a result, changing the width L of the dummy pulse 1253 can alter the level of brightness, as shown in FIG. 81. The larger L is, the larger the effective value voltage attached to the liquid crystal layer becomes. Conversely, the smaller the L, the smaller the liquid crystal layer becomes. Adjustment is possible by the user through the pressing of the information display unit button 256.

The common voltage (V3, MV3) amplitude can be reduced by impressing a dummy pulse 1253. However, it also means that the dummy pulse lowers the bias ratio and therefore the ON/OFF ratio as well. The ON/OFF ratio can be thought of as the contrast. The larger the value, the clearer the difference in black & white can be displayed, enhancing the contrast.

The more common signal lines (scanning lines) there are in the simple matrix-type LCD panel, the word the ON/OFF ratio becomes. For example, because the scanning line splits in the center of a 480 VGA panel (2 parts), n=240 lines. In the VGA panel, the ON/OFF ratio is 1.06458. Similarly, when the scanning lines are 600 (n=300), the ON/OFF ratio is 1.0556, and when the scanning lines are 768 (n=384), the ON/OFF ratio is 1.04654 in the XGA panel. These values are not reliant on liquid crystal materials and only relate to the number of scanning lines—n.

Figure 82:
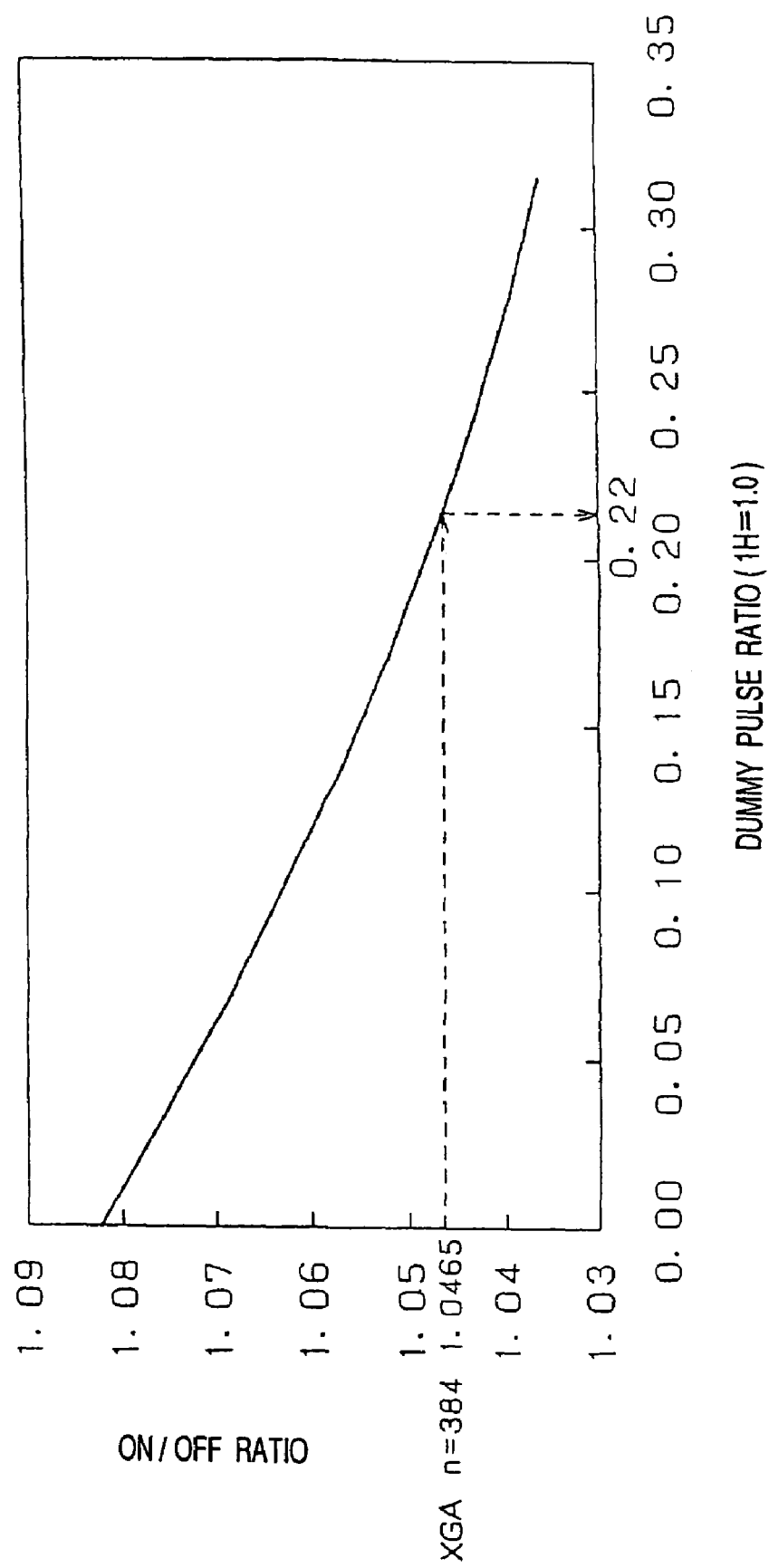
FIG. 82 is an explanatory graph view of the drive system for the display unit of the present invention.

FIG. 82 shows the dummy pulse ratio listed in the horizontal axis. The dummy pulse ratio refers to the dummy pulse width (ratio) covers in the one-horizontal scanning period (1H). Furthermore, the ON/OFF ratio is listed in the vertical axis in FIG. 82.

Figure 83:
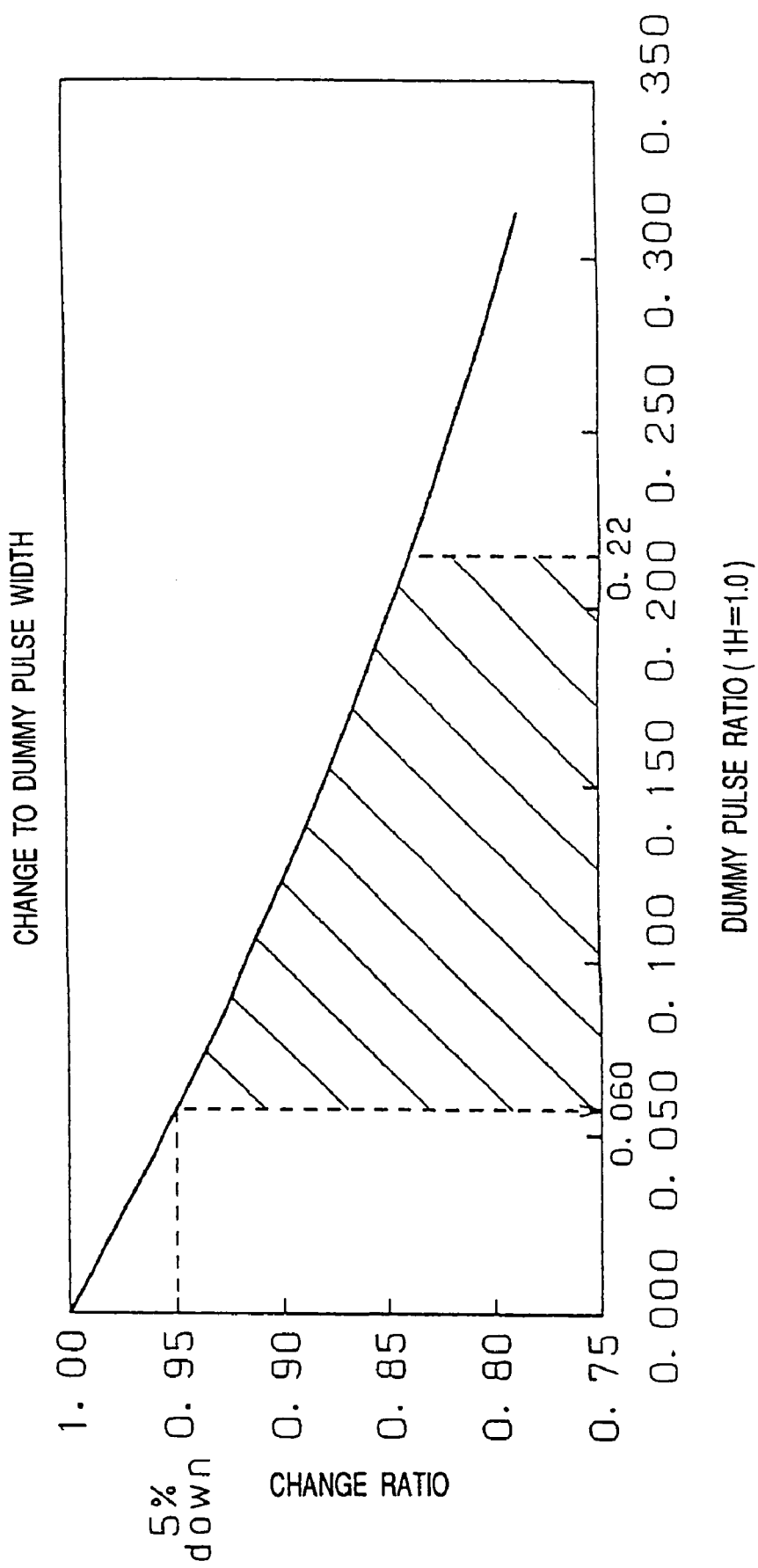
FIG. 83 is an explanatory graph view of the drive system for the display unit of the present invention.

FIG. 83 also shows the dummy pulse ratio listed in the horizontal axis. The vertical axis lists the change ratio. The change ratio refers to how much of a reduction in V3 (MV3) voltage has occurs through the impression of a dummy pulse (in the case of signal pulses 1261 covering all periods of the one horizontal scanning period (1H)) making the V3 (MV3) voltage value 1.

In the simple matrix-type LCD panel, the display that can be tolerated is most likely XGA as a picture display. The reason being that it has been or is being commercialized. In the XGA mode, the ON/OFF ratio is 1.0465 Looking at this value in FIG. 110 as a horizontal scanning line sequel (1H=22%), it cannot be said that the curved lines and crossing dummy result of 0.22, or a reduction benefit of 1 to 2% by impressing the technology onto a M3 have been of any technological benefit to the situation, which needs to be 5%. Looking from the 5% (0.95) reduction position point on the vertical axis to the horizontal axis, the crossing point with curved lines is a the dummy pulse ratio of 0.060 (6% of 1H).

From the above information, it is noted that the ideal range is no under 0.22 and above 0.06 (indicated by the shaded area in FIG. 83). The change ratio of this range is between 0.83 and 0.95, which is more than adequate to achieve low voltage. Furthermore, the ON/OFF ratio XGA is adequate in a practical sense at above 1.0465.

The explanation given above is for simple matrix-type display panels but is not limited to them as such. It can also be applied to active matrix-type display panel. Through the dummy pulse 1253, which has many signals that have a lot of high frequency components in it, being impressed onto the liquid crystal layer, flickering can be suppressed and the level of brightness adjusted.

In FIG. 1, common driver IC15a and 15b have been attached (or molded) to both ends of the segment driver IC14, but not limited to this. For example, a common driver IC15 can be placed at one end adjoining the segment driver IC14. Furthermore, in FIG. 50, the thick solid line areas where the common signal 205 has been juxtaposed and molded. As a result, the C part (bottom of screen) the corresponding number of scanning signal lines 205 have been molded and juxtaposed, and at point D, one line has been molded and juxtaposed. Furthermore, as shown in FIG. 1, when two common drivers—15a and 15b—are used, the number of scanning lines of the common signal 205a becomes ½ (because half each of the common signal lines can be placed at the right and left of the screen). As a result, the frame can be spread evenly across the screen.

Figure 51:
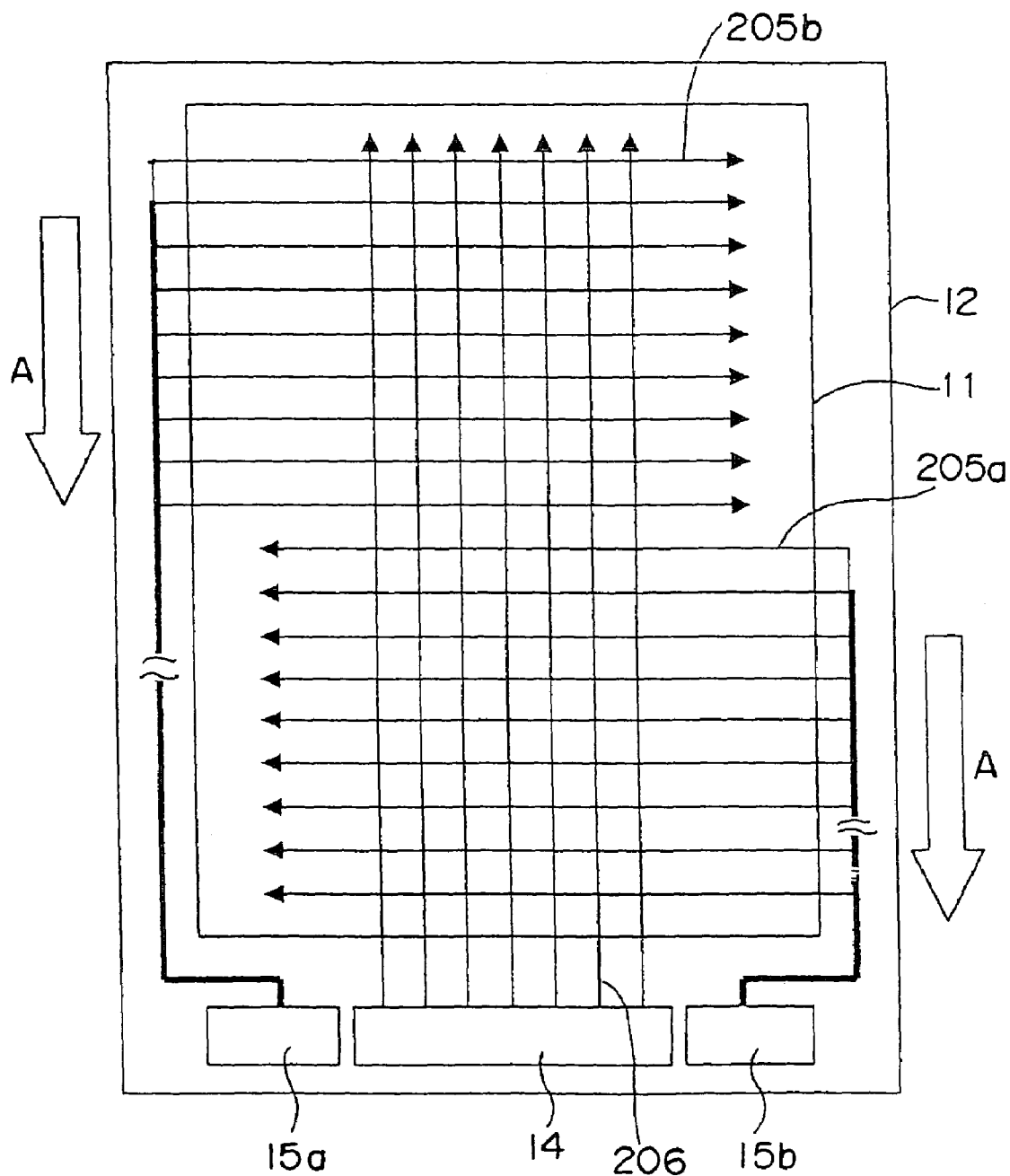
FIG. 51 is a schematic plan view of the display unit of the present invention.

The present invention is also characterized by the screen split and direction of the scanning of the common signal line 205. For example, as shown in FIG. 51, the common driver 15a is connected with the common signal line 205b at the top part of the screen. Also, the common driver 15b is connected with the common signal line 205a at the bottom part of the screen. As the indicated by the arrow A, the scanning direction of common signal line 205 also goes from the top to the bottom part of the screen. Furthermore, the segment signal line 206 goes in the same direction.

Figure 52:
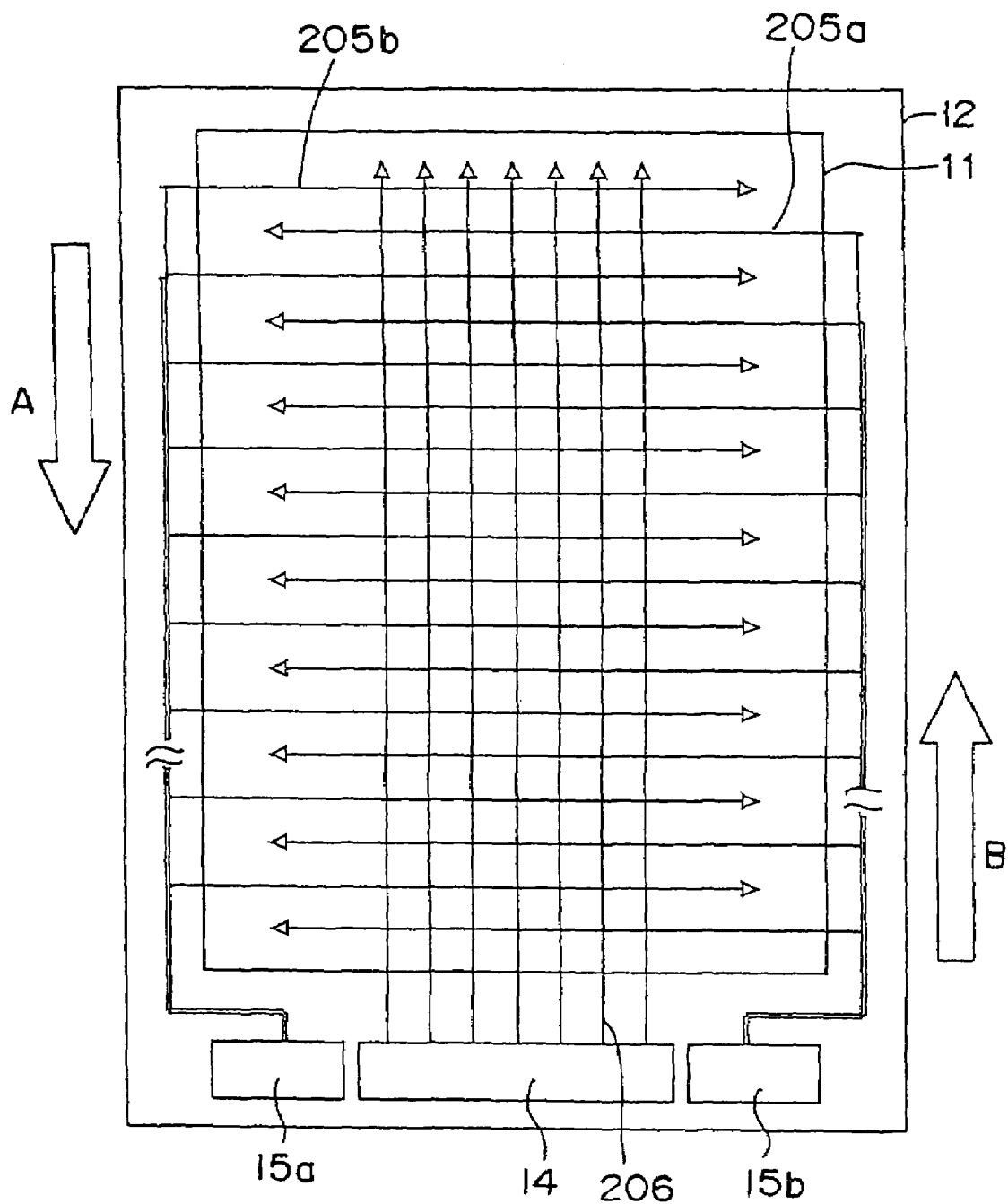
FIG. 52 is a schematic plan view of the display unit of the present invention.

In FIG. 52, the common driver 15a is connected differently with the common signal line 205 at the top of the screen. The common driver 15a is connected with the odd numbered common signal line and the common driver 15b is connected with the even numbered common signal line. The direction of the common signal lines are seen as the common signal line 205b going from the top of the screen to the bottom (arrow A) and the common signal line 205a going from the bottom to the top (arrow B). By connecting the common signal lines 205 to the common driver IC15 in this way as well as setting the direction of the common signal line scanning method, it is possible to suppress the occurrence of flickering and there are no brightness incline occurrences in screen 107.

Additionally, segment signal 206 follows the same direction of top to bottom. However, it can also be split at the top and bottom of the screen. This is also applicable for the following embodiments.

In FIG. 53, the common driver 15a is connected with the common signal line 205b at the top of the screen and the common driver 15b is connected with the common signal line 205a at the bottom of the screen. As the indicated by the arrow A, the scanning direction of common signal line 205b also goes from the top to the bottom part of the screen and as indicated by arrow A, the scanning direction of common signal line 205a, the scanning direction of common signal line 205a goes the bottom to top part of the screen. Furthermore, the segment signal line 206 also goes from the top to bottom of the screen. By connecting the common signal lines 205 to the common driver IC15 in this way as well as setting the direction of the common signal line scanning method, it is possible to suppress the occurrence of flickering and there are no brightness incline occurrences in screen 107.

Also, in FIG. 53, the segment driver IC14 and common driver IC15 are controlled by one chip (1 chip driver IC14a). By making it one chip, then only one chip needs to be attached to the display panel 21. Accordingly, mounting cost reductions can be achieved. Also, various voltages used within the one chip driver IC can be used simultaneously. The one-chip driver IC14a is a semiconductor wafer made from silicon and although mounted to the display panel 21, it is not limited to that material. Other material technology such as high and low temperature polysilicon technology can also be used from display panel 21 and directly molded onto it. Naturally, the driver IC that drives the top part of the screen is placed in the top part of the screen and the driver IC that drives the bottom part of the screen is placed in the bottom part of the screen (in other words, there are two IC chips). The above details can also be applied for other invention embodiments.

Figure 54:
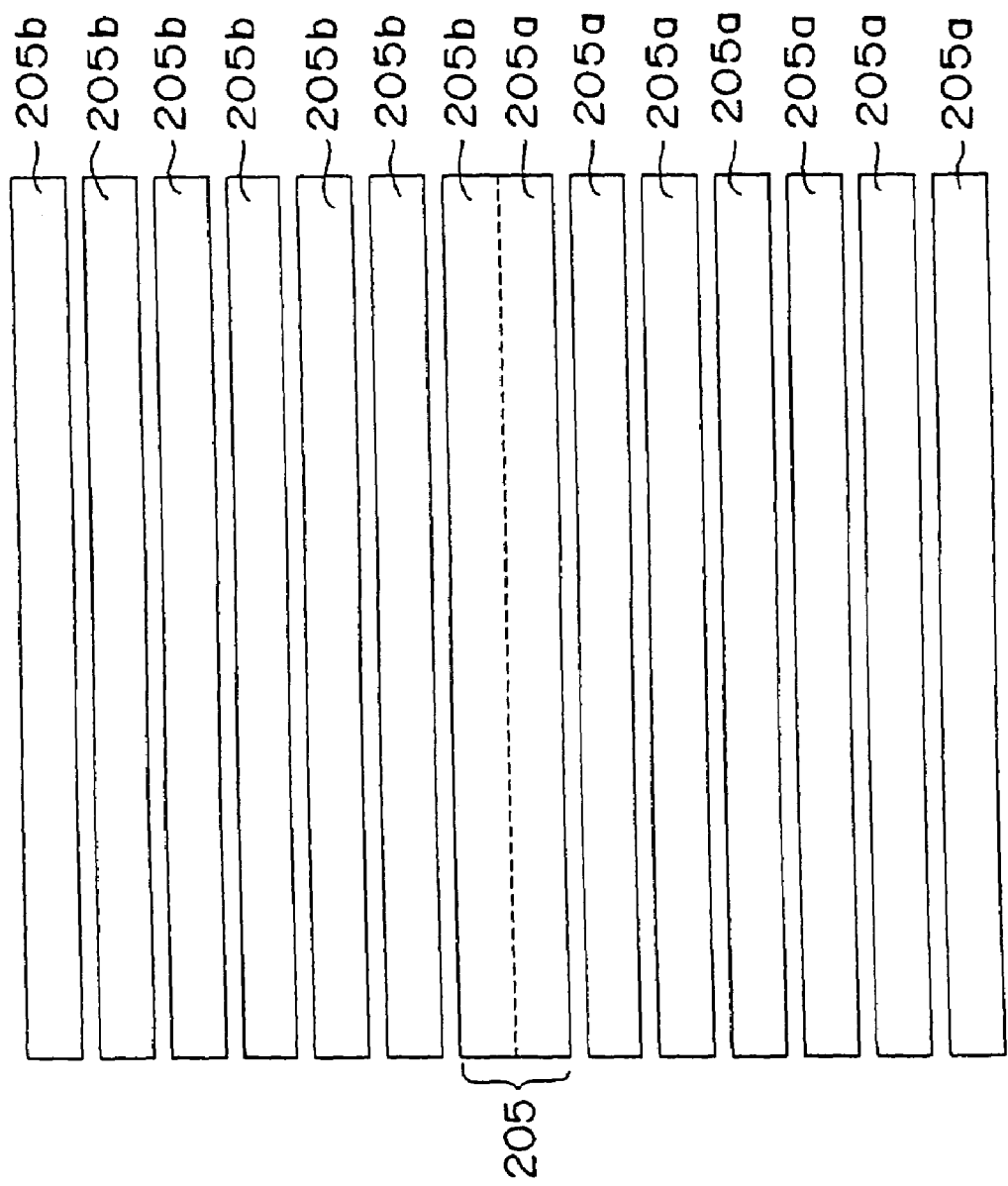
FIG. 54 is an explanatory drawing of the display unit of the present invention.

As shown in FIG. 53, when the top part of the screen 107 scans from top to bottom and the bottom part of the screen 107 scans from bottom to top, as FIG. 54 shows, the common signal 205 in the center (205a, 205b) can be shared. By doing so, the positioning of the segment signal line 206 and the common signal line 205 is made easier. The benefits of the segment signal line 206 being split in the center of screen 107 (common signal line 205) are large.

The drive method used in FIG. 53 as well as the common signal line 205 drive method shown in FIG. 54 must be performed taking into the account the following points. Once the common signal line 205 has been chosen (in other words, when the common signal lines 205a and 205b in the center part of the screen), it is first necessary that the width and polarity of the signal voltage applied to the common signal lines 205a and 205b are synchronized. If they are not synchronized, they will short and surges of electricity will flow through them. Furthermore, a line running across the center of the picture display of the screen 107.

Figure 55:
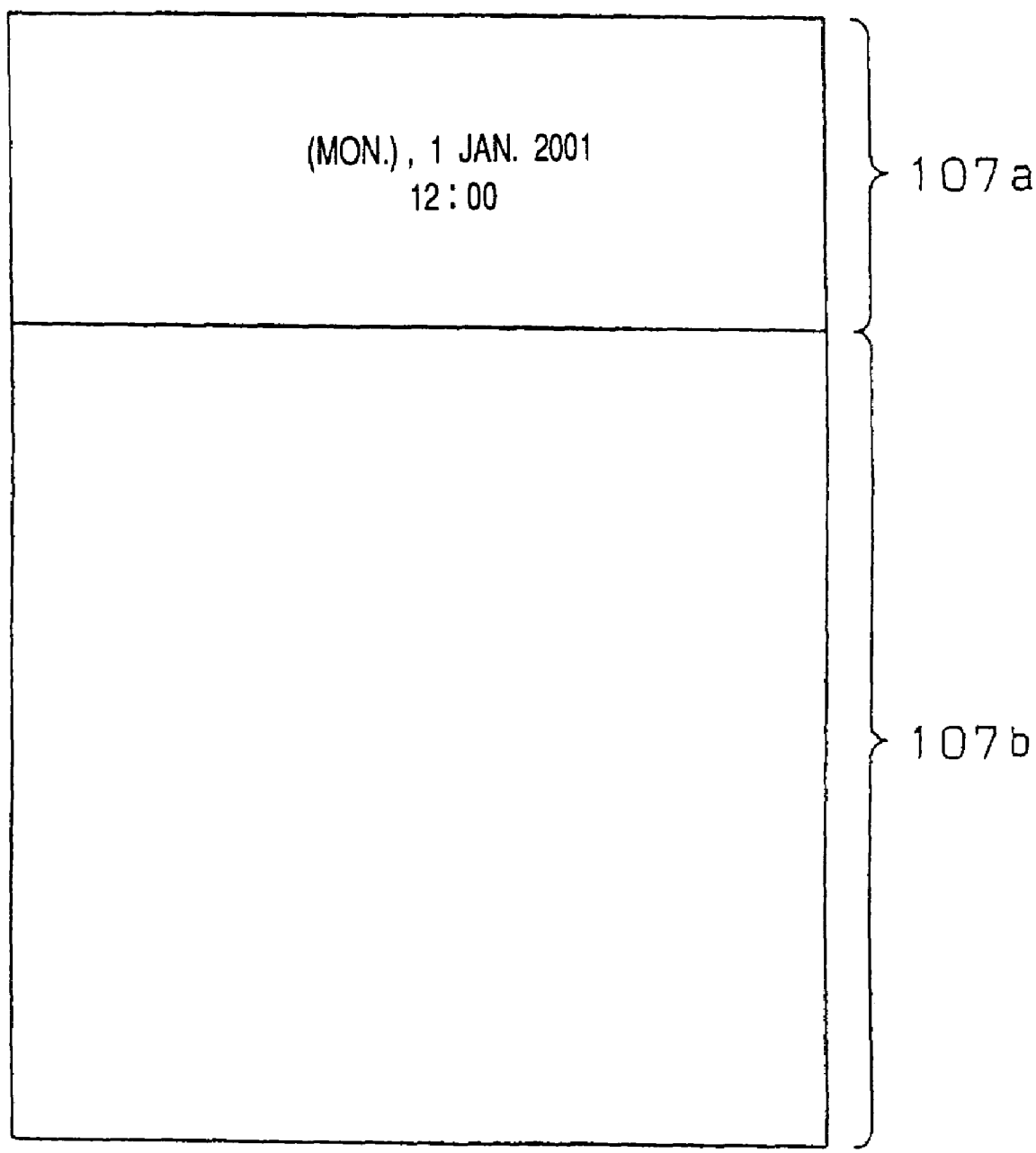
FIG. 55 is an explanatory drawing of the display unit of the present invention.

In FIGS. 51 and 53, the screen is shown as to split from the middle, however this is not the only applicable method. For example, in FIG. 55, screen 107a can be made smaller and screen 107b larger. The display screen 107a is in a partial display zone and is primarily used for the display of time and dates. The partial display zone is used in low power consumption mode. As shown in FIGS. 51 and 53, the display zone 107a is displayed using the common signal line 205b and the display zone 107b is display using the common signal 205a is displayed.

Changing the frame rate (the number of times a screen's frame changes screens per unit of time (1 sec) and drive frequency) in display zones 107a and 107b is effective method in terms of low power consumption as well as changing the color display and number of colors in the display zones of 107a and 107b.

The explanation given above is for simple matrix-type display panels but is not limited to them as such. It can also be applied to active matrix-type display panels. The reason being that partial display and 3-side free configuration, in particular, is applicable to active matrix-type display panels.

Using the MLS drive (herewith referred to as MLS4) which uses 4 simultaneously selected lines, it is advisable to satisfy the relationship listed below with the n of the nH reverse drive when the number of scanning lines is made N, M=N/16 (however, M is the integer that have rounded smaller number points):

$$M-1 \leq n \leq M+5$$

Also, a more preferable relationship is:

$$M+1 \leq n \leq M+3$$

By satisfying the relationship as shown above makes it more difficult for flickering to occur. The effectiveness of a frame rate (number of times a screen is rewritten per second) of fewer than 50 is particularly large.

In the MLS4 method, the segment (SEG) driver IC14 outputs 5 levels of voltage. For now, these five levels are: V2, V1, VC, MV1 and MV2. Furthermore, the voltage on the SEG side is referred to as SEG Voltage. Increasing the integral multiple of the reference voltage using a DCDC computer etc creates these voltages.

It is known that liquid crystals such as STN liquid crystal have temperature reliant properties. In order to adjust the changes in contrast through these temperature reliant properties, the reference voltage is created analogically by adding positive temperature coefficient thermistor, non-linear elements to the reference voltage creating circuits and then adjusting the temperature reliant property changes at the thermistor. Increasing the integral multiple of the reference voltage using a DCDC computer etc creates these voltages.

In the present invention, in order to suppress the occurrence of flickering, a number of shifts processes are conducted. Looking at the drawing below, the following is an explanation of the drive methods etc. Furthermore, for ease of explanation, L=4 (the number of simultaneously selected COM signal lines being 4, or in other words, the MLS 4 drive). However, it is not limited to this calculation as L=2 or above 4 is also acceptable.

In the MLS4 method, one frame is made up from 4 fields. Normally, scanning is conducted 4 times from top to bottom (this is also the case for FIGS. 51 and 53). Using this method, 4 common signal lines are selected simultaneously for scanning. Also, using the Frame Rate Controller, multiple numbers of frames are expressed as one gradation.

Using the expression of one gradation, the period of the frames is the denominator and the numbers of frames switched on are expressed as elements. For example, if one frame of six frames is ON then it is expressed as ⅙. Following is an explanation of the shift process with reference to the drawings. Using multiple frames as one gradation display method, there is the Frame Rate Control method that conducts gradation expressions by controlling the column voltage in each frame. First is an explanation of the FRC method.

Figure 84:
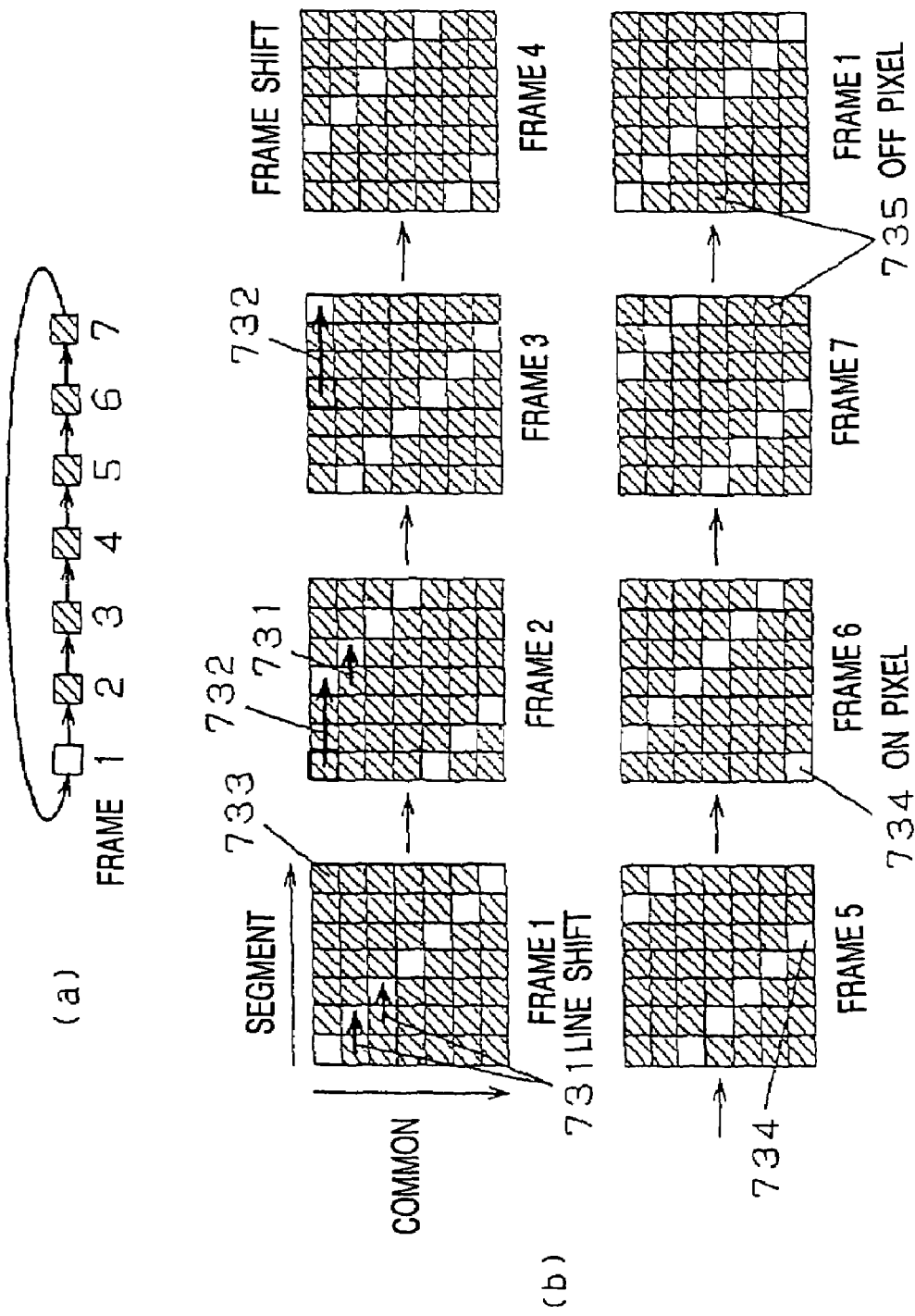
FIGS. 84(*a*) and 84(*b*) are explanatory drawings of the drive system for the display unit of the present invention.

FIG. 84(a) is an example of the expression of the 1st gradation of 8 gradation. By expression one frame as ON and six frames as OFF display is possible. However, the problem of flickering arises when using this method for multiple gradations. Therefore, the timing of the ON and OFF is delayed in each pixel and by adjusting the number of gradation for the ON and OFF pixel ratio in terms of space also, is one method of suppressing the problem of flickering. The realization of this method is shown in the pattern in FIG. 84(b).

For example, when using this method to express the M gradation among N gradation, in the first line, all the M columns are switched ON in order, the next line is switched OFF (N−M) and repeated in this pattern until the final column. In the second line, in order to disperse the ON/OFF pixels, the data from the 1st line is displayed with only the L value shifted. From there, the data is expressed with the L shifted each time. The shift amount L used here is defined as a line shift. By conducing this method, the dispersal and placement of ON/OFF spatially becomes possible.

Next, time ON/OFF is dispersed. As with the line shift, the data is expressed with the F shifted each time by taking the data column for the first line of the first frame and line shifting the data of the first line of the second frame. The shift amount F at this time is defined as a frame shift.

From the third frame onward, the same method of line shifting expressing the pattern in which the F is delayed from the first line of the previous frame. Each frame's second line is displayed in the same way by conducing a line shift. In FIG. 84(b), using the line shift L (=1) and frame shift F (=3), the example of the first gradation of the 8 gradations is expressed.

Furthermore, here the explanation is focusing on a configuration of 7 lines X 7 columns, so when applying this configuration to larger screens, the lines should be lined up together. The ratio of ON pixels in all frames is even with one gradation of eight being expressed like that of the 173 pixels— OFF•OFF•ON•OFF•OFF•OFF•OFF.

When conducting gradation expressions by the FRC method, flickering easy occurs due to the occurrence of gradation of which the ON/OFF number ratio becomes smaller when the number of display gradation increases. By increasing the frame rate, flickering is reduced, however this increases power consumption.

For example, in 256 color display, to express the gradation requiring 7 frames, whereas for 4096 color display, 15 frames are required. In order to simply make the flicker level the same, the frame rate should be increased two-fold. Conversely, for mobile terminals such as cellular phones, the amount of power source is limited and so the reduction in power consumption is being demanded. Also, the circuitry for flickering needs to be simple taking into consideration the demands for cost reduction, and the narrow frame shape can be possible.

The Frame Rate Control (FRC) refers to method of using multiple frames to conduct gradation expressions by controlling the column voltage in each frame. However, the problem of flickering arises when using this method for multiple gradations. Therefore, the timing of the ON and OFF is delayed in each pixel and by adjusting the number of gradation for the ON and OFF pixel ratio in terms of space also, is one method of suppressing the problem of flickering.

Figure 85:
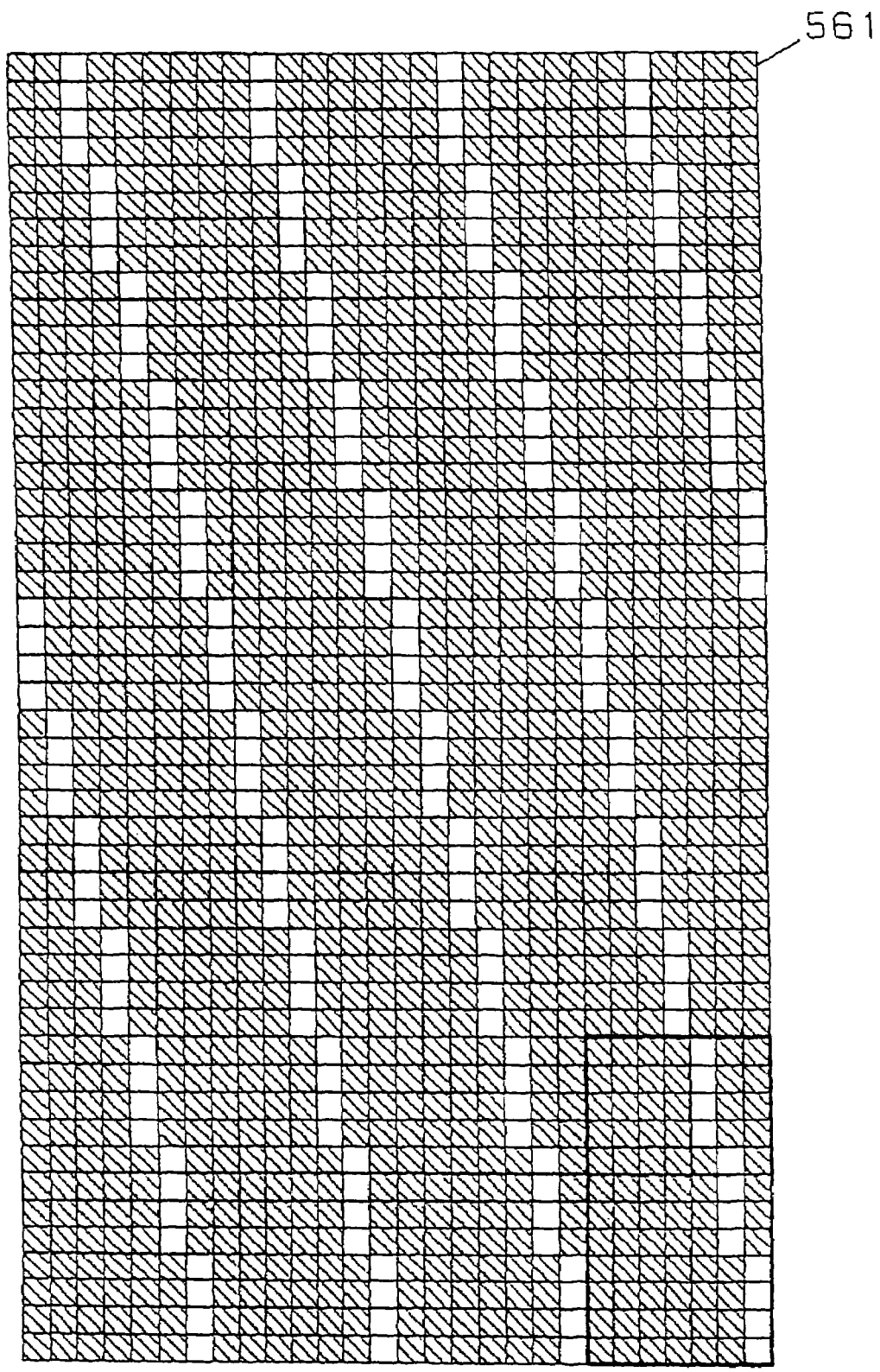
FIG. 85 is an explanatory drawing of the drive system for the display unit of the present invention.

The realization of this method is shown in the pattern in FIG. 85. For example, in FIG. 85, when using this method to express the M gradation among N gradation, in the first line, all the M columns are switched ON in order, the next line is switched OFF (N−M) and repeated in this pattern until the final column. In the second line, in order to disperse the ON/OFF pixels, the data from the 1st line is displayed with only the L value shifted. From there, the data is expressed with the L shifted each time. The shift amount L used here is defined as a line shift. By conducing this method, the dispersal and placement of ON/OFF spatially becomes possible. In the embodiment of FIG. 85, 4 lines are conducted simultaneously with the same amount being shifted and a one-dot shift being done every four lines.

Next, time ON/OFF is dispersed. As with the line shift, the data is expressed with the F shifted each time by taking the data column for the first line of the first frame and line shifting the data of the first line of the second frame. The shift amount F at this time is defined as a frame shift. From the third frame onward, the same method of line shifting expressing the pattern in which the F is delayed from the first line of the previous frame. Each frame's second line is displayed in the same way by conducing a line shift.

Figure 86:
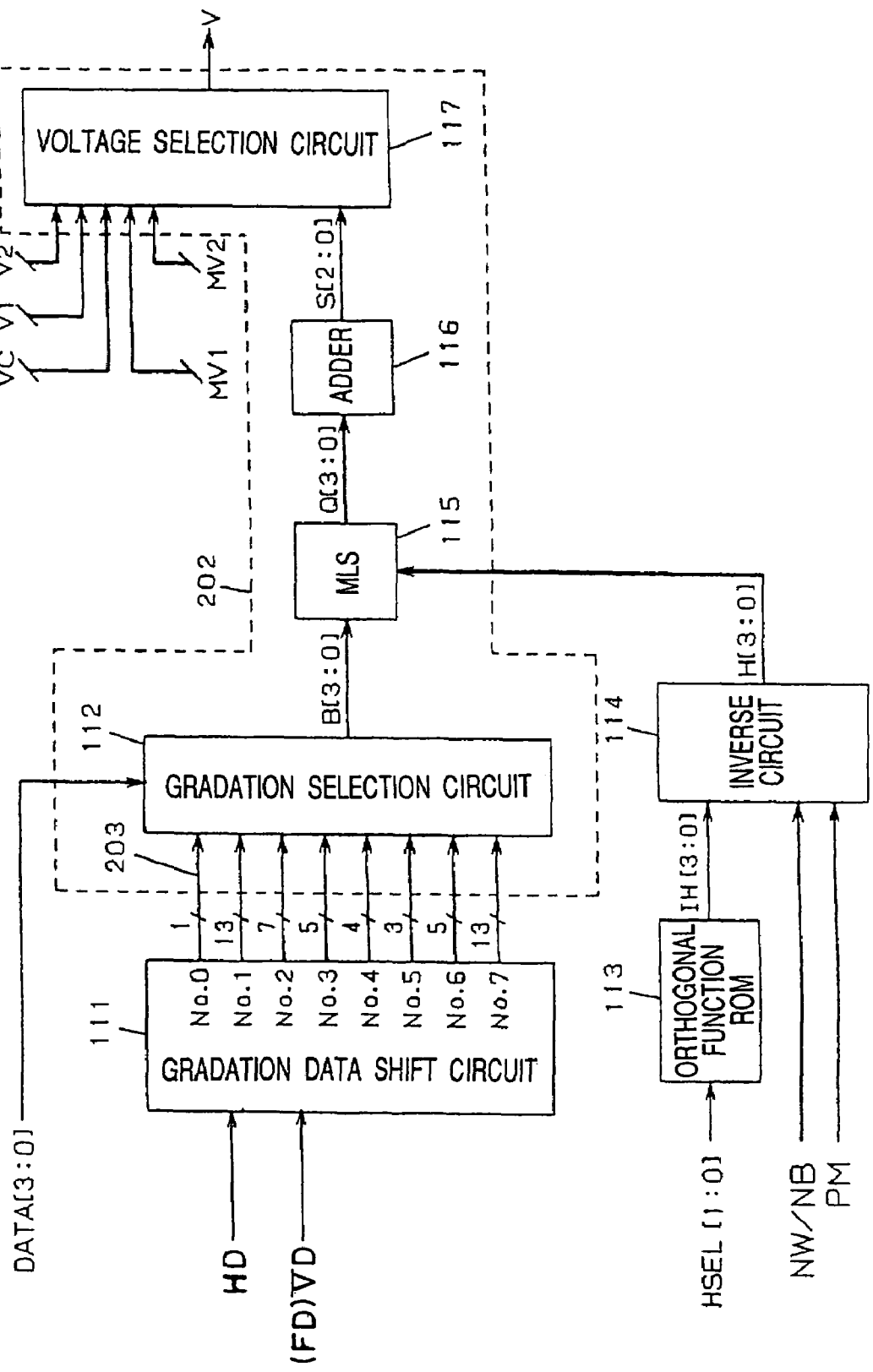
FIG. 86 is a block diagram of the display unit of the present invention.

In FIG. 86, the function block diagram of the first state of the present invention is shown. The present invention is comprised of a gradation controller (not illustrated), which conducts shifts the gradation data shift circuit 111 gradation register (not illustrated) used to output FRC date at every field synchronized signal (FD) (referred to herewith as Vertical synchronized signal (VD) generic naming the field synchronized signal and the vertical synchronized signal), vertical synchronized signal (VD) and horizontal synchronized signal (HD), and a gradation selected circuit 112 which selects input picture signals (DATA) from the gradation register output.

In the Multi-Line-Selection Method (herewith referred to as MLS), as illustrated in FIG. 86, conducts MLS line and column calculations via the MLS circuit 115 of the orthogonal function created by the orthogonal function ROM 113 and the input signal B.

The output of the segment signal lines is changed according to the values as a result of the MLS line and column calculations and the ON/OFF display is conducted through the voltage used between common signal line 205 and segment signal line 206. The number of columns of the orthogonal function H is the numbers of the common signal line 205. When selecting the common signal, the value of 1 or −1 is held and when not selected the value is 0.

Accordingly, in the case of N line simultaneously selection, the orthogonal function have 1 or −1 N in one line, therefore, at least N is required for MLS calculations of the input signal S line data. For that reason, the input signal is N lines of simultaneously selected common signal lines are input at the same time.

The input picture signal of the gradation selection circuit 112 in FIG. 86 is input simultaneously in the N lines. If all the N lines are the same gradation, then the same gradation register output is selected. The reason all the N lines are input simultaneously is to lower the main clock, thus reducing power consumption. Naturally, this can also be conducted under a one dot serial process.

FIG. 87 shows the state of output of the gradation selection circuit 112 through the present invention. In this drawing, the white circles are the pixels in an ON state. Diagonals or black circles are the pixels in an OFF state. Additionally, the side on direction is called the column and the vertical direction is called a line. In the following embodiment, an explanation of the shift process is given, so the ON and OFF pixels of white and black circles can also be switched in order to consider the issue of being negative or positive logic.

In FIG. 87, the 4-line simultaneous selection method is used and the first gradation of 8 is displayed across the entire screen. Because it is the 4-line simultaneous selection method, 4 lines of the same ON/OFF pattern are selected and for groups of 4 lines with differing input times, the pattern is shifted.

By using this method, the shift amount of every 4 lines (line shift) and frame are adjusted, which in turn means that if a line shift of 3 or 5 or a frame shift of 3 or 5 is set, flickering can be removed at a frame frequency of 120 Hz.

Among the 5 segment output values, if either a V2 or MV2 output occurs, the picture quality tends to deteriorate. For example, flickering will easily occur through interference with 50 Hz of fluorescent light when pictures are displayed using only MV2, VC or V2.

Generally, the results of the calculations are 4, 2, 0, −2, −4. The voltage value of 4 is V2(=2×V1), 2 is V1.0 is VC, −2 is MV1 and −4 is MV2 that are impressed on the segment signal 206. Accordingly, as shown in the embodiment of FIG. 87. Neither V2 nor MV2 occurs, thus making the display of non-deteriorating picture quality possible. Therefore, there is no longer the necessity to add circuits to prevent the occurrence of V2 and MV2 output and it has the characteristic of being able to reduce the size of circuits.

Figure 88:
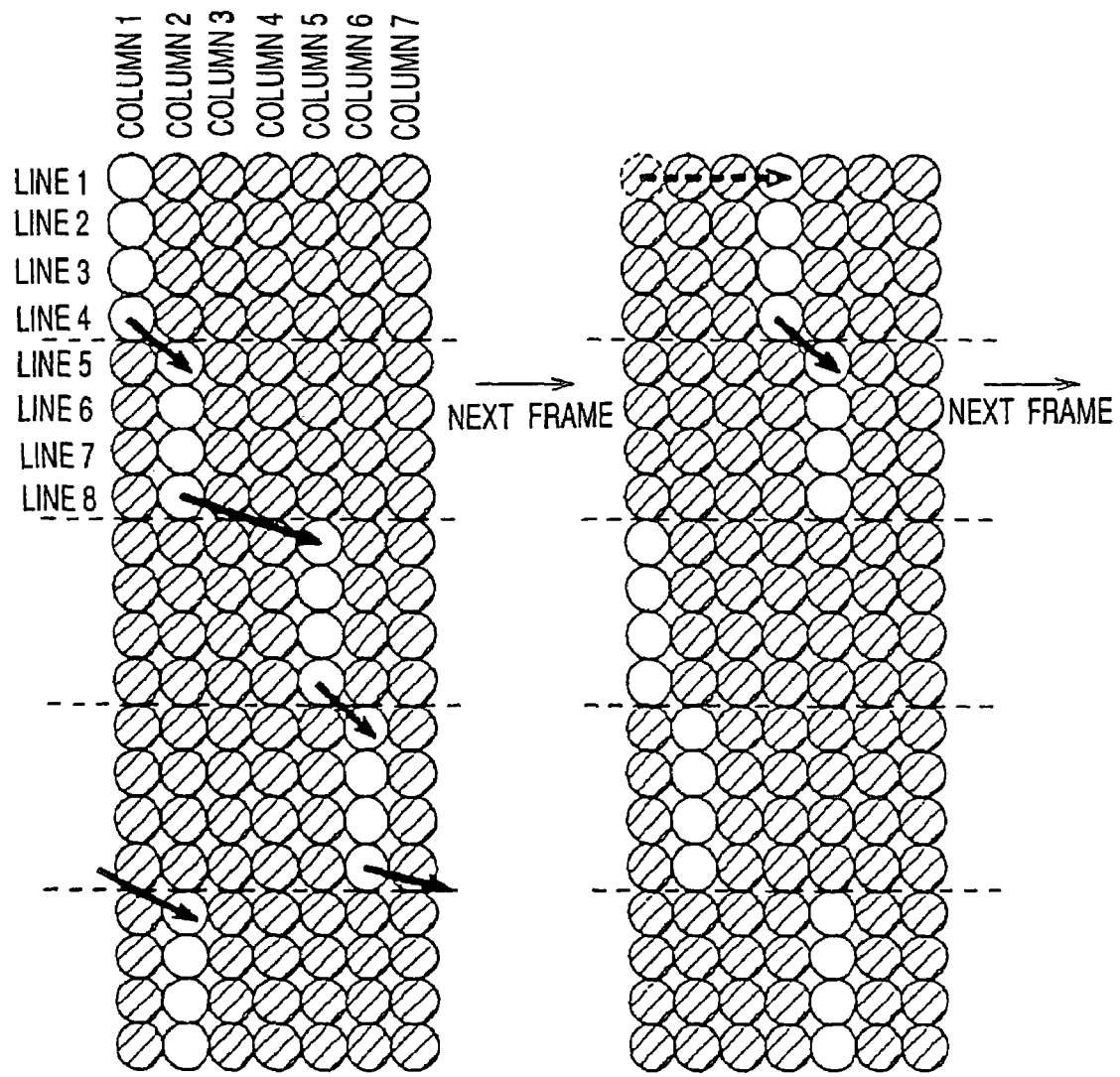
FIG. 88 is an explanatory drawing of the drive system for the display unit of the present invention.

FIG. 88 shows the picture pattern in FRC of another embodiment of the present invention. It differs from FIG. 87 in the fact that it has at least 2 types of line shift which both enable differing values to be gained as line shift A and line shift B. When conducting 4-line simultaneous selection, under this method, the values shifted at every 4th line were able to be set individually.

If the configuration is that of the above example, by differing the values at 3 for line shift A and 4 for line shift B, the ON pixels which were lined up diagonally in FIG. 87 by the rules, can be either randomized or set to a certain range. The more random they are set the smaller the flickering becomes even if the frame rates are reduced.

In the embodiment of FIG. 88 also, the 4-line takes the same ON/OFF data. Accordingly, V2 or MV2 voltage does not occur (when the screen displays white raster in the halftone)

Because there are two line shifts, A & B, the circuit scale is increased slightly in order to allocate the recognition circuit which determines which register or line shift (A or B) that maintains the line shift value of the two types. However, the frame rate can be reduced further that that of FIG. 87. As a result, low power consumption drives are also possible.

Figure 89:
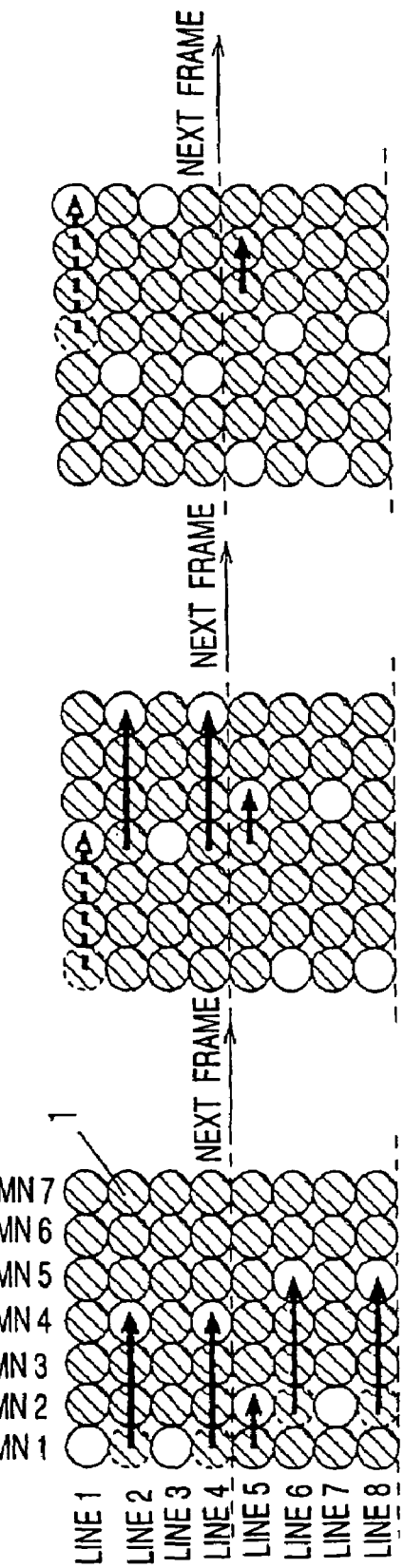
FIG. 89 is an explanatory drawing of the drive system for the display unit of the present invention.

FIG. 89 shows another embodiment of the present invention. In this example also, the 4-line simultaneous selection method is used of which N=4, and the first gradation of 8 is displayed. In the previous embodiment, shifts were conducted every 4 lines. In FIG. 89, in addition to conducting shifts every 4 lines, the shift amounts are differed between odd and even numbers.

In the 8 gradation display, if the even number line shift is set from 1 to 4, the frame shift either 3 or 5, and the line shift at any of 1, 2, 5, or 6, flickering will not occur at even a frame frequency of 80 Hz.

Also, when changing to a 4gradation display, the even number line shift can be set at 2 or 3, the frame shift at 1, and the line shift at either 1 or 3. The 4 gradation display takes 4 gradations of the 8 gradation display and there are some gradations that are used together. However, it was found that the most ideal shift amounts differed depending on the number of gradation. Therefore, the most suitable shift was conducted depending on the display gradation numbers by making it possible to change the value of the RAM used to maintain the shift amounts depending on the display gradation numbers.

Furthermore, it was also found that the shift amounts within each N line grouping and the ideal line shifts differ depending on the frame frequency. For example, when comparing a frame rate of 80 Hz to that of 120 Hz, the shift amounts for the ideal line shifts etc., change to 3. Similar to the gradation display numbers, depending on whether the frame frequency number is under 70, between 70-120 Hz, 120-160 Hz, or over 160 Hz, it is possible to change the value of the RAM used to maintain the shift amounts through a microcomputer. In other words, the shift amount is changed in the frame frequency range of more than two frames. Furthermore, the shift amount can be changed in stages or continuously.

It is advisable to differ the amount of frame shift in line with the response speed of the liquid crystal material. For response speeds of above and below 150 msec it is possible to change the value of the RAM used to maintain the shift amounts through a microcomputer. Furthermore, the response speed refers to the time added to the time taken to start up and shut down under normal temperatures. The measurement method for the response speed is determined within the field of liquid crystals.

In this case, due to the fact that the liquid crystal materials selected are determined in principal, software to operate the microcomputer is not necessary the majority of the time. In other words, depending on the liquid crystal materials, the shift amount can even be fixed at a set amount. The most important factor is to select the ideal shift amount, as there is an ideal amount for liquid crystal materials.

The area in which software is needed is related to temperature dependency. Liquid crystal material viscosity decreases as the temperature rises and thus the response speed increases. In general, it is said to be proportionate with the quadrupling of temperatures that are changed. To that end, the temperature of the LCD panel is measured using a temperature sensor and shift changes are conducted through a microcomputer depending on the temperature recorded. The shift amount can be changed in stages or continuously.

The above-mentioned temperature dependency and frame rate causes the amount of shift to change. It is also applied in other shift methods and situations. For example, the shift methods such as field shifts and RGB shifts.

Furthermore, the MLS4 method, which selects four lines simultaneously, has been used as an example in the explanation, however it is not the only method. The MLS8 method, which selects eight lines simultaneously, the MLS7 that calculates one line virtually, the MLS2 method, which selects two lines simultaneously and other MLS methods can be used. They are applied in other embodiments.

In the case of gradation expression by FRC, gradation expressions are being conducted by changing the average brightness of pixels in numerous frames. When a LCD unit is used, there is a change in the frequency of flickering depending on the response speed of the liquid crystal. In particular, between the response speeds of 50 msec to 120 msec, the ON/OFF frames clearly change. For that reason, vertical line interference can easily occur due to interference with other gradations.

Particular interference with other gradations affects all of the pixels in the segment signal line 206 when interference in that line occurs. As a result, the deterioration was of picture quality was far greater than flickering. For that reason, a transfer switch is attached externally to the gradation control block 202, as shown in FIG. 86. It is configured in such a way that it rewrites the RAM value used to maintain the shift amount using a microcomputer for response speeds of 50 to 119 msec, 120 msec to 299 msec and above 300 msec.

For example, in the case of the line shift, for liquid crystals with a response speed of 130 to 300 ms, 2 is better than 1, and for liquid crystals with a response speed of between 50 to 120 ms 4 is more preferable than 3. For liquid crystals with a response speed of 120 to 300 ms, 3 or 5 is more preferable. In response to the panel response speed, which is displayed, the display of an ideal shift amount with little interference or flickering is made possible.

Figure 90:
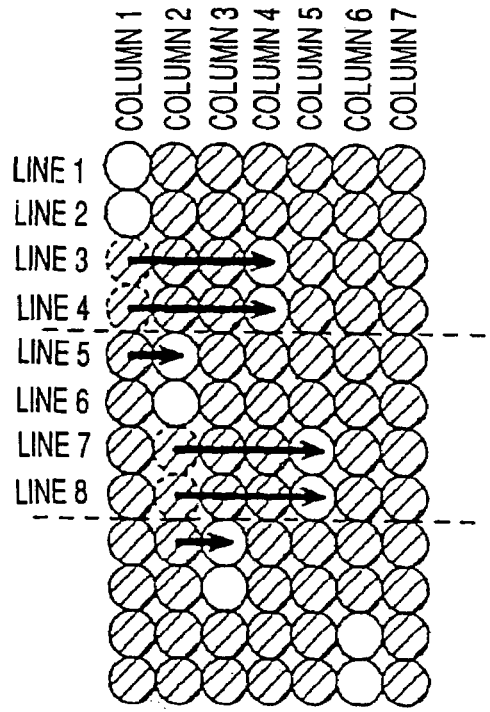
FIG. 90 is an explanatory drawing of the drive system for the display unit of the present invention.
Figure 91:
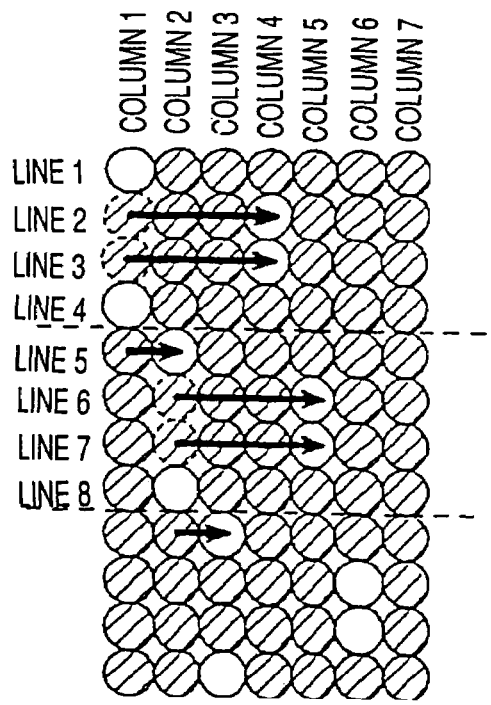
FIG. 91 is an explanatory drawing of the drive system for the display unit of the present invention.
Figure 92:
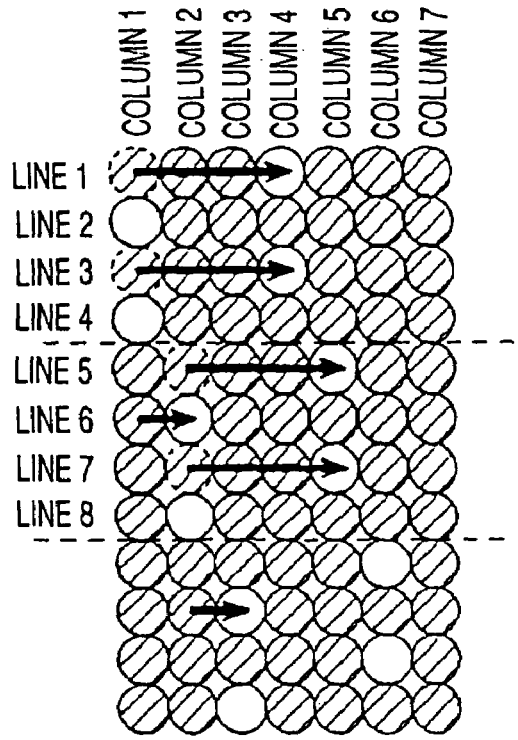
FIG. 92 is an explanatory drawing of the drive system for the display unit of the present invention.

As other methods to delay ON/OFF, the methods presented in FIGS. 90, 91, and 92 can be considered. In FIG. 92, the method by which the odd number line shifts are input and shift the odd number columns is listed by substituting the value of the RAM used to maintain the shift amounts in odd number columns opposite to the example of FIG. 89. In FIG. 91, the 2-3 line shifts are listed which shift the 2nd and 3rd lines. In FIG. 90, the 3-4 columns are listed which shift the 3rd and 4th lines.

Furthermore, in FIG. 91, even the 1st and 4th columns can be shifted, not the 2nd and 3rd (1-4 line shift). In FIG. 90, the 1st and 2nd columns can be shifted (1-2 line shift) to obtain the same effect. Depending on the line shift 3 and the frame shift 4, the effective method for flickering differs and the combination of ON/OFF data from differing adjoined pixels is required.

All of these methods are those, which display the same gradation over the entire screen within the 4 line data. They have an ON/OFF ratio of 4 to 0, 2 to 2 or 0 to 4. In these types of combinations, the results of the MLS calculations are scanned using only V1 and MV1 voltage. Accordingly, displays without the use of V2 and MV2 electric potential are possible. As a result, low frame rate FRC gradation display can be realized.

Also, in order to conduct randomized placement a circuit that extracts numbers in N line groupings is set up. A method by which the shifts amounts of lines that are changed within the N line groupings is available. It is made possible by changing the value of the RAM 1 used to maintain the shift amounts through each N line grouping number.

Figure 93:
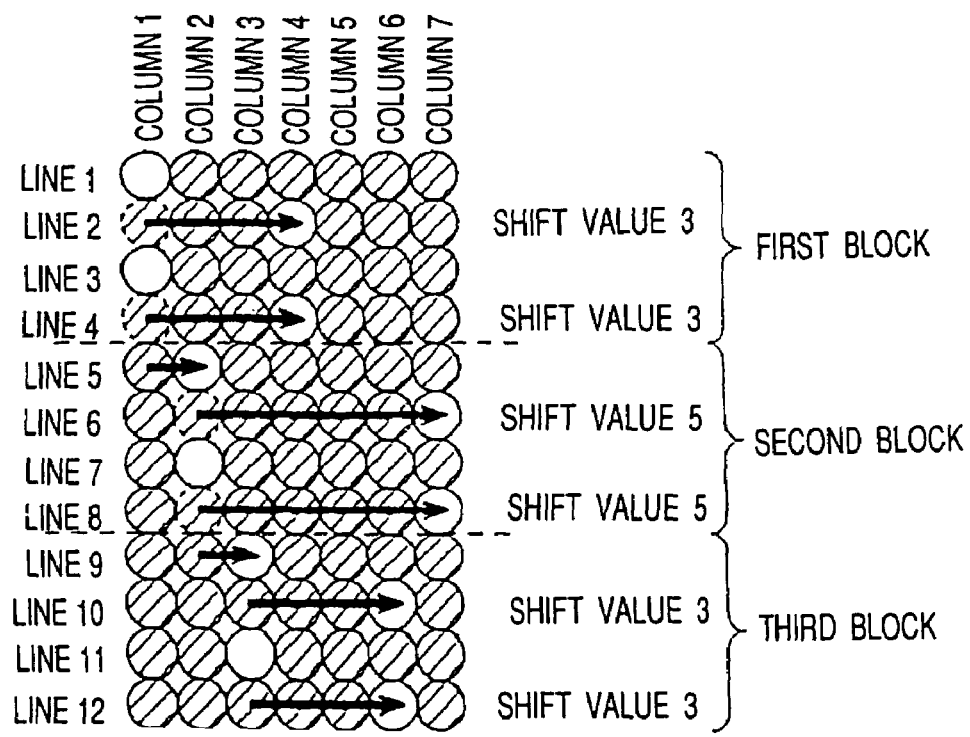
FIG. 93 is an explanatory drawing of the drive system for the display unit of the present invention.

For example, as shown in FIG. 93, a method exists by which the even number line shift amounts are changed every four lines. In the embodiment of FIG. 93, the shift amount in the odd number block is set at 3 and in the even number block at 5. Accordingly, the ON pattern, which is shifted within the N line, does become somewhat scrambled in comparison to FIG. 89 from a linear point. It is also possible for each block to take a completely different shift amount. However, in doing so, the number of registers that memorize the amounts of shift increase, meaning the circuit size too increases.

From a practical point of view, the combination of a reduction in flickering but a overlapping of circuit size means that the most preferable shift amount pattern would be from 2 to 4. Also, in FIG. 93, an explanation of the even number line shift was given, however, it should be noted that the same level of benefit can be achieved with an odd number line shift or a 1-2, 3-4, 1-4, or 2-3 line shift.

Figure 94:
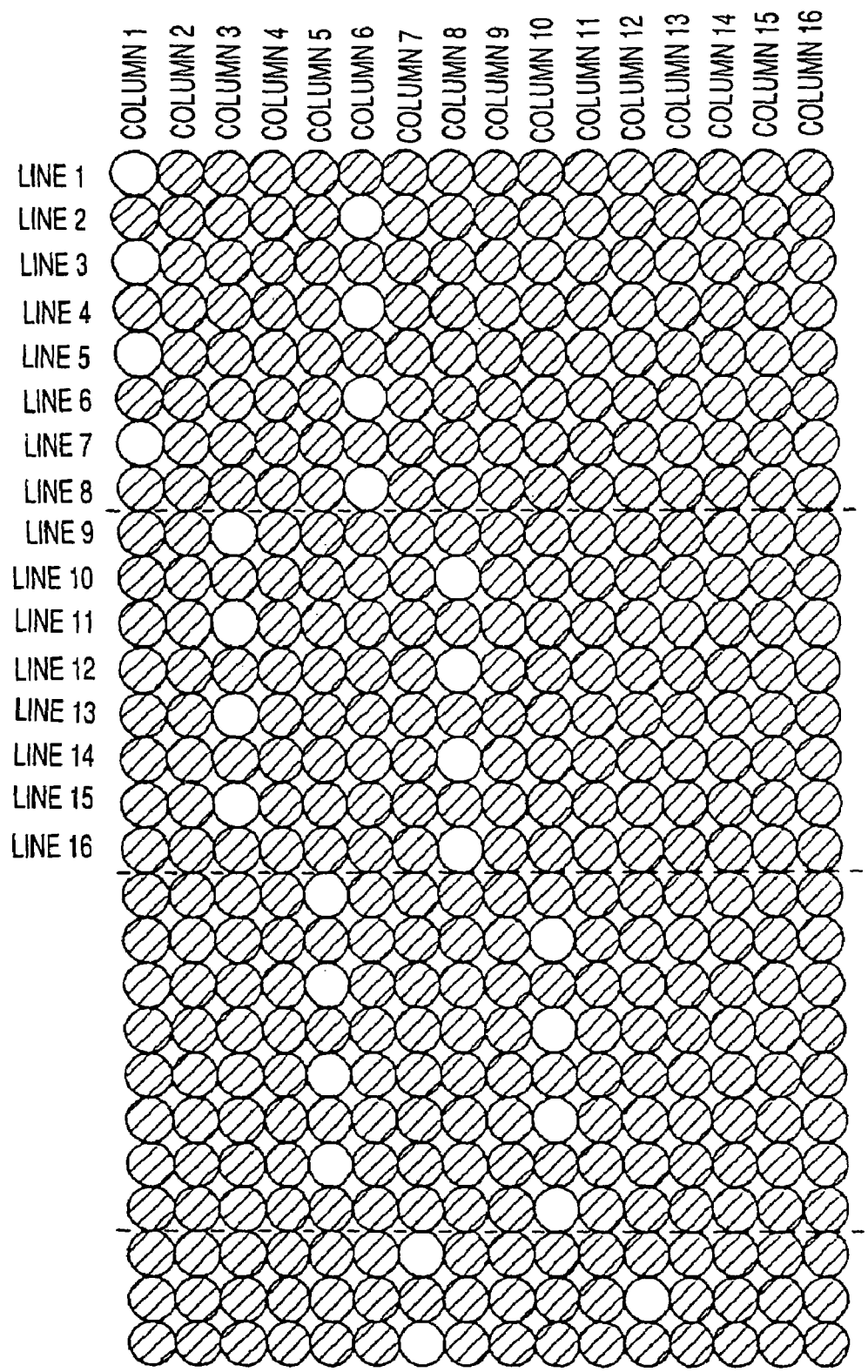
FIG. 94 is an explanatory drawing of the drive system for the display unit of the present invention.

The above embodiment is that of the MLS4 method. As is shown in FIG. 94, the MLS8 method in which the common signal line which selects 8 lines simultaneously, was implemented. As this shows, the present invention is not limited to the MLS4 method. Furthermore, the FRC processing is not limited to simple matrix-type display panels, but also can be applied to active matrix type display panels. Accordingly, the present invention can be applied to all display panels and the contents given above are the same for the other embodiments of the present invention.

Following is an explanation of the field shift, which occurs when shifting gradation data to the sub-field in the MLS drive. The field shift also relates to the drive method, which makes the occurrence of flickering difficult even in low frame rates through shift processing. Additionally, field shifting is separate for the MLS drive concept. The reason being that in one frame (in MLS4, 1 frame equals 4 fields) the effective value voltage that is impressed onto the liquid crystal layer does not reach the effective voltage value set as the objective. In other words, it is not an MLS drive, but for ease of explanation it is treated as one type of MLS in this explanation.

The field shift is a drive method, which drives the display panel configured into one frame, which is made up of L subframes though a drive method that simultaneously selects the multiple numbers (L) of scanning electrodes. The gradation display method is primarily FRC. However, it can also be realized under a PWM method.

The gradation register, which memorizes the gradation patterns representing the ON/OFF at each gradation level, the gradation control circuit, which conducts shift calculation processing of the gradation patterns of the gradation register, and the gradation selection circuits built onto each signal line are equipped. Through the gradation control circuit, the gradation patterns of the gradation register are first synchronized onto a vertical sync circuit where shift-calculating processing is conducted at each frame, at the same time as being synchronized onto a horizontal sync circuit where shift-calculating processing is conducted at each line. On top of this; shift-calculating processing also takes place at each subframe and then the gradation is displayed.

In MSL4 the drive is made up of subframes (sub-fields) from 1-4. An explanation of the gradation display within this MLS drive method will be follow. As one gradation display method, there is the FRC method that conducts gradation display through the control of the ON/OFF functions of each frame using multiple frames.

FIG. 95 is an example of the frame modulator system used for an 8-gradation display. In the case of 8 gradations, the ON/OFF functions of 7 frames is used with the gradations displayed in a total of 8 gradation patterns from 0/7 through to 7/7. The white circle field shift sets the shift amount by making the position of the $1^{st}$ field standard. In the embodiment of the 1/7 gradation in FIG. 96, the shift amount of the $2^{nd}$ field is 2, the $3^{rd}$ field is 1 and the $4^{th}$ field is 5. Accordingly, the shift amounts of the field shift in FIG. 96 can be expressed as (2, 1, 5).

Figure 96:
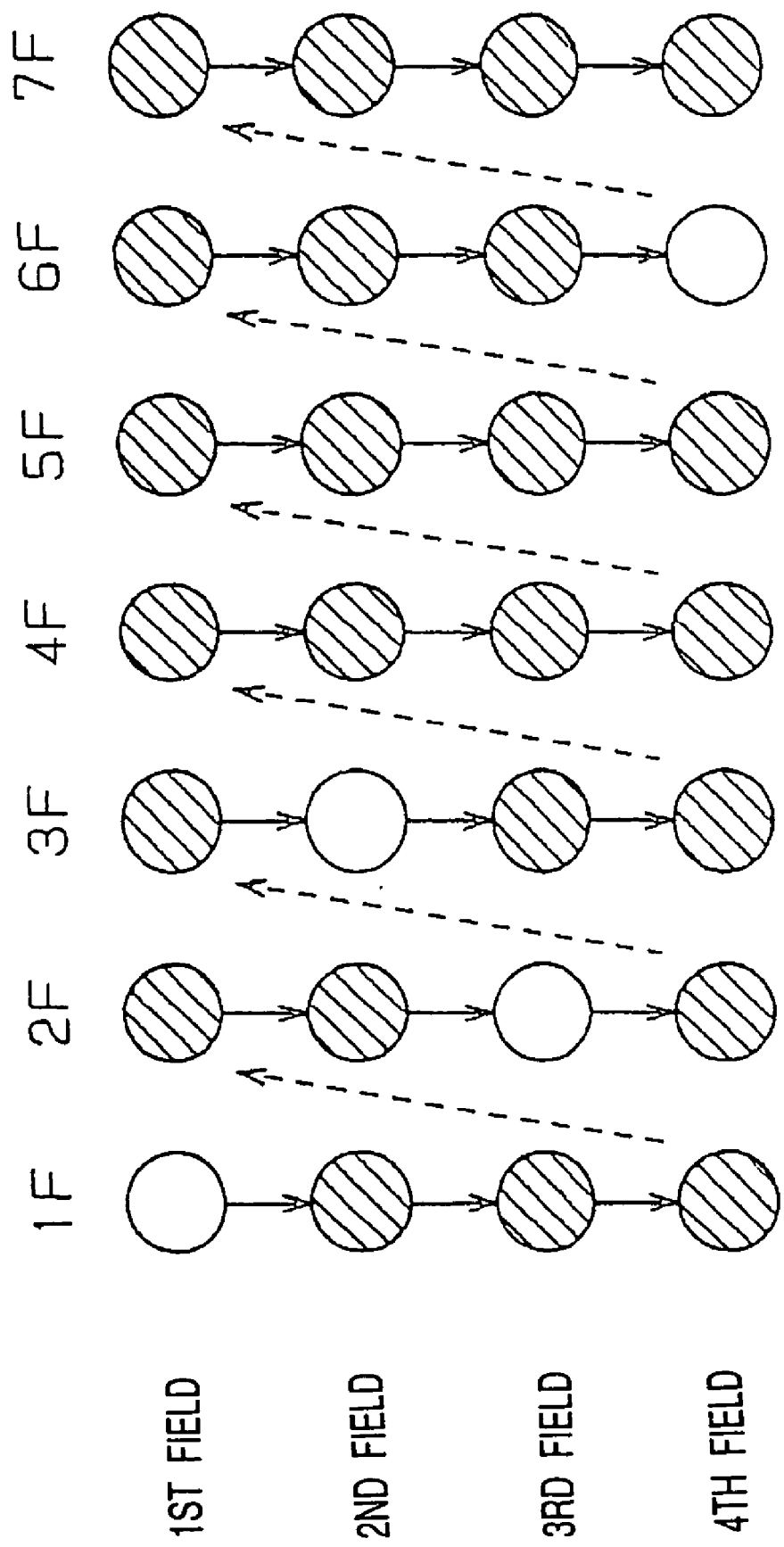
FIG. 96 is an explanatory drawing of the drive system for the display unit of the present invention.
Figure 97:
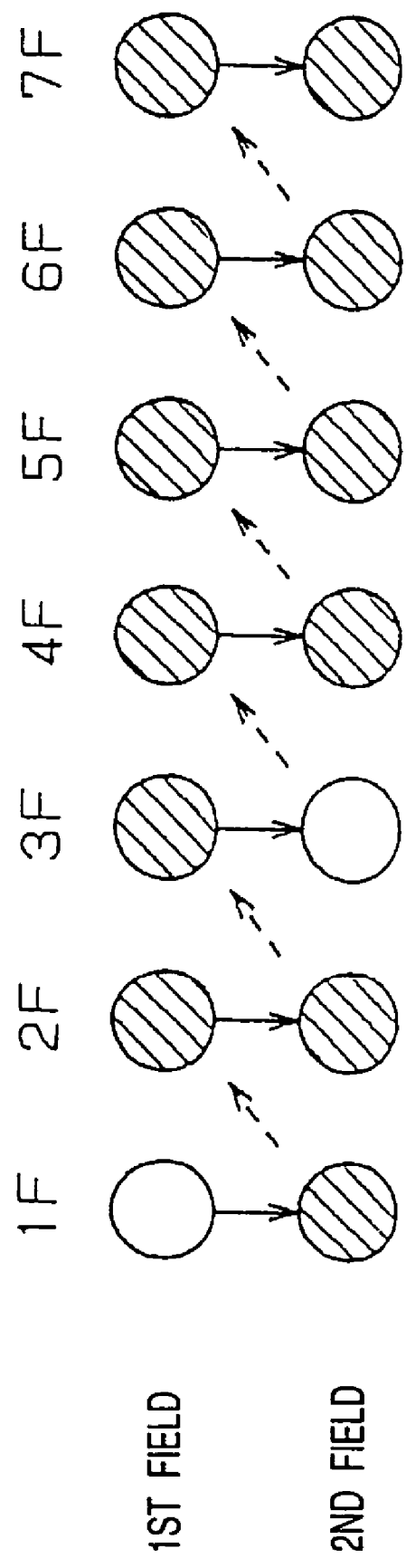
FIG. 97 is an explanatory drawing of the drive system for the display unit of the present invention.

FIG. 96 uses the MLS4 method, which has 4 sub-fields. The present invention the MLS4 method, which selects four lines simultaneously, has been used as an example in the explanation, however it is not the only method. As shown in FIG. 97, the MLS2 method, which processes 2 fields, can also be applied. Furthermore, the shift amount in the $2^{nd}$ field is 2.

Figure 98:
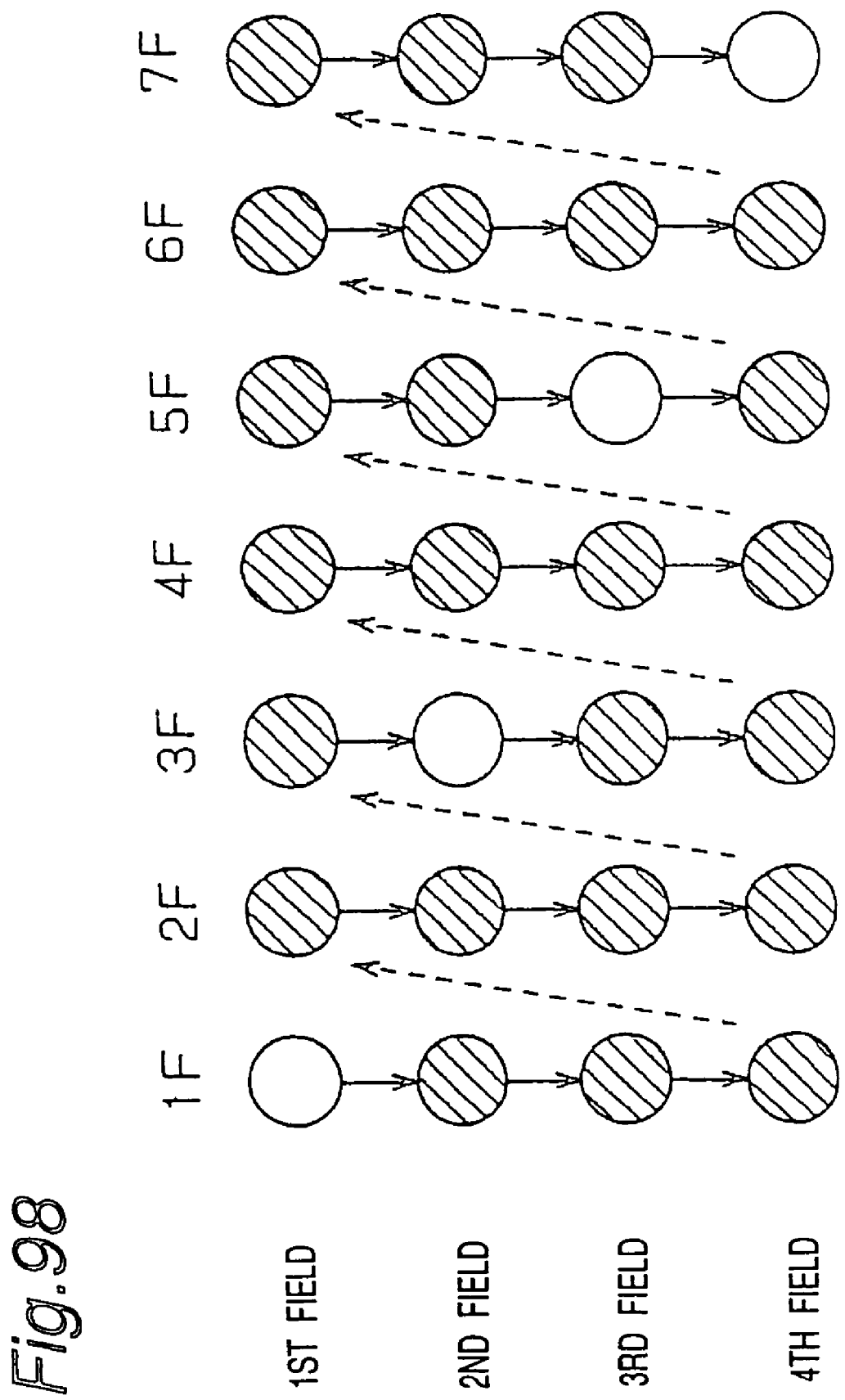
FIG. 98 is an explanatory drawing of the drive system for the display unit of the present invention.

The intervals between the signal amounts for each field are not unique. In order to prevent interference between other colors or gradations, it is advisable to introduce some ordinality in the shift amounts, as shown in FIG. 98. The shift amount for the second field is 2, for the third field is 4 and for the fourth field, it is 6. Simply put, the shift amount ratio (interval) for each field is 2. The shift amounts for the field shift in FIG. 98 can be expressed as (2, 4, 6) regular way at intervals of 2.

Figure 99:
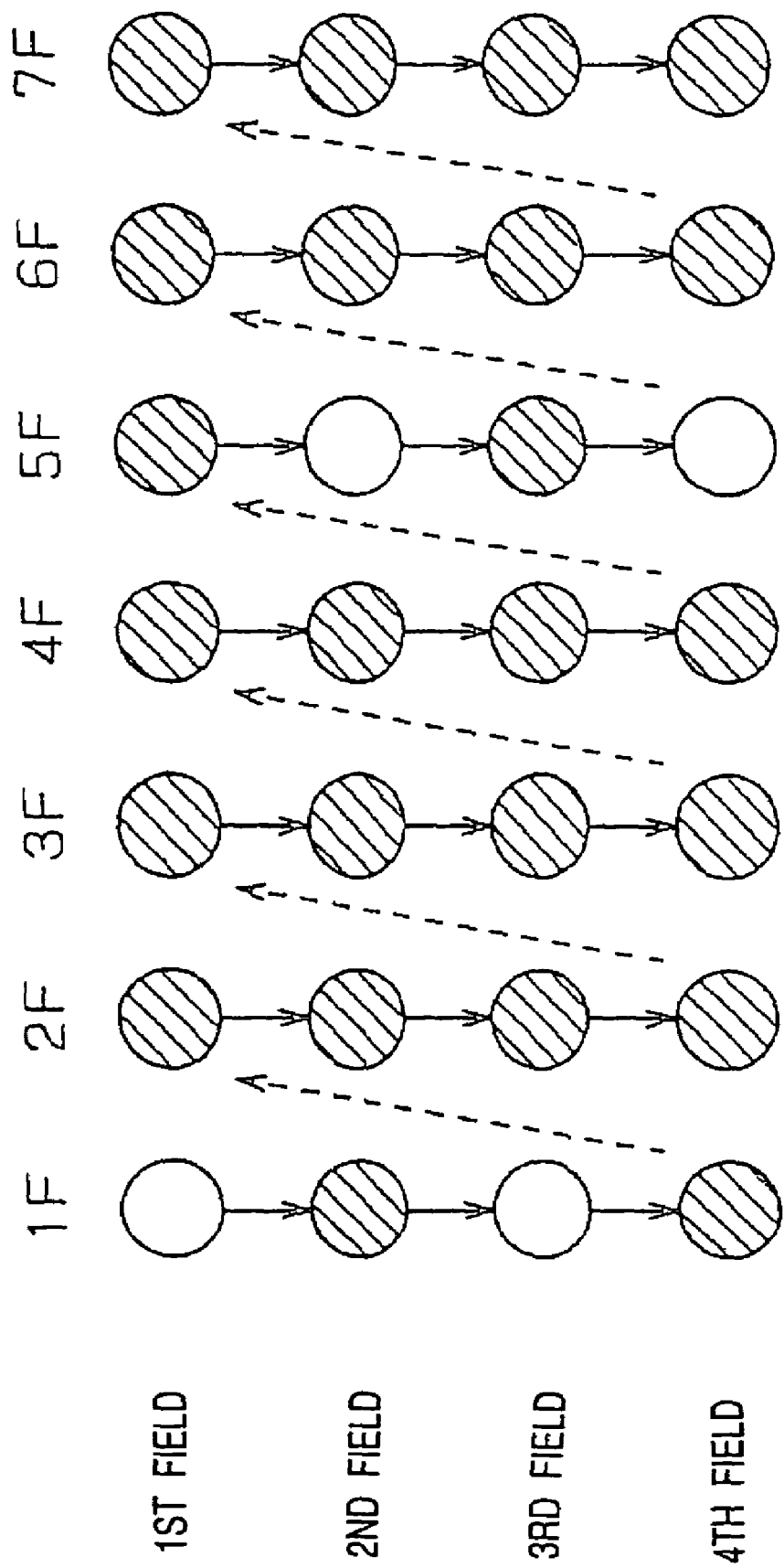
FIG. 99 is an explanatory drawing of the drive system for the display unit of the present invention.

Other ordinality that are effective is suppressing flickering include the method used in FIG. 99. In FIG. 99, the even number field amounts were implemented at set amounts in relation to odd numbers.

In contrast to the odd number fields (first and third), the even number (second and fourth) have shift amounts of 4. Naturally, this relationship can be reversed. In the embodiment of FIG. 99, the shift amount can be expressed as 4, 0, 4. The shift amounts are set with the first field position as standard for the field shifts. In the 1/7 gradation embodiment of FIG. 96, the second shift field amount is 2 for the fourth field is formed and 5. According, the shift amount for the field shift in FIG. 96 can be expressed as 2, 1, and 5.

FIG. 96 uses the MLS4 method, which has 4 sub-fields. The present invention the MLS4 method, which selects four lines simultaneously, has been used as an example in the explanation, however it is not the only method. As shown in FIG. 97, the MLS2 method, which processes 2 fields, can also be applied. Furthermore, the shift amount in the $2^{nd}$ field is 2.

The intervals between the signal amounts for each field are not unique. In order to prevent interference between other colors or gradations, it is advisable to introduce some ordinality in the shift amounts, as shown in FIG. 98. The shift amount for the second field is 2, for the third field is 4 and for the fourth field, it is 6. Simply put, the shift amount ratio (interval) for each field is 2. The shift amounts for the field shift in FIG. 98 can be expressed as (2, 4, 6)

Furthermore, FIG. 98 also implemented the shift amounts in a regular way at intervals of 2. Other ordinality that are effective is suppressing flickering include the method used in FIG. 99. In FIG. 99, the amounts were implemented at set amounts in relation to odd numbers.

In contrast to the odd number fields (first and third), the even number (second and fourth) have shift amounts of 4. Naturally, this relationship can be reversed. In the embodiment of FIG. 99, the shift amount can be expressed as 4, 0, 4. The shift amounts are set with the first field position as standard for the field shifts. In the 1/7 gradation embodiment of FIG. 96, the second shift field amount is 2 for the fourth field is formed and 5. According, the shift amount for the field shift in FIG. 96 can be expressed as 2, 1, and 5.

FIG. 96 uses the MLS4 method, which has 4 sub-fields. The present invention the MLS4 method, which selects four lines simultaneously, has been used as an example in the explanation, however it is not the only method. As shown in FIG. 97, the MLS2 method, which processes 2 fields, can also be applied. Furthermore, the shift amount in the $2^{nd}$ field is 2.

The intervals between the signal amounts for each field are not unique. In order to prevent interference between other colors or gradations, it is advisable to introduce some ordinality in the shift amounts, as shown in FIG. 98. The shift amount for the second field is 2, for the third field is 4 and for the fourth field, it is 6. Simply put, the shift amount ratio (interval) for each field is 2. The shift amounts for the field shift in FIG. 98 can be expressed as (2, 4, 6)

Furthermore, FIG. 98 also implemented the shift amounts in a regular way at intervals of 2. Other ordinality that are effective is suppressing flickering include the method used in FIG. 99. In FIG. 99, the even number field amounts were implemented at set amounts in relation to odd numbers.

In contrast to the odd number fields (first and third), the even number (second and fourth) have shift amounts of 4. Naturally, this relationship can be reversed. In the embodiment of FIG. 99, the shift amount can be expressed as 4, 0, 4. The shift amounts are set with the first field position as standard for the field shifts. In the 1/7 gradation embodiment of FIG. 96, the second shift field amount is 2 for the fourth field is formed and 5. According, the shift amount for the field shift in FIG. 96 can be expressed as 2, 1, and 5.

FIG. 96 uses the MLS4 method, which has 4 sub-fields. The present invention the MLS4 method, which selects four lines simultaneously, has been used as an example in the explanation, however it is not the only method. As shown in FIG. 97, the MLS2 method, which processes 2 fields, can also be applied. Furthermore, the shift amount in the $2^{nd}$ field is 2.

The intervals between the signal amounts for each field are not unique. In order to prevent interference between other colors or gradations, it is advisable to introduce some ordinality in the shift amounts, as shown in FIG. 98. The shift amount for the second field is 2, for the third field is 4 and for the fourth field, it is 6. Simply put, the shift amount ratio (interval) for each field is 2. The shift amounts for the field shift in FIG. 98 can be expressed as (2, 4, 6).

Furthermore, FIG. 98 also implemented the shift amounts in a regular way at intervals of 2. Other ordinality that are effective is suppressing flickering include the method used in FIG. 99. In FIG. 99, the amounts were implemented at set amounts in relation to odd numbers.

In contrast to the odd number fields (first and third), the even number (second and fourth) have shift amounts of 4. Naturally, this relationship can be reversed. In the embodiment of FIG. 99, the shift amount can be expressed as 4, 0, 4. The shift amounts are set with the first field position as standard for the field shifts. In the 1/7 gradation embodiment of FIG. 96, the second shift field amount is 2 for the fourth field is formed and 5. According, the shift amount for the field shift in FIG. 96 can be expressed as 2, 1, and 5.

FIG. 96 uses the MLS4 method, which has 4 sub-fields. The present invention the MLS4 method, which selects four lines simultaneously, has been used as an example in the explanation, however it is not the only method. As shown in FIG. 97, the MLS2 method, which processes 2 fields, can also be applied. Furthermore, the shift amount in the $2^{nd}$ field is 2.

The intervals between the signal amounts for each field are not unique. In order to prevent interference between other colors or gradations, it is advisable to introduce some ordinality in the shift amounts, as shown in FIG. 98. The shift amount for the second field is 2, for the third field is 4 and for the fourth field, it is 6. Simply put, the shift amount ratio (interval) for each field is 2. The shift amounts for the field shift in FIG. 98 can be expressed as (2, 4, 6).

Furthermore, FIG. 98 also implemented the shift amounts in a regular way at intervals of 2. Other ordinality that are effective is suppressing flickering include the method used in FIG. 99. In FIG. 99, the amounts were implemented at set amounts in relation to odd numbers.

In contrast to the odd number fields (first and third), the even number (second and fourth) have shift amounts of 4. Naturally, this relationship can be reversed. In the embodiment of FIG. 99, the shift amount can be expressed as 4, 0, 4. This refers to the ON frame, whereas black circles refer to the OFF frame. It is called 7FRC as the gradation display is conducted in a 7-frame pattern.

However, because 0/7 are all OFF, fundamentally FRC processing is not required. Also, as 7/7 is all ON, fundamentally FRC processing is not required. However, to make the explanation easier to understand, they are listed. Accordingly, it is not required when implementing the actual hardware configuration. The above information is the same for other embodiments.

Figure 100:
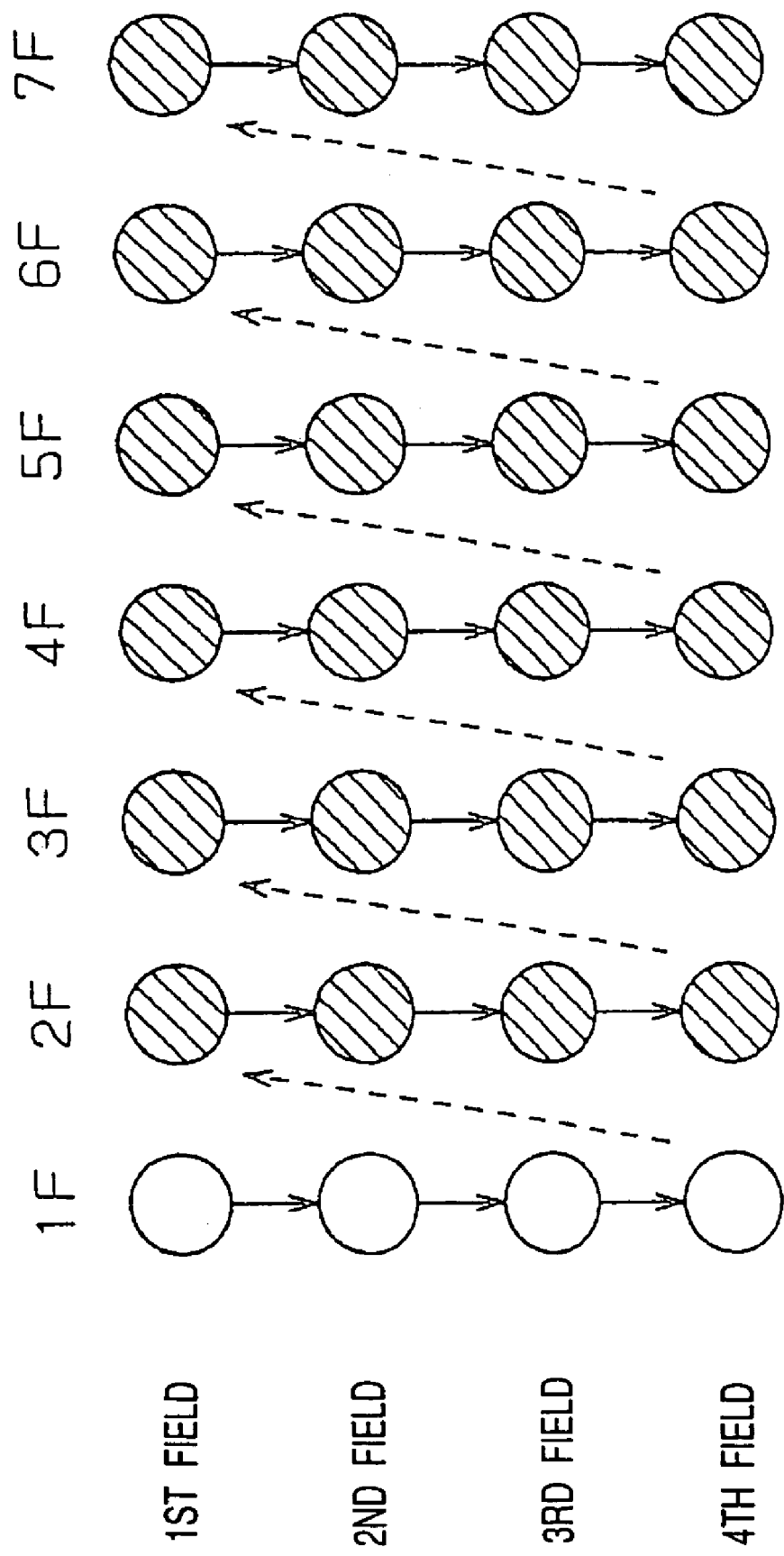
FIG. 100 is an explanatory drawing of the drive system for the display unit of the present invention.

In order to implement the gradation display through FRC in the MLS drive method, as shown in FIG. 100, gradation display is done using the same gradation pattern shown in the first to fourth subframes in terms of the frame shift for 1/7 gradation display.

When conducting gradation display through FRC, if the number of gradations increases, the ON/OFF number ratio narrows between the gradations, thus making it easier for gradation to occur. One method is to increase the frame rate and reduce the flickering, however this means an increase in power consumption. For example, in 256-color display, to express the gradation requires 7 frames, whereas for 4096-color display, 15 frames are required. In order to simply make the flicker level the same, the frame rate should be increased two-fold.

Conversely, for mobile terminals such as cellphones, the amount of power source is limited and so the reduction in power consumption is being demanded. Also, the circuitry for flickering-needs to be simple taking into consideration the demands for cost reduction, and narrow frames.

The shift amounts are set with the first field position as standard for the field shifts. In the 1/7 gradation embodiment of FIG. 96, the second shift field amount is 2 for the fourth field is formed and 5. According, the shift amount for the field shift in FIG. 96 can be expressed as 2, 1, and 5.

FIG. 96 uses the MLS4 method, which has 4 sub-fields. The present invention the MLS4 method, which selects four lines simultaneously, has been used as an example in the explanation, however it is not the only method. As shown in FIG. 97, the MLS2 method, which processes 2 fields, can also be applied. Furthermore, the shift amount in the 2nd field is 2.

The intervals between the signal amounts for each field are not unique. In order to prevent interference between other colors or gradations, it is advisable to introduce some ordinality in the shift amounts, as shown in FIG. 98. The shift amount for the second field is 2, for the third field is 4 and for the fourth field, it is 6. Simply put, the shift amount ratio (interval) for each field is 2. The shift amounts for the field shift in FIG. 98 can be expressed as (2, 4, 6)

Furthermore, FIG. 98 also implemented the shift amounts in a regular way at intervals of 2. Other ordinality that are effective is suppressing flickering include the method used in FIG. 99. In FIG. 99, the amounts were implemented at set amounts in relation to odd numbers.

In contrast to the odd number fields (first and third), the even number (second and fourth) have shift amounts of 4. Naturally, this relationship can be reversed. In the embodiment of FIG. 99, the shift amount can be expressed as 4, 0, 4.

Figure 101:
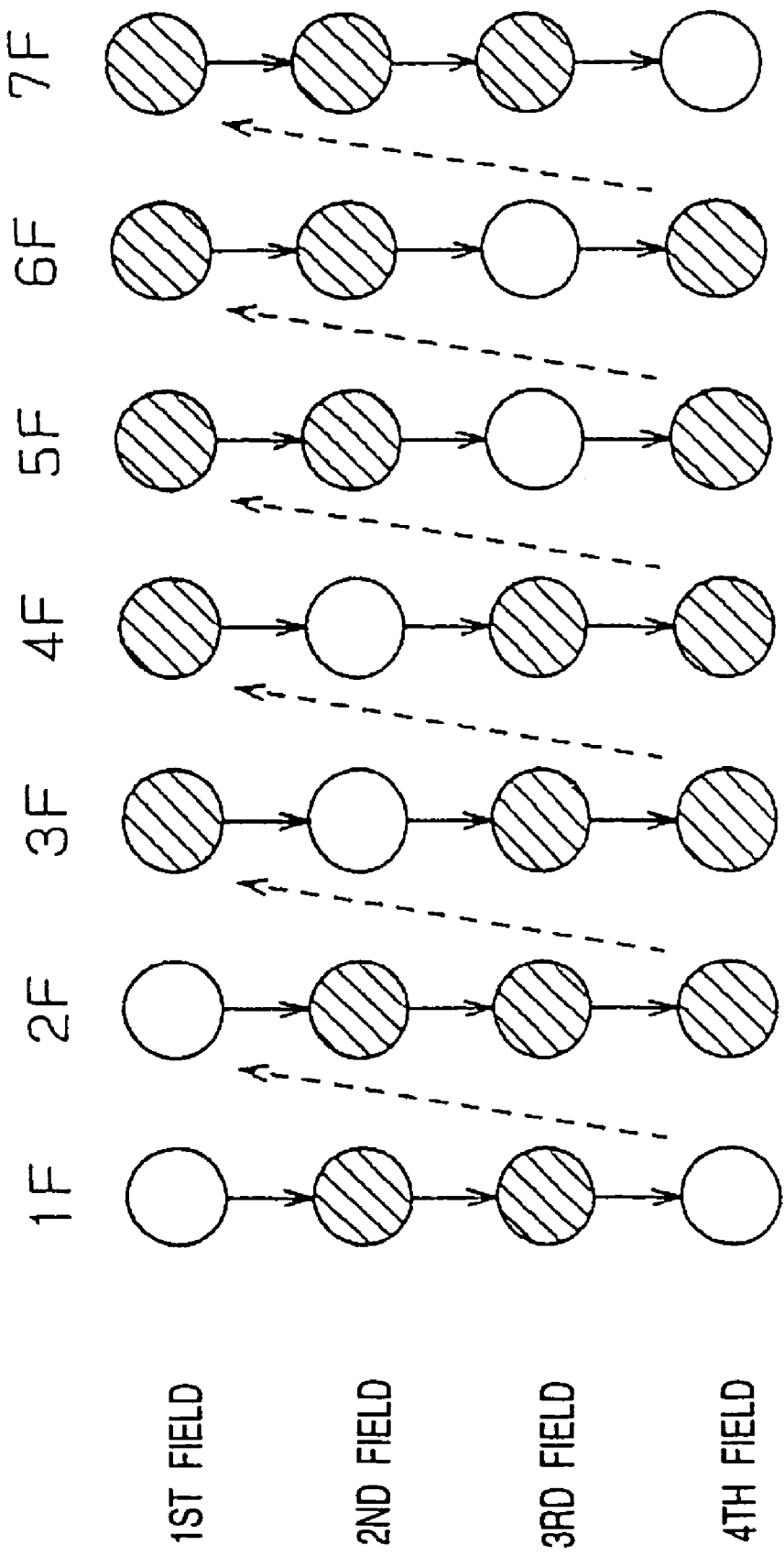
FIG. 101 is an explanatory drawing of the drive system for the display unit of the present invention.

For the embodiment covered above, the element for gradation expression is 1 (i.e. 1/7 in FIG. 99). Obviously, even if the element were above 2, as shown in FIG. 101, field shifts can still be implemented. The field shift in FIG. 101 is 2/7 and can be expressed as (2, 4, 6).

Figure 102:
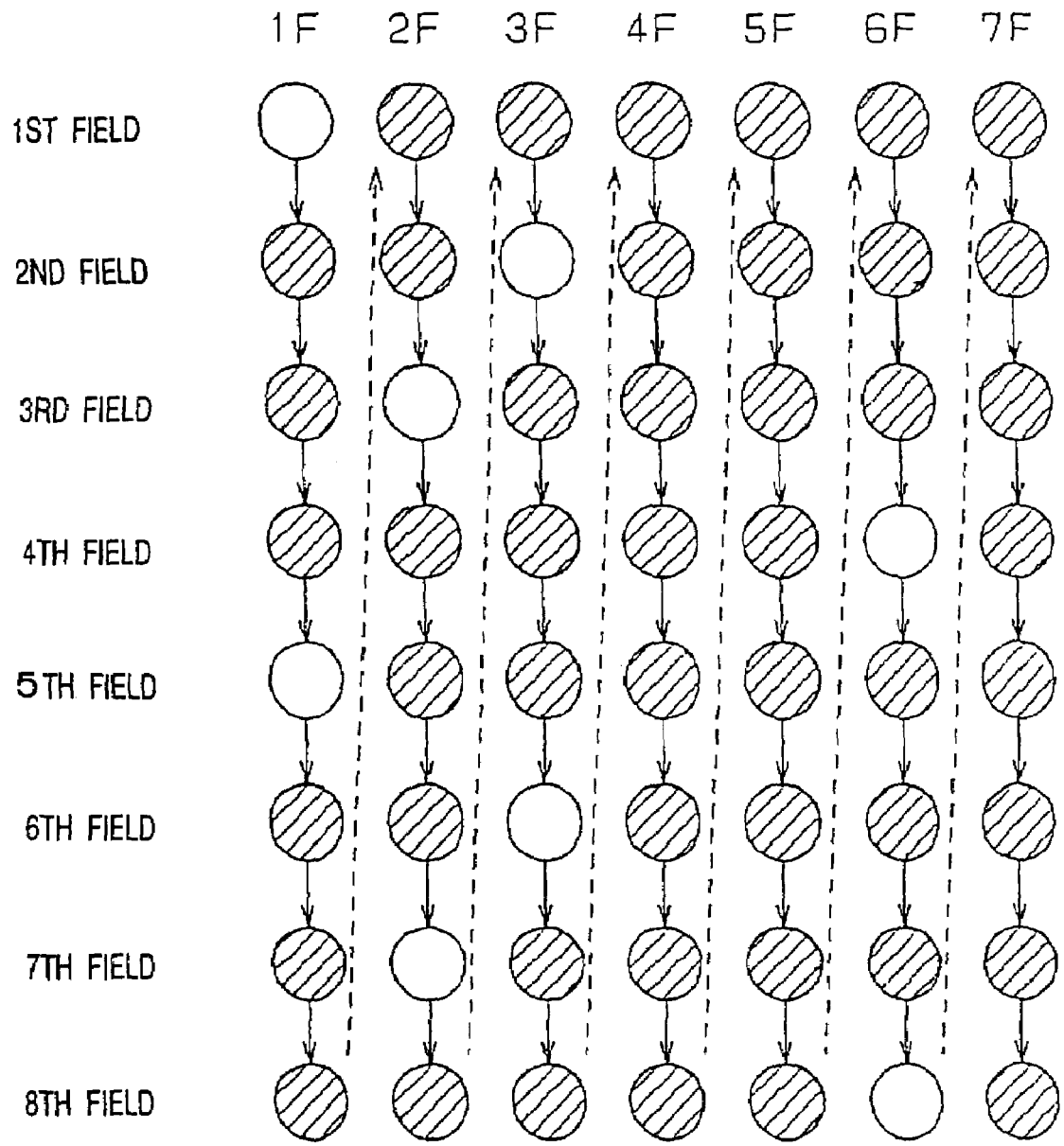
FIG. 102 is an explanatory drawing of the drive system for the display unit of the present invention.

FIG. 102 refers to the MLS8 method in which 8 lines are selected simultaneously. The second field shift is 2, third field shift is 1, fourth field shift is 5, fifth field shift is 0, sixth field shift is 2, seventh field shift is 1, eighth field shift is 5, and ninth field shift is 0. Accordingly, the shift amounts can be expressed as (2, 1, 5, 0, 2, 1, 5, 0).

FIG. 103($a$) is a 1/4-gradation field shift. The shift amount is (1, 2, 3).

FIG. 103($b$) is a 1/12 gradation field shift. The shift amount is (2, 4, 6). As shown above, the field shift can be set at each gradation. However, from the issue of interference with other gradations and slight differences in effective values, it is advisable to make the shift amounts of the gradations displayed all the same. For example, if the 1/4-gradation field shift amount in FIG. 103(*a*) is set at (1, 2, 3), then the 1/12-gradation field shift amount in FIG. 103(*b*) should also be set at (1, 2, 3).

Figure 104:
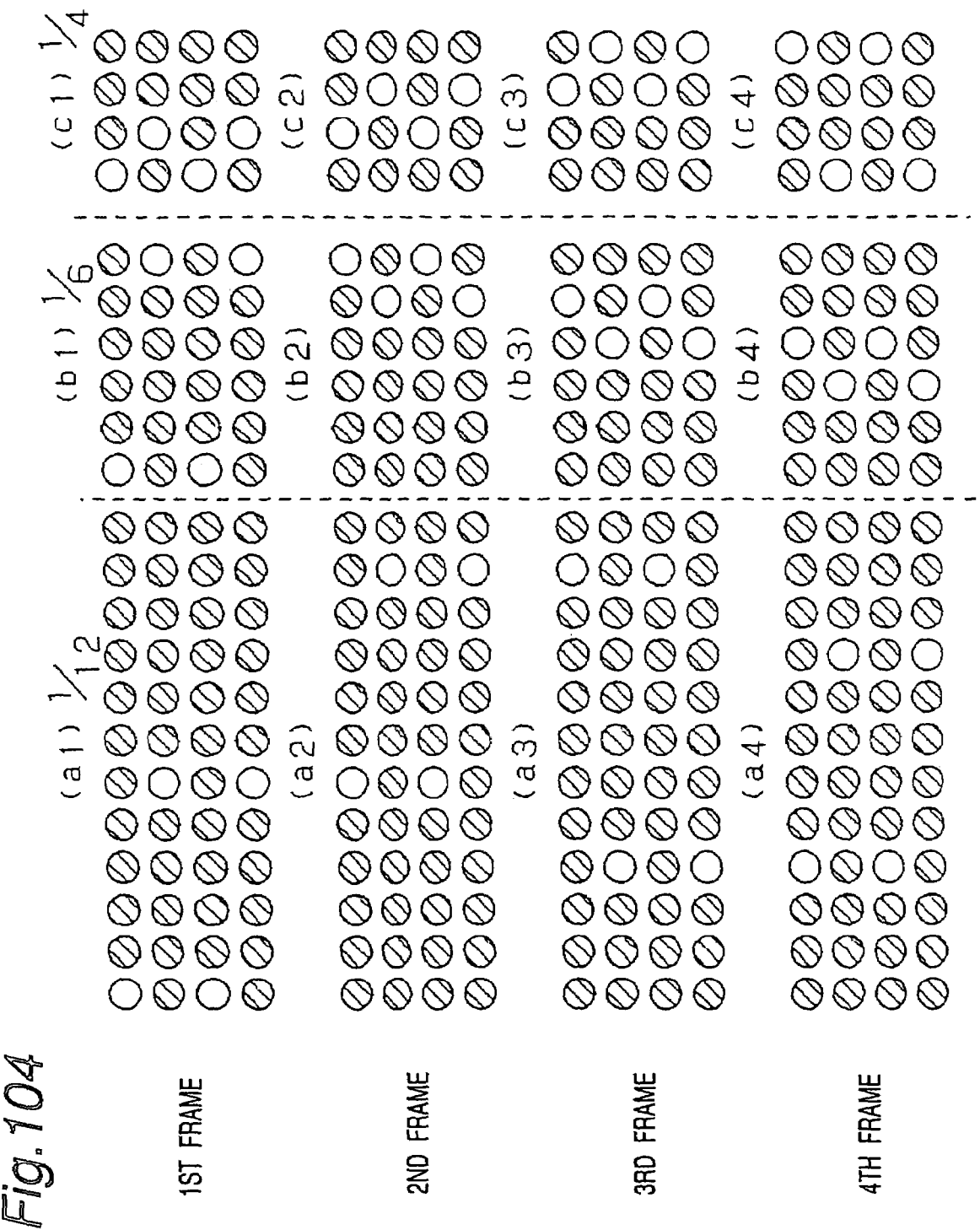
FIG. 104 is an explanatory drawing of the drive system for the display unit of the present invention.
Figure 105:
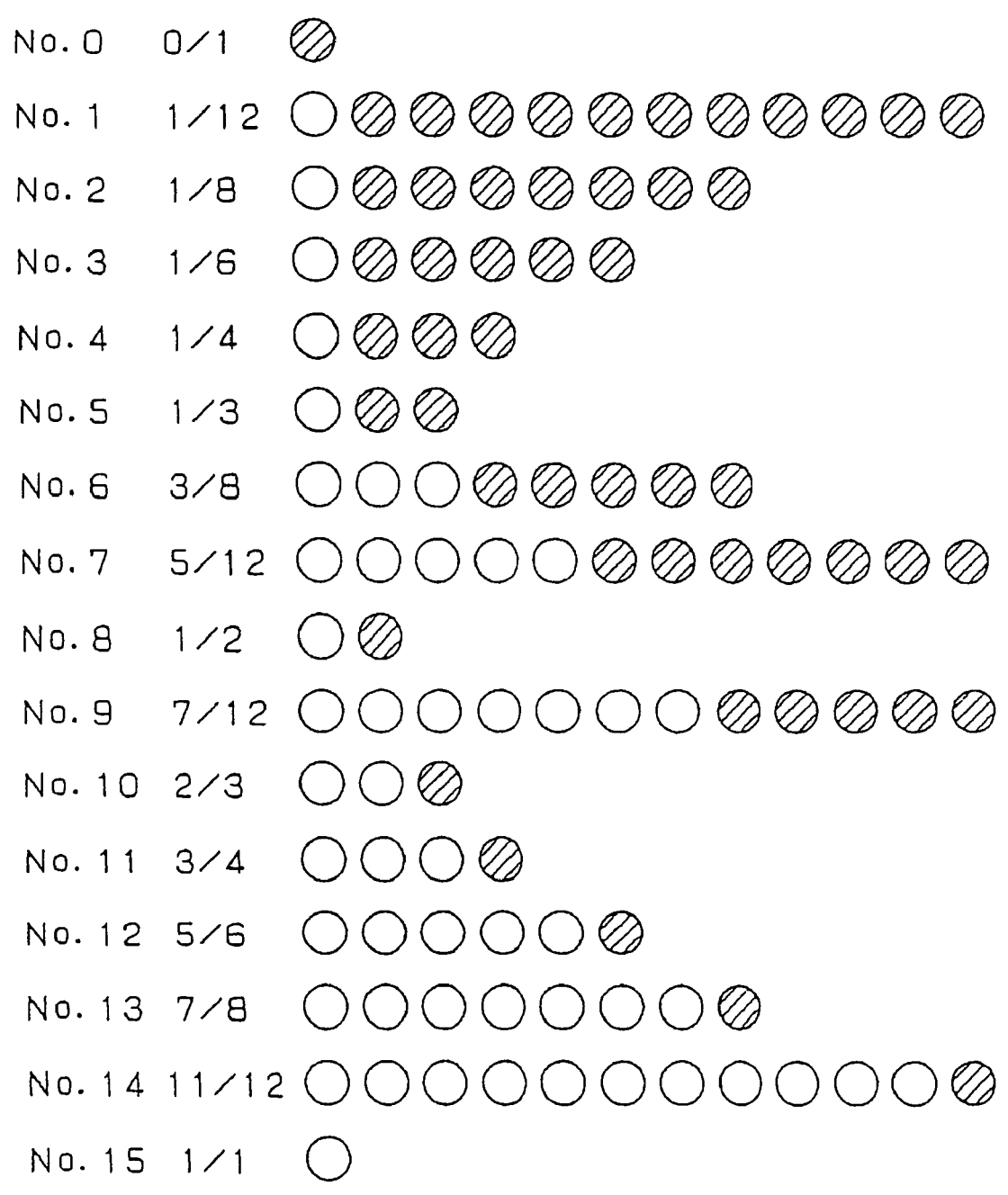

FIG. 104 is an embodiment in which the field shifts of each gradation have been made the same. It is a 16 gradation FRC (15 FRC). All gradation expressions are shown in FIG. 105. Among the gradations in FIG. 105, 1/12 in no. 1, 1/6 in no. 3, and 1/4 in no. 4 are illustrated.

All shift amounts for FIGS. 104(*a*), (*b*) and (*c*) in terms of the gradation shift pattern are (5, 0, 5). The expression shift 5 may be difficult to understand because the numeration is 4. Shift amounts are counted going right. Starting from the far left, the amounts are counted in order going to the far right, then returning to the far left again. To that end, the pattern is shown in FIG. 104(*c*).

All shift amounts have been made the same at each gradation. For example, if a 1/12 shift of the second field is 5, then all gradations are set at 5. If the third field is 3, then all gradations are 3.

In this way, when the number of simultaneously selected scanning lines is L, the shift amount at each subframe is set at the same value for each gradation level. This is the case even if, for example, the gradation pattern should change within the subframes, as it was found that flickering could be suppressed without the occurrence of display defects due to a slight difference in the effective value voltage that is applied to the liquid crystal.

In particular, the setting of the shift amount to 5 as shown in FIG. 105 is the most preferable. Again, the contents of FIG. 104(*a*) are understandable, however, it is advisable to set it so that odd number field shifts in fields follow the shift position in even number field position. As a result, the ON data position plays a game of chase by synchronizing the fields in the odd and even number positions.

For example, in FIG. 104(*a*) there is ON data in the position of 6 columns of the even number field of the first frame. In FIG. 104(*b*), there is ON data in the position of 6 columns of the odd number field of the second frame. Then, in FIG. 104(*c*), there is ON data in the position of 5 columns of the even number field of the third frame, which in comparison to b, has shift columns and is found in the third column from the left. In FIG. 104(*d*), there is ON data in the position of 3 columns from the left in the odd number field and in 8 columns in the ON position of the even number field.

Evaluation results show that a high quality picture display can be achieved without interference from other gradations in any of the following shift amounts in the field shift—(5, 0, 5), (5, 5, 5) or (5, 5, 0). Also, flickering did not occur even when the frame rate was lowered.

The gradation display in FIG. 105 contains the common multiplier of 24 for the number of frames which make up the gradation pattern which represents the ON/OFF of each gradation level when using a 16 gradation (4096 colors) LCD panel drive. The shift amount for each frame on each gradation level is set at 5. Also, the shift amount is either set at 5 or 0 for the shift (L-1 ) at each subframe that have the same value at each gradation level. When the common multiplier of 24 uses the frames 2, 3, 4, 6, 8 to display the 16 gradations, in comparison to when it is 15 frame ratio, the frame numbers are low. This makes the suppression of flickering possible at lower frame frequencies, which is a very important point.

The following is a list of the possible settings for FRC concerning the shift amounts in each frame: 2FRC: 1(, 3, 5, •••); 3FRC: 1, 2 (, 4, 5, •••) 4FRC: 1, 3 (, 5, •••) 6FRC: 1, 5; 8FRC 1, 3, 5, 7 and 12FRC 1, 5, 7, 11. Therefore, the 1 or 5 become the common setting shift amounts in each frame at each gradation level. Gradation flow easily occurs when the shift amount in each frame is 1. If the same value is to be set, then the most ideal amount is 5. Also, if the same value is set in each subframe for the shift amount on all gradation levels at 5 or 0, then the amount of interference between gradations in 16-gradation (4096) display decreases and flickering can be suppressed even if the frequency is lowered to below 60 Hz. This point is also important.

As has been shown above, when the number of simultaneously selected scanning lines is L, the shift amount at each subframe (L-1 ) is set at the same value for each gradation level. This is the case even if, for example, the gradation pattern should change within the subframes, as it was found that flickering could be suppressed without the occurrence of display defects due to a slight difference in the effective value voltage that is applied to the liquid crystal.

Furthermore, at each gradation level of RED, GREEN and BLUE, altering the amount of shift for each subframe (L-1 ) at the same value in the shift amounts of each line and each frame of the gradation pattern is highly effective in suppressing flickering. For example, in the RED gradation pattern, the GREEN is shifted 1 and BLUE is shifted 3. By doing this at the same gradation level, flickering is suppressed.

The above procedures not only apply to the gradation display in FIG. 105, but also are also possible for the gradation display in FIG. 152. Naturally, they can also be applied to other gradation displays, for example when using a 16-gradation (4096 color) display in a LCD panel such as an organic display panel. In this case, the gradation pattern representing the ON/OFF of each gradation level previously mentioned is configured in 15 frame units (0/15, 1/15 ••• to 15/15).

The shift amount for each frame on each gradation level is set at same value of any of the following: 1, 2, 4,7, 8, 11 13, or 14. Also, the shift amount is either set at 5 or 0 for the shift (L-1 ) at each subframe that have the same value at each gradation level. By setting the shift amount in this way, the amount of interference between gradations in 16-gradation (4096) display decreases and flickering can be suppressed even if the frequency is lowered to below 80 Hz.

FIG. 105 contains the common multiplier of 24 for the case of 16-gradation display (4096 color). It is made up of the common multiplier of 8 and 12 and other multipliers. Accordingly, one cycle, which expresses all gradations, of 24 is short and for that reason, it is characteristically low in the amount of interference between gradations even when conducing field shifts.

Generally, 4096 colors can be implemented in 256 (512 color) display also. This can be done by selecting 8 gradations from among the 16 gradations. By selecting 8 gradations for RED and GREEN, and 4 gradations for BLUE, the total becomes 256 colors.

The following gradations from FIG. 105 can be used in 8-gradation selection: no. 0 0/1; no. 1 1/12; no. 4 1/4; no. 5 1/3; no. 8 1/2; no. 10 2/3; no. 11 3/4; no. 14 11/12 and no. 15 1/1.

Choosing from the above, FIG. 107 shows the placement of no. 0 to no. 8 as an 8-gradation display. If this gradation pattern is used, 256 colors can be realized.

The characteristic of this 256-color display method is that the largest denominator is 12 (the smallest common multiplier is 12). Accordingly, in comparison to the smallest common multiplier of 24 shown in FIG. 105, the above is half (12/24). As a result, by selecting the denominator of 12 and the multipliers pattern and then implementing the 256-color gradation display, the suppression of flickering is possible.

Using the 24 multipliers frames of 2, 3, 4, 6, 8, 12 and displaying a 16 gradation, the number of frames are less in comparison to the case of 15 frames. Therefore flickering can also be suppressed at lower frame frequency. By using the 12 as the common multiplier and displaying an 8 gradation, the suppression of flickering is even more possible.

As the FRC expression of 256 colors (512 colors), another possible method is the 7FRC implementation as shown in FIG. 95. In the 7 FRC method, the largest denominator is 7. Therefore, the frequency cycle is shorter making the suppression of flickering even more possible compared the situation in FIG. 107 in which the denominator is 12.

An alternative is to form a gradation pattern in FIG. 152 and that (7FRC) in FIG. 95 within the IC chip and use the gradation pattern in FIG. 105 or 14 for 16 gradations and FRC gradation pattern for 8 gradations.

15 FRC gradation pattern may be formed as 16-gradation display. In this way, generation of flickers will be suppressed to reduce frame frequencies by displaying gradations using the optimum (perhaps the denominator is the smallest) gradation pattern according to the number of gradation displays. This eventually achieves low power consumption. Reduction of frame frequency includes both reduction of frame rate and reduction of main frequency used for circuit operation.

The gradation pattern can be switched by pressing the user button (265 or 266) placed on the mobile telephone or by user's operation of the touch panel placed on the display area 107 directly or indirectly (such as speech entry) A microcomputer may automatically decides the number of colors of the image entered and switch. These matters are also applicable to other implementation examples.

Matters concerning gradation expression in FIG. 105, 107 and 152 are the method commonly applicable to FRC drive. Hardware configuration concerning gradation display is also the common item to FRC drive. Therefore, The method is not restricted only to the field shift drive.

The field shift was supposed to process in the field direction as shown by the arrow in FIG. 100. There is another field shift method described in FIG. 106. The following is the description of field shift described in FIG. 106.

Figure 106:
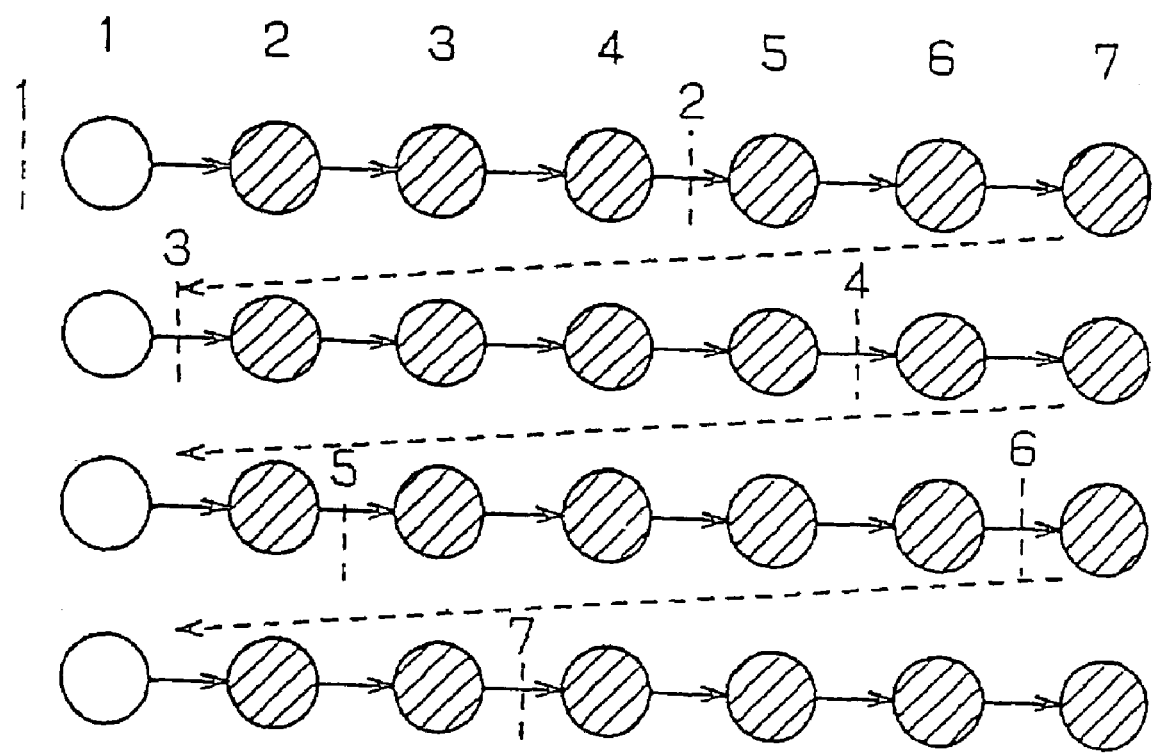
FIG. 106 is an explanatory drawing of the drive system for the display unit of the present invention.

FIG. 106 shows the implementation example of 7FRC. It illustrates the gradation pattern 1/7. The data is processed as shown by the arrow. 7FRC has on/off data (see FIG. 106) of 4 fields×4 frames=28. This data is serially processed. One on and six off's will be expressed at the end of 7 frames in FIG. 106.

IT may be a bit difficult to understand FIG. 106 compared to FIG. 100. Regard it as the serially connected 28 on/off data for easier understanding. Think of applying a process by delimiting this serially connected 28 on/off data with the number of fields 4. FIG. 106 shows delimitations by 4 in dotted line. The scope delimited by the dotted line shows one frame period. Numbers 1,2,3 . . . is described to show frames for convenience.

Consequently, the field shift in FIG. 106 has the concept of field and does not have the concept of frame (specifically speaking, it has little bearing on the concept). Namely, ON is impressed once and OFF is impressed 6 times on the pixel when 7FRC has finished processing.

When four fields in the conventional first frame are all on in the field shift in FIG. 106, the element (white circle) of on voltage and the element (black circle) of off voltage are aligned in the same distance. This makes the frame response aligned in the same distance and easily suppresses generation of flickers. Namely, It is desirable that white circles and black circles should be aligned in the same distance if possible.

Regarding the expression of liquid crystal frame response, it goes without saying that the drive method in FIG. 106 is applicable to the display panel that displays images in peak brightness such as an organic EL These matters are also applicable to the following description of the present invention.

Figure 108:
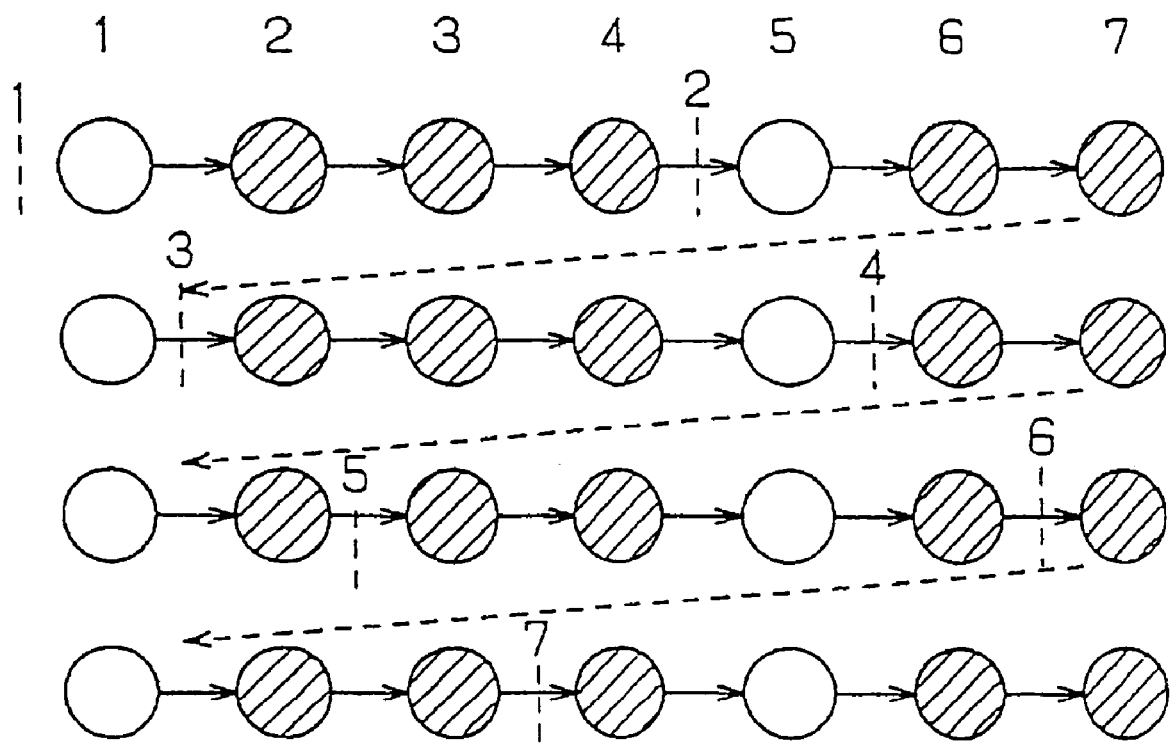
FIG. 108 is an explanatory drawing of the drive system for the display unit of the present invention.

FIG. 108 shows the case of 2/7 in FRC. Three black circles are placed after one white circle followed by one white circle. Two black circles are placed followed by one white circle. This pattern repeats to make another patterns. As the white circles and black circles are aligned in almost the same distance, it can reduce the liquid crystal frame response.

As a matter of course, white circles may be placed in the first and fourth columns. Or, a white circle may be fixed on the first column and placed alternatively on the fourth and fifth columns.

Figure 109:
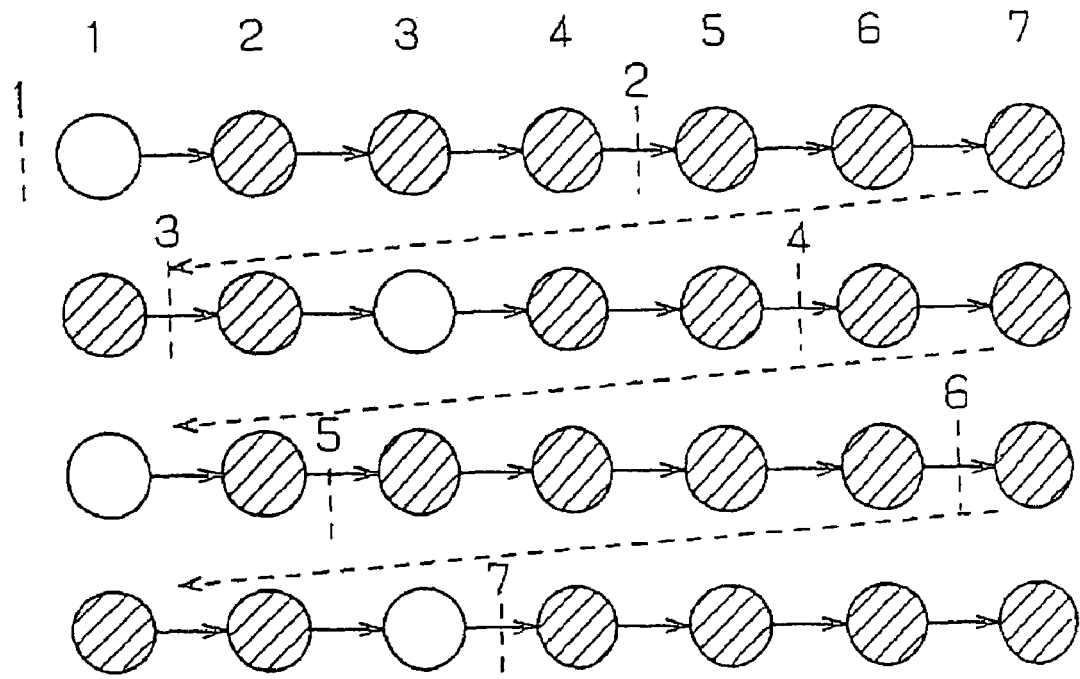
FIG. 109 is an explanatory drawing of the drive system for the display unit of the present invention.
Figure 110:
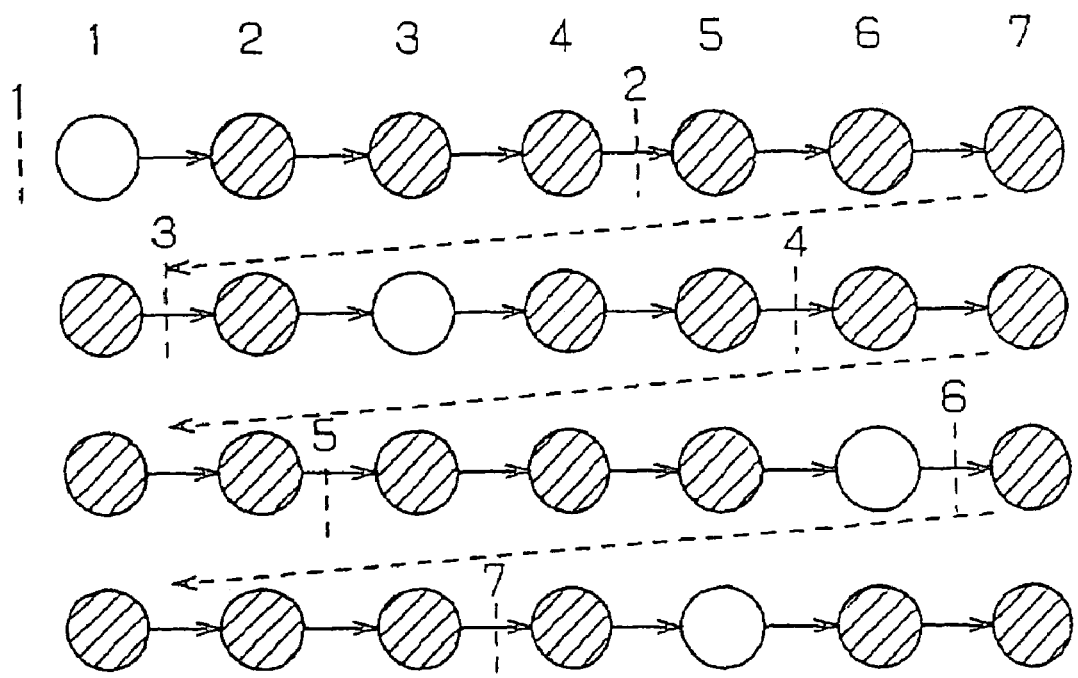
FIG. 110 is an explanatory drawing of the drive system for the display unit of the present invention.

Though FIG. 108 describes white circles are placed in the same distance, this is not a restriction. White circles may be irregularly placed as shown in FIGS. 109 and 110. The reason is that irregular placing may reduce flicker generation by interference caused by other gradation.

Though implementation examples in FIGS. 106 and 108 describes as if it is MLS drive, this field shift is not MLS drive. Even a concept of field does not exist. The field exists simply as 4 counters. The important thing is the number of frames× frames expressing the gradation. As a matter of course, there is not even a concept of impressing on voltage on the pixel with one frame or impressing off voltage. Only the concept of impressing on voltage by the entire frame×frame or impressing off voltage exists. Description is made as MLS here for the convenience of easy explanation.

FIG. 106 shows the case for 8 gradation 7FRC. The field shift to output data in horizontal direction in FIG. 106 needs to match denominators of the whole gradation data (Otherwise, it is desirable to match denominators of all the gradation data), because it helps suppressing interference. 15 FRC should be chosen for 16 gradations and 31 FRC should be chosen for 32 gradations. Namely, FRC should be the number of gradations minus 1. On/off data column can be expressed with the number of gradations.

Figure 111:
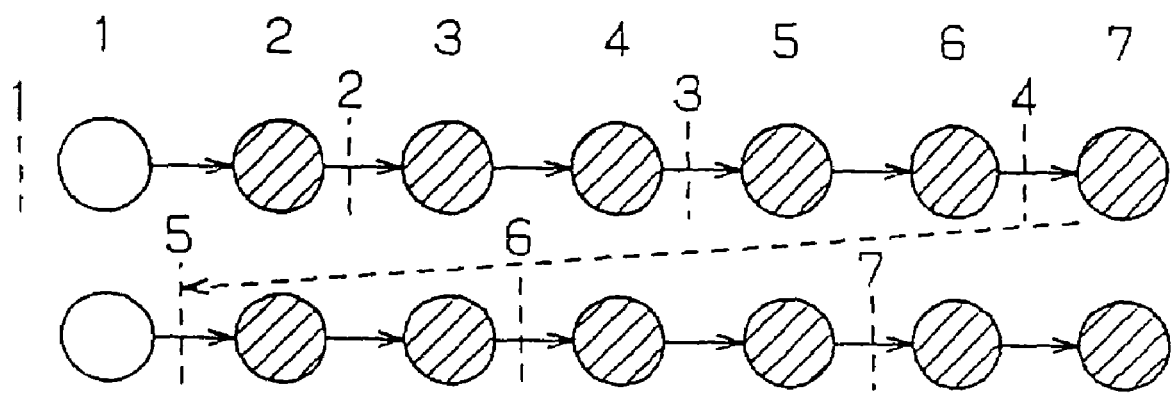
FIG. 111 is an explanatory drawing of the drive system for the display unit of the present invention.
Figure 112:
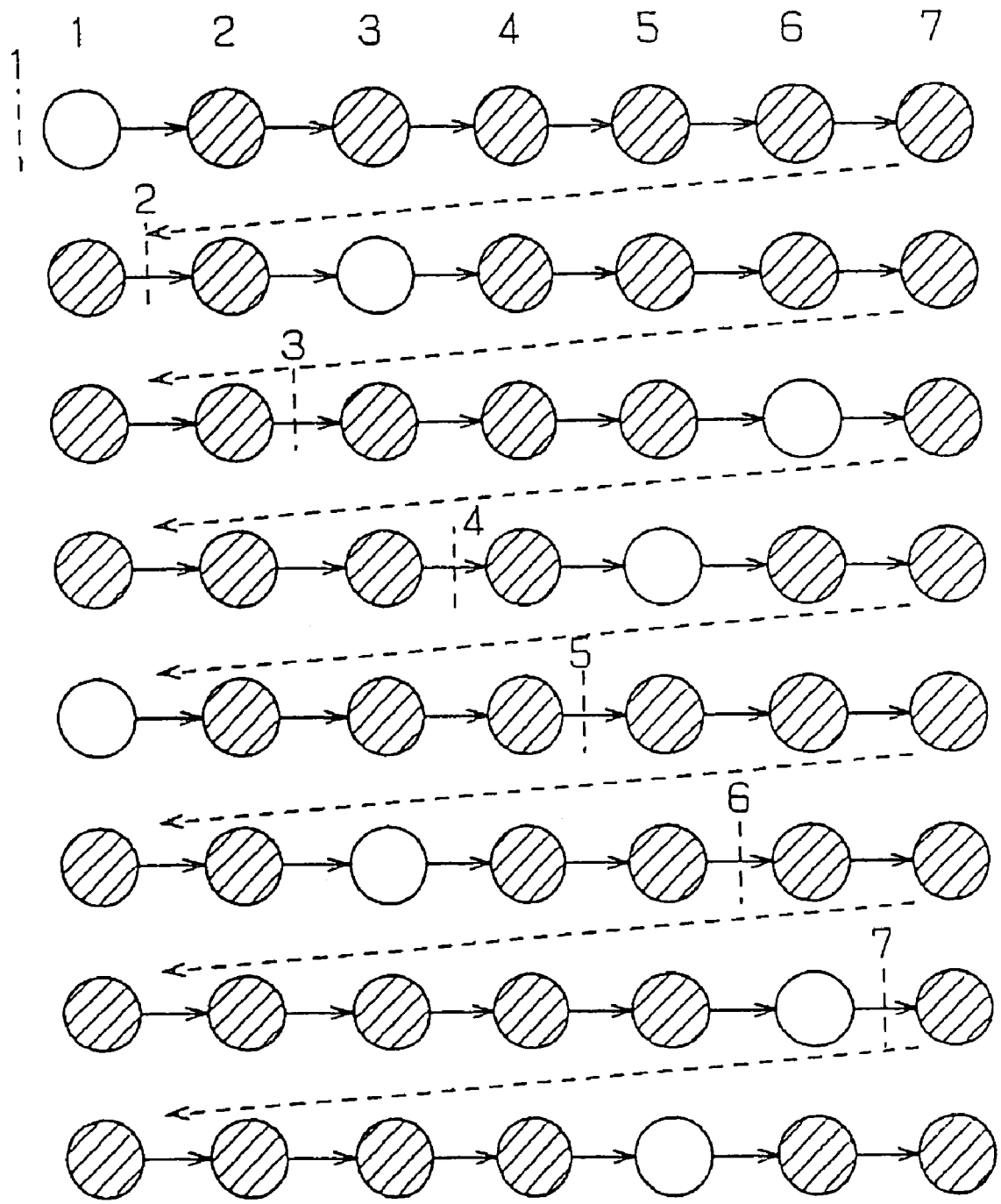
FIG. 112 is an explanatory drawing of the drive system for the display unit of the present invention.

FIG. 111 shows the case for MLS2. two fields×7 FRC makes 14 data. It is delimited in two. FIG. 112 shows the case for MLS8 that allows selecting 8 common electrodes at the same time. It consists of 56 data columns deriving from 8 fields×7 FRC. It is delimited in 8. In either case, the field shift in FIG. 106 can correspond to all MLS drive.

Figure 113:
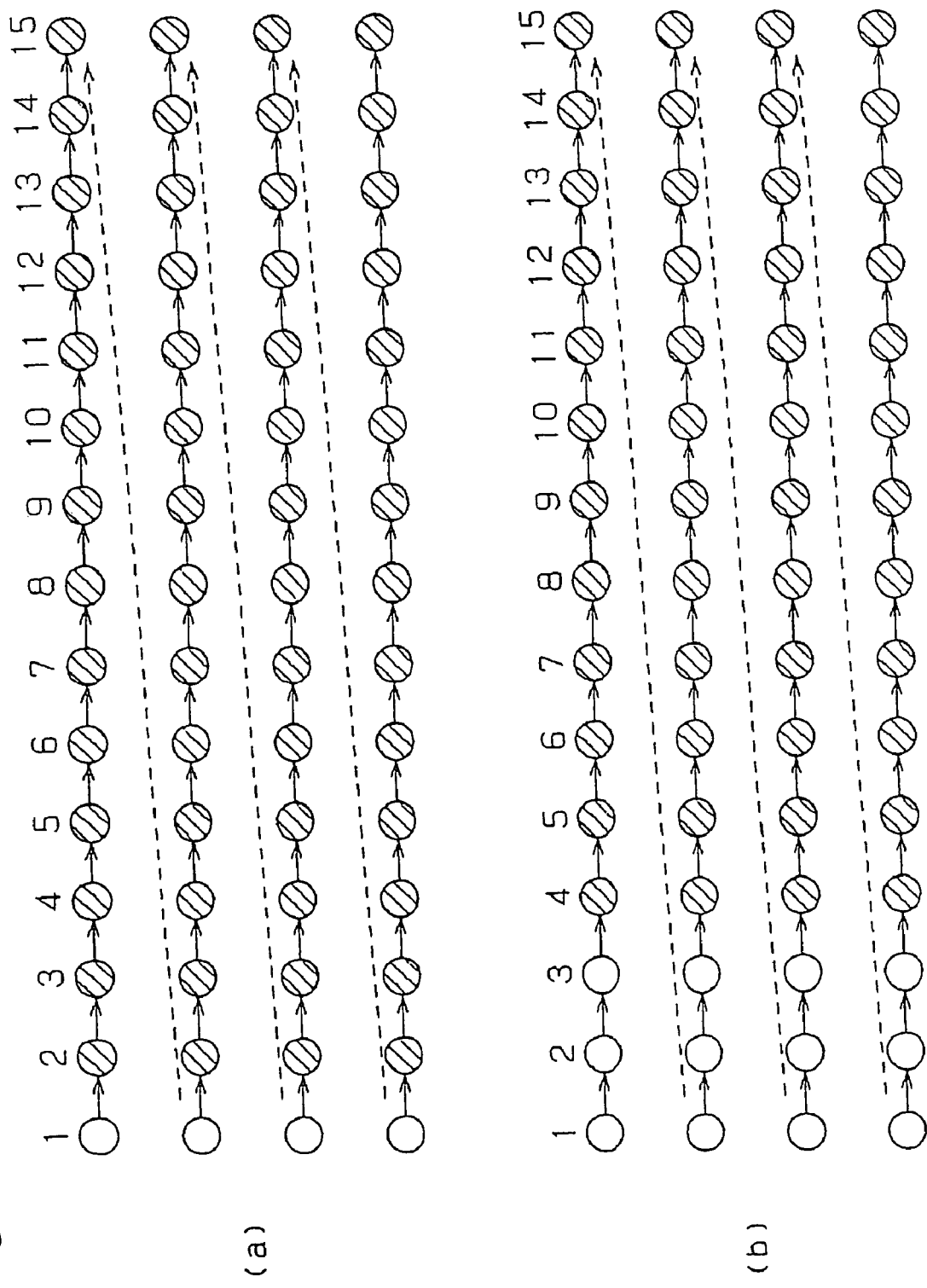
FIGS. 113(*a*) and 113(*b*) are explanatory drawings of the drive system for the display unit of the present invention.
Figure 114:
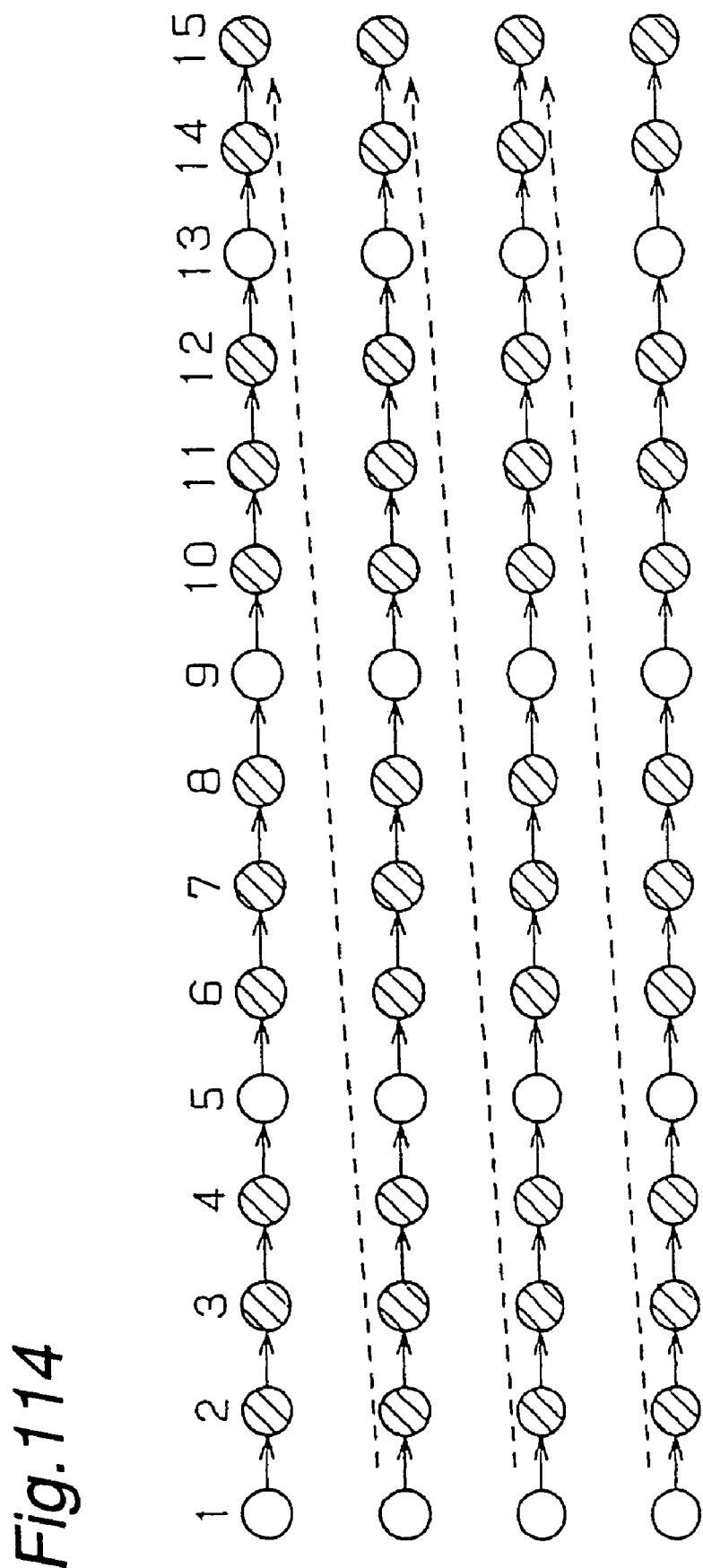
FIG. 114 is an explanatory drawing of the drive system for the display unit of the present invention.

FIG. 113 shows the case for 15 FRC. FIG. 113 (a) shows the gradation in 1/15 and FIG. 113(*b*) shows the gradation in 3/15. FIG. 114 shows the gradation in 4/15 and places white circles in the same distance where possible. Placing in the same distance means that the difference between the minimum and maximum distance should be within 2 or less.

FIG. 115 shows implementation example of combinations of shift processes. 7 FRC is taken for an example. FIG. 115(*a*) shows 1/7 gradation. FIG. 115(*b*) shows 2/7 gradation. FIG. 115(*c*) shows 3/7 gradation. FIGS. 115(*a*1), (*b*1) and (*c*1) show the first breakpoint process (shown by A).

A breakpoint means 4 fields×7 frames=28 for MLS4. Likewise, FIGS. 115(*a*2), (*b*2) and (*c*2) show the next breakpoint process (shown by B). FIGS. 115(*a*3), (*b*3) and (*c*3) show the third breakpoint process (shown by C). FIGS. 115(*a*4), (*b*4) and (*c*4) show the last breakpoint process (shown by D).

Though breakpoints are expressed as A, B, C, D, this is not a restriction. It can be more than 4 or 2 or 3. Breakpoints will be processed in the order as A, B, C, D, A, B. C.

The characteristic of FIG. 115 is that the on data is shifted according to the breakpoints. It takes the shift positioning method described in FIG. 104. Therefore, the detail is omitted here as it was already explained in FIG. 104.

On data can be positioned by randomizing by applying the shift pattern shown in FIG. 104 for every breakpoint in FIG. 115. That helps reducing interference generation between gradations and frame rates.

The combination of above all shift processing or more than 1 will be used for flicker countermeasure processing. The data shift to control flicker occurrence at low frame rate will be implemented at level data shift processing circuit. The following will explain the details of level data processing circuit motion.

Figure 116:
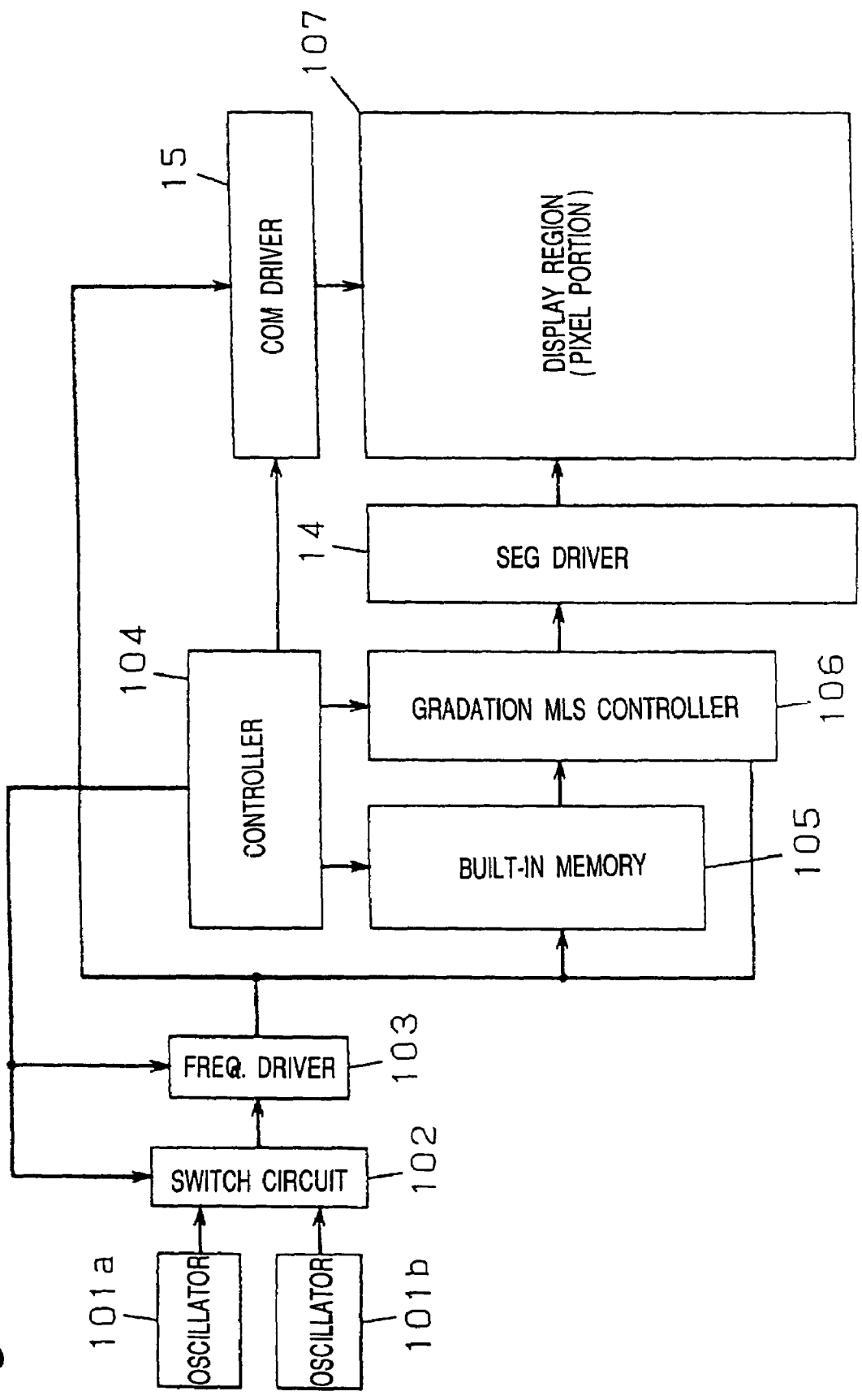
FIG. 116 is a block diagram of the display unit of the present invention.

FIG. 116 is the circuit block illustration of indicator of the present invention. The present invention has at least 2 of oscillators 101 (101a and 101b). The oscillator 101 includes the oscillator, which operates itself, and the other oscillators, which will output the specific frequency by adding the crystal or other circuits. This also includes the oscillators, which operate at specific value by outside resistance R and built-in condenser C, and items, which oscillate outside condenser CR by the resistance of inside IC outside, or multiple clocks, which are supplied from devices like micro computers. In this case, we may not be able to say that this builds up more than 2 oscillators. Since this, however, invention means the oscillators, which can input more than 2 clocks; this will be included in the present invention. The oscillator 101 is not limited to only 2. More than 3 will be possible.

Figure 117:
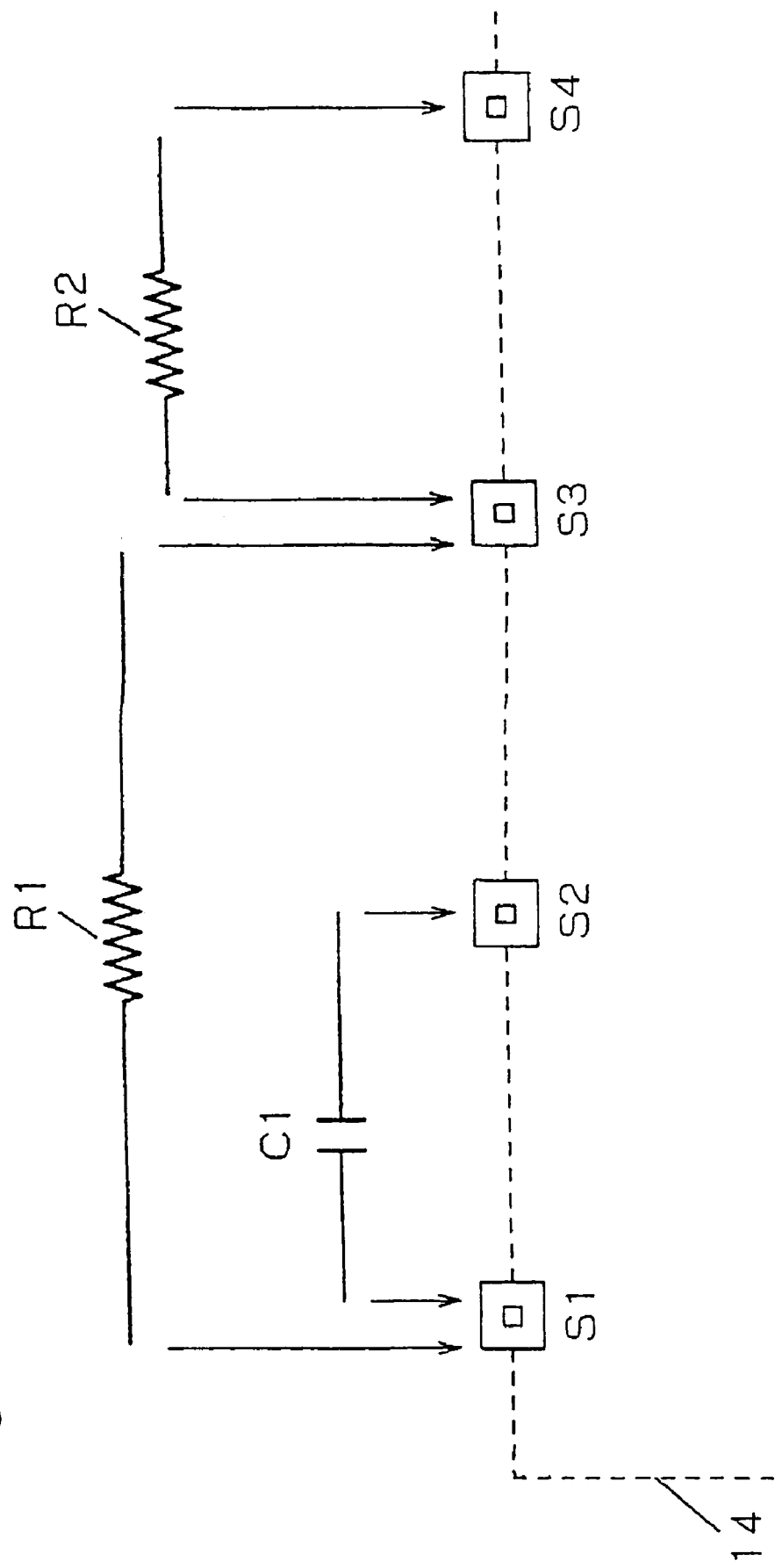
FIG. 117 is an explanatory circuit drawing of the display unit of the present invention.

FIG. 117 oscillates the multiple frequencies by 1 of outside condenser C1 and 2 of outside resistance R1 and R2. It is needless to say that the resistance can consist by the patterns inside semiconductor chips of driver IC. As FIG. 117 describes, this can realize by connecting from terminal S1 of semiconductor chip to C1 of condenser and resistance R1 and R2. Hence, it oscillates by specific frequency by changing C and R.

Figure 118:
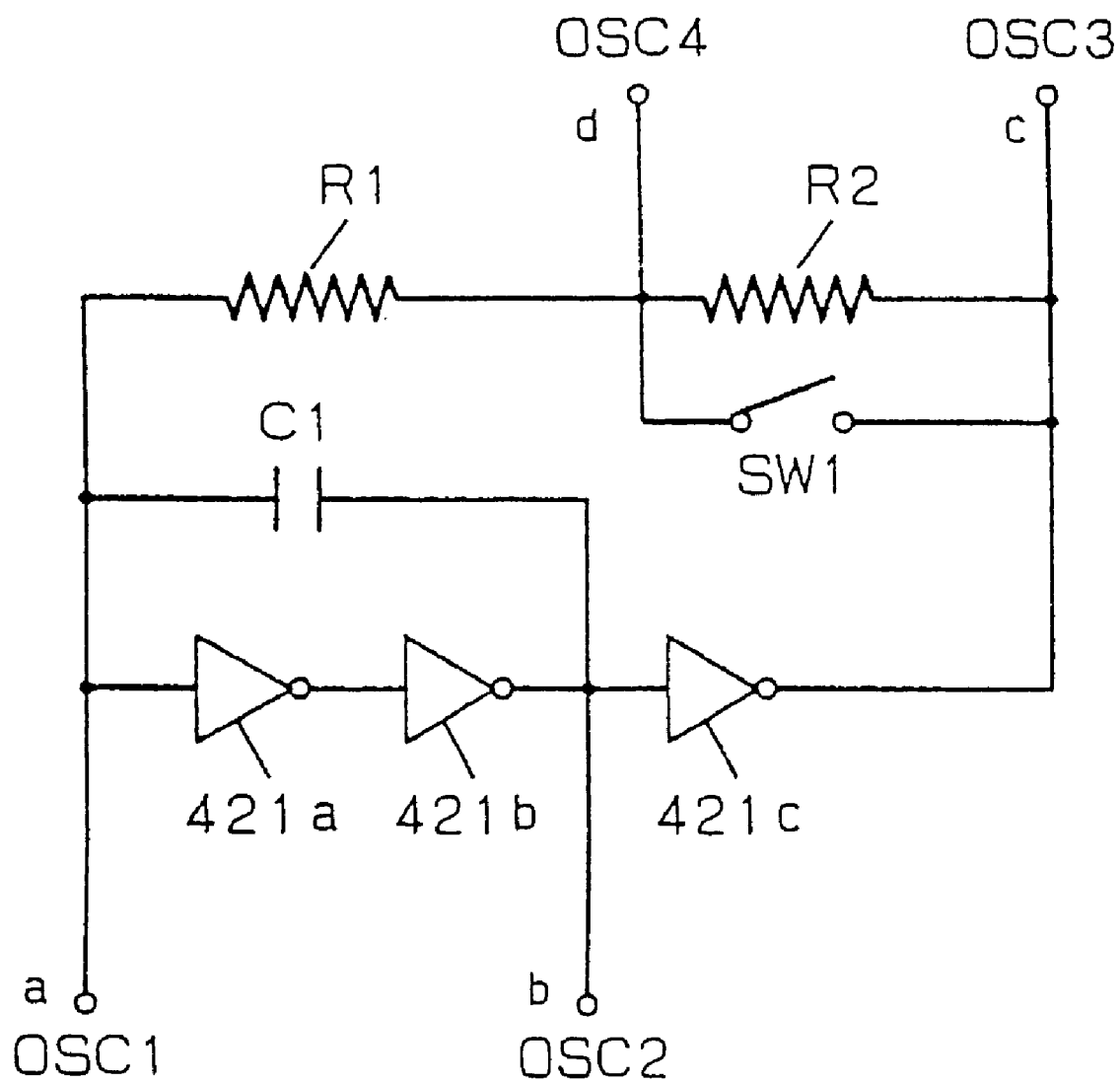
FIG. 118 is an explanatory circuit drawing of the display unit of the present invention.

FIG. 118 describes the detailed semiconductor circuits; that is 3 inverters of 421 and switch SW1 arranged by analog switch. ON/OFF transfer of switch SW1 changes the output frequency from terminal OSC1 to OSC4. This circuit will not require any explanation.

FIG. 116 transfer circuit 102 is the analog switch. Since the transfer switch circuit 102 selects the frequency, this includes the SW1 of FIG. 118. The transfer circuit 102 selects the one clock against multiple input clocks, and outputs.

It is possible to have mechanical switch such as relay switches for switches inside the transfer circuits 102. Other types of manual transfer switches are also available. When one input clock can correspond with multiple frequencies by microcomputer, it is not necessary to memorize the transfer switch 102. This type of transfer switch 102 should be included to the concept.

This type of inventive indicator has at least multiple oscillators 101. For example, the oscillator 101a operates the clock and the oscillator 101b operates the clock 100 kHz. To simplify the explanation, the clock 100 kHz realizes the frame rate 100 Hz (which rewrites the liquid crystal panel 100 times a second), and the clock 160 kHz realizes the frame rate 160 kHz (which rewrites the liquid crystal panel 160 times a second).

The output of oscillator 101 will be input to the transfer circuit 102. The transfer circuit 102 is the switch, selects either oscillator 101a or 101b, and transmits to the transfer circuit 103. It is preferable to differentiate oscillating frequency within the range of above 15% and less than 30% for oscillator 101a and 101b.

The diving circuit 103 passes the input clock frequency without dividing, or dividing it into two, four, or eight parts. It means, the clock frequencies output from the dividing circuit come from one of the oscillators 101a or 101b with or without being divided (see FIG. 119). Therefore, one can choose any one of the eight frequencies.

The reason why plural number of oscillators 101 are used is to deal with both moving images and static images, and/or 4096 colors, 256 colors and 8 colors successfully. Usually, the frame rate is high when moving image is displayed, while it is low when static image is displayed. In the case of STN liquid crystal display panel, the effect of interference between gradations is greater when many colors, for example 4096 colors, are displayed. On the other hand, as the interference in the case of small number of colors, for example 8 colors, are displayed, is small, in such a case, low frame rate fits the purpose.

When the frame rate is high, by necessity, the electric power consumption of the display unit increases. Therefore, it is desirable to use the unit with as low frame rate as possible, partly because it helps save the power consumption. The standard frame rates (default) are represented in the FIG. 120. It is desirable to switch the frame rates depending on the case. You should use different frame rates between 256 colors and moving images, even though you use the same liquid crystal display unit.

For example, when you display 8 colors on the 250-msec liquid crystal panel, you choose 30-40 Hz for the frame rate to lower the power consumption as much as possible. In contrast, when you display a moving image on the same display, you increase the frame rate up to 100-140 Hz so that the splicing would not occur. Accordingly, you can display both moving and static images on one display panel in good quality. It should be noted that, as regarding FRC etc. stated above, you should use different shift processing for moving images and static images. Moving images have their own optimal shift processing, while static images have their own optimal shift processing.

In order to vary the frame rates depending on the number of displayed colors and/or moving/static images, divided frequencies from one frequency is not enough to get excellent image quality. However, as you see in the FIG. 116, if at least two oscillators (101a and 101b) are equipped, the frame rates represented in the FIG. 119 are achieved in combination with the dividing circuit. In other words, the circuit operates with more clock frequencies, the power consumption becomes low, and the liquid crystal display panel runs at the optimal frame rate.

With the present invention, the frame rate is set up so as to become one thousandth of the clock frequency generated by the oscillator 101. Therefore, if the clock frequency is 160 kHz and not divided, the frame rate is 160 kHz. If you use, as represented in the FIG. 119, two clock frequencies of 160 kHz and 100 kHz (utilizing two generators), you can switch the frame rates successfully.

With regard to the way of switching, a changing-over switch such as a key switch will be separately prepared, and the way to switch the frame rates (users will switch the frame rates by pressing the key switch etc.) will be illustrated.

When the microcomputer inputs image data into the internal memory of the segment driver IC14, the data for 4096 colors (RGB: 4 bits) and 256 colors (RG: 3 bits, B: 2 bits) are differently stored into the memory (Or the microcomputer operates differently). This difference is recognized and utilized to switch the frame rates. Specifically, when the microcomputer stores the image data of 4096 colors into the internal memory of the segment IC14, it transfers the command that it stores the data of 4096 colors to the drive IC14. The dividing circuit 103 etc. start to run when this command is transferred, and the dividing circuit 103 outputs clock frequency of 100-120 kHz.

Likewise, the method to store data to memory is switched to 256-color mode by the command from a microcomputer for 256 colors. 80 k-100 kHz clocks are outputted from the divided frequency circuit 103 for 256 colors. Write the animation flag (description) on the packet data of the image sent to a mobile telephone (assuming that the display panel is used for the display panel of the mobile telephone) in animation image. The microcomputer detects this flag (by decoding), determines it as an animation and converts the output clock from the divided frequency circuit 103 to 140-160 kHz.

160 kHz oscillation frequency of the oscillator 101*b* is converted to ¼frequency by the divided frequency circuit to output 30-45 kHz clocks for 8-color display. Therefore, the frame rate will be 30-40 kHz in this 30-45 kHz clocks. In this way, power consumption can be lowered on a proportional basis by reducing the frequency. For example, 8-color display is enough on the menu screen normally displayed on the liquid crystal display panel of a mobile telephone. Therefore, it is effective to reduce power by 8-color display. The present invention enables reducing operating clock on the entire circuit freely by commands and accelerating the frame rate. This helps to layout ultra-low power consumption modules as a whole.

Controller 104 has the control functions such as decoding function of input commands, external I/F function and memory. Memory 105 is the built-in memory made within the segment driver and SRAM memory for one screen. As an example, one bit data consists of 8 MOS transistors and the data bus is a two-way bus.

MLS4 drive is required to compute data for 4 pixels for processing. The data bus is structured to be able to output data for 4 lines at the same time. Semiconductor process uses aluminum three-layer process. To simply the data bus, pixel data may be read one line at a time for 4 times in a row to compute MLS. Data will be read for 8 lines at a time for MLS8.

Data from the memory is sent to the gradation MLS control circuit for MLS operation. The result of operation is sent to the segment (SEG) driver circuit. Though SEG driver 14 is separately shown here, it is combined with the gradation MLS control circuit 106, controller 104 and memory 105 to make a unit. It is separated for easy explanation. The controller 104 and memory 105 may be separated from the segment driver 14 to make a separate chip.

Figure 121:
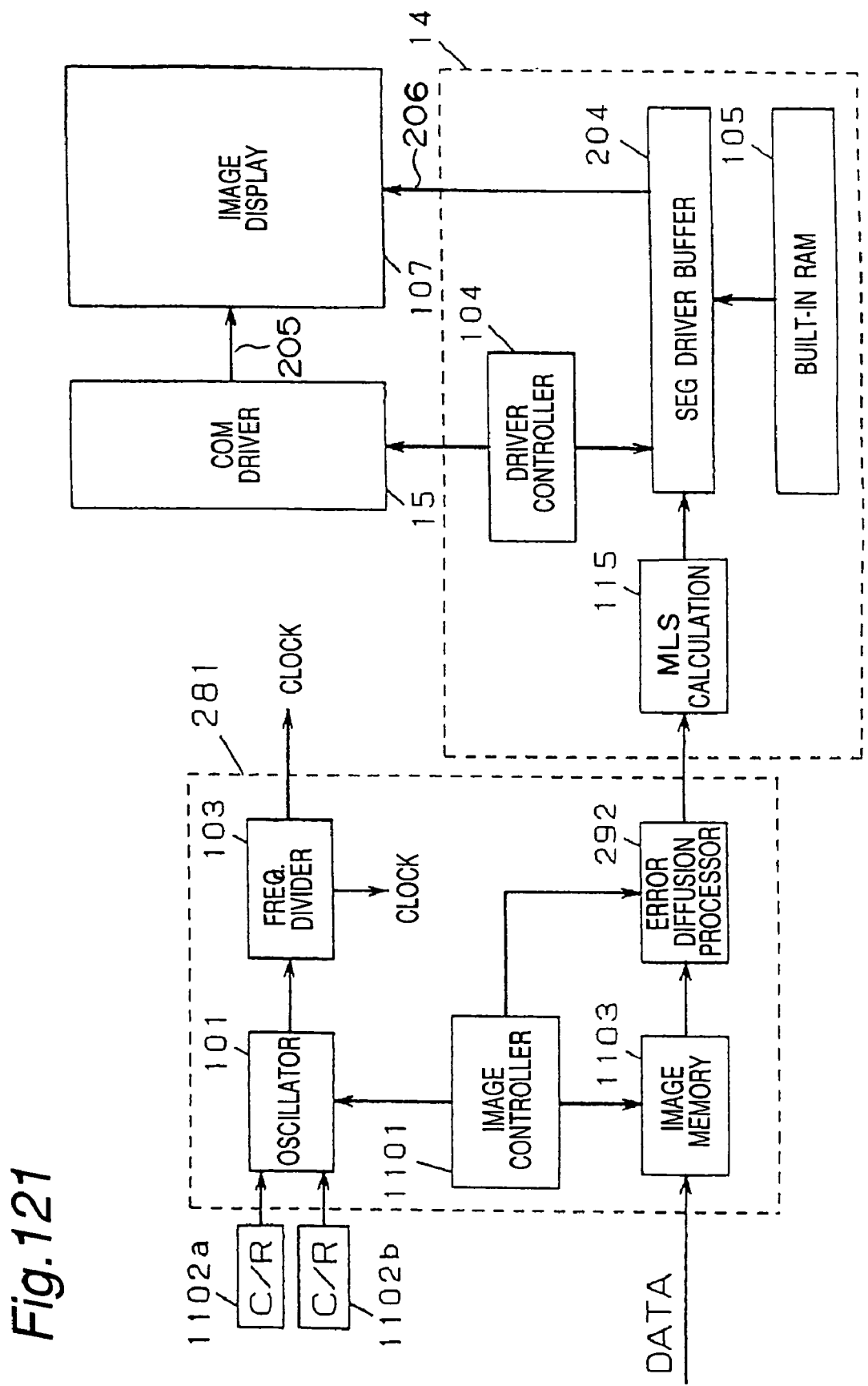

FIG. 121 shows the layout of the built-in RAM 105 within the segment driver 14. The built-in RAM has the capacity of 8-color display (1 bit per color) and 256-color display (3 bits for RG, 2 bits for B). The driver controller 104 reads image data on this built-in RAM 105 for still image in 8-color or 256-color display. It can eventually realize ultra-low power consumption. The built-in RAM 105 may be used for multicolor RAM (4 bits for R, G and B) with 4096 colors or more. It may also be used for 650 thousand colors (6 bits for G, 5 bits for R and B), 260 thousand colors (6 bits for R, G and B) and true colors (8 bits for R, G and B).

Examples above are described on the specification to explain the display panel or the display device and are not limited to this. For example, 281 is the invention of control IC and 14 is the invention of the segment driver (source driver) in FIGS. 121 and 122. And 15 is the invention of the common driver (gate driver). Functions and operations of these IC's are detailed in FIG. 86, FIG. 116, FIG. 118 and FIG. 119. Therefore, selling these IC's is also an implementation of the present invention. These IC's can be built not only on liquid crystal display panel but also on organic EL (OLED) display panel and inorganic EL display panel. Furthermore, It can comprise information display device such as a mobile telephone, note PC and TV using the mentioned display panel. These items are applicable to other examples for the present invention.

Data after MLS operation (3 bits showing voltage value or the number indicating voltage) may be stored for image data on the built-in RAM 105. It could be the data after error diffusion process. Though 204 is described as SEG drive buffer, it is not a simple buffer. It is made up of various functions and circuits to process input from MLS operation circuit 115 and the built-in RAM and output voltage to the segment signal line such as data conversion circuit, latch circuit, command decoder, shift circuit, address conversion circuit. This item is true for other examples of the present invention.

The controller 281 may have an oscillator such as oscillation circuit 101. The layout and function of the oscillation circuit 101 is described in FIG. 118 and the detail is omitted here. The external capacitor C and resistor R are described as CR1101 in FIG. 121. Oscillation circuit generates the basic oscillation frequency by selecting either CR1102*a* or 1102*b*. The generated basic oscillation frequency (clock) is supplied to the internal circuit of the controller 281 and the segment driver 14.

The segment driver IC 14 synchronizes with the controller 281 to process data. Therefore, the image controller 1101 of the controller 281 can synchronize with the driver controller 104 of the segment driver IC 14 to process image data. This enables reducing buffer memory size and eventually the chip size.

Image data is stored on the image memory 1103. The image controller 1101 reads data from the image memory for error diffusion process (including dithering). The processed image data is transferred to the MLS operation circuit of the segment controller.

The segment driver IC 14 (segment driver circuit) synchronizes with the controller 281 to process data. If the segment driver can serially process input image data, the image memory 1103 of the controller 281 is not necessary, because the data is not temporarily stored. Or line memory for a few lines may be prepared in the segment driver IC 14 or the controller 281.

Figure 123:
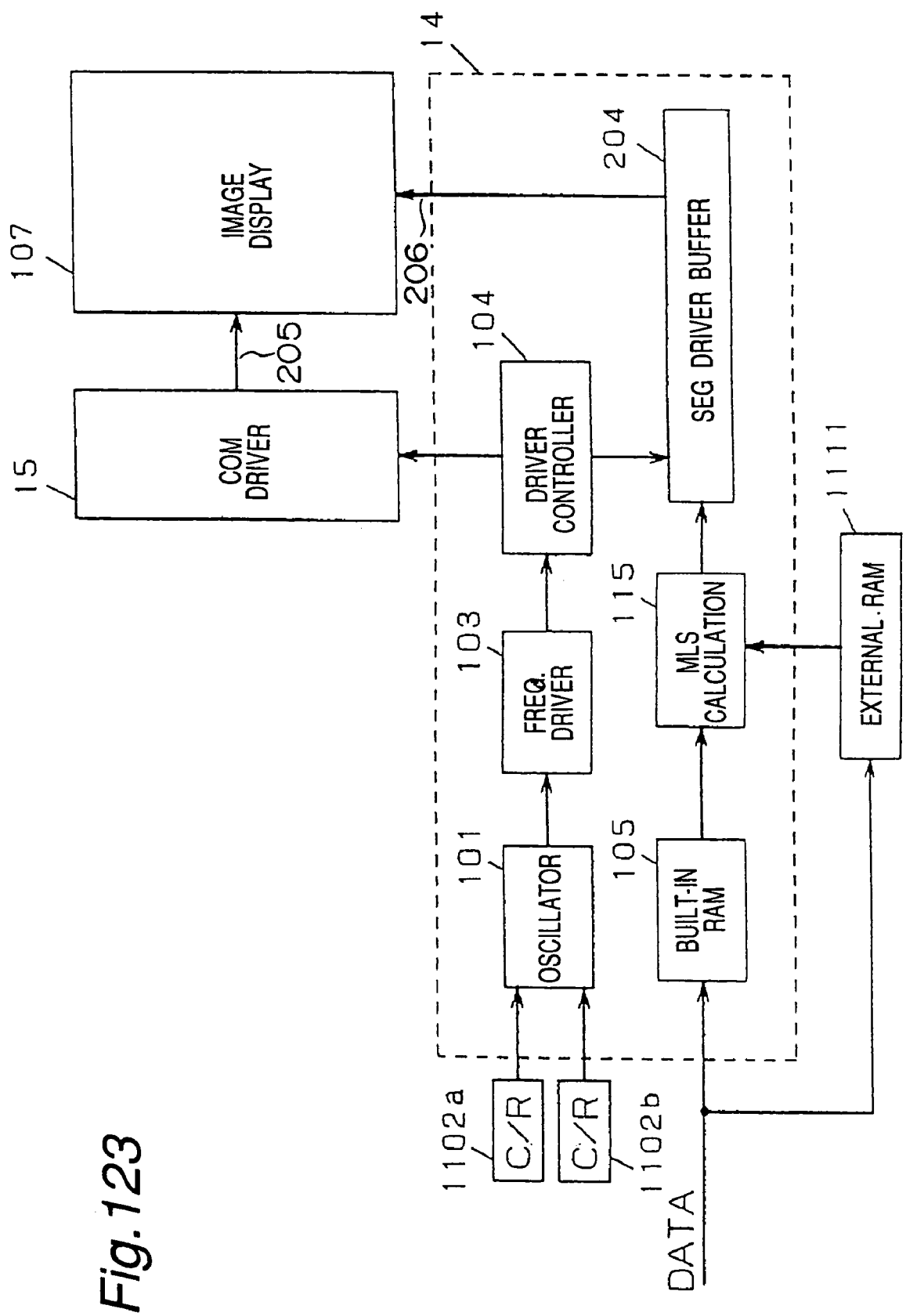

FIG. 123 shows the layout using the built-in RAM and the external RAM 1111. Image data is stored only on the built-in RAM (4 bits for RGB each×number of pixels for 4096 colors), or on both the built-in RAM 105 and the external RAM 1111. Specifically, the built-in RAM 105 of the segment driver 14 in FIG. 123 has RAM capacity for one screen to display 4096 colors. The external RAM 1111 has the capacity of 2 bits per pixel RGB (2×3=6 bits). Therefore, combination of the built-in RAM 105 and the external RAM 1111 requires 6 bits. Namely, 260 thousand colors can be expressed in 64 gradations per color. As a matter of course, configuration of 4 bits for each pixel RGB (4×3=12 bits) on the external RAM 1111 can achieve true color display. In another word, multicolor display is easily achieved by changing the capacity of the external RAM 1111.

Though FIG. 123 shows the external RAM 105 is formed in the segment driver 14, it may be formed in the common driver 15. You can also use the RAM formed for each pixel in the display area 107. You may implement the external RAM 1111 with COG technology on the board 12 or 11 of the display panel 21. It is needless to say that the items above are applicable to other examples of the present invention.

Generally, low power consumption takes precedence over the number of display colors for information display devices such as mobile telephones. Power consumption increases due to reasons such as higher operating frequency of the circuit to increase the number of display colors or more changes of voltage wave impressed on the liquid crystal. Therefore, increasing the number of display colors is limited.

Figure 124:
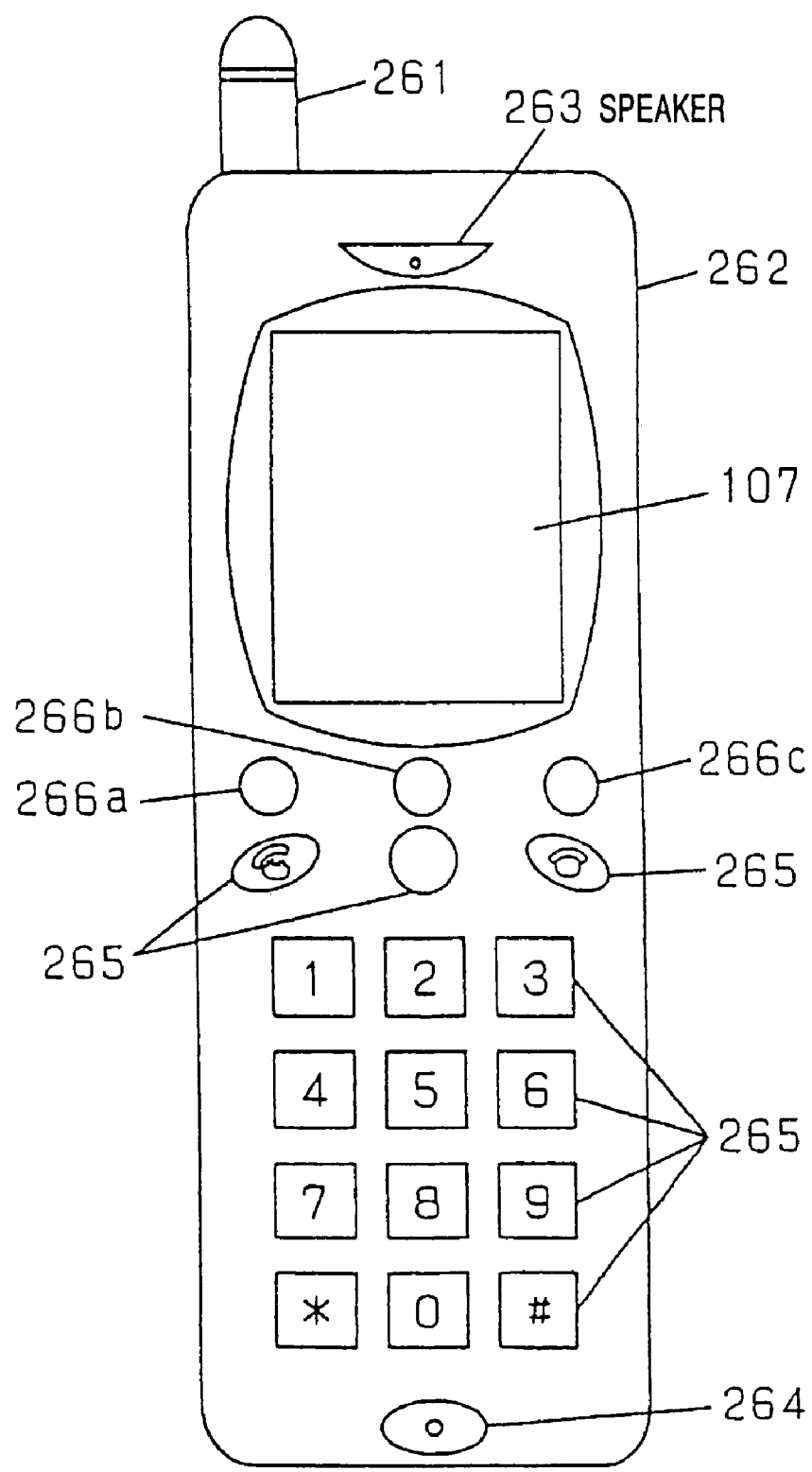

The mobile telephone of the present invention shown in FIG. 124 is equipped with a CCD camera on the back of the body 262. Images taken by the CCD camera can be immediately displayed on the display screen 107 of the display panel. Data taken by the CCD camera can be displayed on the display screen 107. Image data taken by the CCD camera can be switched by the key entry 265 between 24 bits (1.67 million colors), 18 bits (260 thousand colors), 16 bits (65 thousand colors), 12 bits (4096 colors) and 8 bits (256 colors). Error diffusion process or dithering should be applied to the image data before displaying it.

Error diffusion process should be applied to display data especially when the built-in RAM 105 is 12 bits or more. Namely, if the image data from the CCD camera exceeds the capacity of the built-in memory, such as an error diffusion process is performed to reduce the number of display colors to fit the capacity of the built-in memory 105. Image processing method and configuration of this error diffusion process will be later described in FIG. 135 and is omitted here.

It is preferable to display images such as figures taken by the CCD camera in more number of degradations. It is also preferable to display nature images in more number of degradations. On the other hand, it is desirable that menu screens will be displayed in a reduced number of display colors for low power consumption.

To address this problem, images are to be displayed only with the built-in RAM 105 in the normal situation. If only the built-in RAM 105 is used, low power consumption can be achieved because the process is closed within the chip 14 (external access is not required). If the image is to be displayed in more number of degradations than that supported by the built-in RAM 105, use the external RAM 1111 together. For instance, when the number of display colors is expressed in 6 bits per color and the built-in RAM supports 4 bits per color, use the data stored on the external RAM 1111 for the upper two bits.

Therefore, when the color of the image data is expressed in 6 bits per color, store the upper 2 bits on the external RAM 1111 and the lower 4 bits on the built-in RAM 105. When the color of the image data is expressed in 8 bits per color, store the upper 4 bits on the external RAM 1111 and the lower 4 bits on the built-in RAM 105. Of course, when the image data is expressed in 4 bits per color, store the whole bits only on the built-in RAM 105. When the image data is expressed in 6 bits per color, read the data on the external RAM 1111 in sync with the built-in RAM 105 and convert the image data to 6 bit data.

By the configuration described above, only the built-in RAM 105 is used for the normal number of display colors to address low power consumption. If the image is to be displayed in more number of degradations than that supported by the built-in RAM 105, use the external RAM 1111 together to display the image. This enables achieving multi-gradation display in excellent quality. Increase of the capacity of the external RAM can easily increase the number of gradation display colors, which improves general versatility.

Moreover, to address data on the external RAM 1111, set up an address bus on the segment driver 14 to allow addressing. As MLS4 operation requires data for 4 lines, it is desirable that 4 lines of data on the external RAM 1111 should be structured to be read at the same time.

The example in FIG. 123 shows that the upper 4 bits off the built-in RAM 105 are to be stored on the external RAM 1111. This is not restricted. The lower bits may be stored on the external RAM 1111. This doesn't restrict that the upper and lower bits be separately stored. For example, it may be configured to store the menu screen on built-in RAM 105 and sub images and user images on the external RAM 1111.

And the example of the present invention shows that the oscillation circuit 101 is to be built in the controller 281 or the segment driver 14. This is not restricted. A microcomputer may be used to generate clocks used to run the segment driver 14.

Information display devices such as a mobile telephone of the present invention are equipped with a certificate route key. This key allows configuration for SSL (Secure Socket Layer) encrypted communication between I-mode sites. A certificate route key is the public key for internet terminals to carry out SSL encrypted communication with the certificate authority (CA). Installing a certificate route key enables a mobile telephone to carry out SSL encrypted communication with the site for i-mode with SSL encrypted capability using the certificate authority. It implements e-commerce which requires security protection such as credit card information exchange with SSL encrypted capability.

As a result of various investigations, there is an important relation between the response time R (msec) of the liquid crystal and the frame rate F (Hz) on MLS4 drive in FRC method. The response time R (msec) of the liquid crystal is the sum of build up time and fall time of the liquid crystal in 20° C. to 25° C. The frame rate F (Unit is Hz. In another word, number of screen rewrites per second=number of screens) is the times F that the whole screen is rewritten per second. Scanning lines on the display panel shall be K lines (K is 2 or more). Apply all or either of FRC processes ever described in the drawing. However, a shift process is not required in 8-color display. As the result of experiments and investigations, wee have learned that it is important to satisfy the following relations between R, F and K.

It is optimum to satisfy the following relation between R, F and K in 8-color display.

$$150 \leq (K \cdot R)/F \leq 2500$$

Preferably, it is desired to satisfy the following relation.

$$250 \leq (K \cdot R)/F \leq 1500$$

It is desired to satisfy the following relation between R, F and K for a still image in 256-color display.

$$80 \leq (K \cdot R)/F \leq 800$$

Preferably, it is desired to satisfy the following relation $$100 \leq (K \cdot R)/F \leq 600$$

It is desired to satisfy the following relation between R, F and K for a still image in 4096-color display.

$$100 \leq (K \cdot R)/F \leq 700$$

Preferably, it is desired to satisfy the following relation $$120 \leq (K \cdot R)/F \leq 600$$

It is desired to satisfy the following relation between R, F and K for an animation display.

$$80 \leq (K \cdot R)/F \leq 500$$

Preferably, it is desired to satisfy the following relation $$100 \leq (K \cdot R)/F \leq 400$$

The display devices (such as a mobile telephone) of the present invention are configured to set the value of the above-mentioned formula by a user switch and automatic switching by a microcomputer. This enables achieving the optimum screen display in the optimum frame rate by the number of display colors and display status. If the optical modulation layer is liquid crystal, satisfying these ranges helps achieve good image display in no (less) generation of flickers.

Outputs of the frequency divider circuit 103 are given to the COM driver circuit 18, the controller 104, the memory 105 and the gradation MLS control circuit 106. Though FIG. 116 shows that the SEG driver circuit 14 is separately installed, the controller 104, the memory 105, the gradation MLS control circuit 106 and the SEG driver circuit were constructed on a chip to achieve low power consumption. The power circuit is separately integrated and installed. It may be built in the segment driver 14. The memory 105 can hold display data for more than one screens and provide two-way I/I capability (Reading and writing data t the same time). The controller includes the command decoder and the data swap circuit.

Therefore, the segment driver is able to know whether the data is 256 colors, 4096 colors or 8 colors by the command from a microcomputer. Data can be automatically converted by decoding commands from the microcomputer and by controlling the switching circuit 102 and the frequency divider circuit. Therefore, users can view images in the optimum condition without worrying about the display color.

Especially when you want to switch frame rates by the display color, you may place a user button on the device such as a mobile telephone to enable switching display colors.

Figure 125:
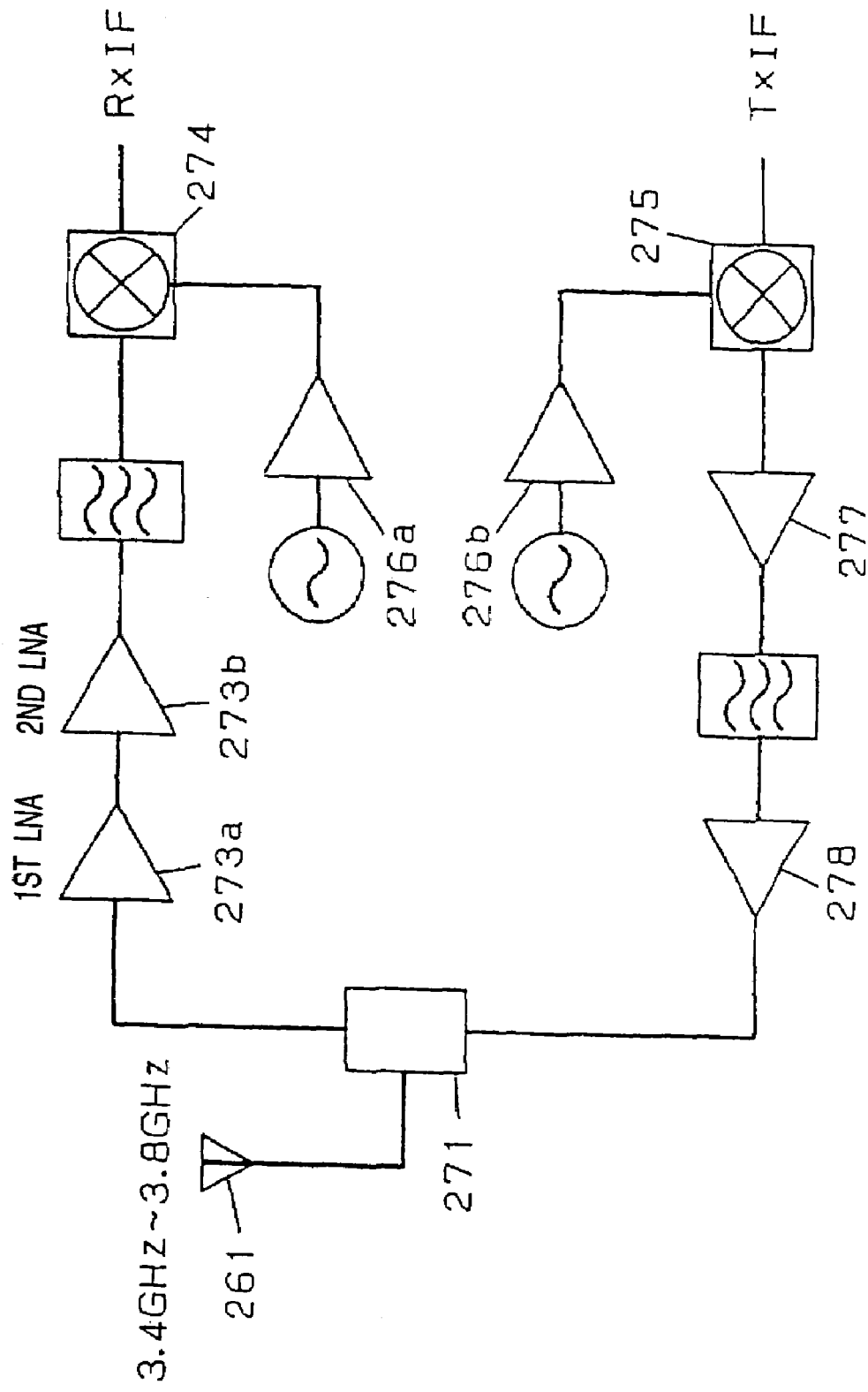

FIG. 124 is a plan view of a mobile telephone as an example of information terminal devices. Antenna 261 and ten-key 265d are attached on the body 262. 266 denotes the display color switching key. The internal circuit block of a mobile telephone is shown in FIG. 125. The circuit mainly consists of blocks of an up-converter 275 and down-converter 274 and a block LO buffer 276 of a duplexer 271, PA pre-driver, PA278 and the like.

Pressing the key 265 changes the display color to 8-color mode, pressing the key again changes to 256-color mode, pressing the key again changes to 4096-color mode. This is the toggle switch that changes the display mode every time the key is pressed. A change key may be separately set for the display color. In this case, three or more keys 261 are required.

The key 265 can be other mechanical switches such as push switch and slide switch and can be the one switched by speech recognition. For example, configure switches so that the display colors on the display screen 107 of the display panel can change by speech entry of 4096 colors into the receiver 264 and high-resolution display. This is easily achieved by adopting the current speech recognition technology. For example, a user speaks "256-color mode" or "low display color mode" to the receiver. Then the receiving terminal starts analyzing the speech and switches to the directed display mode.

The switch can be the one that electrically switches the display colors such as a touch panel which selects an option by touching the menu displayed on the display 107 of the display panel 21. The switch can be configured to switch by the rotation or direction such as a click ball.

Though 266 is shown as the display color switching key, it may be a frame rate switching key. It may also be a key to switch between animation and still image. It may also switch multiple requirements at the same time such as animation, still image and frame rate. It may also be configured to gradually (continually) change the frame rate by keeping on pressing the switch. In this case, it can be achieved by changing the resistor R to the variable resistor and electronic volume out of the capacitor C and the resistor R comprising an oscillator. It can be also achieved by changing the capacitor to a trimmer capacitor. It may also be achieved by forming multiple capacitors on the semiconductor chip, selecting one or more capacitors and connecting them in parallel circuit.

Reference voltage or bias ratio may also be automatically switched by the microcomputer control or a specific menu display may be controlled for display. It may also be switched using a mouse or may be configured to allow switching by pressing a specific place on the menu displayed on the touch panel on the display screen of the display device 21.

Figure 126:
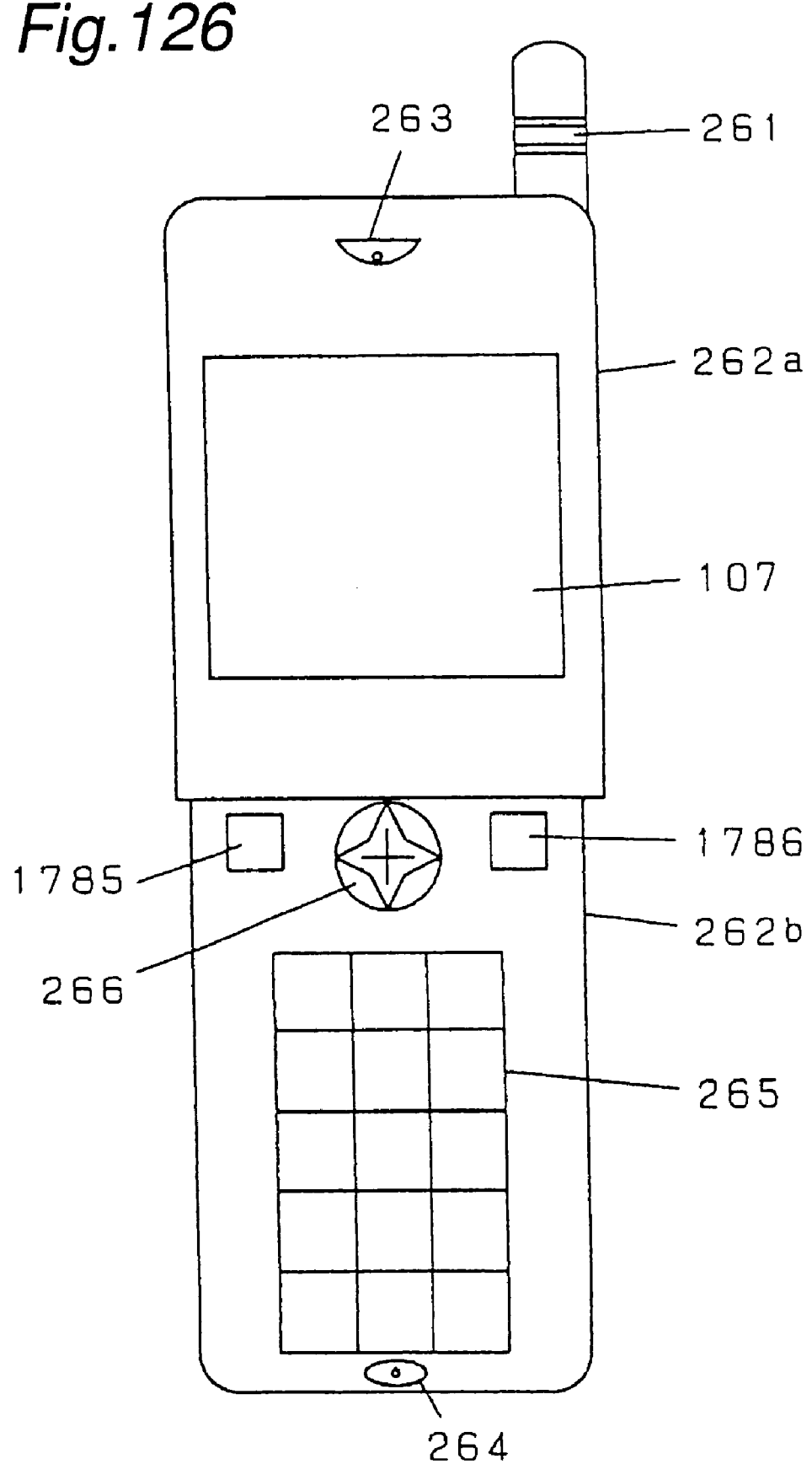

FIG. 126 shows the configuration of the portable information terminal (such as a mobile telephone) of the present invention where the display panel 21 is used as a monitor. The body 262 consists of the 262a with the display panel 21 and 262b with the ten-key 265 in FIG. 126.

Figure 127:
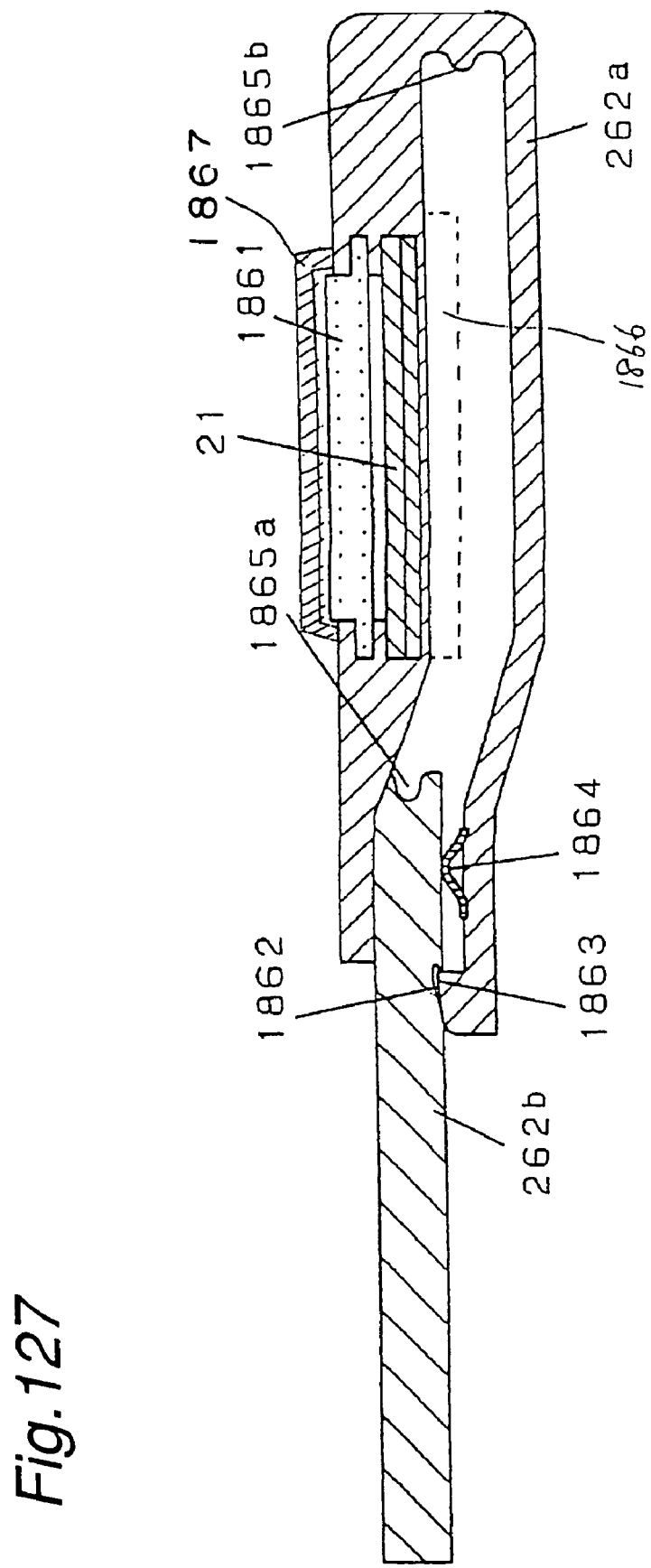

FIG. 127 is a cross section of FIG. 126. An opening is made in the body 262a to store the body 262b. The display panel 21 is attached to the body 262a and the front light 1861 is placed as an illumination in the front, and a back light 1866 is provided inside the body 262a. A touch panel 1867 is attached over the surface of the front light 1861.

0.1 μm or more and 0.8 μm or less air gap shall be provided between the front light 1861 and the display panel 21. Preferably, it is desirable to have 0.2 μm or more and 0.5 μm or less air gap. However, this is not a restriction and an optical coupled layer 1824 may be placed or injected into the mentioned air gap.

In this case, it would be more appropriate to attach the front light 1861 on the display panel than to provide a gap. It is desirable to form AIR coat on the surface of the front light 1861 whose thickness should be 0.4 μm or more and 1.0 μm or less.

Convex alignment section 1865a is formed on the body 262a and concave alignment section 1865b is formed on the body 262b. The position is designed to get fixed when the body 262b is inserted into the body 262a by fitting this convex alignment section 1865a over the concave alignment section 1865b.

The convex section 1863 and the spring 1864 as an elastic body are formed on the body 262a and the concave section 1862 is formed on the body 262b. When the body 262b is withdrawn from the body 262a, this concave section 1862 fits over the convex section 1863 to fix the portable information terminal to the appropriate position.

The spring 1864 and some other parts are used to fix the body 262b and to facilitate the body 262a and 262b insertion. This does not restrict to the spring 1864 and it can be everything that functions as an elastic body such as sponge. The form and structure are not restricted, either. For example, it could be configured that the convex section 1863 moves up-and-down.

As has been mentioned, the terminal can be made compact when it is not used by having the body 262b inserted into the body 262a. The portable information terminal can be big enough when it is used.

Figure 128:
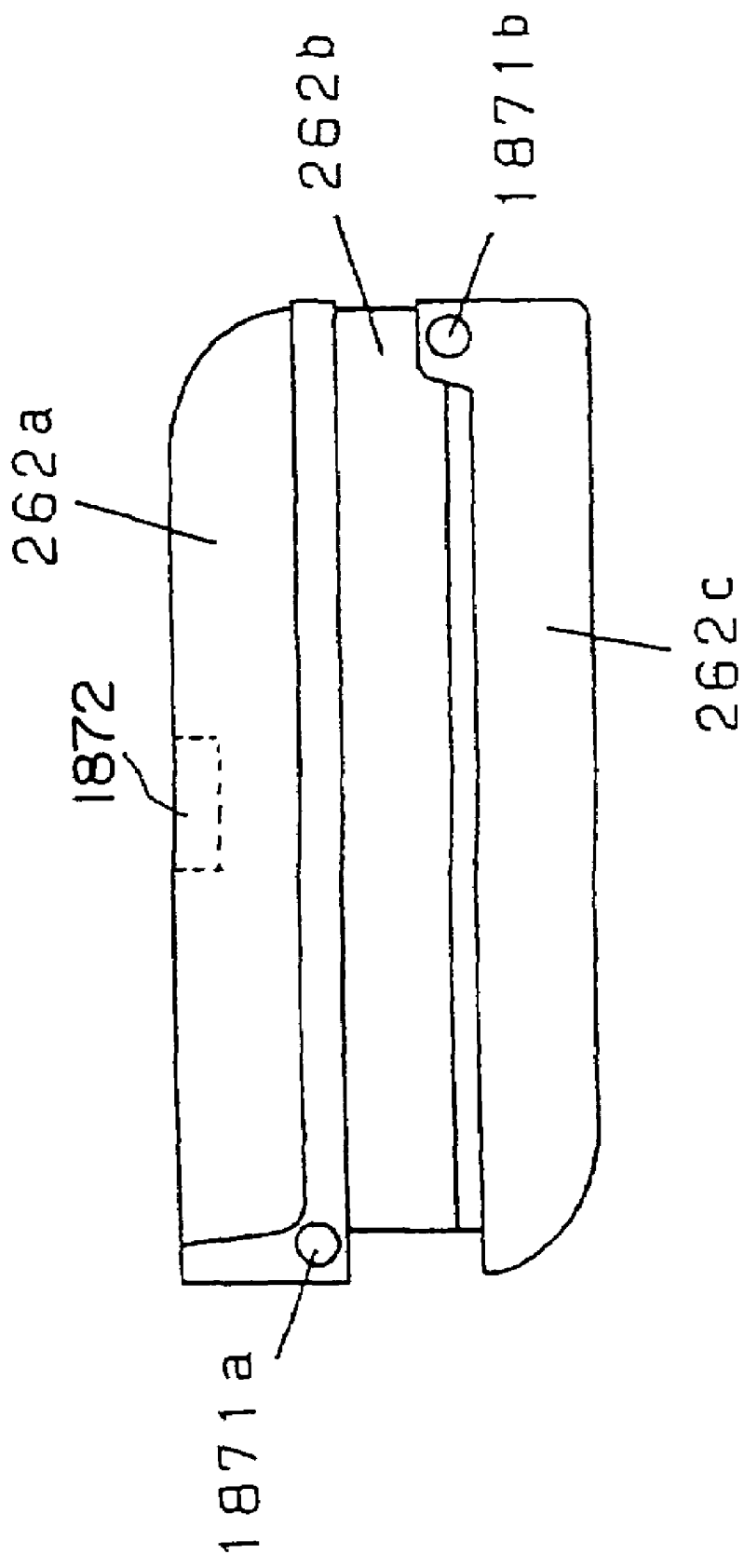

As shown in FIG. 128, it is effective on compact design to divide the terminal into three parts. The body 262a and the body 262c are attached on the body 262b and three bodies 262 can be used on a plane by pivoting them on pivots 1871a and 1871b. In this construction, the body 262a includes a display portion 1872.

The present invention shall be equipped with two or more oscillation circuits 101 and divided frequency circuit to divide the output of the mentioned oscillation circuit. It is separately equipped with the oscillation frequency regulation circuit. This oscillation frequency regulation circuit regulates the oscillation frequency in a specified range. Generally, the oscillation circuit oscillates with the resistor in the semiconductor chip and the external capacitor 1102. However, the resistance generated by the semiconductor in the chip exhibits a wide range of variation. It normally varies ±20%.

The oscillation frequency regulation circuit branches from the defined position in the built-in resistor by the tap and controls oscillation frequency by changing the length of the resistor. Therefore, the oscillation frequency regulation circuit does not convert the oscillation frequency to multiple frequencies (like the oscillation circuit 101); It regulates the oscillation frequency caused by the product variation of the semiconductor to achieve the predetermined value. The oscillation frequency regulation circuit of the present invention is configured to regulate the oscillation frequency in decrements of 5% from +20% to −20%.

The technical idea of switching the frame rate by the display colors is not restricted to a mobile telephone and is widely applicable to devices with display screen such as palm-top computer, note PC, desk-top PC and portable watch. It is not restricted to liquid crystal display devices (liquid crystal display panel) and is applicable to organic EL panel, TFT panel, PLZT panel and CRT.

Improvement of opening ratio will be an important development subject for full color organic EL display panel and active matrix type display panel. Improving opening ratio increases utilization efficiency of light and leads to higher intensity and longer life. To improve opening ratio, you have to decrease the TFT area that blocks light from the light modulation layer such as organic EL layer. As low temperature polycrystal Si-TFT has 10 to 100 times performance compared to amorphous silicon and higher current supply ability, it can make the TFT size smaller. Therefore, it is desirable to manufacture pixel transistor and peripheral driving circuits with low temperature poly-silicon technology for organic EL panel.

The resistance especially significant on the current-driven organic EL panel can be reduced by forming a driving circuit on the glass substrate. It eliminates the TCP connection resistance and shortens the lead wire from the electrode by 2 to 3 mm compared to TCP connection to minimize wiring resistance. Furthermore, it eliminate the process for TCP connection. It is also advantageous in lowering the material cost. These items are also applicable to the liquid crystal display panel.

Needless to say that all items and descriptions in this specification are applicable to driving methods, circuit layouts, devices and transmission formats of the present invention on the organic EL panel.

Should information such as frame rate be described in the transmission format, the frame rate will be automatically changed by decoding or detecting this described data. Especially, it is desirable to describe whether the transferred image is an animation or a still image. It is desirable to describe the number of frames per second for an animation. It is desirable to describe the model number of a mobile telephone on the transmission packet. The transmission packet explained in this specification does not need to be a packet. Namely, it can be anything so long as the sending data contains information described in FIGS. 131 and 139.

Figure 129:
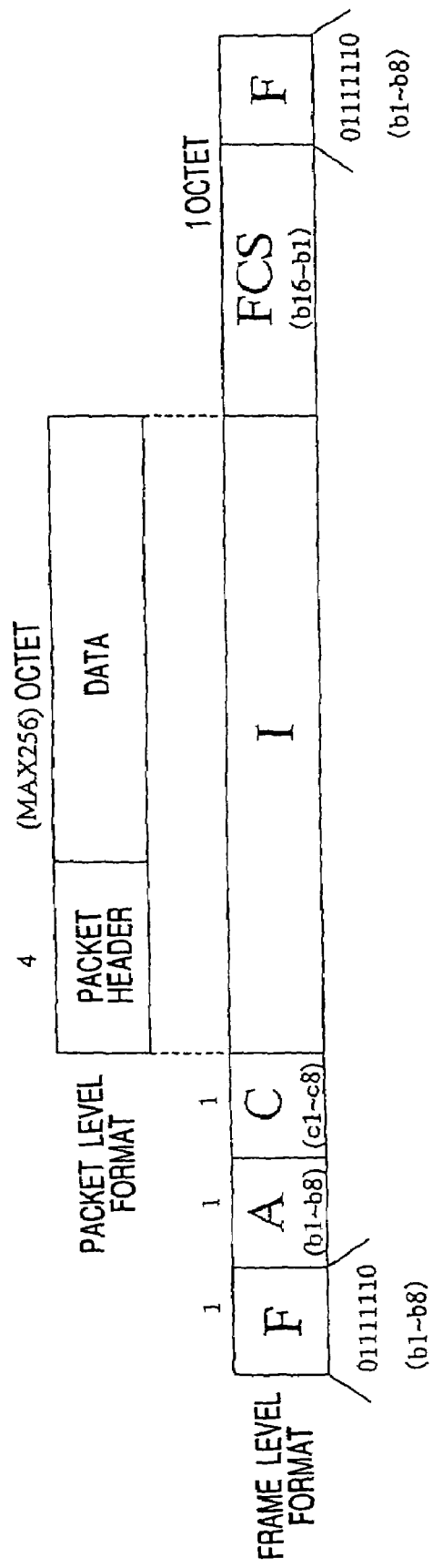
Figure 139:
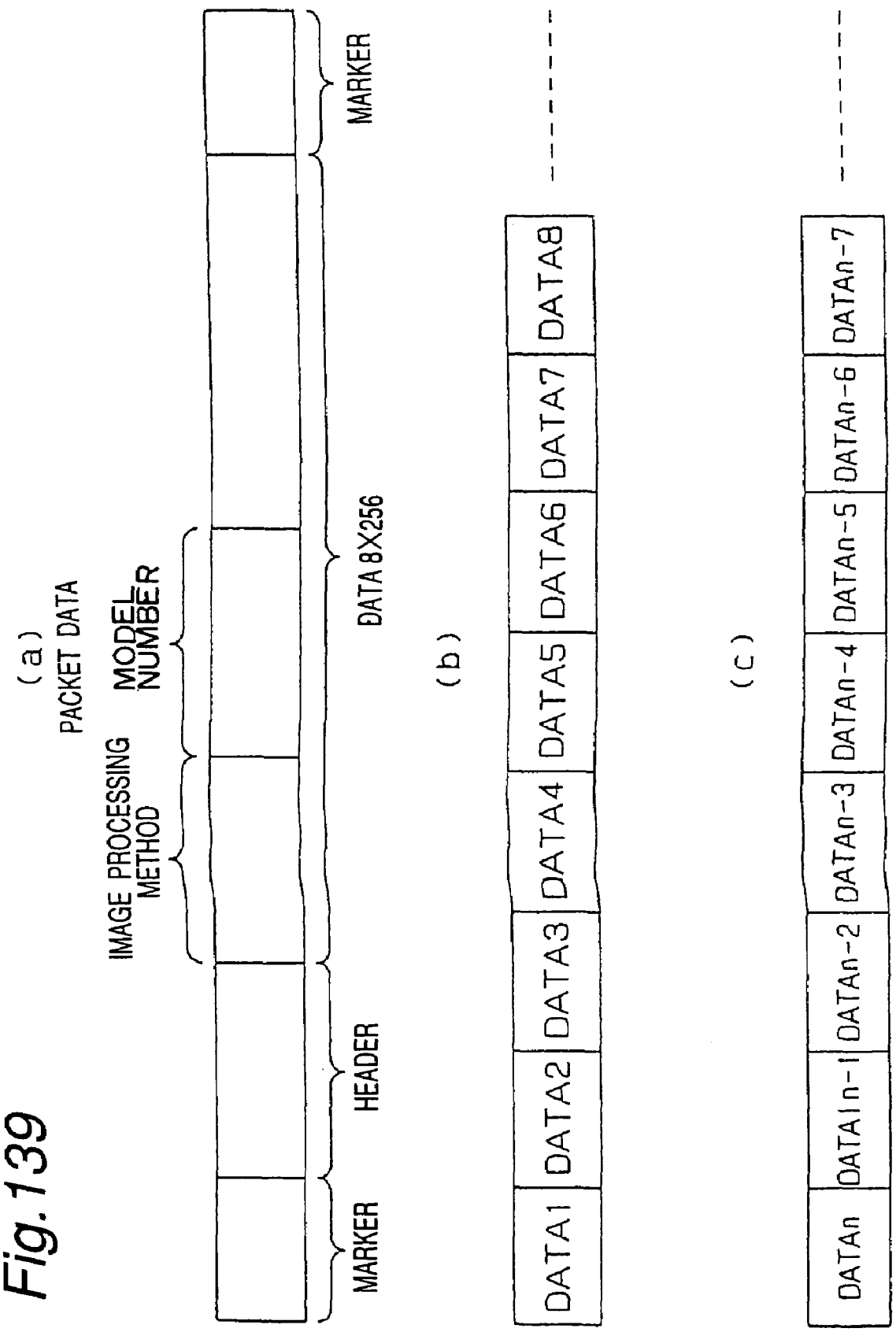

FIG. 129 shows the transmission format sent to a mobile telephone. Transmission means both sending and receiving data. In another word, a mobile telephone may send the speech from the receiver or the image taken by the CCD camera attached to the phone to other mobile telephone. Therefore, items relating to the transmission format described in FIGS. 131 and 139 are applicable to both sending and receiving.

Should information such as frame rate be described in the transmission format, the frame rate will be automatically changed by decoding or detecting this described data. Especially, it is desirable to describe whether the transferred image is an animation or a still image. It is desirable to describe the number of frames per second for an animation. It is desirable to describe the model number of a mobile telephone on the transmission packet. The transmission packet explained in this specification does not need to be a packet. Namely, it can be anything so long as the sending data contains information (such as number of display colors and frame rate) described in FIG. 131.

Data is digitized and transmitted in a packet format for the mobile telephone of the present invention. As described in FIGS. 129 and 130, a frame consists of flag part (F), address part (A), control part (C), information part (I), frame check sequence (FCS) and flag part (F). The format of the control part (C) takes three formats such as information transmission (I frame), supervisory (S frame) and unnumbered system (U frame).

First, information transmission format is the control field format used for information (data) transmission and is the only format having data fields except a part of unnumbered system format.

Supervisory format is the format used for supervision and control functions, namely confirmation of receiving information frame and resend request of information frame. The frame in this format is called a supervisory frame.

Unnumbered system format is the format of the control field used to carry out other data link control functions. The frame in this format called an unnumbered system frame (U frame).

Terminals and a network control transmission information frames by their sequence number (S) and the receiving sequence number (R). N8(S) and N(R) consist of 3 bits. Eight bits from 0 to 7 are used for repeating number and 0 appears next to 7 to make a modulus configuration. Therefore, the modulus in this case is 8 and the number of frames that can be continuously transmitted without receiving response frames is 7.

Data area includes 8 bit data showing the number of colors and 8 bit data showing frame rate. The example of this is shown in FIGS. 131(*a*) and (*b*). It is desirable that identification of still image and animation is included in the number of display colors. It is desirable that a model name of a mobile telephone, description of the image data to be transmitted (natural image of figures, menu screen) in the packet shown in FIG. 129.

The model receives the data, decodes it and automatically converts to the display color and the frame rate according to the description if the data is sent to itself (its model number). It may also be configured to display the description in the display area 21 of the display device. Users view the description (display color, recommended frame rate) on the screen 21 and manually change to the optimum display condition through key operation.

The example in FIG. 131(*b*) shows that the value 3 indicate the frame rate 80 Hz. This is not restricted to it and may be anything showing a certain range such as 40-60 Hz. The data area may include a model of the mobile telephone as the frame rate may need to be changed due to different performance of models. It is also desirable to include information on images to identify its characteristics such as cartoon and advertisement. The packet should include information on the rate of viewing. The packet length may be also included. Users decide whether or not to receive information by checking the rate of viewing. It is desirable that the packet includes data to identify whether the error diffusion process has been applied to the image data.

It is better to include information such as image processing method (error diffusion process, type of dithering, type of weighting function and its data, gamma coefficient) and model number. And include information to identify whether the image data is taken by CCD camera, JPEG data, MPEG data, BIT MAP data and its resolution. This included data will be automatically received, detected and changed to the optimum condition by a mobile telephone.

Of course, it is desirable to include information to identify whether the transmission data is an animation or a still image. It is desirable that the animation includes the number of frames per second. It is also desirable to include information on the number of playback frames per second recommended by the receiving terminal.

These items are true to the sending transmission packet. The transmission packet described in this specification does not need to be a packet. It can be anything so long as the sending data contains information described in FIG. 131.

The frame rate is pertinent to the power consumption of the panel module. Namely, increasing the frame rate increases the power consumption almost on a proportional basis. It is necessary to reduce the power consumption of a mobile telephone from the viewpoint of giving it a longer waiting time. On the other hand, it is necessary to increase the denominator (number of bits of the gradation register) of FRC to increase the number of display colors (increase the number of gradations). However, it is difficult to increase the power consumption.

To resolve this problem, the present invention adopts a configuration to increase the number of apparent gradations by applying the error diffusion process. The error diffusion process is the technology to increase the number of gradations by the technology such as area gradation.

For example, a panel with 16 gradations can express 4096 colors (16×16×16). RGB is expressed in four bits respectively (total 12 bits). Therefore, to display 65 thousand colors, apply the error diffusion process to the input data (R, B: 5 bits, G: 6 bits, total 16 bits), convert it to 4 bits corresponding to RGB and impress it on the liquid crystal display panel. To display full color (RGB: 8 bits each), RGB data is converted to 4 bits to be displayed on the liquid crystal display panel. Output is not restricted to 4096 colors and can be 65 thousand colors.

One of the dithering methods is shown in FIG. 132. As FIG. 132 shows, the original image is divided into a harsh mesh by 4 vertical dots×4 horizontal dots and each divided block is converted to binary form. Each block corresponds to the square area consisting of 4×4 pixel group. The brightness of each pixel group in this rectangular area is compared to the corresponding item in the predefined 4×4 "dither matrix", i.e., "dithering array" table as shown in FIG. 133. If the value in the corresponding part in the table is smaller than the brightness, it is replaced by white (brightness 255). Otherwise it is replaced by black (brightness 0). This is the case of binary and may be applied to multiple value. Dither matrix includes Bayer type, half-tone type, screw type, middle-tone enhancement type and dot concentrate type. Though any one of these works, middle-tone enhancement type is optimum for the liquid crystal display panel or the organic EL display panel.

An error diffusion process or dithering method may vary for each field or frame. For example, Bayer type may used for the first frame and half-tone type may be used for the second frame in dithering. Varying and switching dithering for each frame delivers effect of making dot irregularity less prominent.

Coefficient of error diffusion may vary for the first frame and the second frame. Or, the combination of these may be applied, namely the error diffusion process for the first frame, dithering for the second frame and the error diffusion process again for the third frame. Or random processing method may be selected to process each frame by random number value with the random generation circuit.

In dithering, Bayer type may be used in normally black (NB) mode and half-tone type may be used in normally white (NW) mode. Namely, processing method varies for every mode. Likewise, dithering may be applied in NB mode and the error diffusion process may be applied in NW mode. Coefficient of the error diffusion process may vary for the first frame and the second frame in NW mode and the same process may be applied to all the frames in NB mode.

In the present invention, the SEG driver 14 has the image memory (built-in memory) for one screen. Therefore, if the display image is a still image, external data input is not necessary and the built-in memory 105 may only be accessed. External data input requires driving power to drive the external wiring while built-in memory requires less wiring inside the chip, which is almost negligible. Therefore, power consumption may be reduced in the configuration with the built-in memory.

The configuration with the built-in memory for one screen is applicable not only to the SEG driver 14 but also to the source driver of the TFT liquid crystal display panel. Namely, the present invention is applicable to the active matrix liquid crystal display panel. It is also applicable to other device or display panels such as EL display panel. It is configured to transfer a command to the COM driver from the controller of the SEG driver 14 to control the COM driver 15.

Furthermore, the display device (or display panel) 21 of the present invention is equipped with the error diffusion process controller 971 in addition to the SEG driver 14. To simplify explanation, explanation is given assuming that the SEG driver 14 has the built-in memory 105 for one screen for 4096 color display and the memory whose size is ⅟₁₅ to ½ of the screen for 65 thousand color display and operation (R. B: 5 bits, G; 6 bits).

Needless to say that the error diffusion process controller 281 with full-color capability (RGB: 8 bits each) can achieve full-color display through the error diffusion process.

The error diffusion process means the general process method to simulate higher resolution display in less gradation display in the entire screen by adopting the concept of area gradation. This technology is established as the technology to print images on a printer. Novelty of the present invention is that a chip or a circuit for the error diffusion process is prepared separately from the chip or circuit having the memory for still image data. Another point is that the data calculated by the error diffusion process in the error diffusion process controller is transferred to the mentioned still image memory 105 to be stored.

Error diffusion means the general process method to simulate higher resolution display in less gradation display by adopting the concept of area gradation considering the gradation and color on the periphery of the pixel. The error diffusion technology is installed on the display devices such as CRT and used for image processing for color printers. Needless to say, dithering is also included in the concept of error diffusion process. A combination of error diffusion and dithering may be used.

This specification refers to error diffusion as the method to achieve multiple gradation display in less gradation by diffusing the input image data to the peripheral pixels. Namely, the error diffusion in this specification includes wider meaning than the generally called error diffusion process.

As is shown in FIG. 134, the segment (SEG) driver 14 (applicable to the source driver for the active matrix type display panel such as TFT) is equipped with two I/F systems. One is for 12 bit input and another is for 16 bit input (24 bits are required for full color. It is not restricted to two systems and may be three systems such as 12 bits, 16 bits and 24 bits.) Therefore, image data will be directly entered into the SEG driver 14 from a microcomputer or a PC in 4096 colors. 12 bit data will be entered into the SEG driver via the error diffusion process controller 971 in 65 thousand colors. It may be configured so that 12 bit data will pass through the error diffusion process controller 971 and will be impressed on the SEG driver 14.

Normally, as the voltage amplitude of the segment signal impressed on the liquid crystal display panel requires ±5(V) or more, constant 10(V) pressure is required. For this reason, it is difficult to make more detailed semiconductor process rule. As an example, the maximum pressure is 8.5 (V) when the SEG driver uses 0.35 μm process.

However, unless process rule gets detailed, the cell size of the built-in memory increases. That increases the memory size of the chip and the cost. As an example, the memory size will be 40 mm² for 4096 colors in 128×160 dots. The memory occupies ½ to ⅓ of the chip area. The memory size problem restricts the built-in memory of the SEG driver 14 and the number of display colors. This means that the bit size of each pixel in the built-in memory may not be longer, because it increases the memory size and chip size.

The error diffusion process converts a large size of image data for a pixel and a large image data to a smaller image data through processing (error diffusion process). Therefore, it is very ineffective to keep the memory required for calculation for all pixels within the chip.

On the other hand, the error diffusion process controller 281 consists of the operation memory 293 and the arithmetic circuit 291 as shown in FIG. 135. Namely, it consists of only logic circuits (in some cases, power circuits such as DCDC may be built in). Therefore, the controller 281 may consist of logic gates only, because no pressure-proof output stage is required. Namely, the controller 281 does not require high pressure-proof. For this reason, micro rule semiconductor process is available.

As an example, 3.3 V pressure-proof 0.25 μm process is used. The standard cell size of 0.25 μm process is different from that of 0.35 μm process by two times in area. Namely, the memory made in 0.35 μm process can be made in ½ area. Pressure-proof 1.8 μm process rule may be used.

The result data computed by the error diffusion process controller 281 is transferred to the segment driver 14 and stored in the memory 105. In consequence, the error diffusion process controller 281 can be implemented on a smaller chip as micro rule is available. As the error diffusion process controller 281 requires an arithmetic memory 283 for only one line, the memory can be very small and implemented on a small chip.

The controller 281 may have the capability to keep full screen image data and apply subtractive process by the error diffusion process controller by reading the data. Data is transferred to the built-in memory of the segment driver 14 through subtractive process. The segment driver should have prepared the minimum still image memory for 8 colors and 256 colors.

It is desirable that the voltage circuit 201 consisting of a DCDC converter is prepared in the controller 281. It is desirable that the controller 281 generates the reference clock and impresses this clock 281 on the segment driver IC 14 so that the segment driver IC 14 can synchronize with the controller 281.

I/F circuit 951 should be made on the controller 281 so that it fits the command interface circuit of the segment driver 14. Command interface of the segment driver IC 281 should be the same as that of the segment driver 14. By this configuration, users (generally a microcomputer) can enter commands into the controller 281 when the command is directly entered into the segment driver IC 14 as if users send commands and data directly to the segment driver IC 14 without the controller 281 when the controller sends a command to the segment driver IC 14.

It is desirable that users can select an option by themselves whether or not to apply dithering or the error diffusion process. For example, an option can be press button switch or touch panel on a mobile telephone. Is may be configured to be indirectly switched by speech entry.

Image data could be transferred through dithering or the error diffusion process. Further dithering the dithered image causes dot irregularity more conspicuous. Applying the error diffusion process to the dithered image causes little image quality degradation. Therefore, it is desirable to adopt the error diffusion process for the controller 281.

To achieve data input and output in 256 (512) colors with 8-gradation display and 4096 colors with 16 gradation display on one chip, input and output format of the image data needs to be taken into consideration. For 256 colors, as the data for one pixel requires 3 bits for R, 3 bits for G and 2 bits for B, which totals 8 bits, 8 bits (one byte) input and output can be achieved. However, for 4096 colors, the data requires 4 bits for R, G, and B, which totals 12 bits. That means 1.5 bytes which is odd.

To deal with this problem, the present invention has the method to achieve two I/O formats shown in FIGS. 136(*a*) and (*b*) for 4096 colors. Either or both of those two formats are practicable. Of course, one byte (8 bits) input and output is achieved for 256 colors.

Generally, 8-bit format or 16-bit format can be selected for data I/O. There is an option for 86-family or 68-family. FIG. 136 shows the format for 16-bit I/O.

FIG. 136(*a*) shows 16-bit input. The leading 4 bits should be left blank. Input and output in this way facilitate understanding the relation between 16 bit address and pixel data. However, the blank degrades transfer efficiency of data I/O.

FIG. 136(*b*) shows 8-bit input and output in principle. The address 00H shall be for R and G and the address 01H shall be for B and R. Input and output in this way complicates the relation between the address and pixel data while transfer efficiency of data I/O considerably improves.

The present invention enables switching formats shown in FIGS. 136(*a*) and (*b*) by the reset command from MPU.

The error diffusion process controller 281 in the present invention has the function to pass the error diffusion processed data through to the built-in memory of the segment driver 14. It decodes the data in the packet shown in FIGS. 131 and 97 and automatically decide whether or not to pass the data before processing. Otherwise it follows the command from MPU (microcomputer) and CPU (personal computer).

It is desirable that the error diffusion process controller has two or more built-in memory for ½₀ line or more and ¼ line or less of the screen area. The idea is to achieve optimum error diffusion process considering absorption of the timing difference of data I/O and lines before and after the line for the error diffusion process. And it is to apply weighting process considering the image data of the peripheral pixel as well as the error diffusion process and dithering as well.

Though this specification positions the controller 281 as the circuit for error diffusion process for the sake of convenience, it does not intend to restrict the use to it. Namely, it is the device to convert the size (number of bits) of the image data of one pixel entered to a shorter data (with less number of bits) through computation and transfers it to the built-in memory 105 of the segment driver 14. It is the device to read image data from the built-in memory 105 and output it through reverse error diffusion process. There are many methods that cut down the number of bits of the image data except the error diffusion process. An example of those is weighting process of the image data earlier mentioned and dithering.

As the error diffusion process diffuses the error of one line image data on the next line in succession to the following line, basically it may hold the memory size for one line. Therefore, though description is made using the memory size for multiple lines in the following examples, the purpose is to apply to others except error diffusion process, or to improve general versatility or to use it for I/O timing control. Therefore, the present invention should not restrict the memory size to multiple lines.

As an example image data, when the screen size of the liquid crystal display panel is 128 dots (RGB) wide and 160 dots high, 8 lines or more and 40 lines or less memory size is formed. The memory size increases as the precision of the error diffusion process increases (general versatility improves). Especially, the size should be increased as the number of display colors increases.

We came to the conclusion that the following condition is desirable as the result of reviewing image evaluation in the present invention. Namely, assuming that the number of bits is M (for 4096 colors, M=12 because RGB requires 4 bits for each color) for the sum of R, G and B of the display panel, the RGB total number of bits is N (for 65 thousand colors, RG requires 5 bits each and G requires 6 bits. N=5+5+6=16) for the input data for error diffusion process and the number of line of the memory in the error diffusion process controller 281 is S, it is desirable the following range should be taken.

$$N/M \times 4 \leq S \leq N/M \times 32$$

Preferably, it is desirable to satisfy the following condition.

$$N/M \times 8 \leq S \leq N/M \times 16$$

As is shown in FIG. 137, the error diffusion process controller 281 shall have multiple units of arithmetic memory 293 shown above. In FIG. 137, one memory 293a is for arithmetic processing and another is for storing the data.

Conversely, to output image data, one memory 293b is for arithmetic processing and another memory 293a is for storing the data.

For example, a microcomputer (MPU) closes the switch SA1 of the memory 293a to store image data. On the other hand, SB2 is closed and the memory 293b is transferred to the arithmetic circuit 291 for error diffusion process. Computed result is sent to the built-in memory 105 of the segment (SEG) driver IC 14. The transferred data will be stored on the built-in memory 105.

In the next phase, the switch SA2 is closed and the image data is stored on the memory 293b. And, the switch SB1 is closed and the data on the memory 293a is put to the arithmetic operation. The computed image data will be transferred to the built-in memory of the SEG driver IC 14. Namely, storing data and arithmetic operation are alternately performed on the memory 293a and 293b.

As has been described, to diffuse errors on the image data by the general sequential process, it is not required to switch memory 293 and needless to say, the memory 293 for multiple lines are not necessary. If a memory 293 for multiple lines is equipped, it is advantageous to be able to divide a screen before processing. It is also advantageous to store the data once and transfer the image data at a time (for multiple lines).

The image data is transferred with the divided screen. For example, when the screen size is 160 lines and the memory 293a and 293b have 16 lines, the screen is divided into 10. Therefore, arithmetic operation is made for every 16 lines. When the first 16 lines have been computed, they are then transferred to the built-in memory 105 and the next 16 lines will be computed. The computed result will be sent to the built-in memory 105. Therefore, when the image data has been computed ten times, the error diffusion process for one screen finishes. As the data needs to be transferred 10 times, it is effective compared to the case when the computed result needs to be transferred one line at a time. It also enables low power consumption.

The segment driver IC 14 reads the image data on the built-in memory 105 and displays the image on the display screen of the display device 21. For a still image, once the error diffusion process controller 281 has finished processing and transferred the data to the built-in memory, it doesn't need to operate anymore. Consequently, it automatically stops the clock to DCDC converter 201 and drops its own power circuit to go into sleep condition. Sleep condition and operating condition may be switched by the command control from a microcomputer.

When a new image data is found, a microcomputer transfers a command to the controller 281 and the error diffusion process controller 281 impresses a clock on the DCDC converter to start its own power and falls into the status of waiting image data input. When it receives an image data end command, it falls into a sleep condition.

In this way, as the error diffusion process controller 281 switches between sleep condition and operating condition, it can achieve low power consumption for a still image that requires only arithmetic process for one screen. And as it has a small built-in memory required for computation, the chip can be small. When the computed result is synchronously transferred to the built-in memory 105 one by one, it is needless to say that it is configurable with an arithmetic memory 293 for one line.

Though FIG. 137 shows that two memories 293 are used, this is not restricted and three or more memories such 293a, 293b and 293c may be used as shown in FIG. 138. This memory 293 is selected and used one by one.

In this way, the present invention is the configuration and method to reduce colors of the output data from the original image data holding means such as a microcomputer by the error diffusion process controller and to store image data information on the image memory of the segment driver 14 which has less capacity than the original image data holding part. Reduce (color) information than the RAM storing the original image before writing to the segment driver's RAM.

A border line caused by degradation appears simply by cutting off the lower bits. To resolve the problem, the function part of the error diffusion process controller 281, so called dithering and subtractive process by the error diffusion method (degradation process, for example, 8-bit to 6-bit conversion) should be applied. A border line caused by degradation is protected by diffusing gradations in a spatial form. This process is effective to both still image and animation. Especially for a still image, the controller 281 handles the data for one screen and transfers data to the built-in memory of the segment driver 14 and stops. From then on, only the segment driver 14 operates and exerts the effect of low power consumption.

In short, integrating the image memory 105a and the driver 292 into the segment driver on one-chip IC provides a noticeable improvement of low power consumption because the image is displayed only by accessing the built-in memory which has finished computing a still image.

Lookup table method gamma process part may be formed on the controller adding to the operating part. Of course, it could be a non-lookup table gamma changing means. One example is the method to convert an image data to the gamma processed image data with the logic such as decoder circuit.

Lookup table should be configured so that it can be changed externally. Namely, the data showing gamma curve (convertible to gamma curve) corresponding to the display device should be entered in the position area of the memory 293 using RS232C bus, three-line system bus and IIC bus. Entry may be made by reading the data from the ROM in the microcomputer when the controller started and by transferring the data. And it may be configured to include gamma data on the transmission format in FIGS. 129, 130 and 131, decode it and store the data on the memory 293.

In this way, if it is configured so that gamma curve data can be externally re-writable, the controller hardware can be compatible with various display devices even if it is originally the same.

Proper gamma characteristics will be achieved depending on the display image data (images such as nature of the bright shore, figure and movies, image quality or atmosphere such as classic and popular). And the best image display can be achieved by including gamma data best suited to the transmission image data on the transmission format together with the transmission image data.

It is desirable to form RAM (RGB; 1 bit each) for 8-color display on the controller 281. 8-color display is extensively used for menu screens and waiting screen of a mobile telephone. Therefore, there are many chances (time) for 8-color display usage. Reducing the power consumption for 8-color display is an essential technology for devices requiring low power consumption such as mobile telephones.

To achieve this low power consumption for 8-color display, data is read from the built-in RAM formed on the segment driver 14 to display images. Therefore, the controller 281 doesn't have to successively transmit the data, which achieves low power consumption.

The segment driver should achieve PWM drive function together with additional 7FRC or 4FRC function. The controller successively transmits 4-bit/color data to the segment driver 14. PWM drive impress this 4-bit data on the liquid crystal. The liquid crystal display panel 21 displays 4096 colors in 4 bits. If 4FRC is implemented together, 2 bits are added to the data. Namely, 6-bit/color display (about 260 thousand colors) can be achieved by carrying out 4FRC four times on 4-bit/color PWM data.

260 thousand color display requires 6 bits per color. The upper 2 bits are for FRC. The lower 4 bits are for PWM drive in MLS method. If the upper 2 bits is 3, on/off FRC shows on, on, on. As the lower 4 bits are taken care of by PWM, the entire bit image will be on, on, on, gradation display by PWM. If the upper 2 bits is 2, on/off FRC shows on, on, off, or on, off, on or off, on, on. This on/off sequence is achieved to cause least flickers. As FRC processing is the method to diffuse on/off status within a plane, it is generally achieved. As the lower 4 bits are taken care of by PWM, the entire bit image will be on, on, off, gradation display by PWM as an example.

If the upper 2 bits is 1, on/off FRC shows on, off, off. As the lower 4 bits are taken care of by PWM, the entire bit image will be on, off, off, gradation display by PWM. If the flicker is likely to appear in this case, adjust the sequence to on, off, PWM, off. As this does not generate off twice successively, a flicker is suppressed. In short, adjust the position of PWM properly.

An alternative is to have a 4-bit built-in memory for PWM in the segment driver 14 with the upper 2 bits built in the controller 281 for FRC processing. If the image is a still image in 4096 colors, gradation display may be achieved by PWM in 4 bits of the built-in memory in the segment driver 14. This is not restricted to PWM and FRC may be an option. This is not restricted to the memory for 4096 colors and a memory for 256 colors may be built in the segment driver.

Furthermore, 7FRC adds 3 bits. Namely, as it adds 3 bits to 15PWM (8+4+2+1), it can display about 2 million colors. Therefore, even though PWM can express only 16 gradations, it can switch between 260 thousand color display and 2 million color display in combination with 4FRC or 7FRC.

PWM calculation is performed in the controller 81. The result of MLS operation results in five-value voltage. This voltage value is added by the weighting calculation (V2 is 2, V1 is 1, Vc is 0, MV1 is −1, MV2 is −2). The result will be the absolute value of V2 and its sign (±) and the absolute value of V1 and its sign (±). This data is sent to the segment driver 14 and kept in latch for 1 hour. The segment driver reads this data in latch and impresses it on the liquid crystal display panel.

It goes without saying that the present invention is applicable in the method of computing in consideration of correcting data instead of weighting computation of the image data in combination of MLS and FRC or PWM or PHM.

In this way, the micro rule available controller can achieve complex calculation by transferring the calculated result to the segment driver 14. Therefore, it is not necessary to for a logic circuit on the segment driver 14 which may not be manufactured in micro rule as the specified pressure proof is required. Consequently, low cost and low power consumption can be achieved.

In most cases, transmitted image data is not in the proper gamma characteristics to be displayed on the display panel of the receiving terminal. For example, the data could be in gamma characteristics of 2.2 power of CRT. The receiving terminal (such as those with the liquid crystal display panel) converts (compensates) the data to the gamma curve appropriate to the display panel. Gamma conversion increases the number of bits of the image data. For example, 8-bit data becomes 10-bit data. Namely, proper gamma processing increases the number of bits. However, as proper subtractive process is applied to the data by the error diffusion process, the data with additional bits may be temporarily kept. The number of bits can be properly reduced by dithering and error diffusion process. Consequently, good image display can be achieved.

Of course, a still image stops gamma processing and never increases the power. With reference to gamma processing in the receiving terminal, it is needless to say that the configuration to transmit the data through reverse gamma process in the receiving terminal is preferable. This reverse gamma process is easily achieved by the lookup table method.

RGB-specific gradation process may be applied. Basically, assigning more bits to green (G) and less bits to blue (B) improves the image quality using the same amount of memory. For example, assign 5 bits to G, 4 bits to R and 3 bits to B. As this method has more gradations in G which is more sensitive to human eyes, it can resolve the graininess on even the coarse display panel against the spatial diffusion method such as dithering and error diffusion method.

Circuit process part to suppress flickers may be included using the frame rate control (FRC) method on the controller 281. FRC circuit part is large in scale. As the controller can be manufactured in micro rule, the large scale circuit can be integrated with the controller.

Examples ever shown have been predicated on the liquid crystal display panel. It is needless to say that the power reduction effect on calling still images also works for light emitting display such as organic or inorganic EL, fluorescent display device, PLZT display device, display device using digital micro mirror device (DMD) developed by TI in the US.

FIG. 139 describes a transmission packet as in FIG. 131. Information such as image processing method (type of error diffusion process and dithering, weighting function and its type and data, gamma coefficient) and model number on the format to be transmitted. Include such information as to whether it is the image data taken by CCD camera, JPEG data, MPEG data, BITMAP data or its resolution. A mobile telephone automatically receives, decodes or detects and receives the data to be able to change in an optimum condition.

Of course, it is desirable to describe whether the transferred image is an animation or a still image as is described in FIG. 131. It is desirable to describe the number of frames per second for an animation. It is desirable to describe the number of playback frames per second recommended for the receiving terminal.

These items are also true for the sending transmission packet. The transmission packet explained in this specification does not need to be a packet. Namely, it can be anything so long as the sending data contains information described in FIGS. 131 and 139.

FIG. 139 shows the transmission format sent to a mobile telephone. Transmission means both sending and receiving data. In another word, a mobile telephone may send the speech from the receiver or the image taken by the CCD camera attached to the phone to other mobile telephone.

It is desirable that the error diffusion process controller 281 has additional function to apply reverse error diffusion process to the error-processed data to the original data and apply error diffusion process again. Presence or absence of the error diffusion process should be included in the packet data in FIG. 118. And the data required for reverse the error diffusion process such as error diffusion method (including dithering) and type should be included. As the other items are similar to those in FIG. 131, descriptions are omitted here.

The reason why the reverse error diffusion process executed is that the error diffusion process can correct gamma curve in the process. There are some cases when the gamma curve on the liquid crystal display device that received the data does not adapt to the received one. And there are cases when the received data is the image data that has gone through error diffusion process.

To deal with this matter, the reverse error diffusion process is applied to convert to the original data so that the data may not be affected by gamma curve correction. Then, the receiving liquid crystal display device applies the error diffusion process to achieve the optimum gamma curve for the receiving liquid crystal display. Especially, when the display device receiving the image data is a STN liquid crystal display device with FRC process, the difference between degradations is not linear. It is desirable to apply gamma process for these STN liquid crystal display devices in accordance with each gradation.

Generally, the image data in the display screen 107 is sent to the upper left on the screen (number 1 to the arrow direction) as shown in FIG. 140. Therefore, image data is transmitted in forward direction (DATA1, DATA2, DATA3, ...) as described in FIG. 139. The error diffusion process is also applied from the left to the right as shown in FIG. 141. As one of examples of the error diffusion process, it distributes 7/16 of the image data A in FIG. 141 to the left image data, 3/16 to the lower left one, 5/16 to the lower one and 1/16 to the lower right one.

In consequence, to apply reverse error diffusion process, image processing should be applied in the reverse order of that in FIG. 140 as shown in FIG. 142. As shown in FIG. 142, apply image processing starting from Nth line to the arrow direction (N, N−1, N−2, ... 1). One pixel data should be processed in the reverse order of that in FIG. 141 as shown in FIG. 143.

However, the image data transmitted in the way as shown in FIG. 139(b) may not be processed in the reverse order as shown in FIG. 142. For that reason, data is transmitted in the reverse order (DATAn, DATAn−1, ...) as a transmission format as shown in FIG. 139(c). Include the description to identify this reverse order data transmission in the packet format described in FIG. 139(a). The receiver detects this description and applies the reverse error diffusion (including dithering).

Figure 122:
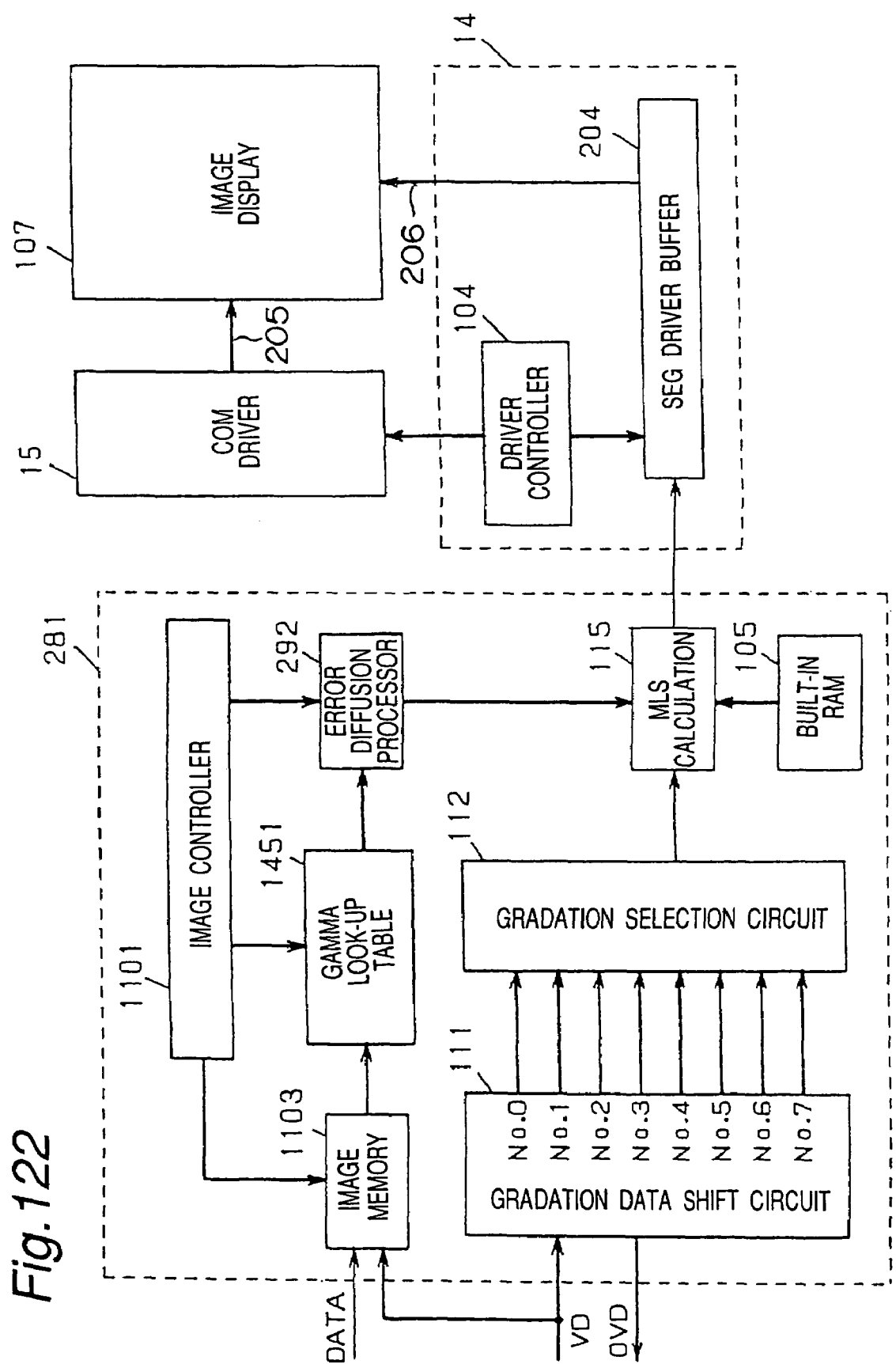

Incidentally, though FIG. 142 describes the data is to be transmitted in reverse order, the reverse error diffusion process may be executed in forward order if the controller 281 has a certain amount of memory (see FIG. 122). This is illustrated in FIG. 144. FIG. 144 describes the method to divide the display screen into multiple blocks A, B and C. One divided block is entered (kept) in the memory shown by FIG. 122. The data kept (such as A block in FIG. 144) is processed within the block in reverse order from 1 to 4. Though FIG. 144 shows that the block keeps data for 4 lines, this does not mean that the data is restricted to have 4 lines. The data could have 2 lines, 3 lines, 5 lines or more, Especially, as dithering handles 4×4 block process as shown in FIG. 132, the process method shown in FIG. 144 is convenient. And dithering may not be required to start processing from the opposite line within the block in reverse order.

FIG. 116 is the circuit block diagram of the present invention. The gradation MLS circuit 106 shown in FIG. 116 is the circuit to control gradation by MLS operation and frame rate control (FRC). FRC process is achieved by the data from the memory 105 and the gradation control circuit.

FIG. 145(a) shows an example of seed functions. There are many seed functions of orthogonal functions. MLS4 selects 4 lines of common signal lines at a time and uses 4×4 matrix seed function. Use the orthogonal function that contains −1 in each line (this is expressed as containing 1 in each line if the sign is expressed in reverse). If there is a line containing two −1's, using the orthogonal function containing all 1 in a line generates more flickers. The reason it generates more flickers seems that the segment IC outputs more V2 (MV2) voltage.

Therefore, it is desirable to adopt an orthogonal function that contains −1 in each line. (this is expressed as containing 1 in each line if the sign is expressed in reverse.) The sign − and + holds true even in reverse from the logical viewpoint. Therefore, needless to say, the sign may be taken in reverse in the following description (positive logic and negative logic may be reversed). Positive sign is simply taken for easier explanation.

As shown in FIG. 145(b), common voltage aV corresponds when the orthogonal function is 1. V indicates the reference voltage and a indicates bias ratio. The orthogonal function 1 is replaced by the logic H (positive). The orthogonal function −1 is replaced by the logic L (negative).

Ideal bias ratio is determined by the number of lines on the display panel for bias ratio a. It is logically expressed in the figure with a decimal point such as 6.5. However, as the circuit generates voltage by multiplying the reference voltage, it will eventually be an integer. Therefore, when the ideal bias ratio is 6.5, the bias ratio a must be either 6 or 7. It is desirable to adopt a larger integer than the ideal bias ratio.

As the bias ratio increases, amplitude value of the segment signal decreases and the generation of flickers is suppressed. In short, bias ratio 7 should be adopted. The scale of circuit may be made smaller by adopting even bias ratio from the circuit aspect. Therefore, 8 is better than 7 for the bias ratio. In another word, adopt an even value that is larger than the ideal bias ratio for the bias ratio a.

On/off ratio should be more than 1.067 for the adopted bias ratio. 1.067 is the on/off ratio when the number of lines is ½OfVGA, namely n=240. If the on/off ratio is less than this, it degrades the image quality.

Though this will be described later, layer data that agrees with the image data DATA (2:0) is selected by 1 bit (on or off) and 4 lines of bits makes B(3:0) shown in FIG. 86. The orthogonal function and the logical operation shown in FIG. 145(*c*) for every bit will be applied to this 4-bit B data for 4 lines. ON data 1 means −V voltage and corresponds to logic 1 as shown in FIG. 146 for the image data. Conversely, OFF data 0 means V voltage and corresponds to logic 0. FIG. 145(*c*) corresponds to the output on the common side and FIG. 146 corresponds to the output on the segment side. For example, when the segment side is −V voltage and the common side is aV, high voltage is impressed on the liquid crystal layer. (ON voltage is selected and impressed).

FIG. 86 is the block diagram of the gradation MLS circuit 106. The gradation data shift circuit 111 has the gradation data consisting of at least multiple registers. This gradation data is shown in FIGS. 147 and 44. Output value of this gradation data shift circuit 111 is compared with the 3-bit data of DATA(2:0) to determine on or off. Four lines of DATA(2:0) are read at the same time or one line is read at a time when four lines are selected at the same time: Four lines of data are gathered to make 4-bit B(3:0) of the output of the gradation selection circuit.

MLS4 is chosen for an example for easier explanation, the present invention does not restrict to this. 8 line simultaneous selection (MLS8) or 0.7 line simultaneous selection (MLS7) can be an alternative. Four lines of data are gathered to make 4-bit of the output of the gradation selection circuit for MLS4. However, eight lines of data are to be gathered to make 8-bit of the output of the gradation selection circuit. Consequently, the present invention should not be applied to only MLS4 and may be applied to the driving method for other liquid crystal display panel.

HSEL(1:0) signal shown in FIG. 86 is the 2-bit selection signal and selects each line of the orthogonal function with the 2 bits shown in FIG. 148(*a*). The orthogonal function is held in ROM in the segment driver 14 which transfers this orthogonal function to the common driver in every one hour (or selects the orthogonal function held in the common driver). It is desired that the orthogonal function should be held only on the segment driver to minimize the hardware scale.

Orthogonal functions in FIG. 148(*a*) should be different in each field. The first field selects the first line of the orthogonal function and uses-this for MLS operation with DATA. The second field selects the second line of the orthogonal function and applies MLS operation in the same way. The third field selects the third line of the orthogonal function and applies MLS operation and fourth field selects the fourth line of the orthogonal function and applies MLS operation. MLS operation described here is used for the convenience of explanation. Actually, a simple decoder circuit takes place instead of MLS operation. Each line (3:0) of the orthogonal function is outputted from the orthogonal function ROM 113 by the line selection signal HSEL (1:0). It is desirable that the selection order of each line may be configured to be variable. Replacing the line of the selecting orthogonal function may produce good results such as splicing reduction depending on the type of images.

Each line data IH(3:0) is entered in the inverse process circuit 114. The inverse process circuit 114 inverses the data. The inverse process consists of normally white (NW) and normally black (NB) switching (NW/NB) and alternating circuit signal PM. PM is the signal polarity switching signal of nH inverse drive.

The present invention achieves NW/NB switching by inversing either of orthogonal function signs in the segment and common driver. Alternating circuit is achieved by inverting signs of both orthogonal functions in the segment and common driver at the same time. Inversing signs of the orthogonal functions and achieving alternate circuit allow smaller hardware circuit. It can be achieved by inversing 4×4=16 data for the orthogonal function compared to the method to inverse signs of image data.

Actually, the orthogonal function is built in the segment driver IC 14 as ROM and successively transferred to the common driver IC 15 from the segment driver IC. Therefore, the orthogonal function is not built in the common driver IC 15 as ROM. In this way, hardware cab be smaller by adopting a serial transfer method. It is desirable that the orthogonal functions should be configured to allow transfer within a chip using 2-line bus, IIC bus and RS232C outside of the driver chip. It may be configured to allow selection of any line by building 4 lines or more orthogonal function lines in the segment chip as ROM.

The inversed sign of the orthogonal function is transferred from the segment driver IC to the common driver IC to switch NW/NB in the configuration where the orthogonal function is transferred from the segment driver. Alternate circuit drive such as nH drive inverts the sign of the orthogonal function of the segment driver IC and transfers the orthogonal function of this inverted sign to the common driver IC. Build in the orthogonal function whose signs for 4 lines are inverted as ROM and select any one of orthogonal functions for 4+4=8 lines. It may be configured for transmission. In this case, a hardware is nor necessary to invert and transfer the sign. Consequently, the driver operation is made clear.

The present invention defines that the voltage impressed on the liquid crystal layer for PM=0 is negative and positive for PM=1 as described in FIG. 148(*b*). The present invention defines that NW/NB is NB (normally black) for 0 and NW (normally white) for 1. Therefore, the output of the orthogonal function H (3:0) will be as shown in FIG. 148(*d*) by NW/NB and PM signal.

MLS circuit 115 computes B(3:0) and H(3:0). Computation is performed on each bit. Namely, computation is performed on the combination of B(0) and H(0), B(1) and H(1), B(2) and H(2) and B(3) and H(3). Computation logic is shown in FIG. 145(*c*). The result will be Q(3:0). As it is clear from the logic in FIG. 145(*c*), Q is EX-NOR logic.

The addition circuit 116 counts the number of "1" bit in Q(3:0). The result of counting is S(2:0). This converter is shown in FIG. 149. However, the actual hardware is not an addition circuit and achieves addition by a decoder circuit.

The voltage selection circuit 117 turns the switch on based on the value of the output S(2:p) from the addition circuit 116 and outputs this voltage to the segment signal line. The result of MLS operation shown in FIG. 150 corresponds to S(2:0). As a result, voltage is selected based on the value of S.

In the explanation, MLS operation is performed in the gradation MLS control circuit and the result is summarized by the addition circuit 116 for the purpose of easier explanation. This is not true in the actual circuit. MLS circuit and the additional circuit are integrated into one. Specifically, they comprise the decoder circuit. The scale of the circuit can be made smaller by implementing the decoder circuit in this way.

Consequently, MLS operation and addition are not performed. It is logically configured with the simple combinational circuit. To minimize the scale of gate circuit, the image data is entered by having it inverted in advance.

Voltage value has 5 variations such as V2, V2, VC, MV1 or MV2 for MLS4. The relation between these 5 values is |V2|=|MV2|, |V2|=|MV2|, V2=2×V2, MV2=2×MV1 with VC in the center.

These processes will be done during 1 horizontal scan period (1H). Four common signal lines are selected at the same time during 1 horizontal scan period (1H). The present invention generates at least 4 clocks for 1H. Namely, the main clock is four times longer than 1H.

The drive circuit of the display device in the present invention is specifically shown in FIG. 151. Namely, the signal process circuit 202 shown by the dotted line in FIG. 86 is connected to each segment signal line in FIG. 151 respectively. The circuit block in the present invention illustrates the process circuit for one of R, G and B for the convenience of explanation. The circuit will be about three times larger in scale for a color display device. This specification describes as if the device is a black and white display and dares not refer to color processing including R, G and B. However, The specification does not restrict this. Two-color display needs twice of black and white requirement and 6-color display needs 6 times.

The gradation data line 203 from the gradation data shift circuit 111 is wired in the direction along the segment chip 14 in the segment IC 14 as shown in FIG. 151. Gradation data shift circuit 111 is controlled by the control circuit 201. The power circuit 104 consisting of DCDC converters (such as charge pump) supplies power. The gradation data line 203 is connected to the signal process circuit 202 one by one for each gradation. The output of the signal process circuit 202 is impressed on the buffer circuit 203 and is outputted to the segment signal line 206. V3 (MV3) voltage is impressed on the common signal line by the common driver 165.

A sample of the gradation register is illustrated in the configuration in FIG. 147. The maximum number of registers is 13 in this configuration. As the gradation number 0 is always off, gradation registers may not be set up. The description is made for the convenience of explanation. Likewise, as the gradation number 15 is always on, gradation registers may not be set up. The description is made for the convenience of explanation As is shown in FIG. 152, gradation No. 0 is shown by 0/1. Gradation No. 1 is shown by 0/13. Gradation No. 2 is shown by 1/7. Gradation No. 3 is shown by 1/5. Gradation No. 4 is shown by 1/4. Gradation No. 5 is shown by 1/3. Gradation No. 6 is shown by 2/5. Gradation No. 7 is shown by 6/13. Gradation No. 8 is shown by 7/13. Gradation No. 9 is shown by 3/5. Gradation No. 10 is shown by 2/3. Gradation No. 11 is shown by 3/4. Gradation No. 12 is shown by 4/5. Gradation No. 13 is shown by 6/7. Gradation No. 14 is shown by 12/13. Gradation No. 15 is shown by 1/1.

FIG. 153 shows the adjacent data disparity of the gradation data mentioned in FIGS. 152 and 147. The gradation difference remains within the 20% range of the desired rate (1/15=0.667). Therefore, there is no gradation skip, and a fine, 16 gradations can be displayed. Also, since the maximum frame value of gradation is 13, there is a lesser chance of flicker occurrence, due to having a shorter value when compared to 15.

The gradation data line 203 will be inputted in the signal process circuits 202. In the signal process circuits 202, an image data [3:0] will be inputted and the output of gradation data line 202 will be selected which rightly corresponds to the data.

As FIG. 147 shows, the inversion pattern for 0/1 of gradation no. 0 will be 1/1 of gradation 15. The inversion pattern for 1/13 of gradation no. 1 is 12/13 of gradation 14. The inversion pattern for 1/7 of gradation no. 2 is 6/7 of gradation 13. The inversion pattern for 1/5 of gradation no. 3 is 4/5 of gradation 12. The inversion pattern for 1/4 of gradation no. 4 is 3/4 of gradation 11. The inversion pattern for 1/3 of gradation no. 5 is 2/3 of gradation 10. The inversion pattern for 2/5 of gradation no. 6 is 3/5 of gradation 9. The inversion pattern for 6/13 of gradation no. 7 is 7/13 of gradation 8. Therefore, the relationship of the bit of each register is as that of a mirror.

The inversion of gradation no. 0 to gradation no. 7 registers is equivalent to gradation no. 15 to no. 8. Thus, either a set of gradation no. 0 to no. 7 or a set of gradation no. 15 to no. 8 is available, restoration of other set can be possible. The present invention makes the point to an advantage and abbreviates the gradation no. 8 to no. 15.

As being described on FIG. 151, on the segment IC14, the gradation data line 202 from gradation data shift circuit 111, the wiring is done on the chip 14 in a horizontal direction. Concerning the data on FIG. 147, the gradation data line 202, there are 1 gradation no. 0, 13 gradation no. 1, 7 gradation no. 2, 5 gradation no. 3, 4 gradation no. 4, 3 gradation no. 3, 4 gradation no. 4, 3 gradation no. 5, 5 gradation no. 6 and 13 gradation no. 7. This statistics amounts to 51 in total. (But the gradation no. 0 can be abbreviated.)

Since this is a case with having a single color, when this is RCB, the number will be quadruple, amounting to 153 in total. If the structure of the register is not designed in the mirror relationship, the figure will be double, totaling of over 300, resulting in the gradation data lines to occupy a considerable space in the chip. When it is displayed in the frame rate control method (FRC), the length of data (denominator) that display gradation, or in other words, the number of frames becomes longer as the number of gradation increases. This will result in the easy occurrence of flicker. Therefore, to control the flicker occurrence, it is more favorable to design the structure in such a way that gradation register become shorter in length.

In order to achieve this objective, the present invention, as shown in FIG. 105, can be set so that the length of gradation register basically will be 8 and 12 or its common divisor. Actual example described in FIG. 105 shows 13 as the maximum denominator, whereas the actual example in FIG. 105 shows comparatively small number of 12 as the maximum denominator. FIG. 105 also shows a small number of 24 as the minimum common multiplier, thus setting the period of expressing complete gradation (period in which all of 16 gradations returns to the starting position) to rather short 24.

By structuring like these, the chance of occurrence for splicing and flicker will be extremely low. The present invention selects and uses, for 8 gradation display, a portion of 16 gradation display of gradation data patterns. (see also FIG. 107)

For 8 gradation display, the gradation register no. 0 will be 0/1, 1/12 for no. 1, 1/4 for no. 2, 1/3 for no. 3, 1/2 for no. 5, 3/4 for no. 6, 11/12 for no. 7, and 1/1 for no. 8 (among them, 1 is abbreviated).

In this case, one cycle that expresses all gradation will be rather short figure of 12. Thus, even when the invented field shift is done, the chance of flicker occurrence by cancellation becomes very low. This point also is for advantage.

In the 16 gradation display in FIG. 105, difference of brightness of each gradation is practically equalized. Small number of maximum denominator, which is 12, causes the lesser occurrence of flicker. This is not simply a matter of design, but is rather a well thought out invented item after conducting image display and careful consideration. In FIG. 105, No. 0 and No. 15 are shown to make the explanation easier, but even without them, no doubt the circuit layout is possible.

In FIG. 105 the gradation register for No. 0 is 0/1, 1/12 for No. , 1/8 for No. 2, 1/6 for No. 3, 1/4 for No. 4, 1/3 for No. 5, 3/8 for No. 6, 5/12 for No. 7, 1/2 for No. 8, 7/12 for No. 9, 2/3 for No. 10, 3/4 for No. 11, 5/6 for No. 12, 2/3 for No. 13, 11/13 for No. 14, and 1/1 for No. 15. Especially 1/2 for No. 8 has a repetitive pattern of on and off and thus it has the characteristic of having no chance of flicker occurrence.

Also, since the maximum length of gradation denominator is 12, many of the common divisor of 12 (4, 3, 2, 6, etc) will be repeated in the 12 frame by most of the gradation data (No. 1, 3, 4, 5, 7, 8, 9, 10, 11, 12, 14). Therefore, interference in between the gradations is unlikely to occur. For image, too, the splicing is unlikely to happen. Data length of gradation registers No. 2, 6, and 13 is 8, and 8 have the common divisor of 4 and 2. This is in harmony with the common divisor of 12. Therefore, the combined structuring of 1/12 and 1/8 makes it very difficult to cause interference.

There are some reasons for adopting 1/2 of No. 8. One reason is that it has a pattern which the flicker is unlikely to take place and another is that even with the gradation data having no mirror structuring of No. 6, there will be no 'skip' in between each gradations. When a gradation pattern is set in the mirror position of No. 6, the gap between the 5/7 of gradation No. 7 and 7/12 of gradation No. 9 (if 1/2 of gradation No. 8 is not present, then the next will be No. 9) becomes too large, creating a 'skip'.

However, in FIG. 105 this gradation pattern is not limited. For example the structuring can be the one having inserted (replaced structure) 1/7 to No. 2 and 1/7 to No. 13. Or 7/12 of No. 9 can be deleted. 1/5 can be set in between No. 3 and No. 4.

Having gradation patter shown in FIG. 105, the gradation display capability will be sufficient. Also conduct error diffusion process when necessary in order to correct the gradation skips and make gamma characteristic to a linear one. And by adopting area gradation display for error diffusion, the gradation figures can be increased, resulting in favorable outcome.

Control circuit 201 controls the gradation data shift circuit 111, and the power will be supplied from the power circuit that consists from DC, DC converter, and charging pump. As shown in FIG. 91, in the signal processing circuit 202, gradation data wiring 203 is serially connected in each gradation. And the output of the signal processing circuit 202 will be impressed on the buffer circuit 204. In the buffer circuit 204, high impedance circuit is installed in order to prevent penetration current which may flow when each voltage (such as V2 and V2) is switched.

On MLS4, out of 5 voltage values in V2, V2, VC, MV2, and MV2, only 1 value will be selected and will be impressed on the segment signal line. For instance, when V2 voltage is impressed on the segment signal line at a certain time, MV2 voltage will be impressed on the aforementioned segment signal line at a next circuit clock. At this time, if the operation amplifier that output V2 voltage and another operation amplifier that output MV2 voltage simultaneously output voltage to the segment signal line 205, then a considerable amount of penetration current will flow.

In order to prevent the penetration current from flowing, the display device of the present invention installs the analog switches for low impedance at the output terminal of 4 operation amplifiers; V2, V2, MV1 and MV2. The analog switches will all be turned off at the switching of voltage values. When the V2 voltage is being impressed on the segment signal line at a certain time, the analog switch that output V2 voltage will first of all be turned off, then the analog switch which is formed on the output terminal of amplifier next to be outputted will be on. Thus 2 analog switches will never be on at the same time. As a result the penetration current will not be generated.

The period t in which all of these analog switches 1481 will be turned off shall be no less than 20 nsec and no more than 100 nsec. If the value is less than 20 nsec, then due to the temperature characteristic of semiconductor chip, the timing gap to output H pulse may easily occur, resulting in high chance of generating penetration current. And when the value is more than 100 nsec, the execution value of voltage which will be impressed on an optical modulation layers such as liquid crystal layer becomes small, resulting in the corrugation of signal pulse 1261, or gradation variation through timing.

On the other hand, it was mentioned that the analog switches are used for switching voltage, but as long as this is a switching method, any equipment can be used. For example, transistors, photorelay or phototransistor can structure a switch circuit. Thus, as long as the voltage or current can be controlled as on or off, any equipment can be used.

In order to prevent this penetration current from happening, the display device of the present invention installed the prevention measures for penetration current occurrence between 5 voltage values; V2, V2, VC, MV2, MV2. Similarly, this will take place in common driver 15. In the common driver 15, V3, VC, MV3 voltage are also switched and used. Just as the segment driver 14, for the common driver 15 will have an analog switch at the output terminal of the voltage which will be impressed on the common signal line. During the switching of voltage, it should be designed so that several numbers of voltage will not be outputted to the common signal line at the same time.

When describing in more detail the signal processing circuit 202, it will be as in FIG. 154. The gradation data wiring 203 will have the data inputted to the signal processing circuit 202 which are installed on each segment signal lines, one line for each gradation. On the other hand, image data [479:0] (data here refers to 4 bit, 16 gradation and number of pixels per row is 129 pixels. Therefore, 4×120=480) will be read out for one row at a time. This will then supplied to the signal processing circuit by 4 bits. Then the gradation data wiring 203 which correspond to the data figures of this image will be selected, after which the selected data (1 or 0) and orthogonal functions are calculated. As shown in FIG. 147, it adopts the mirror inversion and takes the circuit structure as described in FIG. 155 in order to restore the data. The lower 3 bits of image data D [3:0] select the number for switch S. Since the figures are the lower 3 bits, the value will be within 0-7. Thus, the switch S0-S7 can be selected. The selected data will be impressed to the X-NOR A terminal. On the other hand, the uppermost bit D3 will be impressed to the aforementioned EX-NOR B terminal. When D3 is 1, then the data of A terminal will be inverted. In other words, data with mirror relationship will be outputted to the C terminal. If D3 is 0, then the inversion will not take place.

By adopting such a structure, the mirror inversion can be realized. Therefore, approximately ½ of gradation registers can be abbreviated. Having this merit, a considerable reduction of the amount of gradation lines 203 can be implemented.

However, the output C of EX-NOR in FIG. 155 will be the output of signal processing circuit 202 in FIG. 90. When these process applies to MLS4, it will be repeated 4 times before it becomes B [3:0]. Of course, it goes without saying that when it is MLS2, it will turn out to be B [1:0], and when it is MLS8, it will be B [7:0].

The gradation pattern shown in FIG. 147 has sufficient gradation display capability. Also, error diffusion process is conducted if necessary, and correct the gradation "skip", and gamma characteristic can be made to a linear one. By adopting area gradation display for error diffusion, the gradation numbers can be increased, resulting in a favorable situation.

It is an important factor to reduce the oscillation value of voltage V3 and MV3 which are outputted from the common driver IC15. This way the pressure on the driver IC15 can be reduced, and unnecessary radiation occurrence can be minimized. In order to reduce the voltage that is outputted from common driver IC15, the dummy pulse will be weighed onto the signal that will be outputted from the segment driver 14. The dummy pulse has the width of more than ⅛ of 1H and less than ¹⁄₁₆. Voltage amplitude is either V2 or MV2. Whether V2 or MV2 will be decided depend on the voltage which are outputted from 4 common drivers IC. When 3 out of 4 selective voltage is V3, the dummy pulse shall be MV2. When 3 out of 4 selective voltage is MV3 the dummy pulse shall be V2. This way the even bigger execution values can be impressed.

The MLS (L) drive, when it is compared with the conventional APT drive methods, the scanning signal will be 1NL and data signal with be VL times, having extremely small bias proportions toward the scanning electrode voltage and signal electrode voltage. The influence of having signal electrode voltage to the execution value will be extremely important when compared to the APT drive method. As a result, when any distortions or interference can be found on a series of signal electrode voltage, it may give a strong impact to the nature of displaying.

However, when dummy pulse of the present invention is impressed on a signal electrode, a same execution rate voltage with much lower reference voltage V of the signal electrode voltage will be impressed on the liquid crystal. This will be even lower signal electrode voltage, and the influence this will have to the displayed image is reduced and the image will become better in quality.

The above was supposed to be method to implement a multi-gradation display though the MLS driven FRC method. The present invention is not limited to that. The multi-gradation display may be realized through the following PWN (Pulse width modulation) method.

The whole or part of functions for segment driver 14, and the whole or part of functions for controller 281 can be formed as one as display parts 107 by the low temperature poly-silicon technique. The low temperature poly-silicon processing temperature is less than 600° C., and large sized glass substrate may be used. The processing temperature under 600° C. can establish constant and high throughfoot crystallization technique. The TFT transfer frequency of this low temperature process using low temperature poly-silicon technology is approximately 300 $cm^2 \cdot V \cdot 1 \cdot S \cdot 1$. Operation in about 10 MHz is possible as a logic circuit, and easily exceed the 4 MHz clock of microcomputer of mobile telephones.

By using the poly-silicon technology, it makes it possible to install not only driver but also the image controller in the liquid crystal display panel. Several image signal is inputted onto the panel and these signal can be controlled and displayed on the liquid crystal display. When compared with the one in which the circuit is installed externally, it makes it possible to achieve low consumption of power, low cost and narrow frame.

By implementing nH inversion drive for the MLS drive, it will be effective in controlling the flicker. This nH inversion refers to the inversion of signal polarity which will be outputted from the segment driver IC14 in each n×L rows on MLS (L) drive (For MLS4, L=4). For instance, when it is 9H inversion drive (n=9), then the MLS4 inverts the segment signal at each 9×4=36 scanning lines. The following procedures will be desirable for NH inversion drive in the MLS drive.

First, when the frame rate is over 80 Hz, n should be over 7 and yet the values should be odd numbers. Especially it is preferable to set the n to greater than 3 and less than 9. Also, when the frame rate is below 80 Hz, n should be more than 3 and less than 9, while the values set at odd numbers. Especially, it is preferable to set the n to greater than 5 and less than 9. Also, the switching of n can be done by either manually by a user, or by automatic control by a microcomputer.

FIG. 122 shows the gamma look-up table 1451 that switches to gamma from the image data (may refer to image data inputted externally) from image memory. In default setting the gamma look-up table 1451 it mentions as having linear characteristic (no gamma switching). This gamma table is overwritten from external (microcomputer) data and controlled to facilitate the characteristic to suit the image display section 107.

The input of gamma look-up table 1451 will be 8 bits in each RGB. This 8-bit data will be switched into 10-bit data by the gamma look-up table 1451. By switching the data the gradation numbers will increase. When the bit numbers increase the hardware scale of image data processing circuit becomes greater.

However, in the present invention, as a secondary step of the gamma look-up table 1451, error diffusion processing circuit 292 operates in order to reduce the number of bits. Thus, in case the data bit numbers increase at the gamma look-up table 1451, the bit numbers are immediately reduced through the error diffusion processing circuit 292. After that the circuit scale can not expect to become any bigger. Since the gamma look-up table helps to switch into optimum gamma curve, color recreation can be increased and favorable image display can be realized.

In controller IC281 a reverse error diffusion processing circuit 1461 is installed. The reverse error diffusion processing circuit 1461 conduct reverse error diffusion process or reverse dither process to the data which are sent after the error diffusion process or dither process. That means by implementing reverse error diffusion process or reverse dither process, switching of the unprocessed original data such as dither process have been carried out.

The reason of implementing the reverse error diffusion process is that in the course of process such as error diffusion process, the corrections of gamma curves have been implemented. The gamma curves of data received devices such as liquid display device and other sent gamma curves may not be compatible. Also, there are cases in which the sent image data have already conducted the process such as error diffusion.

In order to correspond to the situation, the reverse diffusion process is conducted, and the original data is switched so that there will be no influence from gamma curve correction. After that, carry out the error diffusion process by the received liquid crystal display device in an effort to create optimum gamma curve into the receiving liquid display panel and yet become the optimum error diffusion process. Especially, when the data receiving display device is the STN liquid display device that conducts FRC processing, the difference of brightness between each gradations will not be linear. For these STN liquid crystal display devices, it is desirable to carry out gamma process according to each gradation.

In addition, it is desirable for the display device to equip with temperature sensors that detects or measures the temperatures of the display panel 21. The output of this temperature sensor is detected by microcomputer (calculating or controlling means such as CPU), and from the detection result, data switching table of gamma look-up table 1451 and error diffusion processing circuit 292 will be overwritten.

For example, in the case of STN liquid crystal display panel, when temperature becomes low the starting voltage becomes high. In other words, during NB mode, even if voltage is impressed the light's permeating volume (or reflective volume) will be less. When the temperature becomes higher the starting voltage becomes lower and acquiring large amount of light's permeating volume (reflective volume) with small amount of voltage will be possible.

Therefore, by changing the table of gamma look-up table 1451, the gamma characteristic that corresponds to the temperature variations can be realized. By changing data switching table, each RGB will be able to make adjustments individually.

The same can be said for error diffusion processing circuit 292. Temperature becomes higher and viscosity of liquid crystal becomes less. As a result, flicker occurrence will be more frequent. The flicker occurrence can be controlled by changing data values for error diffusion processing. Also, the microcomputer 1692 controls to prevent flicker occurrence from happening by controlling circuits such as the oscillation circuit 101 and changing the frame rate.

Frame pulse (OVD), field synchronized field pulse (OFD), and line pulse (OLD) which is synchronized to the shift signal of 1 horizontal scanning period or a common scanning line are taken to external space. By controlling so that the data can be overwritten to the memory synchronous to this pulse, image data can be written favorably, which is synchronous to the image data reading status. Thus, the occurrence of image display dispersions will be extremely rare.

16 gradations can be displayed in the gradation data shown in FIG. 105. However, the maximum value of gradation data length is 12, which is quite long. At frame rate 120 the value will be 120/12=10, which in turn results in 10 frames/sec. Therefore, it is not appropriate for the displaying of animation.

To take measures on this problem, for animation display the gradation data (No. 0, No. 2, No. 2, No. 6, No. 8, No. 11, No. 13 and No. 15) which are below the maximum value of gradation data length from the gradation data in FIG. 105 are selected and show the image on the display. The number of gradations will decrease to 8 gradations but the gradation data length will be 8 in maximum. For frame rate 120 the value will be 120/8=15, which in turn results in 15 frames/sec. Therefore, favorable animation display can be realized. Due to this reason the gradation data shown in FIG. 105 is a desirable gradation data.

When voltage value is MLS4, there are 5 values; V2, V2, VC, MV1 and MV2. The relationship of these. 5 values, having VC in the center are as follows; V2=MV2, V2=MV2, V2=2×V2, and Mv2=2×MV2. The power circuit of the present invention will be explained later using FIG. 156.

FIG. 156 is the power circuit for display devices of the present invention. For FIG. 151, 201 will be appropriate. However, both V3 and MV3 do not occur inside the segment driver IC15, but rather the V2 voltage will be impressed into common driver IC15. It is desirable to generate V3 voltage inside the common driver IC 15 from the impressed V2 voltage. This is because the V3 (or MV3) voltage exceeds the withstand pressure of the segment driver 14. If it is configured to generate in the segment driver IC14, then the withstand pressure of the segment driver IC will need to be created by withstand pressure process of common driver IC. When that will be the case, then the size of the chip will be very large.

The input power voltage of this power circuit will only be having a single power input, which is the VCC (primary input potential) and VSS (secondary input potential). Also, the latch pulse LP will be inputted that consist of pulse generated at every horizontal scanning period (1H). However, the latch pulse is configured so that the frequency can be altered within the range between +10% and −10%. The frequency can also be changed to either to double or half. This is because when the latch pulse is 1H, sidelines in each 4 rows on the display monitor of display panel 21 will appear.

The clock forming circuit, according to clock signals (LP signal), is basically necessary in the charge pump circuit and will form several clock signals of different signals. VCC or VSS will be used for power source.

Primary circuit 441 generates the primary voltage using VCC and VSS voltage as a reference, followed by the inputting into the next electron volume 442. The electron volume 442 will equip the function of altering voltage at least in 32 steps. Preferably, it will be better to configure in the way so that this alteration can be done in over 64 steps. This electron volume 442 voltage becomes the reference voltage VC.

The electron volume circuit, to be more specific, is a circuit structure shown in FIG. 157. The electron volume circuit implements resistance partial pressurization to the voltage between the TAP1 and TAP2 in order to generate voltage VC0 which will be inputted to VC generating circuit. External resistance R1, R2, and R3 will be connected in between VEV-TAP1, TAP1-TAP2, and TAP2-TAP3. Voltage will be applied to the built-in resistance between TAP1 and TAP2 and acquire resistance divided voltage VC done by the switch.

Positive directional double booster circuit 443, setting the electron volume 442 voltage VC as a reference, generates the voltage V2 by double boosting VSS and moving to the positive direction by charge pump movement. Similarly, the tertiary booster circuit 444, setting V2 and V3 voltage reference, generates by 3, 4 or 5 times boosting the voltage V3 to the positive direction by charge pump movement. The switching of 3, 4 and 5 times boosting can be done by using commands.

Negative directional double booster circuit 445, setting VC and V3 as reference, generates the double boosted voltage MV3 by charge pump movement to negative direction. ½ descending pressure circuit 446 generates the voltage V2, which evenly divided in between V2–VC, and also the voltage MV2, which evenly divided in between VC–(MV2) by charge pump movement. Or, applying resistance or transistor partial pressure can generate it.

For central potential VC, the VC will be used. Also, MV3 that correspond to VSS will be used as well. These are sufficient to generate the voltage which drives the liquid crystal display device. In this power circuit, the output voltage V3 and MV3, V2 and MV2, and V2 and MV2 is symmetric to VC. However, the section of ½ circuit 446 adopts the circuit structure as shown in FIG. 158. That means the voltage output such as V2, V2, MV1 and MV2 will be outputted by mediating through the operational amplifier 451, since it requires constant current output. But since VC is the central voltage, the operational amplifier 451 may not be needed. Also, since V3 and MV3 voltage are to be used for common scanning, and the output current is very few, there is no need to have operational amplifier 451. Of course, there would be no problem to include the operational amplifier 451 in the structure.

½ circuit 445 section, to be more specific, is configured as shown in FIG. 158. VC0 that was generated at the electron volume circuit will be amplified to generate the VC voltage. The operational amplifier consists of current vomitory main operational amplifier PVC and a lead-in sub-operational amplifier PVCS. In order to prevent penetration the vomitory and lead-in have the differential input transistors which are set asymmetrically in off-set positions. The asymmetry proportions are over 0.5% and less than 5%. It will be preferable to set below 1% and less than 3%.

The amplification is connected to the resistance so that it will be VC=2VC0. However, the resistance value R1 between VSS–VC and the resistance value R2 between VC–V2 are equalized. It would be ideal to set as R1=R2, but at least the difference of the proportion needs to be less than 2%.

The V1 and MV1 operational amplifier consists of the operational amplifier for vomitory and lead-in. The main amplifier of V1 is the one for vomitory and that of MV1 is the one for lead-in. Vomitory and lead-in vary input voltage to prevent penetration. The difference of voltage between the main and sub amplifiers is defined as 1/200×V2. This difference of input voltage shall be 1/200×V2 or more and 10/200× V2 or less. It is desirable that it should be 1/200×V2 or more and 6/200×V2 or less.

Though FIGS. 156 and 158 are the specific block diagram, they are too complex to understand the following description. Therefore, description will be given assuming the structure shown in FIG. 159.

Though the drawing shows 445 for ½ partial pressure and 472 for resistance, this is not a restriction. For example, Voltage V1 and MV1 may be generated by partial pressure of multiple MOS transistors. It may also be generated with the charge pump circuit. It may also be generated using the (MOS) transistor resistance and the volume as shown in FIG. 160. It may be configured to change partial pressure ratio by arranging multiple ladder resistances and selecting any position by an analog switch ASW as shown in FIG. 161.

As is shown in FIG. 156, the voltage required to drive the liquid crystal is generated by multiplying the reference electronic volume 442. However, the problem lies in generating the highest volume V3 and MV3 used for the common driver IC. The volume could exceed the pressure that the common driver IC can withstand. V2 and MV2 voltage used for the segment driver IC 15 brings up the same problem.

The description is given taking the volume V3 and MV3 used for the common driver IC for easier explanation. Therefore, V2 and MV2 for the common driver IC may be addressed according to this V3 and MV3 and the description for it is omitted.

The resistance to pressure of the common driver IC 15 is decided by V3 –(–MV3). For example, if the resistance to pressure of the common driver IC 15 is 18V, V=9 and MV=– 9V decided by V3–(–MV3) is the maximum. However, the voltage exceeds this resistance to pressure when the electronic volume is adjusted by the contrast adjustment and temperature compensation. Especially, as STN liquid crystal requires higher voltage to gain the defined transmittance as the temperature gets lower, the voltage may exceed the resistance to pressure in low temperature. The common driver IC will be damaged by over-pressure.

The conventional driver IC had no other method than to control the maximum step value of the electronic volume 442 using a microcomputer. However, even though the problem lies in the low temperature, big margin is required to control the volume by step value. Big margin requires higher resistance to pressure of the driver in the semiconductor manufacturing process. Higher pressure-proof semiconductors will have larger process rule and chip size.

To deal with this problem, the output voltage from the reference voltage generating circuit is impressed on the maximum voltage generating circuit (not illustrated) and the electronic volume 42. The maximum voltage generating circuit consists of the charge pump circuit and generates MAX pressure-proof voltage (actually the voltage lower than MAX voltage by the defined value). Temperature compensation is made to this voltage by the thermistor or the feedback circuit to avoid influence from the ambient temperature.

On the other hand, the electronic volume 442 varies steps by a command and output voltage. This output voltage is then converted by the tertiary booster circuit 444 and the negative double booster circuit 445 to V3 and MV3.

Assume that the output voltage of the maximum voltage generating circuit is Vm and that of the booster circuit is Vb. These Vm and Vb will be compared with the comparator. The capacitor circuit formed inside the comparator has the constant hysteresis and delay. Therefore, if Vb exceeds Vm, H level voltage is outputted. If Vb does not exceed Vm, L level voltage is outputted. Once Vb exceeds Vm, it won't become L level voltage unless it gets lower than Vm voltage by the defined voltage. The reason is that the display device will function unstably by the frequent switching between H level and L level.

When the electronic volume control circuit receives H level voltage input, it controls its step value so that it won't increase. Therefore, even if a user operates the electronic volume to adjust contrast and brightness, the final output voltage Vb of the electronic volume won't increase. That prohibits the common driver IC from exceeding the withstand pressure.

It may also be controlled by providing a separate temperature sensor (not illustrated) to prohibit the step value of the electronic volume 42 from changing by the output of the sensor. The important thing is to separately provide a defined voltage for the withstand pressure, compare it with the drive voltage of the liquid crystal display panel and control the means to change reference voltage such as an electronic volume.

Normally, V3 (MV3) voltage is formed in the common driver IC 15 and generated by the power circuit consisting of DCDC converters. Therefore, the tertiary booster circuit 444 and the negative double booster circuit 446 are built in the common driver circuit 15. V3, V2, V2, VC, MV2, MV2 and MV3 may be all generated by the common driver 15 and V2, V2, (VC), MV1 and MV2 voltage may be applied on the segmerit driver IC 14.

To avoid the pressure-proof problem of the said common voltage V3 (MV3), the dropped V3 voltage may be generated and impressed on the common driver IC 15.

FIG. 162 shows that multiple partial pressure resistances 472 are placed between V3 (MV3) voltage and V2 (MV2) voltage to generate the dropped voltage V3 (MV3) by switching the electronic switch SW. Two switches out of multiple ones turn on at the same time. SW1*a* and SW1*b* are ganged together. SW2*a* and SW2*b* are ganged together. SW3*a* and SW3b are ganged together. SW4a and SW4b are ganged together. Consequently, the drop rate of V3 and MV3 will be equal.

Changing the voltage of V3 (MV3) will change the bias ratio a. Dropping V3 will lower the bias ratio a. Lowering the bias ratio increases the amplitude of the segment signal relatively compared to that of the common signal. It also increases the contribution ratio of the segment signal. That easily generates flickers or causes low contrast.

To deal with this problem, it is desirable that the voltage drop in FIG. 162 should be in increment of 1% or more and 3% or less and the maximum drop should be within 15% against V3 voltage. The impedance is lowered by the operation amplifier 451 for the output of the electronic volume. The operation amplifier 45 can be omitted when the power of V3 (MV3) is small. The power of the operation amplifier 45 shall be V3 and V2, MV3 and MV2. This power specification allows reducing the power consumption used for the operation amplifier.

As a matter of course, the power of the operation amplifier 45 may be V3 and V2, MV3 and MV2. As shown in FIG. 156, as V1 (MV2) voltage is generated by V2 voltage, using V1 (MV2) voltage increases the cost. It also increases the power consumption as the current flows from V3 (MV3) to V1 (MV2).

V3 (MV3) voltage can be dropped externally using a microcomputer by adopting the circuit structure in FIG. 162 as shown above. This eventually resolves the pressure-proof problem of the common driver IC 15. Adjusting V3 (MV3) allows suppressing low frequency swell generated in low frame rate (less than 40 Hz). This low frequency swell is the phenomenon that variations of images generate in 10 Hz or less and move up and down on the screen. To reduce variations of images, it is effective to adopt the drive method that decreases n of nH inverse drive to 7 or less.

If the low frequency swell generates, it is suppressed by slightly lowering the V3 (MV3) voltage. Therefore, to display 8 colors in low frame rate, the electronic volume switch in FIG. 162 should be switched by the command from a microcomputer.

To suppress the low frequency swell, the ratio of V2 and V1 (MV2 and MV2) may be varied. The method to vary the ratio of V2 and V1 and its circuit structure will be described in FIG. 163.

FIG. 162 shows the structure of one operation amplifier. This is not a restriction and may b a structure of the main and sub amplifiers such as 451a and 451b as shown in FIG. 158. Adopting the structure of two amplifiers shown in FIG. 158 produces good results such as suppressing voltage fluctuation.

These descriptions are concerning the common driver IC and also applicable to the segment driver IC. The circuit structure and the method described are applicable by reading V2 voltage of the segment driver IC 14 for V3 of the common driver IC 15.

As has been described, ideally, the absolute value of V1 and that of MV1 should be equal and the absolute value of V2 and that of MV2 should be equal. The relation of V2=V1×2 and MV2=MV1×2 shall stand. Actually, this setting causes the phenomenon to easily generate cross talk.

To deal with this, the value of V2 should be smaller by 0% or more and 5% or less for V1×2 when the image (display panel) is in NB mode, It is desirable that it should be smaller by 0.5% or more and 3% or less (V1×2>V2).

Conversely, the value of V2 should be larger by 0% or more and 5% or less for V1×2 when the image (display panel) is in NB mode, It is desirable that it should be larger by 0.5% or more and 3% or less (V1×2>V2).

Having the value within the range prevents generating cross talk on the display screen and helps achieving good image display. The reason of this seems to relate to the fact that images tend to darken by reducing V2 in NB mode and cross talk generation is inconspicuous even when the value is slightly off the ideal value.

To review this reason and the variable range, a black window is displayed on the reflex STN liquid crystal display panel in NB mode as shown in FIG. 164. The central part on the screen shows the part of 0% brightness (black) and the peripheral (A, B part) shows the reflective (or transparent) part of 50% brightness. Originally, the A and B parts should be in the same 50% brightness. However, actually it is affected by the central part C and the transparency of B part is lower than that of A part (Transparency may be improved in some liquid crystal mode). FIG. 165 shows the graph of the rate of this transparency change.

The y-axis of FIG. 165 represents transmission ratio. 0% represents the case in which the transmission (reflectance) rate of the part A is equivalent to the rate of the part B. Therefore, if the part A becomes dark, the ratio becomes a negative value. X-axis represents the ratio between the voltage V2 and the voltage V1 (V2/V2). In this case, V2=−MV2 and V1=−MV2. Ideally (theoretically) V2/V1 equals to 2.

If the ratio of V1 to V2 is changed, keeping other conditions at the same and plot it on the graph, it seems that the transmission will be most stable when the ratio V2/V1 is 1.975, i.e. 1.5%, if the display mode is normally black (NB). The reason why we mention "it seems" is because the outcome varies depending on the sizes of the windows, etc.

Another reason why we mention "it seems" is that we actually didn't evaluate the outcome with only the windows displayed but we evaluated it with many natural images on the display, considering cross talk status synthetically. Therefore, the graph in FIG. 165 should be understood as a conceptional diagram for the explanation probably. Consequently, the transmission ratio represented by the graph in FIG. 165 does not necessarily mean the transmission ratio measured by an instrument.

At any rate, in the case of NB mode, when V2/V1 ratio was smaller than 2, interference such as cross talk didn't occur (or difficult to recognize) and we could get the clear images on the display. In addition, the difference was around −5% in this case. The ideal figure of the difference exists at the center part of −5% and 0% or −3% and 0%. It means, in the case of NB mode, V2 value should be 0-5% smaller than V1×2. More desirably, 0.5 to 3% smaller than V1×2 (V1×2>V2).

As is seen in the graph of FIG. 165, the curve that represents transmission ratio is apt to become sharper when the transmission ratio goes over some −3%. Even on the actual display, when the transmission ratio went over 3%, vertical lines tended to appear on the natural images in large numbers, and deteriorated them notably. The 3% of the transmission ratio represents 100/3=33, i.e., over −30 resolution. Even for the recent television sets, 32 tones for the display is considered enough. Therefore, if the difference is under some 3%, the realization of the difference may be difficult. For this reason, it is decent to keep the V2/V1 ratio so that the transmission ratio does not go over −3%.

On the other hand, as FIG. 165 shows, when the display panel was in the mode of normally white (NW), the outcome was completely reverse. Therefore, if the mode is NW, V2 value should be larger than V1×2 by 0 to 5%. More desirably, 0.5 to 3% larger (V1×2<V2). By keeping this difference, it is possible to avoid the cross talk of the displayed images as much as possible and get a balanced relationship.

The problem is that the ratio of V2/V1 varies depending on the liquid crystal mode, the materials used for the liquid crystal, the ambient temperature, or the displayed images. With the displayed images, if 8 colors are displayed, even though the V2/V1 ratio is farther than 2 relatively, the images are unlikely to be effected by the factors such as cross talk. On the other hand, if the natural image is displayed with 4096 colors, it is likely to be effected. Therefore, it is desirable to change the V2/V1 ratio depending on the ambient temperature, the number of colors displayed, etc.

Figure 163:
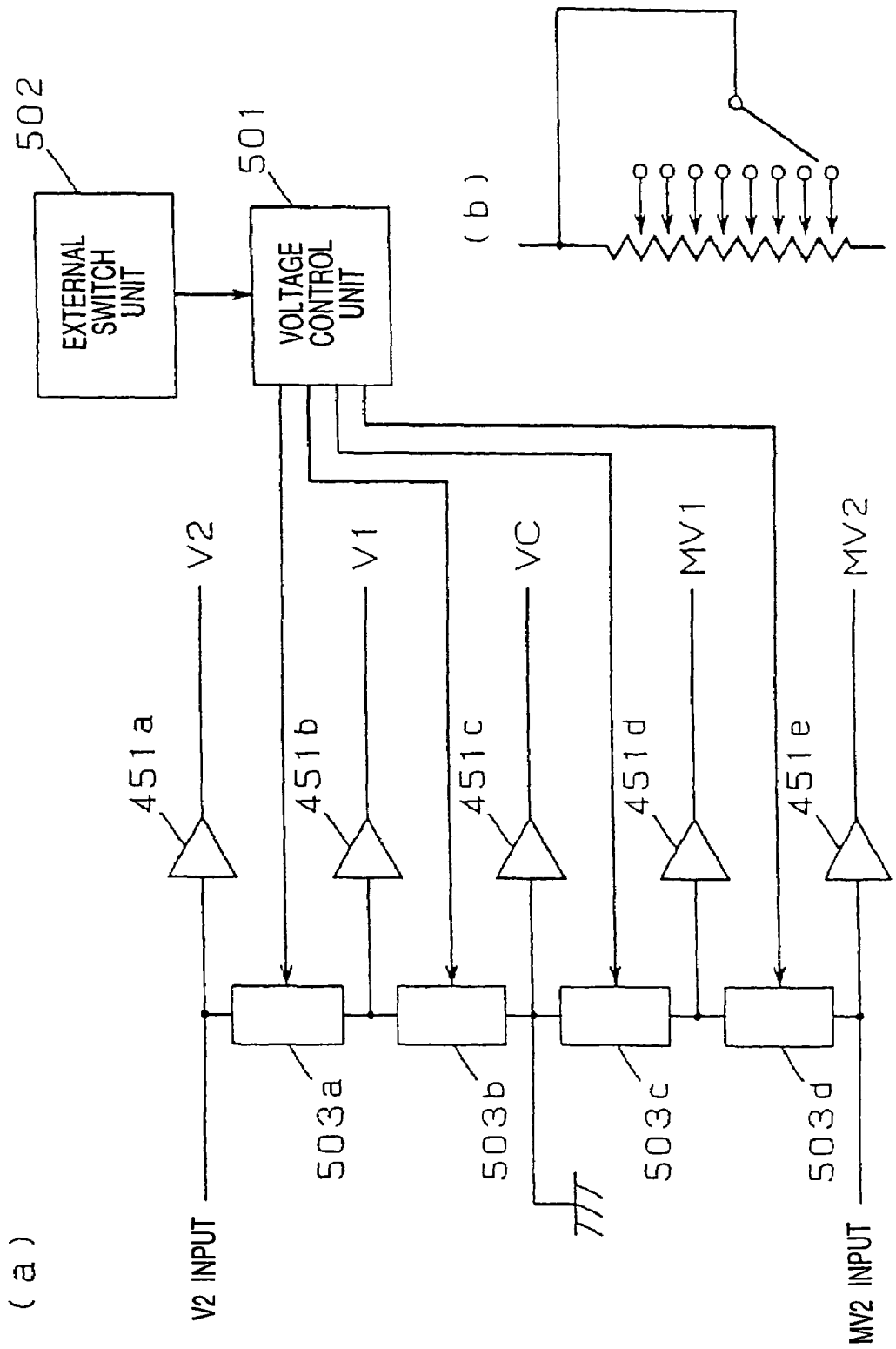

The present invention is structured so that you can change the V2/V1 ratio externally using commands by picking up one from the 8 different ratios. FIG. 163 represents the circuitry diagram. You change the dividing-voltage ratio of the dividing-voltage circuit 503 through the voltage control part 501 and then accordingly change the V2/V1 ratio.

One example structure of the voltage control part 502 is the volume structure illustrated in FIG. 163(*b*). The object of the control is not limited to the resistance value but can be the current value or the voltage value. Here, in order to simplify the case, the object is assumed to be the resistance value. It is desirable to set the structure so that the voltage ratio can be changed with the increments of minimum 0.5% or 1% towards V2/V=2. In addition, with regard to the IC chip, it is desirable to set the structure so as to change the chip among 4 to 16 different grades.

The partial pressure circuit 503, as shown in FIG. 163(*b*), has the volume that can be changed at specified steps. In other words, it changes the voltage of V1 or V2 by changing the tap, resulting in a change of ratio of V2/V2. It can modify the tap location from an external command. To be more specific, in similar to FIGS. 161 and 162, the analog switch (ASW) is arranged in a specified location of partial pressure resistance R, and the optional analog switch (ASW) should be configured so that it enable to turn on and off by 3-bit command (D0, D1 and D2).

When (D2, D1, D0) is at 0, decoder 521 will select the terminal G0 and turn on the analog switch ASW0. When (D1, D2, D0) is at 1, the decoder 521 will select the terminal G1 and turn on the analog switch ASW1. When (D1, D2, D0) in at 2, the decoder 521 will select the terminal G2 to turn on the analog switch ASW2. What follows is a similar process.

In addition, it is assumed by the present invention that the partial pressure ratio V2/V1 is changed by command, but it is not limited to that case. For example, for producing the liquid crystal display panels, either the NB or NW is selected at the time of module compilation. In other words, there are no instances in which one panel uses NW mode at one time and NB mode at another time (or very unlikely). Therefore, when the display panel in NB mode, V2/V1 ratio should be set lower, within the range of 0.5% to 3%. In other words, the V2/V2 ratio should be set with values smaller than 2. If the value of V2/V2 is to be locked, there is no necessity to adapt the partial pressure circuit 503 (FIG. 163*b*) and neither does the voltage control circuit 501.

To lock the V2/V2, the resistance values R1 and R2 in FIG. 160 should be locked. In addition, the size the MOS transistor or channel width of W transistor should be set at the predetermined values.

As shown in FIG. 166, there is also a method to modify through the mask pattern. In FIG. 166, reference numeral 532 is the ladder resistance, which is connected in series (resistance wiring). The contact section (the connection) is formed in the connection of ladder resistance 532. On one hand, the ladder resistance fence in this way, 532 is wired to 533, using a metal wire. On the other hand, when this metal wiring 533 is connected with the contact sections 531 and 532, it can modify the V2/V2 ratio. Hence, it is V1 voltage that will be outputted to metal wiring 533.

In FIG. 166, the connected line 534 is formed with a mask method, and the ratio of V2/V2 is being locked. In addition, at the time of the chip formation, V2/V2 ratio can be changed. Therefore, in NW mode, the modification, which connects the contact holes 531*a* and 531*b*, is possible. And during the NB mode, it can be modified so that contact holes 531*c* and 531*d* are connected. Because of the latter, the driver chip can be produced for both the NW and NB mode with only one mask modification.

As shown in FIG. 163, if commands are decoded from the MPU and construct an external switch method 502, then the V2/V1 ratio control will become so easy and if NW/NB switch method is constructed, the switching of NW mode and NB mode becomes just as easy.

Another problem is that the liquid crystal changes its viscosity due to temperature changes, as well as the screen responsiveness. For this reason, the proper V2/V2 ratio is vital to maintain the temperature of the liquid crystal display panel. The results of the examination have shown that as temperature increases, it is more desirable to make the V2/V1 ratio as much closer to the ideal rate of 2. In order to correspond to the problem, a temperature sensor should be installed separately and after considering the output result of the temperature sensor, the partial pressure ratio (V2/V2) should be controlled.

By the way, the partial pressure circuit 503 would mean to consist both mechanical constitution and also all electric constitution using analog switches. In addition, it is good to make the structure so that the partial pressure will change by a mechanical relay or light emanations, varying the resistance value as a result. Although the practical example described above is the case of MLS4, but the contents of the present invention can be applied in the case of other drives, such as MLS6 and MLS8, because the V2/V1 relationship also occur in these cases.

The selective voltage of V3 or MV3, of opposite polarity, is derived from the common driver IC. By adjusting this V3 voltage (MV3), it is possible to adjust the brightness of the display panel. As for the V3's variable range, it should be within the range of +10%, it is desirable at ±5%. The adjustment for the V3 is relatively easy; simplifying the circuit can do it.

Furthermore, the 451, assuming it is the operational amplifier, but it is not limited to the latter, is good even in the emitter follower circuit of the transistor when the current output is small. There is no necessity as far as the operational amplifier is concerned.

As has been shown, the drive circuit, drive IC (the driver) specifications, constitution and drive method and/or the base plate constitution of 11 and 12 (FIG. 4, FIG. 5 and FIG. 6) of the present invention will realize a display with ultra-low power consumption, high-quality and light-and-small. If an information display device such as the portable telephone, which is explained in FIGS. 87 and 126, is composed using the display system of the present invention, it will also achieve ultra-low power consumption on high quality. These points will be applicable to the following examples of the practical use of the device.

An information display device shall mean whatever type of device with display panel(s). Therefore, the technical scope of the present invention is not limited to portable telephone;

laptop or fixed devices may be included in the category. These points will be applicable to the following examples of the practical use of the device.

FIG. 167 represents an elevation view of information display device. However, in order to simplify the explanation, every detail is illustrated or modified. The segment driver IC 14 is arranged at the top and bottom of the display screen 107. The common driver IC15 is arranged in the right and left side. As for the portable telephone, because the electric power conversion is desired low, the drivers of the IC 14 and IC 15 have been designed respecting these specifications. Using these drivers IC, for the information display, it is possible to achieve high quality with low electric consumption.

In the information display device described in FIG. 167, the display part 107a and 107b are not to be differentiated; it is composed of two base plates 11 and 12. In FIG. 167, in order to simplify the explanation, the line has been drawn in the central part of the display part. The base plate for 107 is made of plastic. The constitution and the features of the display panel, which use the plastic base plate, have already been explained. It is possible to separate the base plates when using the several pairs of base plates 11 and 12.

The information display device in FIG. 167 possesses the component circuit like in FIG. 125, as well as the communication facilities, memo function, Internet function, dictionary function etc. The information concerning the error-diffusion processing has been explained before. As is shown up to this part, all the points indicated in these details of the claims can be applied mutually.

The information display device in FIG. 167, the operation of the segment driver 14a and the common driver 15b, indicates the graphic in the display part 107a. The operation of the driver 14b and the command driver 15b are shown in the display part 107b. Therefore, it is possible to use two screens simultaneously.

In addition, as shown in FIG. 168, the picture A (107a) and the picture B (107b) are represented together as forming one body. Furthermore, regarding FIG. 167, the number of pixels as follows, horizontally 320 dots×0.3 (RGB), vertically 120 dots. In addition, the letters are basically represented horizontally. The basic size of one letter is 16 dots (RGB)×16 dots vertically. In addition, 4 times the angular indication with command settings (32 dots (RGB)×32 dots), it discontinues the functional MLS4 drive, the identical voltage to the 4 common signal conductors (V3 or MV3); it has a function to indicate 16 times in the indicatory mode.

As shown in FIG. 169, the segment driver IC14a, the 14b and the common driver IC15a are all connected in circuit using the voltage unit 201, which is recognizable, by the driver. 15b. The voltage V1 occurs in the voltage occurrence circuit 201 (MV2) and VC are integrated in the segment driver IC14. In addition, V3 (MV3) is integrated in the common driver IC 15. Like in the above, this will occur in the voltage circuit 201 respecting the segment driver 14a, which use a common 14b. In addition, a difference in the brightness of the picture will not happen due the common voltage used by the common driver 15a in relation to 15b.

Furthermore, we assumed that the voltage occurrence in the circuit 201 is provided, but it is not something limited to this case. The V3 (MV3) generates voltage with common driver IC15a; it is possible that the same voltage be used for the common driver IC15b. In addition, the V2 (MV2) and the V1 (MV2) generates the voltage necessary for both the segment driver IC14a and the IC14b.

In addition, the V3 (MV3), V2 (MV2), V1 (MV2) all generate the voltage for the common driver IC15a, IC15b, IC14a and the IC14b. In other words, each segment driver IC provides the change function for the slave or the master driver using the generated voltage.

As stated in FIG. 169, dividing into screen A107a and the screen B107b, when it indicates the picture, it is necessary to divide for the microcomputer (not shown in the drawing) when dealing with graphics.

In FIG. 168, it divides the graphic data of the picture A and the graphic data of the picture B due to a memory set function. The segment driver 14a transfers the data from the picture A to the segment driver 14b for the picture B.

The graphic data distribution is made in relation to the logic signal of H and L of the tip/chip selection terminal of the segment driver IC14. As for the data of picture A and the data of picture B, as stated in FIG. 169, it is necessary to put in a state where the 90-degree display position is converted. When the graphic data is read, it also does the 90-degree conversion by calculating it.

The display of the image is easily achieved by dividing the data into the segment drivers 14a and 14b due to address calculations, possibly by a microcomputer. In addition, the segment driver will adopt the liquid crystal panel for the portable telephone and similar devices, at a low cost and with low electric consumption.

In addition, in FIG. 167, the apparition of the picture is possible using two common driver IC. Because it has made the constitution of the arrangement 15, it is possible that the result makes narrow angle of view. Therefore, the compact display of information can be formed.

As for the simple matrix liquid crystal panel display type, as for the extent the limit ratio, where the number of scanning lines increase, it becomes unclear. In addition, the necessary voltage for the common driver IC becomes high. In order to cope with this problem, the scanning lines should be decreased. In FIG. 168, the number of scanning lines decreases; it is the execution example when it forms the information display in FIG. 167. It makes the length of picture A shorter than B. The segment driver IC14 is arranged vertically in display screen 107, the common driver IC15 is arranged horizontally.

Furthermore, it is possible at the time of the constitution of FIG. 167, with the portion of the picture or the entire picture as a touch panel specification. It indicates the menu in the picture when the touch panel is formed. It follows this menu and enables the user to select. In addition, the base plates 11 or 12 and the touch panel, it is possible to form one body using the F.r.p corrugated sheet. Furthermore, the key 265 and plastic base plate, it is possible to form 11 and 12 into one body. This way, it is possible to increase the general purpose of the touch panel.

In addition, the indicatory mode switch 1785, explained in FIG. 170, it is possible to arrange the reflections transmitted to the selector switch 1786. As a proper thing, it can also apply to the other execution examples mentioned above.

In addition to the display part 107a, it draws up the 107b with a plastic bas plate in FIG. 167. In the display part 107c, it is possible to draw up the 107d with a glass base plate. The fact that the liquid crystal panel breaks when using a plastic base plate for the indicatory panel when pushing pressure is involved, this can be prevented by the use of glass. The display part 107a designates the 107b as the liquid crystal display panel as a reflected type. It is possible that the display part 107c, the 107d as a liquid display panel of semi-transmitted type or transmitted type. In the exterior or in the interior, it can avoid being influenced by the environment by selecting the liquid crystal display panel, which looks at the picture mainly. This way a satisfactory picture indication can be actualize. (Exteriorly, the liquid crystal display of reflected type. Interiorly, liquid crystal display of transmitted type.)

It also makes the black binary indications according to the environment. The number of graduation indications changing, it makes the field sequential indication which indicates the picture of the RGB. By making the black reflection indication, it is possible to change the color's substance.

As for the execution example explained above, it is possible to apply this theory to other facets of the present invention. In addition, it possesses the several examples of the pictures. It is not something limited to the liquid crystal display panel, it is also possible to apply the above to other display panels like the EL panel, the PLZT and similar ones.

The display of the present invention can be used with the transmitted type, the reflected type and the semi-transmitted type. When used with the reflected type, illumination is necessary in a dark environment. As an illumination expedient, the self-luminous element such as LED, EL and the fluorescent tube, the above can be used. Especially when the white LED lights up, the direct current (voltage), it is beneficial to use because it is compact.

The derived optical board, with the black light system is good with the front light/write system. In addition, the material is good with each transparent resin material such as acrylic and polycarbonate. It is good even with inorganic material such as plate glass.

The white LED as a luminous element (Light Emitting Diode) is a Nichiya Kagaku product. The YAG (yttrium aluminum garnet) is sold to those which apply the fluorescent system to the tip/chip surface of the GaN blue LED. In addition, Toyota synthesis (inc.) sells the white LED, which is applied, to the fluorescent substance of red, blue and green to the blue LED. Sumitomo Electric Industries (inc.) uses the ZnSe material, which it produces.

Especially as for the white color LED to be used with the present invention, it is preferred to use LED circuit element of GaN type. This LED circuit element causes short wavelight emission and makes it possible to obtain white color by fluorescence from a fluorescent substance through triggering the fluorescent substance contained in the transparent stopping resin by adjusting In contents of emission layer. As for the fluorescent substance, it is preferable to use 3 types, red color, green color and blue color light emission. For white color LED, the color of emission is determined only though the proportion of light emitting power of the fluorescent substance because the output from LED circuit element is short wave light. Because each of the fluorescent substances has excellent temperature characteristic and the color of light emission is determined by the mixture proportion of fluorescent substances, it has the feature of high productivity and excellent temperature characteristic. Also, the fluorescent substances can be two types, yellow color and red color. It is because LED of blue color and fluorescent substance of yellow color only cannot take the balance of color due to the lack of the wave of red color.

However, light emission circuit element is not limited to white color LED. For example, when displaying a picture field-sequentially, only one of R, G, B emission light or multiple number of the LED can be used. Also, the structure to locate LED for R, G, and B densely together or in parallel and synchronize those 3 LEDs with the indication of indicator panel to turn on field-sequentially is acceptable. In this case, it is preferable to place light diffusion plate on the side of light emission. By placement of light diffusion plate, inconsistency of the color is prevented.

In the present invention, the segment driver IC14, 15 etc. were described as produced with silicon chip. But it is not limited to that and it can be produced using production process of indication area 107 with the use of technology such as high temperature polysilicon technology, low temperature polysilicon technology or semiconductor processing technology. Also, drivers etc. can be connected to stripe shape electrode, using COF, TAB, COP or COG technology.

The light modulation layer of indicator device in the present invention is not limited to liquid crystal but 9/65/35PLZT or 6/65/35PLZT of thickness of about 100μ is also acceptable. Also, light modulation layer 24 with added fluorescent substance or liquid crystal with added polymer ball or metal ball is acceptable. Very small balls distinguished by the color of black and white is acceptable too.

For example, silicon base plate 11 or one with formed organic EL structure on 11 as illustrated on FIG. 171 is also acceptable. An optical interference film of multi-layer derivative is formed on the organic EL structure. Multi-layer derivative 1771 is, as explained before, the layer made of low refractive index derivative films and high refractive index derivative films placed on top of each other. In other words, it is a derivative mirror. This multi-layer derivative 1771 has a function to make the color tone of the light emitted from organic EL structure better (filter effect).

Multi-layer derivative 1771 functions as reflection prevention film. Conventional protection film for organic EL has been thick plate etc. and it is ruled by Snell's law. Therefore the light comes out of organic EL structure to all the directions are all reflected on the surface of the thick plate mentioned before. As a result, it is not released into the air (outside) from the thick plate mentioned before.

But in the case of multi-layer derivative 1771, the thickness is very thin. Therefore when forming by multi-layer derivative as protection like in the present invention, Snell's law does not apply. As a result, the light comes out of organic EL structure is released into the air (outside) from multi-layer derivative 1771.

The organic EL structure has a weak point of lacking humidity tolerance. The multi-layer derivative 1771 is made of many low refractive index derivative films and high refractive index derivative films placed on top of each other. Thus there is no pinhole occurrence. Therefore the organic EL structure is not exposed to the outside air. This means there is no issue of deterioration of organic EL structure to occur.

Incidentally, the organic EL structure may implement simple matrix drive, it is desirable that to implement an active matrix type display with the thin film transistor (TFT) or thin film diode (TFD) formed on the pixel. Especially, two TFT shall be formed on one pixel. 4 TFT or more on one pixel to achieve low power consumption and preferably 6 TFT shall be formed.

Small, light and backlight-less high quality display device can be structured by configuring a mobile telephone, terminal or information display devices shown in FIGS. 87, 126, 167 and 170 using the said organic EL structure display panel or display device.

Transparent electrode such as striped electrode was explained as ITO in the display device in the present invention. This is not restricted. For example, transparent electrode such as $SnO_2$, indium, indium oxide is an another alternative. Thin film deposited by the metal such as gold may be adopted. Organic conductive film, ultra-fine grain dispersion ink or transparent conductive coating agent "Sintron" commercialized by TORAY may be used.

Examples of the present invention have described the active matrix type with switching elements such as TFT, MIM and thin film diode (TFD) arrayed for every pixel electrode. This active matrix type or dot matrix type includes the liquid crystal display panel and DMD (DLP) developed by TI to display images by the angle change of micro mirror.

The switching element such as TFT is not restricted to one element per pixel and multiple elements may be connected. It is desirable to adopt LDD (low doping drain) structure for TFT.

Though matters concerning FRC control method and frame rate switching have been described based on STN binary liquid crystal, they are applicable to the TFT multi-value gradation liquid crystal. Generally, TFT liquid crystal is a multi-value output signal line driver (equivalent to SEG driver 14) and 64 gradation and 256 gradation driver are not suitable to mobile liquid crystal from the aspect of power and circuit structure. As a result, the method to display multi-gradation in 8 and 16 gradation driver and frame rate control is adopted. Even in this case, high degree of flexibility may be obtained like STN by having variable frame rate according to the number of colors, namely gradations.

Technical idea of implementation examples of the present invention is also applicable to liquid crystal display panel, EL display panel, LED display panel, FED (Field Emulation Display) panel and PDP. This does not mean the specification is restricted to the active matrix type and the simple matrix type can be an alternative. The simple matrix type also has a pixel (electrode) at the intersection and can be regarded as the dot matrix type display panel. As a matter of course, a reflection type of the simple matrix panel is within the scope of the present invention. It goes without saying that it is applicable to the display panel displaying simple signs such as 8 segment, characters and symbols. This segment electrode is one of pixel electrodes.

As is shown in FIG. 172, it is desirable to be configured to achieve partial display on only the display area 107*a* to attain low power consumption during waiting. The range register should be provided to show the start position and range of the partial display area. The register number storage circuit to store the register number and the comparative circuit to compare the received number with the register number registered in the described register number storage circuit should be provided.

The color of the area 107*b* outside the partial display area should be changed according to the received number. For example, if the registered number is pertinent to a company, blue should be displayed on the display area 107*b* and if the number is pertinent to a family, green should displayed. Namely, the image processing circuit shall be provided to change the color of the area outside the said partial display area by the output from the said comparative circuit. This control allows decision without checking the receiving number.

These were the implementation examples of information display devices. However, information display devices include video cameras with a display monitor shown in FIG. 173 as well as a mobile telephone. FIG. 173 shows the example suited to a video camera. The present invention is applied to the direct vision monitor (a liquid crystal display panel or an organic EL display panel) 21 and viewfinder section.

The display panel 21 can be folded and stored in the storage 1783 of the video camera body 1782. The video camera body 1782 is equipped with the photo lens 1781 and the eyepiece cover 1784 of the viewfinder.

The display device and information display device of the present invention is equipped with the display mode switch 1785. The display mode switch 1785 switches between NW mode and NB mode. It displays the image in NW mode when the outside light is general (normal). Wide field angle display can be achieved in NW mode. NB mode is used when the outside light is weak. As an observer views the light reflected on the pixel electrode when the liquid crystal is in transparent status in NB mode, the bright display image can be viewed. The field angle is extremely narrow.

However, as the display image can be viewed in good condition even when the outside light is very weak, there is no harm in personal use for a short time. Generally, as NB mode is used less frequently, it should be configured to be normally in NW mode and switch to NB mode if the display mode switch 1785 is kept on pressing. If the outside light is weak, the light emitting element should be lit, or the display panel 21 should be illuminated using both the outside light and the light emitting element.

The display device and information display device of the present invention is equipped with the reflective transmission switch 1786. The reflective transmission switch 1786 switches the data of the contrast adjusting circuit 1681 and the gamma lookup table 1451 to display the image in transmission mode and in reflection mode, because gamma is different in transmission mode and in reflection mode. The reflective transmission switch 1786 enables switching gamma curve with a single touch.

As the reflective transmission switch 1786 compensates gamma curve, it is used to get the optimum display condition from the color temperature of the outside light. The color temperature of the incident light into the display panel 21 under the illumination of an incandescent lamp is about 4800 k reddish white, about 7000 k bluish white under the fluorescent lamp of daylight color and about 6500 k white under the sunlight outdoors. Therefore, the color temperature of the display image on the display panel 21 can be changed using the reflective transmission switch 1786. This feel of incompatibility is especially significant when we move from under the illumination of a fluorescent lamp to under the illumination of an incandescent lamp. We may be able to normally view the display image by selecting the reflective transmission switch 1786.

The incident angle of the light into the display panel 21 is adjusted by rotating the lid 1787. Rotate the lid centered on the rotation center 1871. This configuration allows good incidence of narrow-oriented light into the display panel 21.

This specification refers to the integrated component having at least light source such as a light emitting element (light generating means) and the image display device (light modulating means) that doesn't emit light by itself such as a liquid crystal display panel as a viewfinder.

Video cameras include not only a camera using video tape but also a camera, electronic still camera and digital camera that record images on FD, MO and MD, and an electronic camera recording images on the solid memory.

FIG. 174 is the sectional view to explain the viewfinder. The viewfinder in FIG. 174 uses the display device 21 of the present invention. The lens array 1813 and convex lens 1804 are arranged on the outgoing surface on the display panel 21. The light emitted from the opening 1812 illuminates the display panel 21. The micro lens 1814 converts the light to narrow directional light.

The convex lens 1804 has the function to collect light modulated by the light modulation layer such as liquid crystal layer and organic EL. That makes the effective diameter of the magnifying lens smaller than that of the display panel 21. Due to smaller magnifying lens, the viewfinder can be made lighter in lower cost.

The magnifying lens 1802 is attached to the eyepiece ring 61803. An observer can adjust the focus to the visibility of his eye 1816 by adjusting the position of the eyepiece ring 61803.

As an observer views the display image with his eye 1816 close to the eyepiece cover 1784, narrow directivity of the light from the backlight (light guiding plate) 1815.

FIG. 175 is the explanatory drawing (sectional view) of the viewfinder in the implementation example of the present invention. FIG. 175 shows that the transparent block with parabolic mirror converts the light from the light source placed at O point (see FIG. 176) and illustrates the display panel 21. Transparent type or semi-transparent type of the present invention is used for the display panel 21.

The transparent block 1791 is the concave mirror with the focus O as shown in FIG. 176 and converts the light emitted from the focus O to parallel light by reflecting the light with the reflection plane (reflection film) 1793. The reflection film 1793 is not restricted to the complete parabolic form 1791 and may be elliptical form. Namely, it can be anything as long as it converts the light emitted from the light source to almost the parallel light. For example, prism plate (prism sheet) and phase film may be used. Light emitting element is not restricted to point light source and may be a linear light source like a tenuous fluorescent lamp. For example, parabolic mirror can be two-dimensional.

As shown in FIG. 176, if the light emitting element is a point light source, the back of the diagonally shaded area 1791 (transparent block) is deposited by the film such as Al and Ag to form a reflection plane 1793. The reflection plane 1793 can be dielectric mirror or the one using diffraction effect as well as those with metal material such as Al and Ag deposited. The one with the reflection plane 1793 mounted on other member may be installed.

The light 1806 emitted from the white LED 1805 as light source enter the transparent block 1791. The entered light 1806a is converted to the narrow directional light 1806b and enters the display panel 21. The light collected by the field lens (convex lens) 1804 enters the magnifying lens 1802. The field lens is formed by polycarbonate resin, acrylic resin and polystyrene resin. The transparent block 1791 should be formed with the same material. Among others, the transparent block 1791 should be formed with polycarbonate resin.

The polycarbonate has wide wavelength dispersion. However, it presents no problem if it is used for illumination without an effect of color drift. Therefore, it should be formed with polycarbonate resin that takes advantage of high index of refraction.

High index of refraction allows ample parabolic curvature and smaller plane. It may also formed with organic or inorganic glass. Or the one with gel or liquid filled in the lens-form (concave) case may be used. Or it may be a concave bowl-form whose parabolic plane is partly worked (a part of normal concave mirror is used instead of transparent member).

If the reflection plane is formed with the metal thin film such as Al, it should be coated by UV resin or with $SiO_2$ and magnesium fluoride.

The reflection plane 1793 may be formed with metal thin film and reflection sheet and metal plate may be affixed. Or, it may be formed by paste application. A reflection film formed on the other transparent block may be mounted on the transparent block 1791. Optical interference film may be a reflection plane 1793. The part C (see FIG. 176) is centrally illuminated by the light emitting element 1805C as shown in FIG. 176 in the present invention.

Directional light emitting element may be used, because the illuminating range C (see FIG. 176) is narrow. That improves effectiveness of light It allows effectively illuminating the illumination area of the small display panel 21. In this sense, it is most suited to (white) LED whose light emitting part is small. The position of the light emitting element may be displaced from the focus O. That simply changes the apparent size of the light emitting area of the light emitting element. If it is placed outside the focus distance, the light emitting area grows larger. If it is placed within the focus distance, the illuminating area normally becomes smaller.

For this reason, the present invention uses only half part from the center line of the parabolic mirror and does not use the lower position of light emitting element as passing area of the illuminating light.

Assuming that the diagonal length of the effective display area on the display panel 21 is m (mm) (the pixel-formed area viewable from the observer who views images on the viewfinder)

And focal distance of the parabolic mirror 1791 is f (mm), the following relation shall be satisfied.

$$m/2 \text{ (mm)} \leq f \text{ (mm)} \leq 3\, m/2 \text{ (mm)}$$

When f (mm) is shorter than m/2 (mm), parabolic curvature becomes smaller and forming angle of the reflection plane 311 grows wider. This increases the depth of the backlight, which is not desirable. Sharp angle of the reflection plane causes the problem of easily generating luminance difference on the margin of the display area 21.

On the other hand, when f (mm) is longer than 3 m/2 (mm), parabolic curvature increases and the position of the light emitting element is raised. Likewise, this increases the depth of the backlight.

If the white LED is chip type, the diameter of the light emitting area is about 1 (mm). There is a case when the parabolic plane is big, a case when the diagonal length of the effective display area on the display panel is long and a case when the diagonal length of 1 (mm) diameter is small. Namely, the directivity of the light entering the display panel 21 will be too narrow. Depending on the design of angle of view of the magnifying lens 1802, taking more distance from the eye to the eyepiece cover 1784 reduces visibility of the display image if the light emitting area of the light emitting element is small. Therefore, it is better to enlarge the light emitting area by placing a diffusion plate on the outgoing side of the light emitting element 1805.

The white LED 1805 employs constant current drive. Employing constant current drive reduces the variation of temperature dependent light emitting luminance. LED 1805 allows reducing power consumption by employing pulse drive with light emitting luminance kept high. Duty ratio of the pulse shall be ½ to ¼ and the frequency shall be 50 Hz or more. Flickering will occur if the frequency is as low as 30 Hz.

It is desirable that the diagonal length d (mm) of the light emitting area for LED 1805 should satisfy the following relation assuming that the diagonal length of the effective display area of the display panel 21 is m (mm).

$$(m/2) \leq d \leq (m/15)$$

Preferably, it is desired to satisfy the following relation.

$$(m/3) \leq d \leq (m/10)$$

When d is too small, directivity of the light to illuminate the display panel 21 becomes too narrow and the display image viewed by an observer gets too dark. On the other hand, when d is too large, directivity of the light to illuminate the display panel 21 becomes too wide and the contrast of the display image reduces.

As an example, assuming that the diagonal length of the effective display area on the display panel 21 is 0.5 (inch) (about 13 mm), the diagonal length or the diameter is 2 to 3

(mm) is appropriate for the light emitting area of LED. The size of the light emitting area can be easily achieved to meet the purpose by fixing or placing the diffusion sheet on the outgoing plane of the LED chip.

Quasi-parallel light means the light with narrow directivity and does not refer to complete parallel light. It can be a light concentrating to the optical axis or a diffusing light. Namely, it is used to mean the light not from the diffusing light source like a surface light source. These matters are naturally applicable to other display devices in the present invention.

It is desirable that inner surface of the body 1801 should be in black or dark color to absorb dispersed light by light modulation layers such as liquid crystal layer and organic EL light emitting layer in FIGS. 175 and 177. This is to absorb unnecessary light by the body 1801. Consequently, it is effective to apply black paint on the ineffective area (the area where the light effective to the display images cannot pass through) of the display panel 21.

Light modulation layers such as liquid crystal layer disperse or transmit the intensity of the voltage impressed on pixel electrodes. Otherwise they change the polarizing direction. The transmitted light passes through the magnifying lens and reaches at the eye 1816 of the observer.

As the eyepiece cover 1784 in the viewfinder fixes the scope of the observer, the area to be seen is very limited. Therefore, even if the narrow directional light illuminates the display panel, ample angle of visibility can be achieved. That helps extensively to reduce the power consumption of the light resource 1805.

As an example, surface light source method required 0.3 to 0.35 (W) power consumption of the light source in the view finder using 0.5 inch display panel 21, while the viewfinder of the present invention could achieve the brightness of the same display image by 0.2 to 0.04 (W).

The observer views the displayed image by fixing the eye 1816 with the eyepiece cover 1784. The focus is adjusted by moving the eyepiece ring 1803. The light source 1805 is not restricted to one or more multiple sources may be used.

FIG. 175 uses one liquid crystal display panel whereas FIG. 177 uses two liquid crystal display panels 21.

As is shown in FIG. 177, high-resolution image can be displayed with the low-resolution liquid crystal display by displaying the image interpolating the display panel 21a and 21b. And high resolution and brightness display can be achieved by converting the display panel 21a to the brightness (Y) display panel and forming the color filter on the display panel to be a color (C) display panel. An example also shows that the liquid crystal display panel 21b or R light modulation, the display 21b for B light and G light modulation. Two-color filter may be mosaically formed on one display panel.

Though the display panel 21 is mainly treated as the liquid crystal display panel in the viewfinder of the present invention, this doesn't mean this is restricted. It goes without saying that the self light emitting type display panel such as fluorescent light emitting panel (such as FED), organic EL or inorganic EL may be used. If the display panel 21 is the self-light emitting type, it is needless to say that it requires no illumination means such as backlight.

To display with the field sequential method, LED 1805R for R, LED 1805G for G and LED 1805B for B, as shown in FIG. 177, are located. In addition to these LED 1805 for R, G and B, LED for W (white) can be used.

Apart from these LED 1805 for R, G and B, LED composed of three elementary colors; cyanogens, yellow and magenta, can also be used. The LED 1805 should be located as densely as possible. At the same time, a light diffusion plate (not shown in the drawing) is set on the emission side. This contributes to enlarge the emission area of LED and also restrict the emergency of irregular colors caused by the distributed emission points of LED for R, G and B. The number of LED for R, G or B is not limited to one each. It is acceptable to use two LED for G and one each for R and B as long as the color balance is well considered.

The light emitted from LED 1805 is condensed through the lens 1804. The condensation explained in view finder and other items is used for making the chief ray of divergent rays parallel or semi-parallel. The light may be designed to become convergent, or the chief ray may be designed to spread depending the display area of the display panel 21 or the aperture of the magnifying lens 1802.

When the display panels 21a and 21b modulate the same color, the LED 1805 synchronizes with the applied picture signal of the panel 21 and lights up corresponding LED 1805. This is called 'field sequential display'. The LED 1805, in a case where it emits white, is usually responsible for display (drive). In a case the panel 21a modulates G light and the panel 21b does B light, LED 453G and 453B simultaneously light up. This means: when the panel 21a modulates G light and the panel 21b does B light, LED 1805G and B are lighted up. When 21b modulates B light and 21b does R light, 1805B and R are lighted up. When 21a modulates R light and 21b does G light, 453R and G are lighted up.

As shown in FIG. 177, the present invention uses the polarizing beam splitter (PBS) 1821 in order to polarize and disperse lights with the use of interference film (semi-dispersed layer) 1822. The PBS 1821 is not limited to a solid block material but a sheet type can be used. The latter may degrade contrast in some degree, but is cheap. Instead of PBS 1821 shown in FIG. 177, a regular beam splitter can be used. The beam splitter 1821 means a function to divide an optical path into plural form, and represents a dichroic mirror, a half mirror or a dichroic prism, etc.

As an application sample of FIG. 177, a permeable or semi-permeable panel can be replaced with the panel 21. It is desirable to optically couple the PBS 1821 and the panel 21 with the coupling material (layer) 1824, in order to block the light reflected at the interface between the panel 21 and air. A prism plate may be set at the injection surface of the panel 21 or between the backlight 1815 and the panel 21.

The present invention used two display panels 21 as shown in FIG. 177, but the number of the panel is not limited to this. More than two can be used. As for the panel 21, DMD (digital micro mirror device) produced by Texas Instruments in U.S.A or TMA made by DAEWOO Electronics in South Korea can be used. As the color filter, a hologram color filter can be used. These explanations are applied to other display unit and so forth described in this statement.

All the above specifications are suitable for the case where the panel 21 has a comparatively small display area. When the area becomes larger to exceed 30 square inches, the screen tends to bend. As the countermeasures, the present invention fits the outer frame 1831 with the panel 21 using the fid 1832 to suspend the frame, as shown in F FIG. 170. Using this fid 1832 and the fixing anchor such as the screw 1842 as shown in FIG. 178, the panel is be set on the wall 1841 or other place.

However, the weight of the panel 21 increases in proportion to increase of its size. As the countermeasures, the present invention installs the leg mounting part 1834 under the panel 21 so that the several legs 1833 can support the panel 21.

The leg 1833 is made movable sideward as illustrated in A and also retractable as in B. This construction enables the user to set the display unit with ease even in a small space.

A composite material of plastic film and metal plate (hereinafter referred to as the composite material) is used for the leg 1833 and the case (and also other equipment specifications described in the present invention). This composite material is made by powerfully bonding metal and plastic film through the special surface treatment layer (adhesive layer). The metal plate thickness is preferably 0.2 mm and above but not over 0.8 mm. The plastic film to be bonded through the special finishing layer on the metal plate is desirable to have thickness of 15 μm and above, not exceeding 100 μm.

The special bonding method generates powerful adhesion between the plastic and the metal plate. Utilization of this composite material enables coloring, dyeing and printing on the plastic layer. In addition, the secondary process required for pressed parts (manual lamination of the film or plating) can be omitted. Moreover, deep-drawn molding and DI molding that have been traditionally impossible now become available.

The screen surface of liquid crystal television or organic EL television illustrated in FIG. 170 is plated with the protective film 1843 (or plate). Its main aim is to prevent the panel 21 surface from being damaged when something hits it. Surface of the protective film 1843 is finished with AIR coating and embossed (as shown in 1556 of FIGS. 6 and 7) in an attempt to limit reflection of surroundings (outside light) onto the panel 21.

Beads are spread between the film 1843 and the panel 21 to secure a certain space. The minute convex part created on backside of the film 1843 enables to maintain a space between the panel and the film. By maintaining these spaces, any impact to be transmitted to the panel 21 from the film 1843 is restricted.

Another effective method is to distribute or inject the optical binding agent 1824, e.g. a liquid such as alcohol and ethylene glycol, or gel acrylic resin, or solid resin such as epoxy between the panel and the film 1843. This also prevents interfacial reflection along with the function of the above-mentioned optical agent 1824 as a buffer.

Samples of the protective film 1843 include polycarbonate film (plate), acrylic film (plate), polyethetel film (plate) and PVA film (plate). Engineering resin film can of course be used and so as other films composed of inorganic materials such as reinforced glass. As a substitute for the protective film 853, coating of the panel 21 with epoxy resin, phenol resin or acrylic resin in the thickness from 0.5 μm to 2.0 μm has the same effect.

It is also effective to apply fluoric coating on the film 1843 or the surface of the coating material, because this makes it easier to wipe out the dirt on the surface with soapy water. As another option, it is good to form the film thick to be served as a front light at the same time.

The applicable aspect ratio of the screen is not restricted to. 4 to 3, but that of 16 to 9 typically in a wide television is also acceptable. The resolution is desirable to become 1280×768 dots and above. By taking advantage of the wide screen, the user can fully enjoy DVD movies or telecast when they are broadcast using the screen from side to side.

It is preferable to set brightness of the display panel at 300 cd/m$^2$, or more preferably, at 500 cd m$^2$. This unit is also installed with a selector switch to change the brightness (at 200 cd/m$^2$) suitable for daily use of PC or the Internet. Thus, the user can select optimal brightness of the screen depending on contents displayed or the use.

In addition, it is equipped with a setting that enables to display only the window showing a moving image at 500 cd/m$^2$ and other parts at 200 cd/m$^2$. One of its flexible uses is to display a TV program at one corner of the screen while the user is checking emails. The speaker is designed to be vertical and to emit sound not only in the front but also in the whole space.

Replay or tape-recording of TV programs is another improved feature, and the user can easily reserve and record a program via i-mode. Traditionally users needed to check the time and channel for the program before recording it by referring to the guide on such media as newspaper, but it is not required any longer since the user of i-mode only need to check them with an electronic program guide via i-mode to reserve and record. This helps the user not to miss recording just because they have no source to check the broadcast time. Furthermore, it is capable of replaying a recorded program in a shortened time. It allows the user to see the outline of the program by leaving only the important part they want to see by selecting it from telops or sound and by skipping the part they do not require. (A 30 minute program will be replayed in 1 to 10 minutes.)

For this tape-recording, the unit is installed with a hard disk whose capacity is over 40 GB as well as an expansion box that has I/O terminals for power and image. The expansion box used for connecting AV devices such as a video recorder connects not only a PC and a TV set but also dual system video devices. For the image input, it has a DI terminal used for a BS digital tuner as well as an S terminal, which can be selected depending on a connected device. The terminal for AV devices is arranged in front conveniently for the user to connect video game machines.

It would be more desirable to load such functions as IEEE1394 (i.LINK) or the memory stick. Apart from this, it can deal with Bluetooth. To use this, the user just presses the button 'BLUETOOTH' at the side of the display panel for 2 seconds or more.

When the blue LED on the upper right of the main unit lights up, start the dedicated software to search devices able to be connected. When the search finishes, select the device to be used from the 'connected device panel' on the right of the screen. Then select the communication method from the 9 icons displayed on the screen. For example, click on 'File Push' for communication with VAIO. Select the file to be sent and then input the password decided for the machines in advance.

All the above descriptions, explanation related with the protective film 1843, case, construction, characteristics, functions, etc. are applied to other display devices (such as a mobile phone) and information display devices described in the present invention.

The present invention utilizes plastic to make the platform 11 and 12. This enables integral molding of the spacer and the platform, omitting the molding process of spacer and achieving a great cost reduction and an improved yield ratio.

Also by making the spacer trapeziform, the present invention can increase light emission quantity to the front, which contributes to improve brightness. Other advantages included are less heavy weight and higher impact resistance. Also thanks to the use of plastic, the display can be made flexible. In addition, it enables energy saving during manufacturing. These are some of the many advantages the present invention has.

The technical theory of the present invention can certainly be adopted into the plasma addressing type display panel, along with an optical write, a heat write and a laser write types that have no pixel. These panels can be utilized to construct projection type display units.

The mode (here referred both to a mode and a code) of the panel can be adopted to not only PD mode but also other modes such as STN, ECB, DAP, TN, (anti) ferroelectric liquid crystal, DSM (dynamic scattering mode), vertical orientation, guest host, homeo-tropic, smectic, cholesteric. The above-mentioned specifications are applied to the entire section of the present invention.

Application of the display panel/device specified in the present invention and the information display device or the drive, display and transmission mechanism utilizing the specified theory is not limited to the TN liquid crystal display panel. Applicable display units include the polymer dispersion (e.g. PD liquid crystal mode) LCD whose liquid crystal layer is composed of resin and liquid crystal component, and the STN LCD, cholesteric LCD, DAP LCD, ECB LC mode display, IPS system display, ferroelectric LCD, ant-ferroelectric LCD, OCB LCD and others. Other units, which introduce such systems as PLZT display, electro-chromism display, electro-luminescence (EL) application display, LED display, EL display (OEL, OLED, organic EL and inorganic EL), CRT display, plasma display (DPD) and plasma addressing (PALC), are also applicable. The above-mentioned specifications are applied to the entire section of the present invention.

The technical theory explained in the application samples of the present invention can be adopted to video cameras, LC projectors, 3-D televisions or projection televisions, along with View finders, monitors of mobile phones, PHS, hand-held devices and their monitors or digital cameras and their monitors. Other applicable devices are electronograph systems, head mount displays, direct-view monitor displays, notebook computers, electro steel cameras, monitors of ATM, pay phones, picture phones, personal computers, LC wrist watches and their displays. It can certainly be applied to or developed with LCD monitors of home appliances, pocket game machines and their monitors or back lights for display.

INDUSTRIAL APPLICABILITY

The display panel/unit specified in the present invention has characteristic effects such as high picture quality, low power consumption, lower cost, higher brightness in accordance with respective unit constructions.

Utilization of the present invention does not require much electricity because it supports to construct low-power-consumption information display units. Moreover, it enables downsizing and weight saving, which does not waste resources. In consequence, the present invention is friendly to the global as well the space environment.

The invention claimed is:

1. A matrix type display unit having multiple scanning electrodes and multiple signal electrodes, comprising:
    a driver including a scanning circuit to drive said scanning electrodes and a signal circuit to drive said signal electrodes, said driver being positioned on one side of said display unit,
    wherein a predetermined amplitude pulse, having an amplitude significantly greater than a data signal, is superimposed to one of the signal electrodes and one of the scanning electrodes simultaneously with one horizontal scanning period,
    wherein the driver significantly reduces an amplitude of a selection signal and an amplitude difference between a selection signal and the data signal,
    wherein the predetermined amplitude pulse is applied simultaneously at a predetermined pulse width to each of a plurality of scanning lines and each of a plurality of signal lines at an end of a subframe,
    wherein a length of the subframe is $(1+x)(N/4)$ or $x+(N/4)$ pulse widths, wherein x is the predetermined pulse width, $0 < x < 1$, N is a number of the scanning lines, $N>0$, and a pulse width is a unit of time standardized to one scan pulse, and
    wherein the driver simultaneously applies an amplitude of aV of drive voltage to each of the plurality of scanning lines, and the driver simultaneously applies an amplitude of 2V of drive voltage to each of the plurality of signal lines, wherein a is a bias ratio and V is a reference voltage.

2. The display unit according to claim 1, wherein the scanning circuit and the signal circuit are formed within a single semiconductor chip.

3. The display unit according to claim 1, wherein by selecting simultaneously L number of scanning electrodes where L is an integer greater than one, a gradation display is made.

4. A matrix type display unit having multiple scanning electrodes and multiple signal electrodes, comprising:
    a predetermined amplitude pulse, having an amplitude significantly greater than a data signal, superimposed to one of the signal electrodes and one of the scanning electrodes simultaneously with one horizontal scanning period; and
    a driver configured to significantly reduce an amplitude of a selection signal and an amplitude difference between a selection signal and the data signal,
    wherein a width of said pulse is in a range from 0.06 to 0.23 when the horizontal scanning period is specified to be 1,
    wherein the predetermined amplitude pulse is applied simultaneously at a predetermined pulse width to each of a plurality of scanning lines and each of a plurality of signal lines at an end of a subframe,
    wherein a length of the subframe is $(1+x)(N/4)$ or $x+(N/4)$ pulse widths, wherein x is the predetermined pulse width, $0 < x < 1$, N is a number of the scanning lines $N>0$, and a pulse width is a unit of time standardized to one scan pulse, and
    wherein the driver simultaneously applies an amplitude of aV of drive voltage to each of the plurality of scanning lines, and the driver simultaneously applies an amplitude of 2V of drive voltage to each of the plurality of signal lines, wherein a is a bias ratio and V is a reference voltage.

5. A matrix type display unit having multiple scanning electrodes and multiple signal electrodes, comprising:
    a pulse applier for superimposing a predetermined amplitude pulse, having an amplitude significantly greater than a data signal, on one of the signal electrodes and one of the scanning electrodes simultaneously with one horizontal scanning period;
    a pulse controller for changing at least one of a pulse width and a position of said one horizontal scanning period; and
    a driver configured to significantly reduce an amplitude of a selection signal and an amplitude difference between a selection signal and the data signal,
    wherein the predetermined amplitude pulse is applied simultaneously at a predetermined pulse width to each of a plurality of scanning lines and each of a plurality of signal lines at an end of a subframe,
    wherein a length of the subframe is $(1+x)(N/4)$ or $x+(N/4)$ pulse widths, wherein x is the predetermined pulse width, $0>x>1$, N is a number of the scanning lines $N>0$, and a pulse width is a unit of time standardized to one scan pulse, and
    wherein the driver simultaneously applies an amplitude of aV of drive voltage to each of the plurality of scanning lines, and the driver simultaneously applies an amplitude of 2V of drive voltage to each of the plurality of signal lines, wherein a is a bias ratio and V is a reference voltage.

6. A driving method for a matrix type display unit having multiple scanning electrodes and multiple signal electrodes, comprising:
superimposing a predetermined amplitude pulse, having an amplitude significantly greater than a data signal, on one of the signal electrodes and one of the scanning electrodes simultaneously with one horizontal scanning period, wherein the pulse is continuously applied during horizontal scanning periods in odd-numbered and even-numbered order, and
significantly reducing an amplitude of a selection signal and an amplitude difference between a selection signal and the data signal,
wherein the predetermined amplitude pulse is applied simultaneously at a predetermined pulse width to each of a plurality of scanning lines and each of a plurality of signal lines at an end of a subframe,
wherein a length of the subframe is $(1+x)(N/4)$ or $x+(N/4)$ pulse widths, wherein x is the predetermined pulse width, $0<x<1$, N is a number of the scanning lines $N>0$, and a pulse width is a unit of time standardized to one scan pulse, and
wherein the driver simultaneously applies an amplitude of aV of drive voltage to each of the plurality of scanning lines, and the driver simultaneously applies an amplitude of 2V of drive voltage to each of the plurality of signal lines, wherein a is a bias ratio and V is a reference voltage.

7. A driving method for a matrix type display unit having multiple scanning electrodes and multiple signal electrodes and having at least, a first pixel which modulates a first wavelength of light and a second pixel which modulates a second wavelength of light, said method comprising:
superimposing a predetermined amplitude pulse, having an amplitude significantly greater than a data signal, on one of the signal electrodes and one of the scanning electrodes simultaneously with one horizontal scanning period, wherein a starting position of a horizontal scanning period of a pulse applied to the first pixel is different from a starting position of a horizontal scanning period of a pulse applied to the second pixel, and
significantly reducing an amplitude of a selection signal and an amplitude difference between a selection signal and the data signal,
wherein the predetermined amplitude pulse is applied simultaneously at a predetermined pulse width to each of a plurality of scanning lines and each of a plurality of signal lines at an end of a subframe,
wherein a length of the subframe is $(1+x)(N/4)$ or $x+(N/4)$ pulse widths, wherein x is the predetermined pulse width, $0<x<1$, N is a number of the scanning lines $N>0$, and a pulse width is a unit of time standardized to one scan pulse, and
wherein the driver simultaneously applies an amplitude of aV of drive voltage to each of the plurality of scanning lines, and the driver simultaneously applies an amplitude of 2V of drive voltage to each of the plurality of signal lines, wherein a is a bias ratio and V is a reference voltage.

8. A driving method for a matrix type display unit having multiple scanning electrodes and multiple signal electrodes, comprising:
superimposing a predetermined amplitude pulse, having an amplitude significantly greater than a data signal, on one of the signal electrodes and one of the scanning electrodes simultaneously with one horizontal scanning period, wherein by changing at least one of a pulse width and a pulse amplitude, a display brightness of the display unit is varied, and
significantly reducing an amplitude of a selection signal and an amplitude difference between a selection signal and the data signal, and
wherein the predetermined amplitude pulse is applied simultaneously at a predetermined pulse width to each of a plurality of scanning lines and each of a plurality of signal lines at an end of a subframe,
wherein a length of the subframe is $(1+x)(N/4)$ or $x+(N/4)$ pulse widths, wherein x is the predetermined pulse width, $0<x<1$, N is a number of the scanning lines $N>0$, and a pulse width is a unit of time standardized to one pulse, and wherein the driver simultaneously applies an amplitude of aV of drive voltage to each of the plurality of scanning lines, and the driver simultaneously applies an amplitude of 2V of drive voltage to each of the plurality of signal lines, wherein a is a bias ratio and V is a reference voltage.

9. An information display unit having the display unit according to claim 1 and an audio reception or transmission device.

10. The display unit according to claim 1, wherein the predetermined amplitude pulse is configured to be varied based on one or more of a plurality of parameters, the parameters comprising color, field, or frame.

\* \* \* \* \*

UNITED STATES PATENT AND TRADEMARK OFFICE
CERTIFICATE OF CORRECTION

PATENT NO.         : 7,737,933 B2
APPLICATION NO.    : 10/381047
DATED              : June 15, 2010
INVENTOR(S)        : Atsuhiro Yamano et al.

It is certified that error appears in the above-identified patent and that said Letters Patent is hereby corrected as shown below:

Title Page:
On the cover page under item (86) §371 (c)(1), (2), (4) Date: "September 10, 2003" should be --June 16, 2003--

On the cover page under item (30); Foreign Application Priority Data, "2000-39710" should be --2000-397712--

Signed and Sealed this
Eighth Day of February, 2011

David J. Kappos
*Director of the United States Patent and Trademark Office*